(12) United States Patent
McWilliams et al.

(10) Patent No.: US 7,975,109 B2
(45) Date of Patent: Jul. 5, 2011

(54) SYSTEM INCLUDING A FINE-GRAINED MEMORY AND A LESS-FINE-GRAINED MEMORY

(75) Inventors: Thomas M. McWilliams, Oakland, CA (US); Earl T. Cohen, Oakland, CA (US); James M. Bodwin, Cupertino, CA (US); Ulrich Bruening, Neustadt a.d. Weinstrasse (DE)

(73) Assignee: Schooner Information Technology, Inc., Menlo Park, CA (US)

( * ) Notice: Subject to any disclaimer, the term of this patent is extended or adjusted under 35 U.S.C. 154(b) by 503 days.

(21) Appl. No.: 12/130,661

(22) Filed: May 30, 2008

(65) Prior Publication Data

US 2008/0301256 A1 Dec. 4, 2008

Related U.S. Application Data

(63) Continuation of application No. PCT/US2008/065167, filed on May 29, 2008.

(60) Provisional application No. 60/940,934, filed on May 30, 2007, provisional application No. 61/035,362, filed on Mar. 10, 2008, provisional application No. 61/039,020, filed on Mar. 24, 2008, provisional application No. 61/039,027, filed on Mar. 24, 2008, provisional application No. 61/042,700, filed on Apr. 4, 2008.

(51) Int. Cl.
*G06F 12/00* (2006.01)

(52) U.S. Cl. . 711/147; 711/202; 711/221; 711/E12.014; 711/E12.066; 711/141; 714/6.22; 714/6.24

(58) Field of Classification Search .......................... None
See application file for complete search history.

(56) References Cited

U.S. PATENT DOCUMENTS 5,897,664 A * 4/1999 Nesheim et al. .............. 711/206
5,963,983 A   10/1999 Sakakura et al.
(Continued)

FOREIGN PATENT DOCUMENTS

EP   1 548 600 A   6/2005
EP   1 746 510 A   1/2007

OTHER PUBLICATIONS

Gopal S. et al., "Speculative Versioning Cache", IEEE Transactions on Parallel and Distributed Systems, IEEE Service Center, Los Alamitos, CA, US, vol. 12, No. 12., Dec. 1, 2001, pp. 1305-1307.

(Continued)

*Primary Examiner* — Reginald G Bragdon
*Assistant Examiner* — Baboucarr Faal
(74) *Attorney, Agent, or Firm* — SNR Denton US LLP

(57) ABSTRACT

A data processing system includes one or more nodes, each node including a memory sub-system. The sub-system includes a fine-grained, memory, and a less-fine-grained (e.g., page-based) memory. The fine-grained memory optionally serves as a cache and/or as a write buffer for the page-based memory. Software executing on the system uses a node address space which enables access to the page-based memories of all nodes. Each node optionally provides ACID memory properties for at least a portion of the space. In at least a portion of the space, memory elements are mapped to locations in the page-based memory. In various embodiments, some of the elements are compressed, the compressed elements are packed into pages, the pages are written into available locations in the page-based memory, and a map maintains an association between the some of the elements and the locations.

79 Claims, 35 Drawing Sheets

U.S. PATENT DOCUMENTS

2005/0005074 A1* 1/2005 Landin et al. ............... 711/148
2005/0034048 A1* 2/2005 Nemawarkar et al. ........ 714/758
2006/0174063 A1 8/2006 Soules et al.

OTHER PUBLICATIONS

McDonald, A. et al; "Architectural Semantics for Practical Transactional Memory", ACM Sigarch Computer Architecture News, vol. 34, No. 2, Jun. 2006, pp. 53-64.

Schooner Information Technology, PCT/US2008/065167 filed May 29, 2008, Invitation to Pay Additional Fees and, where Applicable, Protest fee, European Patent Office, Oct. 23, 2008, 7pp.

Schooner Information Technology, PCT/US2008/065167 filed May 29, 2008, International Search Report and Written Opinion, European Patent Office, Jan. 28, 2009, 16pp.

* cited by examiner

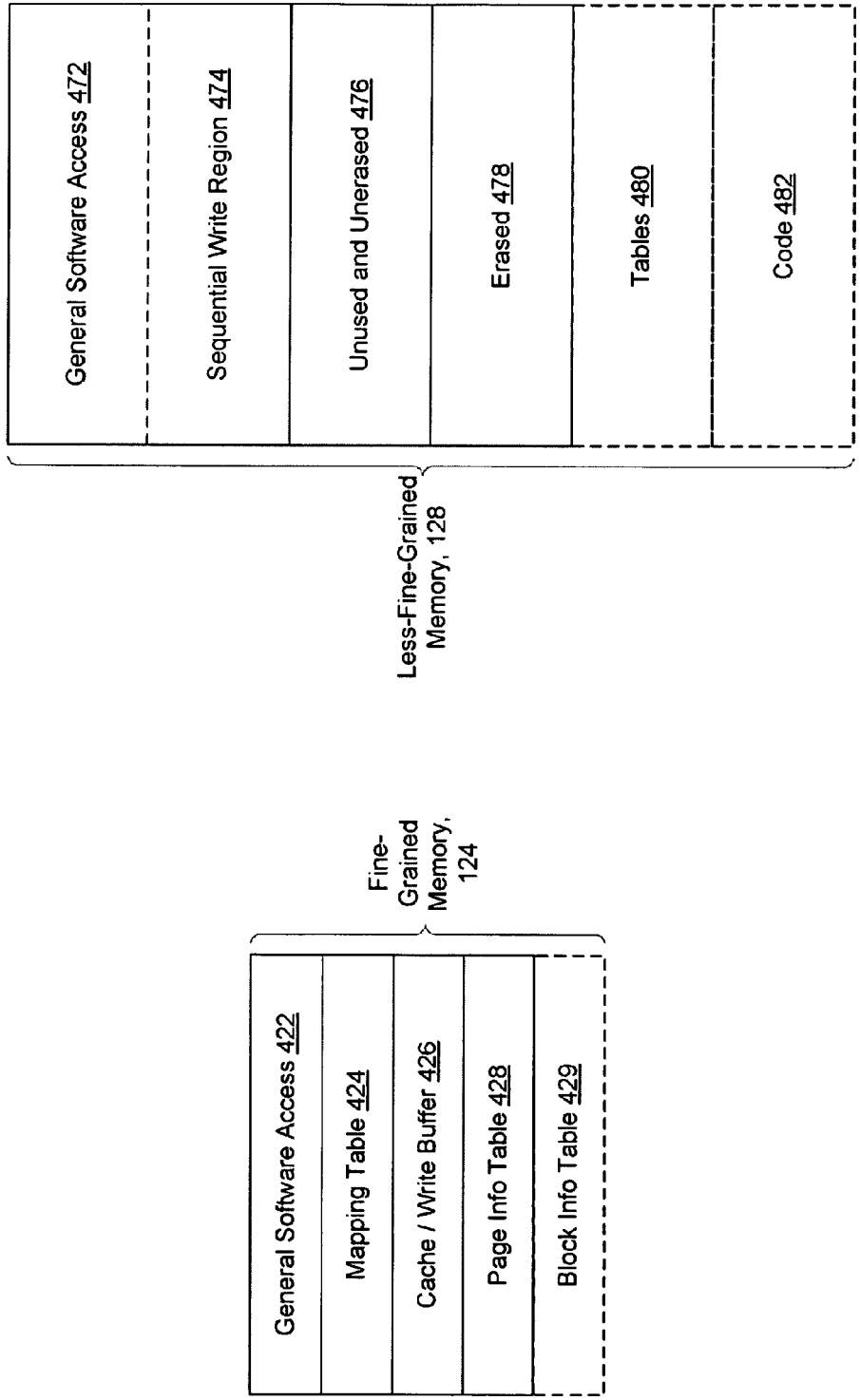

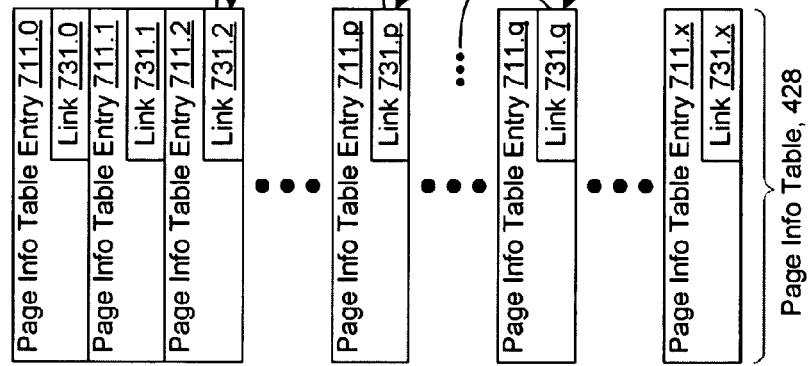
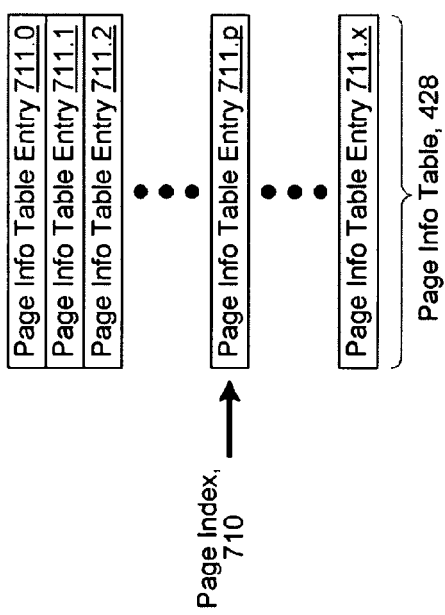
Fig. 7C
Fig. 7A
Fig. 7B

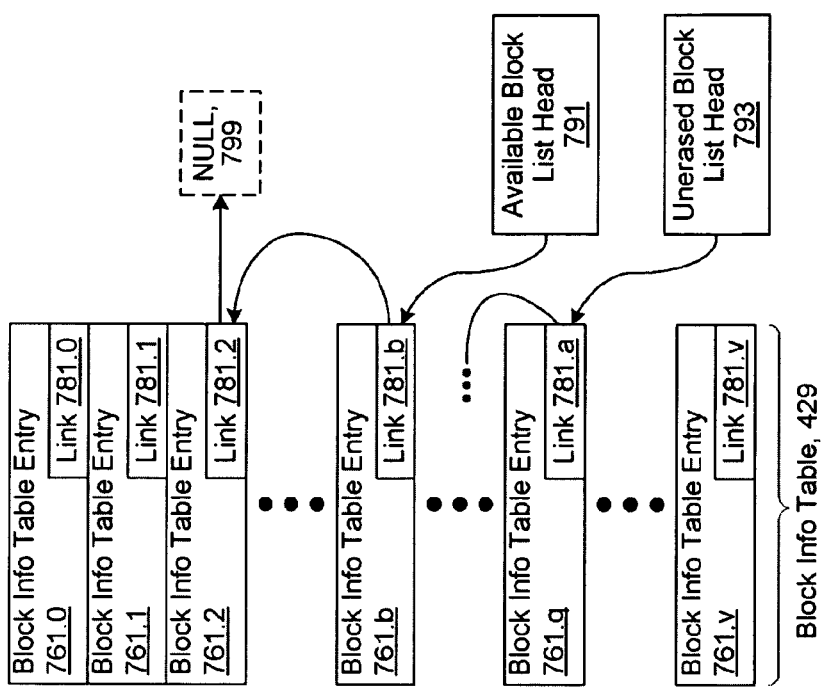
Fig. 7F
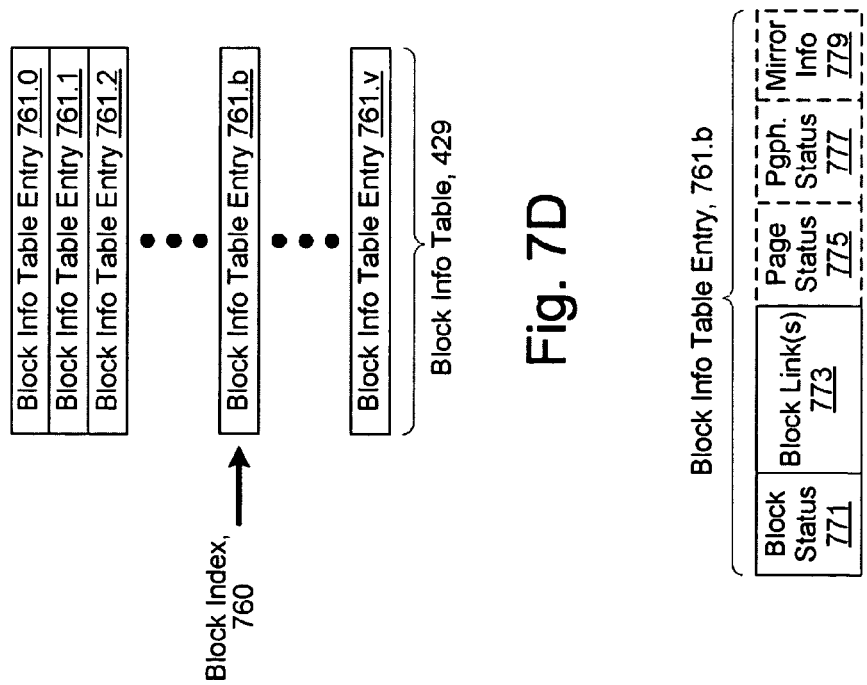
Fig. 7D
Fig. 7E

SYSTEM INCLUDING A FINE-GRAINED MEMORY AND A LESS-FINE-GRAINED MEMORY

CROSS REFERENCE TO RELATED APPLICATIONS

This application is a Continuation of International Application No. PCT/US08/65167, filed 29 May 2008, and also claims the priority benefit of U.S. Provisional Application 60/940,934, filed May 30, 2007.

U.S. Provisional Application 61/035,362, filed Mar. 10, 2008,

U.S. Provisional Application 61/039.020, filed Mar. 24, 2008,

U.S. Provisional Application 61/039,027, filed Mar. 24, 2008, and

U.S. Provisional Application 61/042.700, filed Apr. 4, 2008, which are assigned to the assignee of the present invention and are incorporated herein by reference.

BACKGROUND

1. Field

Advancements in data processing systems are needed to provide improvements in one or more of performance, power utilization, cost, scalability, efficiency, and utility of use.

2. Related Art

Unless expressly identified as being publicly or well known, mention herein of techniques and concepts, including for context, definitions, or comparison purposes, should not be construed as an admission that such techniques and concepts are previously publicly known or otherwise part of the prior art.

Clustered computer systems include a plurality of interconnected processing nodes. Data processing systems manipulate data for purposes such as data analysis and data queries. Some data processing systems store data on storage devices, such as disk drives. Some data processing systems store data in computer memory, such as Dynamic Random Access Memory (DRAM). Some data processing systems operate in a distributed manner where tasks are divided among a plurality of processors. Some data processing systems are clustered computer systems.

An example of a solid-state memory device is a device that stores information and whose active portions are based entirely on electronic and/or optical components, such as a device with active portions made from semiconductors. Solid-state memory devices include volatile memory devices, such as DRAMs, and non-volatile memory devices, such as flash memory devices. Non-volatile, solid-state memory devices retain contents after power is removed. Volatile, solid-state memory devices, in contrast, lose contents after power is removed. Back-up power sources (such as a battery back-up power source) are sometimes used to enable a volatile, solid-state memory device to retain contents for at least some time period after power is removed. Generally, non-volatile, solid-state memory devices have a higher capacity and/or use less power than volatile, solid-state memory devices, and volatile, solid-state memory devices have higher performance than non-volatile, solid-state memory devices.

Solid-state memory systems (memory systems using solid-state memory devices for storage) are contrasted with electro-mechanical memories such as hard disk drives or optical disk drives, which have mechanical action and/or moving parts. Some non-volatile, solid-state memory systems have been manufactured in a disk form factor and with standard disk drive interfaces, so called solid-state disks, to provide some of the advantages of non-volatile, solid-state memory devices, though generally at a higher price and/or with a lower capacity than hard disk drives.

In some system, a capacity of high-performance, solid-state memory, such as DRAM, is limited by factors such as cost and power. In some systems, a use of high-capacity, solid-state memory, such as flash memory, is limited by performance. Flash memory, for example, is slower in read access than DRAM, and even slower in write access, and thus has seen limited use as a main memory, generally in low-power and/or low-performance devices. Further, some non-volatile, solid-state memory devices, such as NAND flash memory devices, are paged-based. For example, a minimum writable unit of a NAND flash memory device is a page, such as a 2 kilobyte (KB) or 4 KB page. The page-based nature of some non-volatile, solid-state memory devices has made use of such devices in solid-state disks or as similar hard disk drive replacements seem natural, as hard disks are block-based devices (and have a minimum writable unit of a block, such as a 512 byte or a 4 KB block).

A page-based, solid-state memory device, such as a NAND flash memory device, comprises a plurality of pages, a size of the pages varying according to factors such as technology and/or manufacturer of the solid-state memory device. For example, the size of the pages in some NAND flash memory devices is 512 B, and the size of the pages in other NAND flash memory devices is 4 KB. A page of the page-based, solid-state memory device is the smallest writable (programmable) unit. That is, portions of a page are not writable independent of writing the entire page.

In some page-based, solid-state memory devices, pages are organized into blocks, each of the blocks comprising a number of the pages. As with the size of the pages, the number of the pages per block varies according to factors such as technology and/or manufacturer of the solid-state memory device. For example, the number of the pages per block in some NAND flash memory devices is 32, and the number of the pages per block in other NAND flash memory devices is 64. In some page-based, solid-state memory devices, a block is the smallest erasable unit, and blocks must be erased before the pages in the blocks are writable (programmable). Thus, writing data to a page-based, solid-state memory device may require erasing an entire block, even if an amount of the data is small.

Some page-based, solid-state memory devices support reading a portion of a page. For example, some NAND flash memory devices enable reading a portion of a page starting at an arbitrary index within the page. The page-based nature of writing to page-based, solid-state memory devices, combined with a need to have error detection and/or correction for each page, has caused many systems to treat both read and write of the page-based, solid-state memory devices similarly, and to only support page-based accesses.

The reference:

"Speculative Versioning Cache", Vijaykumar, et al. IEEE Transactions on Parallel and Distributed Systems, Volume 12, Issue 12, December 2001, pg. 1305-1317 discusses versioning of data with regard to caches, but does not discuss other types of versioning, such as with regard to transactions in a clustered computer system and/or in a memory system.

The reference:

"Architectural Semantics for Practical Transactional Memory", McDonald, et al. ACM SIGARCH Computer Architecture News, Vol. 34, Issue 2. May, 2006, pg. 53-65 discusses transactional memory semantics as embodied in an Instruction Set Architecture (ISA), but does not discuss transactional semantics as embodied in a clustered computer system and/or in a memory system.

All of the aforementioned references are herein incorporated by reference for all purposes.

SUMMARY

The invention may be implemented in numerous ways, including as a process, an article of manufacture, an apparatus, a system, and as a set of computer-readable descriptions and/or instructions embedded on and/or in a computer readable medium such as a computer readable storage medium. In this specification, these implementations, or any other form that the invention may take, may be referred to as techniques. The Detailed Description provides an exposition of one or more embodiments of the invention. The Detailed Description includes an Introduction to facilitate the more rapid understanding of the remainder of the Detailed Description. The Introduction includes Example Embodiments of one or more of systems, methods, articles of manufacture, and computer readable media in accordance with the concepts described herein. As is discussed in more detail in the Conclusions, the invention encompasses all possible modifications and variations within the scope of the issued claims.

BRIEF DESCRIPTION OF DRAWINGS

FIG. 4A illustrates an embodiment of contents of a fine-grained memory.

FIG. 4B illustrates an embodiment of contents of a less-fine-grained memory.

FIG. 7A illustrates an embodiment of a page information table.

FIG. 7B illustrates an embodiment of a page information table entry.

FIG. 7C illustrates an example of linking page information table entries into a linked list.

FIG. 7D illustrates an embodiment of a block information table.

FIG. 7E illustrates an embodiment of a block information table entry.

FIG. 7F illustrates an example of linking block information table entries into a linked list.

FIGS. 9A-9D illustrate embodiments of data structures within a page and within a paragraph.

DETAILED DESCRIPTION

Figure 1A:
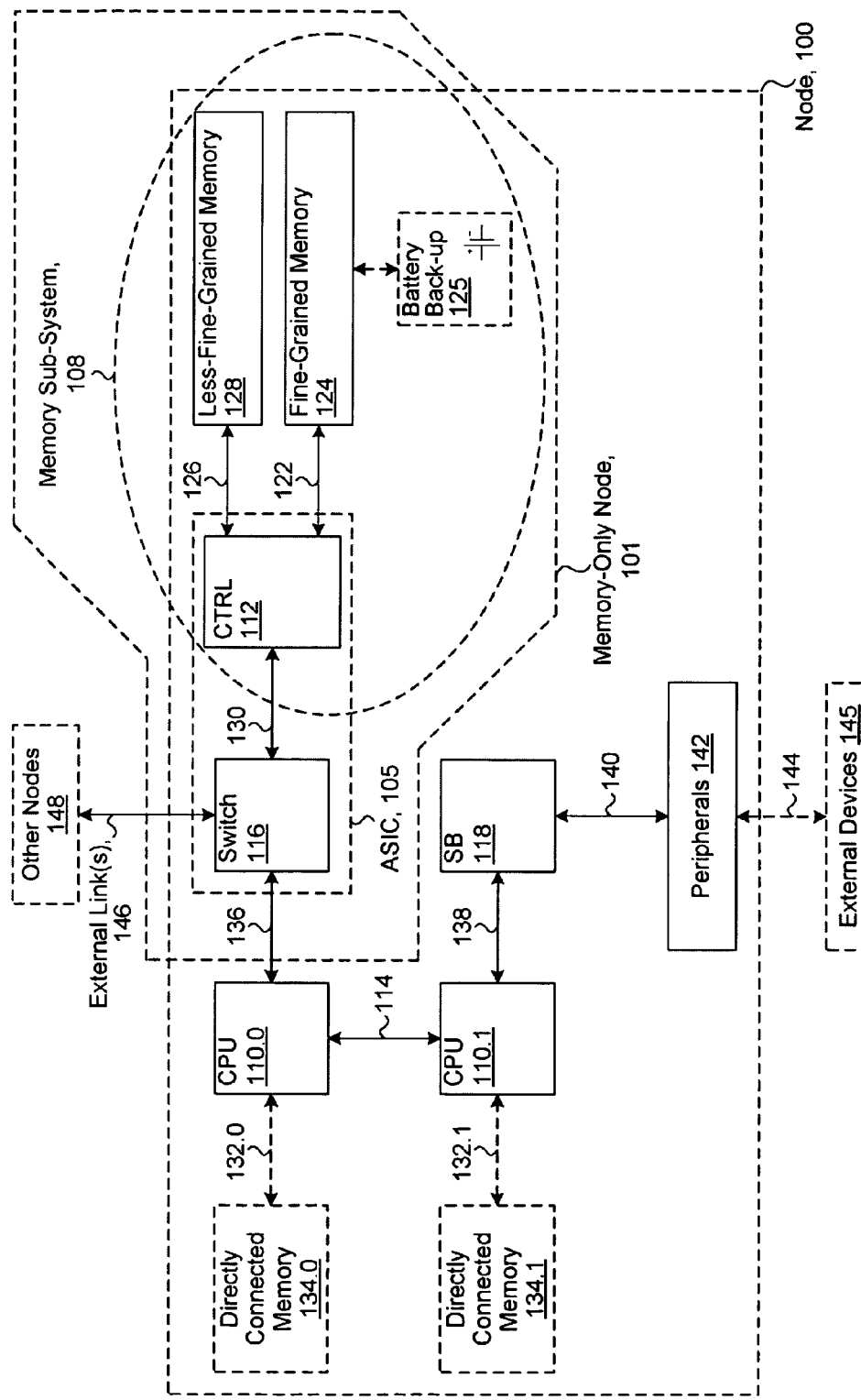
FIGS. 1A, 1B, and 1D illustrate embodiments of a portion of a system including a node having a fine-grained memory and a less-fine-grained memory.

A detailed description of one or more embodiments of the invention is provided below along with accompanying figures illustrating selected details of the invention. The invention is described in connection with the embodiments. The embodiments described herein should be understood to be merely exemplary, the invention is expressly not limited to or by any or all of the embodiments described herein, and the invention encompasses numerous alternatives, modifications and equivalents. To avoid monotony in the exposition, a variety of word labels (including but not limited to: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Introduction

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

Acronyms

Elsewhere herein various shorthand abbreviations, or acronyms, are used to refer to certain elements. The descriptions of at least some of the acronyms follow.

| Acronym | Description |
| --- | --- |
| ACID | Atomic Consistent Isolated Duarable |
| ASIC | Application-Specific Integrated Circuit |
| CAM | Content Addressable Memory |
| CPLD | Complex Programmable Logic Device |
| CPU | Central Processing Unit |
| CRC | Cyclic Redundancy Check |
| CSR | Control/Status Register |
| DIMM | Dual In-line Memory Module |
| DMA | Direct Memory Access |
| DRAM | Dynamic Random Access Memory |
| ECC | Error Correcting Code |
| EDC | Error Detecting Code |
| EEPROM | Electrically Erasable Programmable Read-Only Memory |
| FBDIMM | Fully Buffered Dual In-line Memory Module |
| FGM | Fine-Grained Memory |
| FPGA | Field Programmable Gate Array |
| FRAM | Ferroelecric Random Access Memory |
| I/O | Input/Output |
| LFGM | Less-Fine-Grained Memory |
| MRAM | Magnetoresistive Random Access Memory |
| NIC | Network Interface Controller |
| PLD | Programmable Logic Device |
| PRAM | Phase-change Random Access Memory |

-continued

| Acronym | Description |
| --- | --- |
| PROM | Programmable Read-Only Memory |
| RAID | Redundant Array of Inexpensive Disks |
| RDMA | Remote Direct Memory Access |
| ROM | Read-Only Memory |
| SRAM | Static Random Access Memory |
| UBNYE | Unused But Not Yet Erased |
| USB | Universal Serial Bus |
| WB | Write Buffer |
| XBAR | Crossbar |

Overview

This Overview section provides an overview of one set of embodiments. Details of some other embodiments are described in subsequent sections.

The inventors are not aware of computer systems, such as data processing systems or clustered computer systems, that advantageously use high-capacity and/or non-volatile, solid-state memory (for example, flash memory) as a portion of a memory hierarehy and in a way that is much more similar to a high-performance main memory (such as a DRAM-based main memory) than to a hard disk drive. Doing so requires solving multiple problems, such as achieving high performance with a page-based memory device, particularly for varying and/or small access sizes (less than a size of one of the pages) typically used with main memories. Solving these problems brings benefits such as high capacity, low power, and non-volatility to a high-performance memory system. Further, providing a high-performance, non-volatile memory system advantageously enables the memory system to subsume some or all of a role traditionally filled by hard disk drives, and creates a new type of system. For example, in a database system, transactions are optionally and/or selectively committable once they have completed or been logged to non-volatile "main" memory, without having to wait for completion of operations to much slower hard disk drives.

One of the imports of the present invention is an ability to use a less-fine-grained memory, such as a page-based memory, as all or a portion of a memory hierarehy in a computer system, such as a data processing system. Historically, page-based memory, such as flash memory, has been used in portable devices, such as Personal Digital Assistants, and in peripherals, such as solid-state disks. The techniques described herein advantageously enable the use of page-based memories as at least a portion of a memory hierarehy, such as a main memory, of a computer system, providing advantages such as high storage capacity at a reduced latency. Many other embodiments of the invention are also contemplated, as described herein.

Figure 1B:
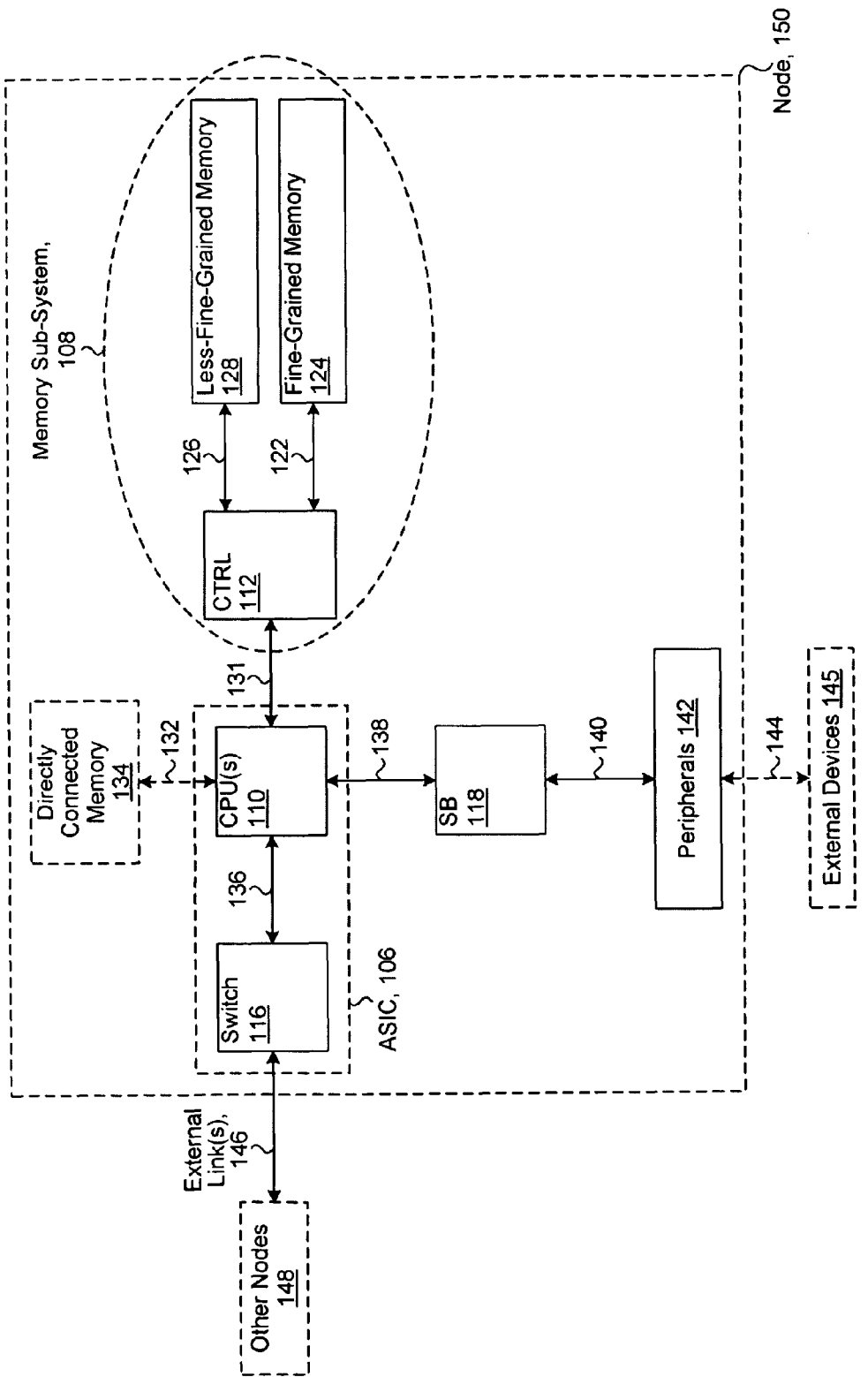
Figure 1C:
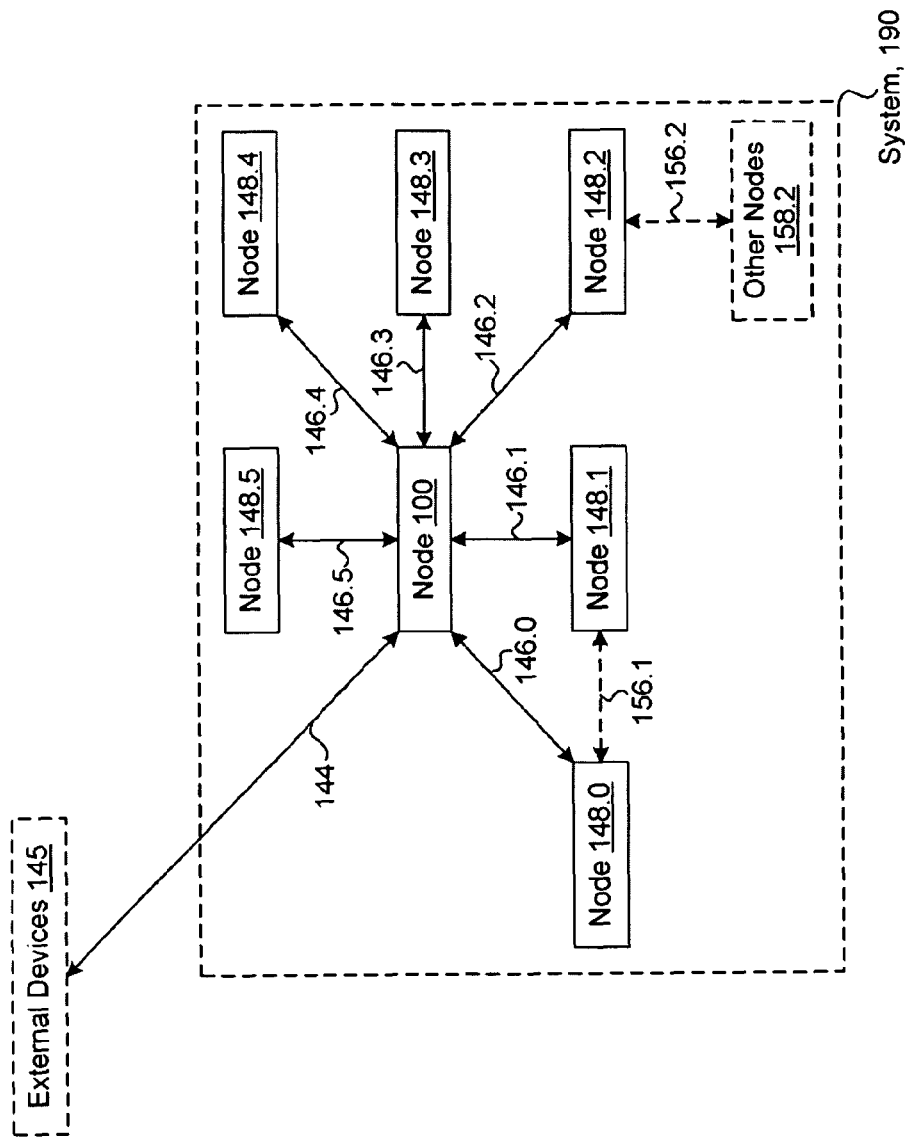
FIG. 1C illustrates an embodiment of a portion of a system including a plurality of nodes.
Figure 1D:
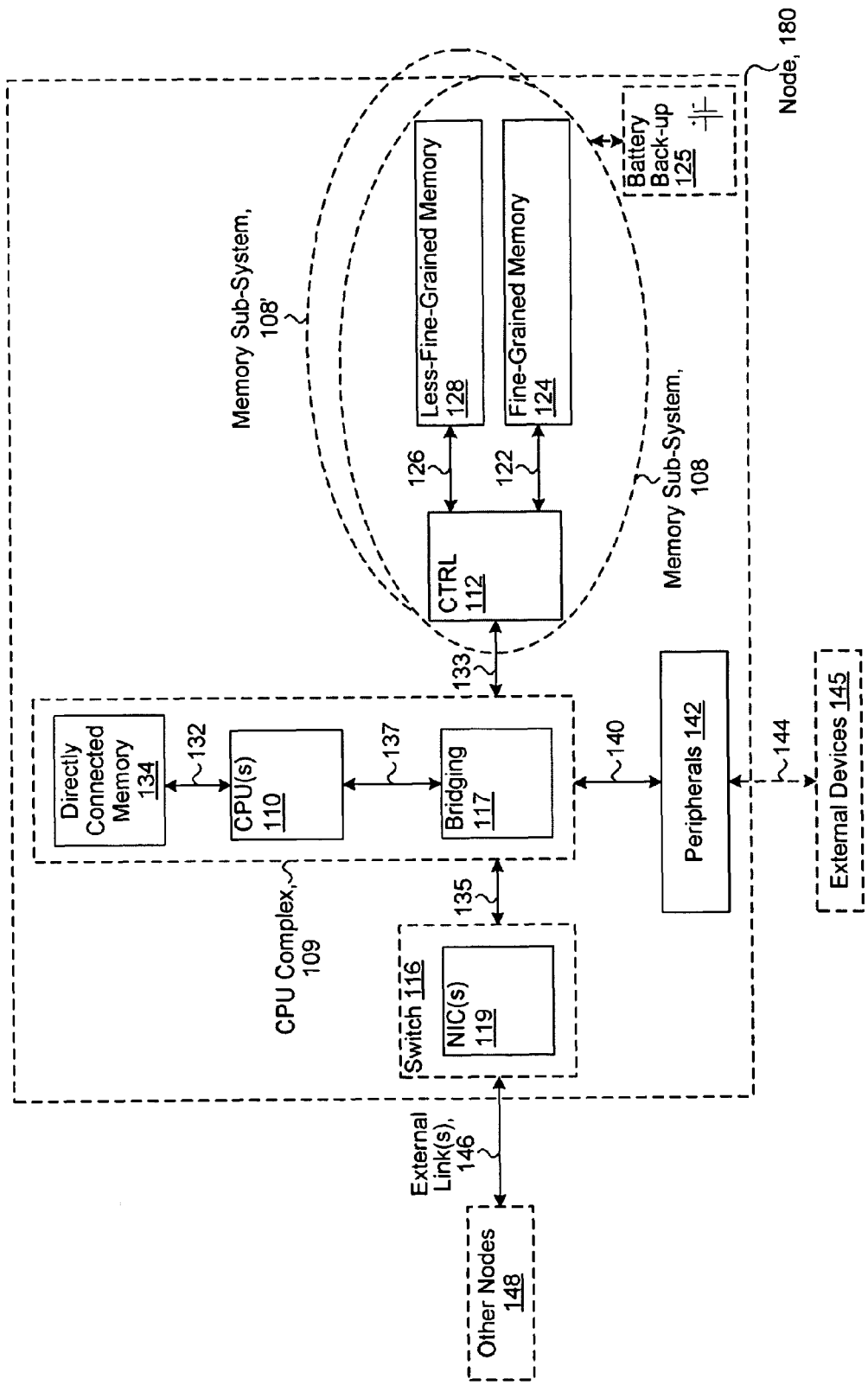

A data processing system (such as data processing system 190 of FIG. 1C) includes one or more nodes (such as node 100 of FIG. 1A, or node 180 of FIG. 1D). According to various embodiments, the nodes are interconnected to enable communication among the nodes in various ways, such as one or more of: direct connections between the nodes (for example, in a mesh); and via external mechanisms (for example, via switch 116' as illustrated in FIG. 1B). In various embodiments and/or usage scenarios, the nodes are configured to communicate and/or to cooperatively perform processing tasks. In further embodiments, a first subset of the nodes is configured to process shared data stored on and/or directly accessible via a second subset of the nodes, where the first subset and the second subset optionally and/or selectively overlap.

Figure 1E:
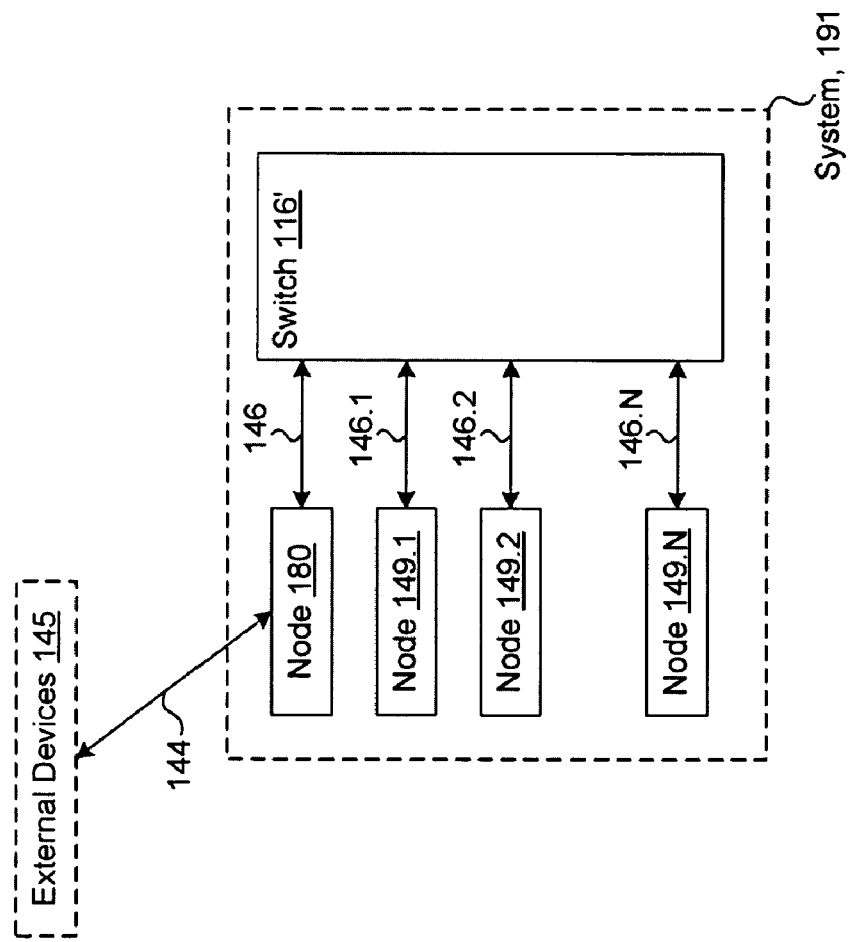
FIG. 1E illustrates an embodiment of a portion of a system including a plurality of nodes connected by a switch.

In some embodiments the nodes are communicatively coupled, such as via respective interconnect switches of the nodes and/or via external switching. For example, as illustrated in FIG. 1E, nodes 180, 149.1, 149.2, . . . , 149.N are coupled through external switch 116' via external links 146, 146.1, 146.2, . . . , 146.N. According to various embodiments, external switch 116' is one or more of: similar or substantially similar to switch 116 (as illustrated in FIG. 1A); a multi-port switch; a single-tier switch; a multi-tier switch; a switching network; representative of a LAN, a WAN, or the Internet; and any other switching technique and/or interconnection network suitable for interconnecting nodes. According to various embodiments, respective processors of the nodes communicate (within and/or between the nodes) using one or more of: packets; datagrams; messages; remote procedure call; RDMA; memory-based communications; any other inter-processor communication techniques; and any combination of the foregoing.

According to various embodiments, each of the nodes includes components such as one or more of: one or more respective processors, such as two processors; a respective memory sub-system; a respective Southbridge chip enabling interconnections to I/O busses and/or to peripheral devices; and a respective interconnect switch enabling connectivity to other nodes. In some embodiments, at least one of the respective processors includes multiple processing cores. In some embodiments, at least some of the nodes include the respective interconnect switch and the respective memory sub-system, but do not include the respective processors and optionally do not include the respective Southbridge chip. In some embodiments, the respective interconnect switch includes one or more Network Interface Controllers (such as NIC(s) 119 as illustrated in FIG. 1D) coupled to respective external links. According to various embodiments, the external links use one or more of: an Ethernet protocol; an InfiniBand® protocol; and any other high-speed communications medium and/or protocol. In some embodiments, the one or more NICs communicate with the respective processors via a bus of the respective node, such as a PCI Express bus. In further embodiments, software executing on the respective processors provides a switching function (such as by controlling receipt of packets from and/or transmission of packets to the NICs) so that the NICs and the respective processors function, at least in part, as the respective interconnect switch.

The components of a particular one of the nodes are coupled using communications links, such as link(s) 133, 135, 137, or 140 as illustrated in FIG. 1D. Some communications links, such as a communications link compatible with PCI Express, use a plurality of lanes to implement the communications link. Herein, a communications link is generally, but not always, referred to as optionally including a plurality of links, hence communications link 133, for example, is generally referred to as link(s) 133. According to various embodiments, the communications links are compatible with one or more of: PCI Express; HyperTransport™; InfiniBand®; and any other high-speed communications link and/or protocol. In various embodiments, at least some of the communications links of the respective processors (termed processor communications links) are compatible with a high-speed, point-to-point, inter-processor, interconnect protocol. In some embodiments, the respective interconnect switch is coupled to at least one of the respective processors by one or more of the processor communications links.

In various embodiments, the one or more respective processors and optionally other portions of a particular one of the nodes are included in a respective CPU complex of the particular node (such as CPU complex 109 of FIG. 1D). As illustrated in FIG. 1D, CPU complex 109 includes one or more respective processors (CPU(s) 110), such as two processors; respective processor memory coupled to the respective processors (such as directly connected memory 134 coupled to the respective processors via link(s) 132); and connectivity to other components of the particular node (such as bridging 117 coupled to the respective processors via link(s) 137). Herein, the terms the respective processors and the respective CPU complex are used interchangeably to refer to the respective processors and optionally to other components of the particular node that are directly coupled to the respective processors.

Of course, there are various organizations of the respective CPU complex, and some of the organizations depend on a type of the respective processors. In a first example, the respective CPU complex includes the respective processors, a respective Northbridge chip coupled to the respective processors, the respective Southbridge chip coupled to the respective Northbridge chip, and respective processor memory (such as DRAM) coupled to the Northbridge chip. In a second example, the respective CPU complex includes the respective processors, the respective Southbridge chip, and respective processor memory (such as directly connected memory 134 of FIG. 1D) directly connected to the respective processors. In some embodiments, the respective processor memory is and/or is managed as a portion of the respective memory sub-system.

In some embodiments, such as illustrated in FIG. 1D, the respective interconnection bridging (bridging 117) of a particular one of the nodes optionally supports a number of connections to devices, such as peripherals 142 (coupled via link(s) 140) and/or the respective interconnect switch (coupled to CPU complex 109 via link(s) 135). According to various embodiments and/or usage scenarios, at least some of the peripherals are one or more of: components of a node, such as a local disk drive or a PCMCIA card slot; and external to the node, for example plug-in peripherals (such as external devices 145 coupled via link(s) 144).

The respective CPU complex is enabled to execute operating system software (such as Linux) including drivers and interrupt routines, to execute applications programs (such as a database program), and to execute control and management software to control and manage the particular node (and/or, in some embodiments, others of the nodes). According to a type of the respective processors (such as whether the respective processors are Intel and/or AMD processors), there are various components of the CPU complex, and there are various ways in which the various components are organized. In a first example, bridging 117 (as illustrated in FIG. 1D) includes a Northbridge chip coupled to CPU(s) 110 and to directly connected memory 134, and a Southbridge chip coupled to the Northbridge chip. In the first example, CPU(s) 110 are coupled to each other via the Northbridge chip. In a second example, each of CPU(s) 110 is optionally coupled to at least a portion of directly connected memory 134, and at least one of CPU(s) 110 is coupled to bridging 117. In the second example, each one of CPU(s) 110 is coupled to at least one other of CPU(s) 110.

According to various embodiments, the components of a particular one of the nodes are arranged and/or are combined and/or coupled in various manners. In a first example, the respective interconnect switch is integrated with the respective CPU complex, such as with the respective processors. In a second example, the respective interconnect switch is integrated with the respective Southbridge chip or with the respective interconnection bridging. In a third example, the respective interconnect switch is integrated with a controller for the respective memory sub-system. In a fourth example, a processor-only node includes the respective CPU complex, the respective interconnection bridging, and the respective interconnect switch, but does not include the respective memory sub-system. In various embodiments, a processor-only node is enabled to communicate via the respective interconnect switch with the respective memory sub-systems of others of the nodes. In a fifth example, a memory-only node includes the respective memory sub-system, and the respective interconnect switch, but does not include the respective processors. In various embodiments, a memory-only node is enabled to communicate via the respective interconnect switch with the respective memory sub-systems of others of the nodes and/or with the respective processors of others of the nodes.

In some embodiments, the respective memory sub-system is external to the respective CPU complex. In other embodiments, at least a portion of the respective memory sub-system is integrated with the respective CPU complex. In a first example, the respective memory sub-system includes a memory sub-system controller, and at least a portion of the memory sub-system controller is integrated with the respective processors (or with another component of the respective CPU complex). In a second example, at least some functions of the respective memory sub-system are performed and/or controlled, at least in part, by software executing on the respective processors. Herein, the respective memory sub-system is sometimes referred to as an external memory sub-system (or an external memory system) since at least a portion of the respective memory sub-system, such as one or more memory devices, is external to (not integrated with, such as in an integrated circuit with) the respective processors (and/or the respective CPU complex).

The respective memory sub-system (such as memory sub-system 108 or memory sub-system 108' as illustrated in FIG. 1D) includes a memory sub-system controller (such as memory sub-system controller 112) and a plurality of types of memory, including a fine-grained memory type (such as fine-grained memory 124), and a less-fine-grained memory type (such as less-fine-grained memory 128). In various embodiments, the fine-grained memory has a granularity of access (a minimum size of data in an access) that is smaller than that of the less-fine-grained memory. For example, in some embodiments, the fine-grained memory has a granularity of access for write of 8 B, and the less-fine-grained memory has a granularity of access for write of 2 KB or 4 KB. In some embodiments, the fine-grained memory type is and/or includes a volatile memory type, such as DRAM or mobile DRAM. In further embodiments, the fine-grained memory type is coupled, at least in part, to a battery back-up to preserve at least a portion of the fine-grained memory, at least for some amount of time, in the event of a loss of power, such as due to a power failure. In some embodiments, the less-fine-grained memory type is and/or includes a non-volatile memory type, such as flash memory. In various embodiments, at least some of the accesses to the less-fine-grained memory are page-based (such as write accesses) or are block-based (such as erase accesses). In some embodiments, the respective memory sub-system includes and/or is coupled to a control processor to manage and/or control operations such as diagnostics, maintenance, initialization, and recovery. In further embodiments, the respective processors function as the control processor.

In some embodiments, the fine-grained memory includes one or more separate memories. According to various embodiments, one or more of: the fine-grained memory is separate from and/or independent of the respective processor memory; the fine-grained memory includes some or all of the respective processor memory; and the fine-grained memory includes some or all of an external DRAM memory in an address space of at least one of the respective processors. For example, the fine-grained memory includes a first part that is part of or is directly coupled to the CPU complex (such as directly connected memory 134 as part of CPU complex 109), and a second part that is coupled to the respective processors via the memory sub-system controller (such as fine-grained memory 124 coupled via memory sub-system controller 112). In various embodiments, separating the fine-grained memory into separate portions enables a first portion to operate efficiently for access by the respective processors, and a second portion to operate efficiently for access by the memory sub-system controller and/or to have other desirable properties, such as non-volatility or temporary non-volatility.

Herein, a long-term battery back-up provides power for a sufficient long-term duration (such as longer than an expected power outage) that an otherwise volatile memory powered by the long-term battery back-up is considered non-volatile. For example, a long-term battery back-up provides power for multiple hours or for one or more days. In some embodiments, the long-term battery back-up powers not solely the otherwise volatile memory, but also control logic (such as at least a portion of memory sub-system controller 112), for example to refresh the otherwise volatile memory. Herein, a short-term battery back-up provides power for a sufficient short-term duration (such as long enough to present a portion of memory state in non-volatile storage in the event of a power disruption) that an otherwise volatile memory powered by the short-term battery back-up is considered temporarily non-volatile. For example, the short-term battery back-up provides power for enough time to preserve at least a portion of the otherwise volatile memory in non-volatile storage. In some embodiments, a short-term battery back-up powers not solely the otherwise volatile memory, but also the non-volatile storage and/or control logic (such as at least a portion of memory sub-system controller 112) for the sufficient short-term duration. According to various embodiments, a non-volatile or temporarily non-volatile portion of the fine-grained memory is used for one or more of: a cache and/or a write buffer for the less-fine-grained memory; information related to versioning of data, such as data involved in transactions; information used in failure recovery by software executing on the respective processors, such as information related to data replication among the nodes; and any other information required to be non-volatile.

In some embodiments, all or a portion of the fine-grained memory is non-volatile and/or is preserved in a non-volatile memory in the event of a power disruption (such as a power outage). In a first example, at least a portion of the fine-grained memory is a non-volatile memory type, such as FRAM. In a second example, at least a portion of the fine-grained memory is a volatile static memory type, such as SRAM, and the at least a portion of the fine-grained memory is coupled to a long-term battery back-up. In a third example, the respective memory sub-system is coupled to a short-term battery back-up to enable at least a portion of the fine-grained memory that is coupled to a memory sub-system controller of the respective memory sub-system (such as memory sub-system controller 112) to be preserved, such as in the less-fine-grained memory. In various embodiments, a short-term battery back-up for at least a portion of the fine-grained memory (such as battery back-up 125 as illustrated in FIG. 1A or in FIG. 1D) preserves the at least a portion of the fine-grained memory for at least some amount of time in the event of a power disruption. In further embodiments, the short-term battery back-up enables the memory sub-system controller and the at least a portion of the less-fine-grained memory to continue operating, and the at least some amount of time is sufficient to copy a specified part or all of the at least a portion of the fine-grained memory to one or more specified regions of the less-fine-grained memory.

The respective interconnect switch of a particular one of the nodes includes a plurality of ports, each port providing a respective switch communications link. At least one of the ports is a processor port that couples the respective interconnect switch to at least one of the respective processors, and at least one of the ports is an external port enabling coupling among the nodes via the respective interconnect switches. In some embodiments, each external one of the ports is controlled and/or configured by a respective Network Interface Controller (NIC). In various embodiments, at least one of the ports is a local port coupling the respective interconnect switch to other components of the particular node, such as to a controller for the respective memory sub-system.

In some embodiments, the respective interconnect switch has six external ports, enabling the nodes to be coupled in a multi-dimensional network, such as a cube or a hyper-cube. In some embodiments, external ports of the respective interconnect switch are of a different type than processor ports. For example, processor ports provide communications links using HyperTransport™ protocol for coupling to processors, and external ports provide optical communications links using an inter-switch protocol for coupling among a plurality of the respective interconnect switches.

In some embodiments, the respective interconnect switch of a particular one of the nodes includes one or more NICs on a bus and/or one of the communications links of the particular node, such as a PCI Express bus. In further embodiments, software executing on the respective processors of the particular node provides a switching function (such as by controlling receipt of packets from and transmission of packets to the NICs) so that the NICs and the respective processors function as the respective interconnect switch.

The respective processors of a particular one of the nodes are enabled to communicate via one or more processor communications links. In some embodiments, the respective processors are coupled together via some of the processor communications links, and others of the processor communications links provide intra-node (outside of the one or more respective processors and within the particular node) communications to/from the respective processors. In some embodiments, at least some of the respective processors of the particular node are coupled via a combination of the processor communications links and the switch communications links of the respective interconnect switch. In a first example, a pair of the respective processors is directly coupled via processor communications links. In a second example, each of the pair of processors is coupled to the respective interconnect switch forming an indirect coupling of the respective processors via the respective interconnect switch. In a third example, a pair of the respective processors is coupled via a Northbridge chip.

In a further example, a particular one of the respective processors is an AMD Opteron™ processor, and the particular processor is enabled to communicate via one or more communications links using HyperTransport™ protocol. Continuing the example, if two of the respective processors are AMD Opteron™ processors, the Opteron™ processors are coupled via a first HyperTransport™ communications link, and each of the Opteron™ processors has an additional HyperTransport™ communications link for additional communications, such as to the respective Southbridge chip from a first one of the Opteron™ processors, and to the respective interconnect switch from a second one of the Opteron™ processors.

The respective processors of a particular one of the nodes output addresses, such as via the processor communications links, to access external (to the respective processors) components, such as memory devices. Some processors manage multiple address spaces, such as a virtual address space (used, for example, by user-level software) and a physical address space (used, for example, by hardware circuitry to select and/or to address particular physical components). One example of at least a portion of a physical address space is a PCI (or PCI Express) address space. (Herein, all references to PCI, such as to a PCI bus or to a PCI address space, refer to any one or more of PCI, PCI Express, or any similar I/O standard.) Some processors use structures such as a translation look-aside buffer to translate between the virtual address space and the physical address space. Some processors map portions of the physical address space. For example, a portion of the physical address space refers to I/O devices, or to specific on-chip memories or registers. Some processors include memory interfaces, and a first portion of the physical address space refers to memory local to the processor, and a second portion of the physical address space refers to memory local to other processors and/or to other external devices.

To distinguish among multiple address functions of some embodiments, the terms "node address space" and "node address" (an address within the node address space) are used. A node address space enables access to resources, such as memory, that are local to a particular one of the nodes, and/or to resources that are local to others of the nodes. According to various embodiments, a node address space is one or more of: distinct from the physical address space; overlapping with the physical address space; a portion of the physical address space; a mapped, routed, or otherwise translated portion of the physical address space; and any combination thereof. In some embodiments, a node address space is used as part of a message-based protocol for communicating among the nodes. In further embodiments, the node address space is used for the communicating among the nodes, and within each of the nodes, the respective processors use a respective physical address space to access the respective memory sub-system. For example, the respective processors of a particular one of the nodes generate a node address to access a portion of memory (that is either local to the particular node, or resides on one of the others of the nodes). The node address is used, at least in part, to determine a home one of the nodes for the portion of memory, and a message (such as a packet) including at least a portion of the node address is sent to the home node (such as via the respective interconnect switch of the particular node). The home node (such as the respective processors of the home node) uses the at least a portion of the node address to generate a physical address to access the respective memory sub-system of the home node (and thus to access the portion of memory), and a result from the respective memory sub-system of the home node is returned (such as via the respective interconnect switch of the home node) to the respective processors of the particular node. In some embodiments, when the home node is the particular node, the message is a local message, and is sent without using the respective interconnect switch of the particular node. In other embodiments, when the home node is the particular node, messaging is not used, and at least a portion of the node address is used to generate a physical address to access the respective memory sub-system of the particular node.

According to various embodiments, the respective processors perform accesses (such as to the fine-grained memory and/or to the less-fine-grained memory) via a node address space using one or more of: load and/or store operations; put and/or get operations, such as HyperTransport™ or RDMA put/get operations; an address field in packets, frames, cells, or messages; prefetch versions of any of the foregoing; and other communication protocols. Herein, the respective processors are said to read and/or to write (or collectively, to access) via the node address space, encompassing any of the foregoing embodiments. In some embodiments, load/store operations are cache coherent (with respect to caches of the respective processors). In various embodiments and/or usage scenarios, some or all of the operations, such as some or all of the put/get operations, perform a transfer to and/or from a portion of the node address space (such as a portion of the respective less-fine-grained memory) from and/or to an other memory, such as a directly-connected memory of the respective processors. According to various embodiments, an address in the other memory is specified as one or more of: a physical address; a virtual address; and a node address.

In some embodiments, at least some of the read and/or write accesses are asynchronous, in that the respective processors do not wait for a response to the access In further embodiments, the respective processors determine completion of an asynchronous access by one or more of: interrupts; polling; observing pointers, such as queue pointers; and other techniques. In some embodiments, an amount of data returned from a read access is variable. For example, a type of read access is enabled to read a plurality of records, and to filter the records based, at least in part, upon a list of filter criteria, returning solely a portion of the records that match (or do not match) the list of filter criteria.

Each of the nodes manages and/or uses at least one node address space. According to various embodiments and/or usage scenarios, one or more of: a node address space is respective to a particular one of the nodes; a node address space is respective to a software entity, such as a container; a node address space is managed and/or used by ones of the nodes accessing and/or managing a software entity associated with the node address space, each of a plurality of the nodes has an identical node address space; and at least some of the nodes have node address spaces that differ, at least in part, from each other. (Of course, there are, in various embodiments, any number of software entities, such as containers, instantiated at any one time, and each of the nodes is enabled to independently access zero, one, or more of the software entities at substantially a same time.) In some embodiments, a particular node address space maps only a first portion of a memory, and a second portion of the memory is either accessible in other node address spaces, or is not accessible in any node address space. In various embodiments, a first portion of a memory is accessible in a node address space used by each of one or more of the nodes, but a second portion of the memory is not accessible in any node address space used by any of the nodes. For example, the second portion of the memory is "private" memory that is accessible solely to the node including the memory. In some embodiments, the respective node address space of a particular one of the nodes is at least a portion of the physical address space of one of the respective processors of the particular node.

In some embodiments, a node address space includes a local portion and/or a global portion. In further embodiments, the nodes are advantageously enabled to access, via the global portion of the node address space, a global, shared memory including at least a portion of the less-fine-grained memories of some or all of the nodes. According to various embodiments, the local portion and the global portion (if both are included in the node address space) are present in the node address space in any order and in a variety of manners, such as contiguous, separated by a gap, and interleaved. The local portion of a particular node address space refers to memory local to a particular one of the nodes. The global portion of the particular node address space enables the particular node to access memory that is shared among the nodes. In a first example, the local portion of the respective node address space of a particular one of the nodes includes at least a portion of the fine-grained memory of the particular node, and the global portion of the respective node address space of the particular node includes at least a portion of the less-fine-grained memory of the particular node and at least a portion of the less-fine-grained memories of one or more other nodes. In a second example, at least some memory local to the particular node is accessed in a physical address space of the respective processors, and the respective node address space is used, at least in part, to access at least a portion of the less-fine-grained memories of one or more other nodes optionally and/or selectively including the particular node. In a third example, a particular node address space is associated with a software entity, such as a container, and with respect to a particular one of one or more of the nodes accessing the software entity, a local portion of the particular node address space optionally and/or selectively includes at least a portion of the less-fine-grained memory of the particular node, and a global portion of the node address space includes at least a portion of the less-fine-grained memories of zero or more others of the nodes. In some embodiments, the nodes are advantageously enabled to access, via the global portion of a node address space, a global, shared memory including at least a portion of the less-fine-grained memories of some or all of the nodes. Herein, a node address space associated with a container is sometimes termed a container node address space.

Figures 5A, 5B:
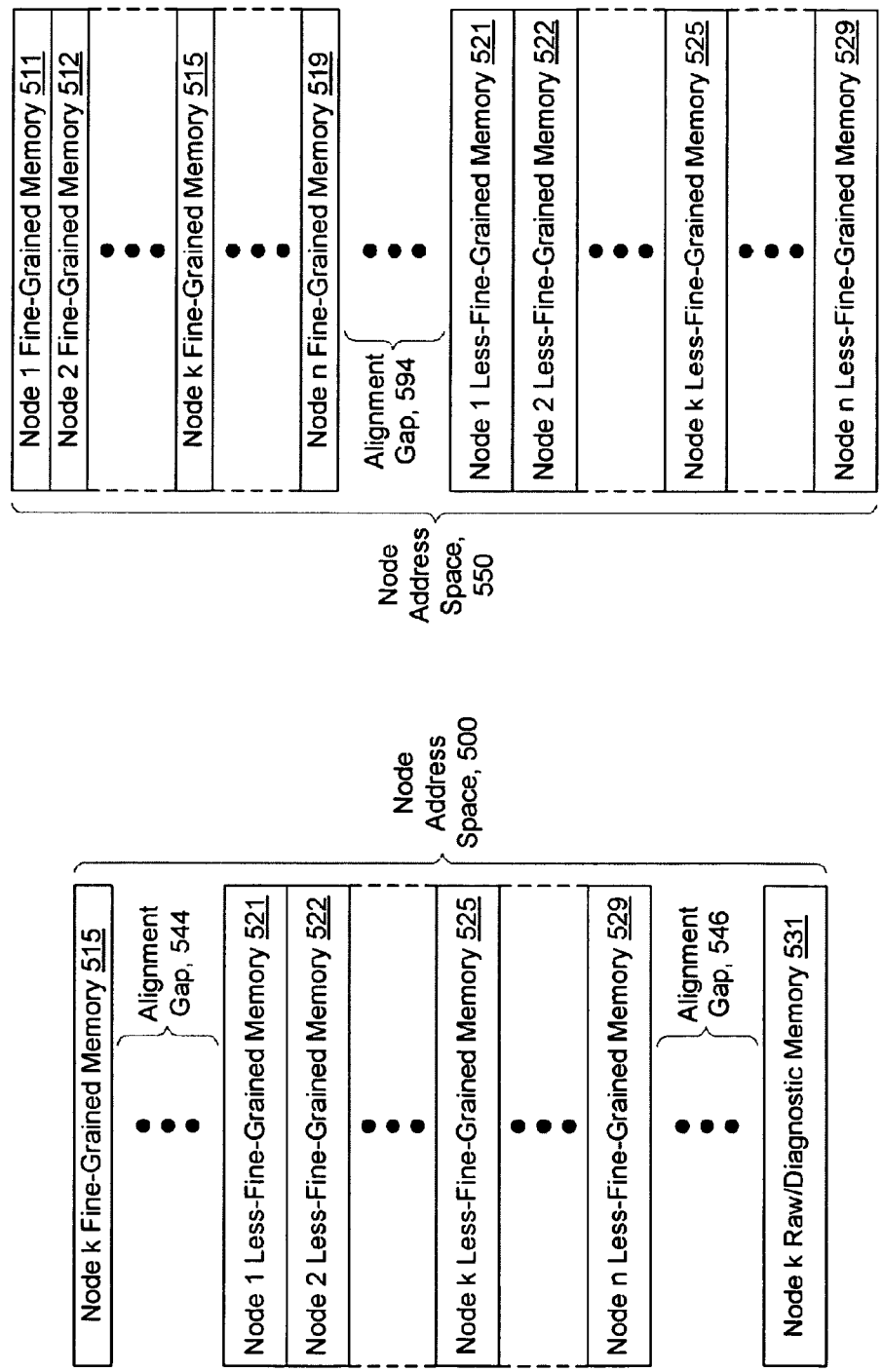
FIGS. 5A, 5B, and 5D illustrate embodiments of a node address space.
Figure 5C:
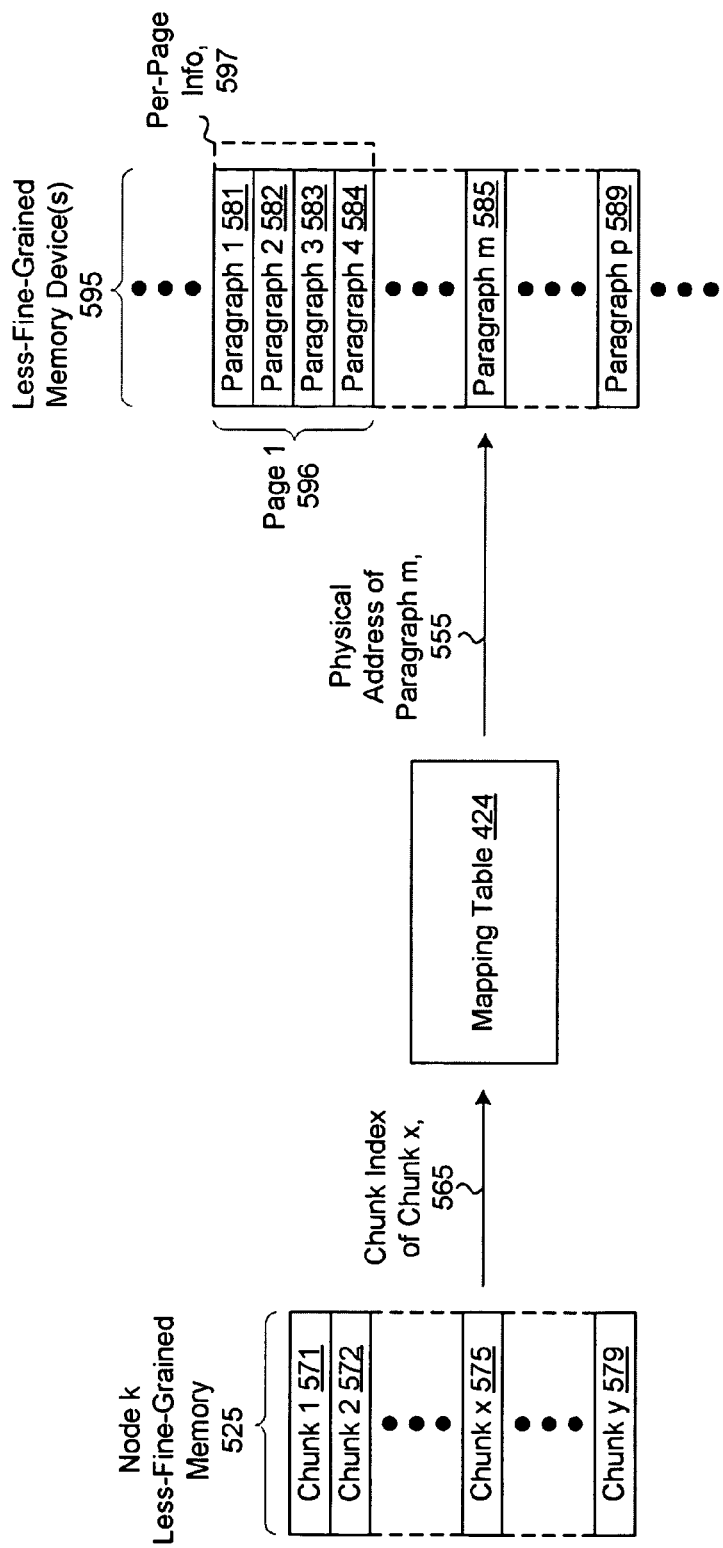
FIG. 5C illustrates an example of mapping a chunk in a less-fine-grained portion of a node address space to a paragraph in one or more less-fine-grained memory devices.
Figure 5D:
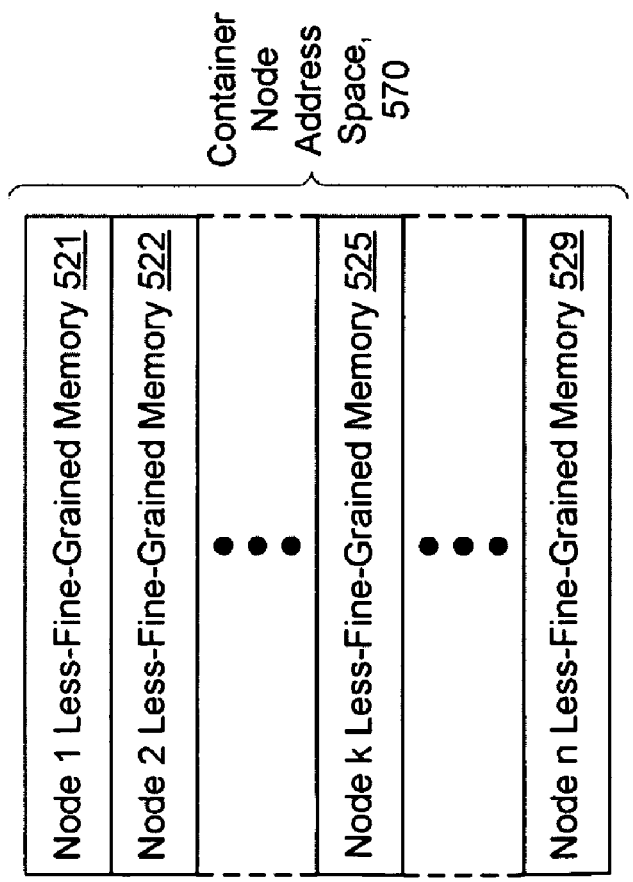

With reference to FIG. 5D, in some embodiments, a node address space enables access to a portion of the less-fine-grained memory of each of at least some of the nodes (node 1 less-fine-grained memory 521 through node n less-fine-grained memory 529). The portions of the less-fine-grained memories of the nodes are termed partitions, or with respect to software entities such as containers, are termed shards. For example, in some embodiments, node k less-fine-grained memory 525 corresponds to a general software access region in the respective less-fine-grained memory of a particular one of the nodes. In various embodiments, a first container node address space has partitions (shards) on nodes A, B, and C, and a second container node address space has partitions (shards) on nodes A, B, D, and E. In various embodiments, the less fine-grained memory of a particular one of the nodes is managed and/or allocated, such as for use in one or more containers, in units of shards. For example, the respective less-fine-grained memory of the particular node is 100 GB in size, and the respective less-fine-grained memory is divided into a plurality of shards of sizes ranging in size from 10 MB to 100 MB. As containers are created and/or increased in size, ones of the shards are allocated for use in the containers, and when a particular one of the containers is decreased in size or destroyed, ones of the shards previously used by the particular container are freed for use by others of the containers.

In some embodiments, the portions of the less-fine-grained memories of each of the nodes accessible via a particular node address space are not a power-of-two in size. In various embodiments, there are holes in the particular node address space (ranges of the particular node address space not corresponding to memory) between ranges corresponding to the portions. For example, in some embodiments, there is a hole between node 1 less-fine-grained memory 521 and node 2 less-fine-grained memory 522. In some embodiments and/or usage scenario, software is aware of the holes, and does not use ranges of the particular node address space corresponding to the holes. In other embodiments, the portions of the less-fine-grained memories of each of the nodes are arranged in the particular node address space without holes, even if some of the portions are not a power-of-two in size, or are of different power-of-two sizes.

In some embodiments, the portions of the less-fine-grained memories of each of at least some of the nodes accessible via a particular node address space correspond to more than one of the partitions of the particular node address space. For example, with reference to FIG. 5D, both node k less-fine-grained-memory 525 and node n less-fine-grained-memory 529 reside on a same one of the nodes.

In some embodiments, software entities, such as containers, have a respective node address space, such as one similar to container node address space 570 (as illustrated in FIG. 5D), and ones of the nodes accessing one of the software entities use the respective node address space.

In a first example, a container is a software entity used to manage a plurality of fixed-sized chunks of storage (such as memory) associated with the container, each of the chunks having a respective node address usable in conjunction with the respective node address space to identify and/or to access the associated chunk. According to various embodiments, each of the chunks in the respective node address space is one or more of: a fixed size, a power-of-two in size; a size other than a power-of-two; a fixed size with an integer number of chunks enabled to be stored in each page and/or each block of the less-fine-grained memory (optionally, with some of the space of the page and/or of the block unused); a fixed size enabling a node address in the respective node address space to specify a chunk index via division by the fixed size (treating the node address space as an array of the chunks); less than or equal to a size of a page of the less-fine-grained memory; less than or equal to a size of a block of the less-fine-grained memory; larger than a size of a block of the less-fine-grained memory; a multiple of a size of a block of the less-fine-grained memory; a contiguous region of the node address space; and an aligned region of the node address space, such as a region aligned on a boundary specified by a multiple of the fixed size. In various embodiments, a first container has chunks of a first size (such as 512 B), and a second container has chunks of a different size (such as 4 KB).

In a second example, a container is a software entity used to manage a plurality of variable-sized objects stored in storage (such as memory) associated with the container, where each object is associated with a respective key, and the respective key is usable in conjunction with the respective node address space to identify and/or to access the associated object in the storage. For example, in some usage scenarios, the respective key is a text string, such as an SQL query used to retrieve the associated object from a database. In some embodiments, each of the respective keys is stored with or as part of the associated object. According to various embodiments, objects are one or more of: at least 8 bytes in size; aligned on boundaries, such as on 8 byte boundaries; unlimited in maximum size; and unlimited in size up to a maximum size, such as the size of a shard.

Herein, the term element is used to refer to either a fixed-size chunk or a variable-sized object, and an element identifier is correspondingly either a node address or a key. In some embodiments, a container is, at least in part, a software entity used to manage a plurality of elements of storage (such as memory) associated with the container, each of the elements having a respective element identifier in the respective node address space of the software entity, the element identifier usable to identify and/or to access the associated element. Some of the examples herein are described with respect to either fixed-size chunks or variable-sized objects. The techniques illustrated by the various examples are generally applicable to elements (either fixed-sized chunks or variable-sized objects).

In some embodiments, other types of containers are optionally and/or selectively used. For example, a sequential-write container (also termed a log-type container) stores a series of sequentially written records, such as a transaction log.

When the respective processors of a particular one of the nodes access a portion of the container (such as an element), the respective node address space of the container is used to determine the one (or ones) of the nodes providing (being a home node of) the portion of the container. If the particular node is the home node for the portion of the container (for example, when the portion of the container resides in the less-fine-grained memory of the particular node), the access to the portion of the container is local. Otherwise, the access to the portion of the container is, at least in part, global, and is sent as a message (such as via the respective interconnect switch of the particular node) to the home node of the portion of the container. In further embodiments, each of one or more shards of the container has a respective home node and optionally and/or selectively one or more respective replica nodes, where the less-fine-grained memory of each of the respective replica nodes contains a copy (a mirror) of the shard of the container contained in the respective home node. Herein, copies (or mirrors) of data (such as a shard of a container) or control structures (such as a map for the shard of the container) are referred to as being copies (or mirrors), even though in some embodiments and/or usage scenarios, a time lag in creating the copy (or the mirror) implies that at certain points in time, the copy (or the mirror) is not up-to-date, and thus at the certain points in time, the copy (or the mirror) is not an identical copy.

A particular one of a plurality of elements in a node address space is accessed via a respective element identifier of the particular element. In some embodiments, the respective element identifier of the particular element is mapped and/or translated (such as by software executing on the respective processors and/or by a memory sub-system controller) to a physical address of a memory device. For example, the respective element identifier is used at a particular one of the nodes to access the particular element. The particular node (such as software executing on the respective processors of the particular node) is enabled to map and/or route and/or translate (and/or other similar functions) the respective element identifier (in conjunction with the node address space) to determine a home node of the particular element. A request to access the particular element, such as a message, is sent to the home node along with at least a portion of the respective element identifier. The home node uses the at least a portion of the respective element identifier in conjunction with the node address space (such as a local map associated with the node address space) to access storage of the particular element. The home node returns a response to the particular node. In this manner, an aggregate of storage on a number of the nodes is enabled to store the plurality of elements.

Figure 19:
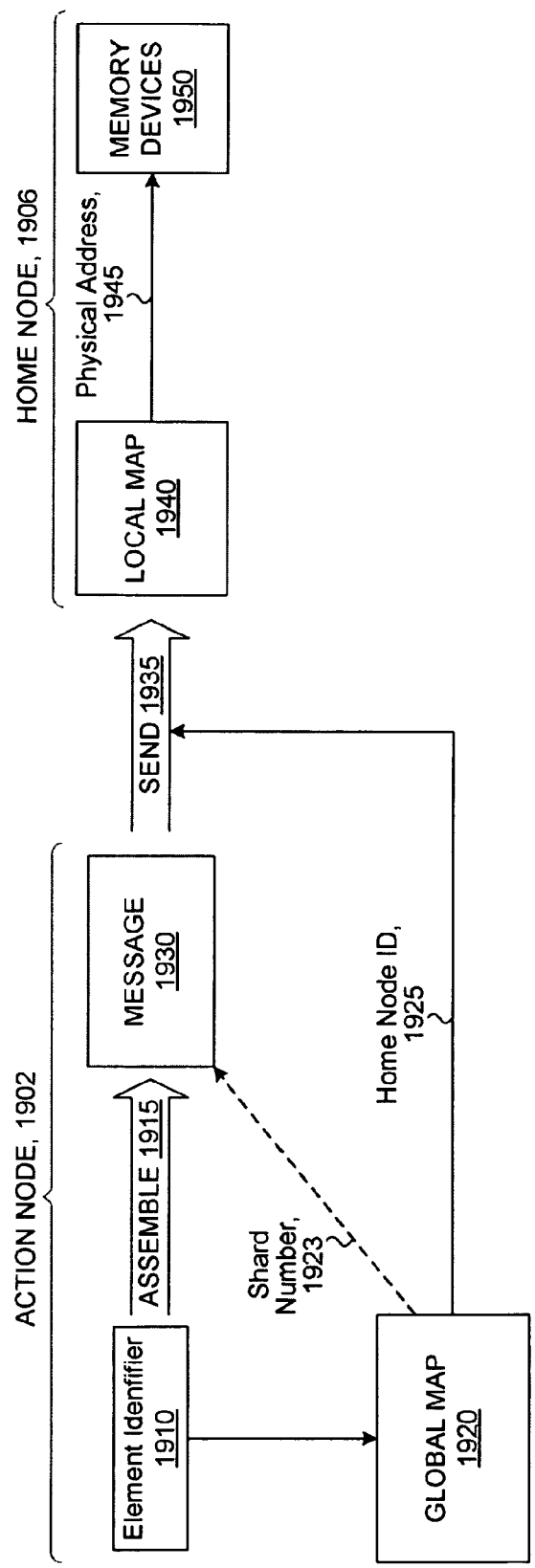
FIG. 19 illustrates an example of using an element identifier to access memory devices located at one or more nodes.

In some embodiments, a particular container having a respective node address space includes a plurality of shards, each of the shards having a respective home node and optionally and/or selectively one or more replica nodes. The respective home node of a particular one of the shards of the particular container includes the storage of the particular shard, such as in the less-fine-grained memory of the respective home node. A home node of a particular element in the respective node address space is the respective home node of a particular one of the shards that includes storage of the particular element. In some embodiments, the home node of the particular element is determined, at least in part, via a look-up of the respective element identifier of the particular element using a home node look-up data structure (also termed a global map data structure, such as global map 1920 as illustrated in FIG. 19). According to various embodiments, the home node look-up data structure is a data structure such as one or more of: an array; a list, such as a linked list; a hash-based structure; an associative structure, such as a CAM; a routing table; any other data structure supporting an index-based, address-based, or key-based look-up; and any combination of the foregoing. In some embodiments, the home node look-up data structure includes two levels, a first level determines a particular one of the shards (such as specified by a shard number) containing the particular element, and a second level determines the home node (and optionally and/or selectively one or more replica nodes) of the particular shard. In further embodiments, the shard number is sent to the home node as at least a part of the request to access the particular element. In various embodiments, the home node look-up data structure includes a plurality of entries, each of the elements in the respective node address space corresponding to one of the entries. In some embodiments, the home node look-up data structure is stored in the respective fine-grained memory of each one of the nodes using the respective node address space. In a first example, if the respective element identifier is a node address, the respective element identifier is looked up in a table indexed by at least some higher-order bits of the node address to determine the home node of the particular element. In a second example, if the respective element identifier is a key, the respective element identifier is hashed to produce an integer value of a fixed size, such as 8 bits, and the integer value is looked up in a table to determine the home node of the particular element.

As illustrated in FIG. 19, element identifier 1910 is used as part of a look-up in global map 1920 at action node 1902. Element identifier 1910 is the respective element identifier of the particular element, and the particular element is contained (stored) in the particular container. Action node 1902 is, for the purposes of this example, the one of the nodes at which the particular element is accessed. (Of course, any of the nodes is optionally and/or selectively enabled to access the particular element, and any of the nodes is thus optionally and/or selectively the action node.) In various embodiments, global map 1920 is associated with the particular container. (For example, in some embodiments, each container has a separate global map.) The look-up in global map 1920 produces home node ID 1925 (such as a hostname or an IP address of the home node of the particular element), and optionally shard number 1923. In some embodiments, the look-up in global map 1920 is a two-level look-up, and shard number 1923 is produced and used as a part of the two-level look-up. At the action node (and ignoring optimizations that are optionally and/or selectively applied if the action node is the home node), message 1930 is assembled (1915) from one or more of: at least a portion of element identifier 1910; shard number 1923; an identifier of the particular container, other information associated with the access to the particular element, such as a type of the access, or write data for the access; and other information used in a messaging protocol for inter-node communication. Action node 1902 then sends (1935) message 1930 to home node 1906 (as identified and/or controlled by home node ID 1925).

In some embodiments, the home node look-up data structure provides the home node and the replica nodes of the particular element. According to various embodiments, a read and/or a write access at a particular one of the nodes to the particular element is sent to one or more of: the home node; and any one of the home node and/or the replica nodes based on factors such as one or more of a type of the access, closeness to the particular node, whether any one of the home node and/or the replica nodes is the particular node, a random selection, network loading, how busy each of the home node and/or the replica nodes are, and other similar factors. For example, in some embodiments, the replica nodes are enabled to support read accesses to the particular element, and write accesses to the particular element are always sent to the home node.

In some embodiments and/or usage scenarios, a request to access a particular element is sent to a home node of the particular element. The request includes at least a portion of the respective element identifier of the particular element, and optionally a shard number (of a shard of a particular container containing the particular element). In some embodiments, a physical address of the particular element is determined, at least in part, via a look-up of the at least a portion of the respective element identifier using a local map data structure of a node address space (such as local map 1940 as illustrated in FIG. 19). According to various embodiments, the local map data structure is a data structure such as one or more of: an array; a list, such as a linked list; a hash-based structure; an associative structure, such as a CAM; an object mapping table; any other data structure supporting an index-based, address-based, or key-based look-up; and any combination of the foregoing. In further embodiments, the local map data structure is specified, at least in part, via the shard number. In various embodiments, the local map data structure includes a plurality of entries, each of the elements in the node address space and stored at the home node corresponding to one of the entries. In some embodiments, the local map data structure is stored in the respective fine-grained memory of the home node. In a first example, if the respective element identifier is a node address, the respective element identifier is looked up in a table indexed by at least some lower-order bits of the node address to determine the physical address of the particular element. In a second example, if the respective element identifier is a key, the respective element identifier is looked up in a hash table to determine the physical address of the particular element.

As illustrated in FIG. 19, element identifier 1910 is used, at least in part, as a portion of message 1930 sent (1935) to home node 1906. Element identifier 1910 is the respective element identifier of the particular element, and the particular element is contained (stored) in the particular container. Information in message 1930, such as one or more of at least a portion of element identifier 1910, shard number 1923, and an identifier of the particular container is used to specify local map 1940. For example, in some embodiments, local map 1940 is associated with a particular shard of the particular container specified by shard number 1923. At least a portion of element identifier 1910 is used as part of a look-up in local map 1940 at home node 1906. The look-up in local map 1940 produces physical address 1945 which is used to access memory devices 1950 at home node 1906, the access according to other information in message 1930, such as a type of the access. Home node 1906 optionally and/or selectively returns a response to message 1930 to action node 1902. In a first example, if the access is a read access, the response includes data retrieved from memory devices 1950. In a second example, if the access is a write access, the response includes an acknowledgment of completion of the access.

In some embodiments, each of one or more replica nodes of a shard containing the particular element uses a local map data structure the same as and/or similar to the local map data structure used at the home node. In a first example, the local map data structure used at one of the replica nodes is a copy of the local map data structure used at the home node. In a second example, the local map data structure used at a particular one of the replica nodes is maintained independently from the local map data structure used at the home node, and while tire same elements are mapped by the local map data structure used at the particular replica node and the local map data structure used at the home node, the mappings are optionally and/or selectively different.

Herein, the data structures used in conjunction with a node address space to identify and/or to access elements (such as a respective global map data structure and/or a respective local map data structure) are referred to as a respective map of (or for) the node address space. The respective local map data structure is sometimes referred to as simply a local map. Herein, references to terms such as a map, the map, or the map(s) without a local and/or global indication refer to one or more of the global map data structures and/or the local map data structures.

In some embodiments and/or usage scenarios, the respective global map data structure of a particular node address space is effectively static, and a particular element identifier is always mapped to a same home node (as long as the home node remains available, and is not, for example, replaced by a replica node). In other embodiments, the respective global map data structure of a particular node address space is changed dynamically, such as when more storage is added to the particular node address space, or when more of the nodes are used to provide storage for the particular node address space.

In some embodiments and/or usage scenarios, a respective local map data structure of a particular node address space at a particular one of the nodes is changed dynamically when a particular element of the particular node address space stored within the particular node (such as in the less-fine-grained memory of the particular node) is modified. For example, in various embodiments, modifying an element stored in the less-fine-grained memory includes moving the element to a new location in the less-fine-grained memory. Accordingly, in some embodiments, writing (modifying) the particular element in the particular node address space includes remapping the element in the respective local map data structure to reflect a change in a physical location of the particular element.

In some embodiments, at least some of the addresses output by one of the respective processors of a particular one of the nodes are addresses within a node address space. (For example, in some embodiments where the respective processors of a particular one of the nodes have local memory, where the respective processors are coupled via processor communications links, and where the local memory is not part of the node address space, addresses output from a first one of the respective processors via a processor communications link to access local memory of a second one of the respective processors are not part of the node address space.)

In some embodiments, there are a plurality of node address spaces. For example, a first one of the node address spaces addresses respective first portions of the respective less-fine-grained memories of each of a first subset of the nodes, and a second one of the node address spaces addresses respective second portions of the respective less-fine-grained memories of each of a second subset of the nodes. In further embodiments, each of a plurality of software entities, such as a cluster of one or more nodes, a distributed application, or a software entity called a container, has and/or is associated with a respective node address space.

An address within a respective node address space (a node address) is, in some embodiments, mapped and/or translated (such as by a memory sub-system controller) to a physical address of a memory component. The respective interconnect switch of a particular one of the nodes receives a node address as part of a request from an originator (such as one of the respective processors) to access memory, and forwards the request to an appropriate port of the respective interconnect switch. Depending on the node address, the request goes to a port coupled to a local (to the particular node) memory subsystem controller (coupled to local memory devices), or to a port coupled to the respective interconnect switch of another one of the nodes for further forwarding to reach a remote memory sub-system controller (coupled to remote memory devices). The (local or remote) memory sub-system controller is enabled to use the node address (or a portion thereof) to access one or more of the (local or remote) memory devices, and to return a response to the request back to the originator. In some embodiments, at various points, the node address in the request is optionally and/or selectively mapped and/or translated. In a first example, the respective interconnect switch or the particular node translates the node address prior to forwarding the request. In a second example, the (local or remote) memory sub-system controller maps the node address to access one of the (local or remote) memory devices.

In some embodiments, a memory sub-system controller for the fine-grained memory and/or for the less-fine-grained memory of a particular one of the nodes is enabled to provide arehitectural properties of an ACID (Atomic, Consistent, Isolated, and Durable) memory. Usage of ACID memory properties enables the respective processors to perform atomic operations and/or atomic sequences of operations, such as transactions. In various embodiments, respective memory sub-system controllers of each of at least some of the nodes implement ACID memory properties, and an access by one of the respective processors of the particular node to either local memory of the particular node, or to remote memory of another node, is managed with ACID memory properties. In some embodiments, the use of ACID memory properties with the less-fine-grained memory provides ACID compliance. In various embodiments, the use of ACID memory properties among a plurality of nodes provides a memory-consistency model that is advantageously more efficient than a processor-consistency model (such as maintaining cache coherency among all of the respective processors of the plurality of nodes).

According to various embodiments, an ACID functional unit of the memory sub-system controller provides and/or manages, for data mapped in a global address space, one or more of: versioning; conflict detection; logging; replication; and ACID memory properties. In some embodiments, the ACID functional unit provides ACID memory properties to concurrent transactions executing on the nodes.

In some embodiments, a memory sub-system controller for the fine-grained memory and/or for the less-fine-grained memory of a particular one of the nodes is enabled to provide filtering and/or other data searehing operations. For example, a particular type of read access reads a plurality of records from the less-fine-grained memory, and returns a portion of the records that match (or do not match) a list of filter criteria. According to various embodiments, the records are one or more of: a fixed size; contiguous; separated by record markers; a fixed stride apart; and specified by a scatter/gather list. According to various embodiments, the list of filter criteria is one or more of: provided, at least in part, with the read access request; provided, at least in part, in CSRs; and provided, at least in part, in a memory, such as the fine-grained memory.

In some embodiments, the respective interconnect switch of a particular one of the nodes forwards a request (such as in the form of a command or a datagram or a packet) including an address, such as a node address, using a routing table. At least a portion of the address is looked up in the routing table, and a result of the lookup includes information regarding a destination and/or a next hop of the request, such as a particular one of the ports of the respective interconnect switch to which the request is sent (for forwarding to another one of the respective interconnect switches). In some embodiments, each of a plurality of node address spaces is associated with a respective routing table.

In some embodiments, the respective interconnect switch of a particular one of the nodes forwards a request (such as in the form of a command or a datagram or a packet) including an address, such as a node address, using source routing. In an example of source routing, some particular bits, such as some number of high-order bits, of the address include an indication of a particular one of the ports of the respective interconnect switch to which the request is sent; the particular bits are removed from the address (or are moved to a different place in the address), and the request is forwarded with the modified address. In various embodiments and/or usage scenarios, a subsequent interconnect switch receiving the request repeats the source routing, until a destination switch is reached (where a final port indicated by the address is a local port).

In some embodiments, the respective interconnect switch of a particular one of the nodes is enabled to participate in cache coherent transactions with the respective processors of the particular node. In further embodiments, the respective interconnect switch is enabled to receive virtual addresses from the respective processors, and to perform virtual to physical translation. According to various embodiments, the respective interconnect switch is enabled to receive from the respective processors one or more of: virtual addresses; physical addresses; and addresses in a node address space.

According to various embodiments, any combination of routing tables, source routing, and any other technique to route communications are used to send requests and/or to receive responses to the requests. In some embodiments, the routing tables (or other routing techniques) are changed dynamically. For example, in some usage scenarios, in response to a failure of a node, routing tables are updated so that requests for the failed node are directed to a back-up node. Continuing the example, a routing table contains an entry referring to a home node of a portion of a container, and on a failure of the home node of the portion of the container, the routing table entry is updated to refer to a replica node of the portion of the container.

In various embodiments, the respective memory sub-system of a particular one of the nodes includes a fine-grained memory and a less-fine-grained memory. A first portion of the fine-grained memory serves as a map between a portion of a node address space and at least a portion of the less-fine-grained memory. In some embodiments, each of a plurality of node address spaces is associated with a respective map. Each of the maps includes a plurality of entries. In some embodiments and/or usage scenarios, each of the entries (of a particular one of the maps) maps a chunk (a contiguous range of addresses) of the node address space to a corresponding physical address of a physical location in the at least a portion of the less-fine-grained memory. In further embodiments, the chunks are all of a same size. In some embodiments and/or usage scenarios, each of the entries (of a particular one of the maps) maps an object (a variable-size, software entity identified by a key) to a corresponding physical address of a physical location in the at least a portion of the less-fine-grained memory.

In some embodiments, the respective map of a node address space includes a global portion (the respective global maps) and one or more local portions (the respective local maps). The global portion of the map directs portions of the node address space to one or more of the nodes, where the respective less-fine-grained memory of each of the one or more nodes includes the physical memory of at least one of the portions of the node address space. In various embodiments, the global portion of the map is a routing table. In some embodiments, each of the one or more nodes contains at least one of the local portions of the map. In further embodiments, the portions of the node address space are shards, and there is a respective one of the local portions of the map for each of the shards.

According to various embodiments, a second portion of the fine-grained memory of the particular node serves, for the less-fine-grained memory of the particular node, as one or more of: a cache, a write buffer, and a write coalescing buffer. In various embodiments, a third portion of the fine-grained memory of the particular node includes information about each page and/or each block of the less-fine-grained memory of the particular node, such as a page information table and/or a block information table. In some embodiments, a fourth portion of the fine-grained memory of the particular node is used by software running on the respective processors.

According to various embodiments, the less-fine-grained memory of a particular one of the nodes includes one or more of: a region used by software running on the respective processors of the particular node as read/write memory; a region used by software running on the respective processors of any of the nodes as read/write memory; a region used by software running on the respective processors of any of the nodes as a sequential write region, such as used for a transaction log; a region including unused but not yet erased blocks and/or pages, a region including erased blocks and/or pages; a region including tables or other information; and a region including executable software code. According to various embodiments, some or all or portions of the less-fine-grained memory are accessible to software running on the respective processors of the particular node as one or more of: mapped, such as via the respective maps of one or more node address spaces; unmapped (raw); cacheable; non-cacheable; physical memory, such as in a physical address space; cache coherent; transaction coherent; having ACID properties; and any combination thereof.

In some embodiments, a node address space enables each node to access at least a portion of the respective memory sub-system of at least some of others of the nodes. In various embodiments, the respective interconnect switches perform, at least in part, the inter-node communication that enables the node address space to span multiple nodes.

In some embodiments, at least some of the nodes include a respective processor memory, such as a DRAM memory or an SRAM cache memory, that is coupled to the respective one or more processors. In some embodiments, the respective processor memory is separate from and/or independent of the fine-grained memory. In other embodiments, the fine-grained memory includes some or all of the respective processor memory. In various embodiments, the fine-grained memory includes some or all of the sole external DRAM memory in an address space of one of the respective processors. For example, in some embodiments, the respective processor memory includes some or all of the map(s). In various embodiments, the respective processor memory is and/or is managed as a portion of the respective memory sub-system of the particular node.

In some embodiments, software running on one of the respective processors of a particular one of the nodes accesses at least a portion of the fine-grained memory and/or at least a portion of the less-fine-grained memory via a node address space. A first optional portion of the node address space is used to access the at least a portion of the fine-grained memory, and a second portion of the node address space is used to access the at least a portion of the less-fine-grained memory. In some embodiments, at least some of the accesses to the second portion are indirect, where the map(s) in the fine-grained memory are used, at least in part, to translate a node address into a corresponding physical address in the less-fine-grained memory. In some embodiments, accesses to some parts of the first portion and/or some parts of the second portion of the node address space are not local to the particular node, and are communicated via the respective interconnect switch in a manner that is substantially invisible to at least some of the software running on the respective processors. In some embodiments, the map(s) are used solely for a local part of the second portion of the node address space, and other (non-local) parts of the second portion of the node address space are optionally mapped on others of the nodes where the non-local less-fine-grained memory resides.

In some embodiments, some portions of the fine-grained memory and/or some portions of the less-fine-grained memory are managed, at least in part, via hardware (such as via a memory sub-system controller) and are not accessible to the respective processors of a particular one of the nodes via a particular node address space and/or via any node address space. In various embodiments, some portions of the fine-grained memory and/or some portions of the less-fine-grained memory are accessible to the respective processors in a separate address space and/or in a separate portion of the particular node address space, such as for diagnostic purposes. In a first example, the first portion of the fine-grained memory (including the respective maps of one or more node address spaces) is not accessible via any node address space, either to the respective processors of the particular node or of any other node, but is accessible to the respective processors of the particular node via another address space for purposes such as diagnostics, control, and error handling. In a second example, a portion of the less-fine-grained memory includes unused but not yet erased blocks, such as blocks all of whose contents have been re-written to new locations. The portion of the less-fine-grained memory including the unused but not yet erased blocks is accessible to the respective processors of the particular node, such as via a physical address space, but is not accessible via any node address space.

In some embodiments, some portions of the fine-grained memory and/or some portions of the less-fine-grained memory are managed, at least in part, via software (such as software executing on the respective processors). For example, in some embodiments, software manages the respective maps of one or more node address spaces, and controls access to at least some of the less-fine-grained memory using the respective maps. In further embodiments, software controls use of a portion of the fine-grained memory as a cache and/or as a write buffer for the less-fine-grained memory.

In some embodiments, a nature of types of memory accessible via a node address space is hidden from the respective processors. For example, the respective processors treat all memory as being fine-grained, and management external to the respective processors (such as by a memory sub-system controller) of the at least a portion of the less-fine-grained memory enables a less-fine-grained portion of the node address space to appear to the respective processors as being substantially similar to a fine-grained portion of the node address space. In another example, the respective processors are programmed to advantageously use a fact that the fine-grained portion of the node address space is faster to read and/or to write relative to the less-fine-grained portion of the node address space.

In some embodiments, a less-fine-grained portion of a node address space is divided into a plurality of chunks, where each chunk is a power-of-two-sized contiguous, aligned region. For example, in some embodiments, each of the chunks is 512 B, and the less-fine-grained portion of the node address space is divided into a plurality of 512 B pieces, each piece aligned on 512 B boundary, and each piece corresponding to one of the chunks.

In some embodiments, a less-fine-grained portion of a node address space includes, at least conceptually, a plurality of objects, where each object is a variable-sized region associated with a respective key. In further embodiments, each of the respective keys is stored with or as part of the object associated with the respective key. According to various embodiments, objects are one or more of: at least 8 bytes in size; aligned on boundaries, such as on 8 byte boundaries; unlimited in maximum size; and unlimited in maximum size up to a maximum size, such as the size of a shard.

In some embodiments, a node address space is divided into one or more shards, where each of the shards corresponds to a respective portion of the less-fine-grained memory of a respective one of the nodes. A routing table assigns a chunk and/or an object in the node address space to a particular one of the shards, and thus to the respective portion of the less-fine-grained memory of the respective node (termed a home node of the particular shard). In further embodiments, the home node of the particular shard contains a map to determine a physical location in the respective portion of the less-fine-grained memory of the respective node for the chunk and/or the object.

In some embodiments, the less-fine-grained memory is divided into pages, where each one of the pages is an independently addressable and an independently writable region. In various embodiments, regions smaller than one of the pages are not independently writable. For example, in some embodiments, each one of the pages includes 2 KB of data and 64 B of "extra" space, and any write to the less-fine-grained memory writes at least one of the pages. In various embodiments, each of the pages includes one or more sub-pages, each of the sub-pages being a portion of the page having an error correcting code enabling the sub-page to be independently read and (in the event of a correctable ECC error) corrected.

In some embodiments, the less-fine-grained memory is divided into blocks, where each one of the blocks includes a respective one or more of the pages. Each of the respective pages of a particular one of the blocks corresponds to the particular block via a portion of a physical address of the respective page, which is the physical address of the particular block. In various embodiments, each of the blocks is an independently erasable region, and each one of the blocks is erased (in its entirety) before any one of the respective pages of the block is writable. For example, in some embodiments, each one of the blocks includes a respective 32 of the pages, and any write to the less-fine-grained memory writes to a respective page in a particular one of the blocks which has been erased (since the respective page was last written).

In some embodiments, each one of the pages (or each one of the blocks) in the less-fine-grained memory includes one or more respective paragraphs. Each of the respective paragraphs of a particular one of the pages (or one of the blocks) corresponds to the particular page (or the particular block) via a portion of a physical address of the respective paragraph, which is the physical address of the particular page (or the particular block). For example, a physical address of a particular one of the paragraphs includes a physical address of the corresponding page (or the corresponding block) and a paragraph ID, the paragraph ID specifying the particular paragraph among the respective paragraphs of the corresponding page (or the corresponding block). (Similarly, each of the respective paragraphs of each of the respective pages of a particular one of the blocks corresponds to the particular block via a portion of a physical address of the respective paragraph.) According to various embodiments and/or usage scenarios, the paragraph ID is one or more of: a paragraph number of one of one or more fixed-size paragraphs in a page (or in a block); and a paragraph offset of one of one or more variable-size paragraphs in a page (or in a block). In a first example, the paragraphs are of a fixed size and store fixed-sized chunks, and a respective local map of a node address space (such as a local map in the fine-grained memory) maps respective node addresses (or a portion thereof) of the chunks to physical addresses of ones of the paragraphs in the less-fine-grained memory. In a second example, the paragraphs are variable in size and store variable-sized objects, and a respective local map of a node address space (such as a local map in the fine-grained memory) maps respective keys of the objects to one or more of the paragraphs in the less-fine-grained memory.

According to various embodiments and/or usage scenarios, one or more of: each one of the paragraphs is at least as large as each one of the chunks, so that each one of the paragraphs is enabled to store one of the chunks; each one of the paragraphs includes a portion of the extra space of the corresponding page; at least some of the portion of the extra space is not used to store contents of one of the chunks; and at least some of the paragraphs are variable in size and are smaller than or larger than the size of one of the chunks.

In some embodiments, a particular one of the paragraphs is enabled to store a compressed version of contents of one or more contiguous ones of the chunks starting at a particular node address. When the particular paragraph is read to access a particular one of the contiguous chunks, low-order address bits stored with the particular paragraph are used, at least in part, to determine where the particular chunk is within the contiguous chunks. In some embodiments, a size (an amount of valid data) is stored with each one of the paragraphs storing compressed data, and is used, at least in part, to uncompress the valid data in the paragraph. According to various embodiments, at least some of the portion of the extra space of each one of the paragraphs is used for one or more of: a type of the paragraph; a status of the paragraph; error detection; error correction; mapping information relating the paragraph to a portion of an address space, such as a node address space; a number of chunks stored in the paragraph; one or more low-order address bits; a size (such as a number of bytes) of valid data stored in the paragraph; and other information.

According to various embodiments, at least some of the extra space of each one of the pages is used for overhead information, such as one or more of: a type of the page; a status of the page; error detection; error correction; a count of a number of times the page has been written; a count of a number of times the page has been erased; mapping information (such as a reverse map) relating the page to a portion of an address space, such as a node address space; mapping information relating at least some of the respective paragraphs of the page to a portion of an address space, such as a node address space; and other information. In various embodiments, the overhead information is stored on a block basis, rather than on a page basis. In further embodiments, a portion of each of the blocks, such as some or all of at least one of the pages of the block, is used to store at least some of the overhead information of the block.

In some embodiments, each one of the paragraphs of the less-fine-grained memory includes an error detection code and/or an error correction code. For example, each of the respective paragraphs of a particular page optionally includes a portion of the extra space of the particular page, and a portion of the paragraph is used, at least in part, for the code. A read of a particular one of the respective paragraphs advantageously uses the per-paragraph code to determine if the particular paragraph is read correctly without having to read the entire particular page In various embodiments, a read of a particular one of the respective paragraphs advantageously uses the per-paragraph code to correct one or more errors in the particular paragraph. In various embodiments, a read of a particular one of the paragraphs reads the particular paragraph first (among all of the respective paragraphs on the corresponding page). In further embodiments, a read of a particular one of the paragraphs reads the entire corresponding page, but reads the particular paragraph first. In various embodiments, an error detected in the particular paragraph by the error detection code is managed by reading the entire corresponding page, and using additional information in the corresponding page in correction of the error.

In some embodiments, each one of the respective paragraphs includes a respective error detection code such as a horizontal parity or CRC, and each one of the pages includes a respective error detection code such as a vertical parity or CRC. By combining information from the respective horizontal (per paragraph) error detection code of a particular one of the paragraphs and from the respective vertical (per page) error detection code of the corresponding page, and by using techniques such as burst trapping (with CRC-type codes), one or more errors in the particular paragraph are reliably correctable. According to various embodiments, a correction process is managed by one or more of: hardware logic, hardware state machines, firmware, software, and any combination thereof.

In some embodiments, each one of the respective paragraphs of a particular page includes a respective error detection code such as a parity code or CRC, and each sub-page (of the particular page) includes a respective error correction code. In further embodiments, paragraphs optionally and/or selectively cross sub-page and/or page boundaries. In still further embodiments, paragraphs do not cross block boundaries. By including an error detection code with each paragraph, paragraphs are independently readable, and errors (up to a detection ability of the error detection code) are detectable. If an error is found in a particular one of the paragraphs, one or more sub-pages containing the particular paragraph are read, and the respective error correction codes of each of the one or more sub-pages are used to correct errors (up to a correction ability of the respective error correction codes) in the particular paragraph.

At least some of the following embodiments and examples describe embodiments in which there is a respective node address space for each of the nodes, and in which the node address space is divided into a plurality of chunks, such as fixed-size chunks. Variations of these embodiments and examples in which there are a plurality of node address spaces, each of zero or more of the node address spaces are associated with a respective software entity such as a container, and in which at least some of the node address spaces contain variable-sized objects, are conceived of and are similar to the embodiments and examples below. For example, there are embodiments and/or examples using objects (and/or combinations of chunks and objects) similar to embodiments and/or examples described below that refer to chunks.

Figure 13A:
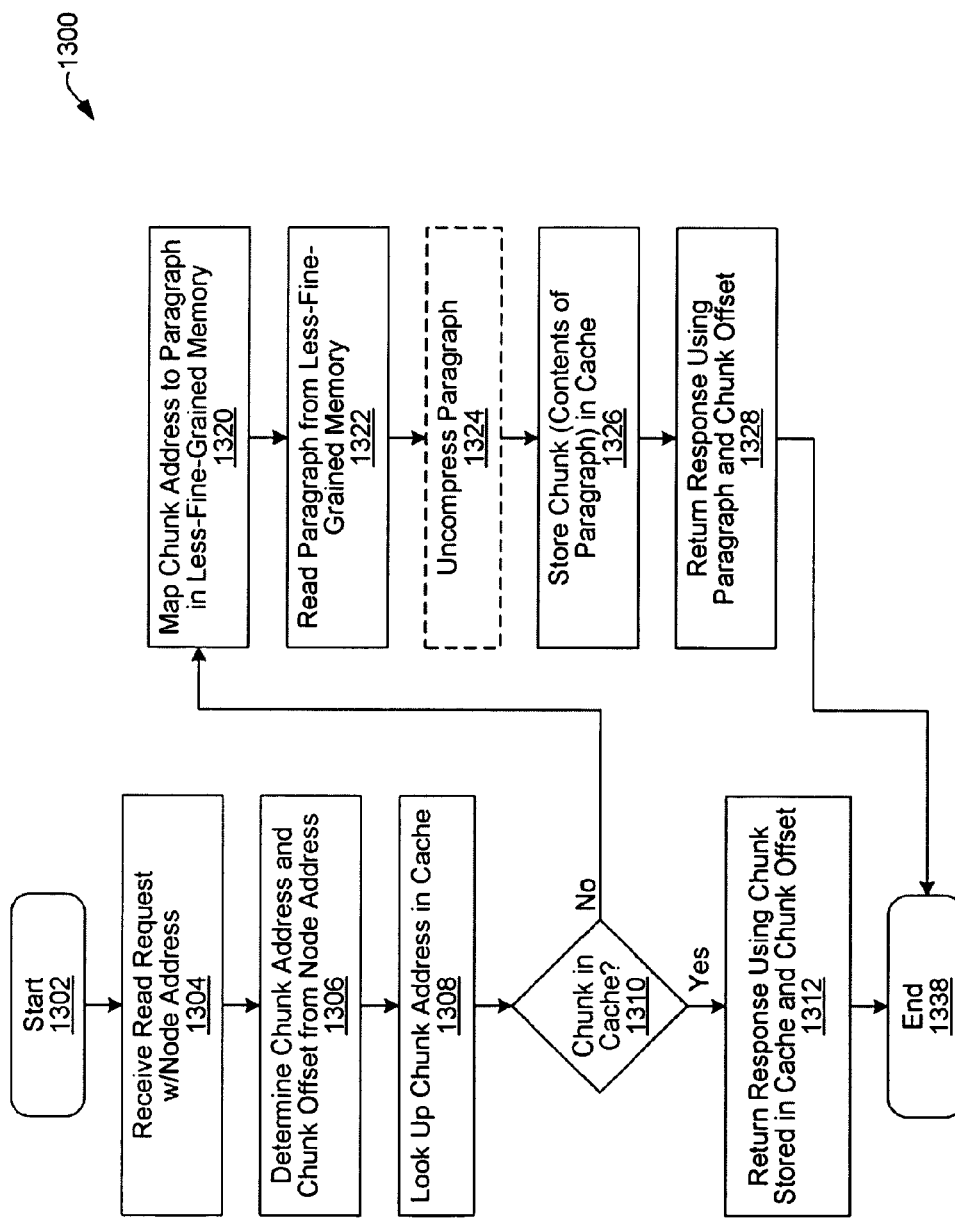
FIG. 13A illustrates an embodiment of a process for managing a read request

At least some software executing on a particular one of the respective processors accesses the respective memory sub-system via the respective node address space. In a first example (illustrated in FIG. 13A), software reads at least a portion of one of the chunks stored in the less-fine-grained memory. The following functions are performed, not necessarily in the order shown, in response to the software read:

- A read request (of a size less than or equal to the size of one of the chunks) from the particular processor and including a particular node address is routed over one or more of the communications links (and optionally and/or selectively via zero or more of the respective interconnect switches) to a (local or remote) memory sub-system controller (1304).
- The particular node address is broken into a chunk address (referring to a particular one of the chunks) and an offset within the particular chunk (1306).
- If the particular chunk is stored in a cache and/or in a write buffer in the fine-grained (1308, 1310 "Yes"), at least a portion of the particular chunk, as defined by the offset within the chunk, is returned in response to the read request (1312).
- Else (1310 "No"), the chunk address is mapped via a map in the fine-grained memory to a particular one of the paragraphs in a particular page in the less-fine-grained memory (1320).
- The particular paragraph (and optionally, the particular page) is read from the less-fine-grained memory (1322). In some embodiments, the particular paragraph optionally and/or selectively contains compressed data, and the compressed data is uncompressed (1324).
- The contents of the particular paragraph are placed in the cache and/or in the write buffer in the fine-grained memory as at least the particular chunk (1326).
- At least a portion of the particular chunk, as defined by the offset within the particular chunk, is returned in response to the read request (1328).

Figure 13B:
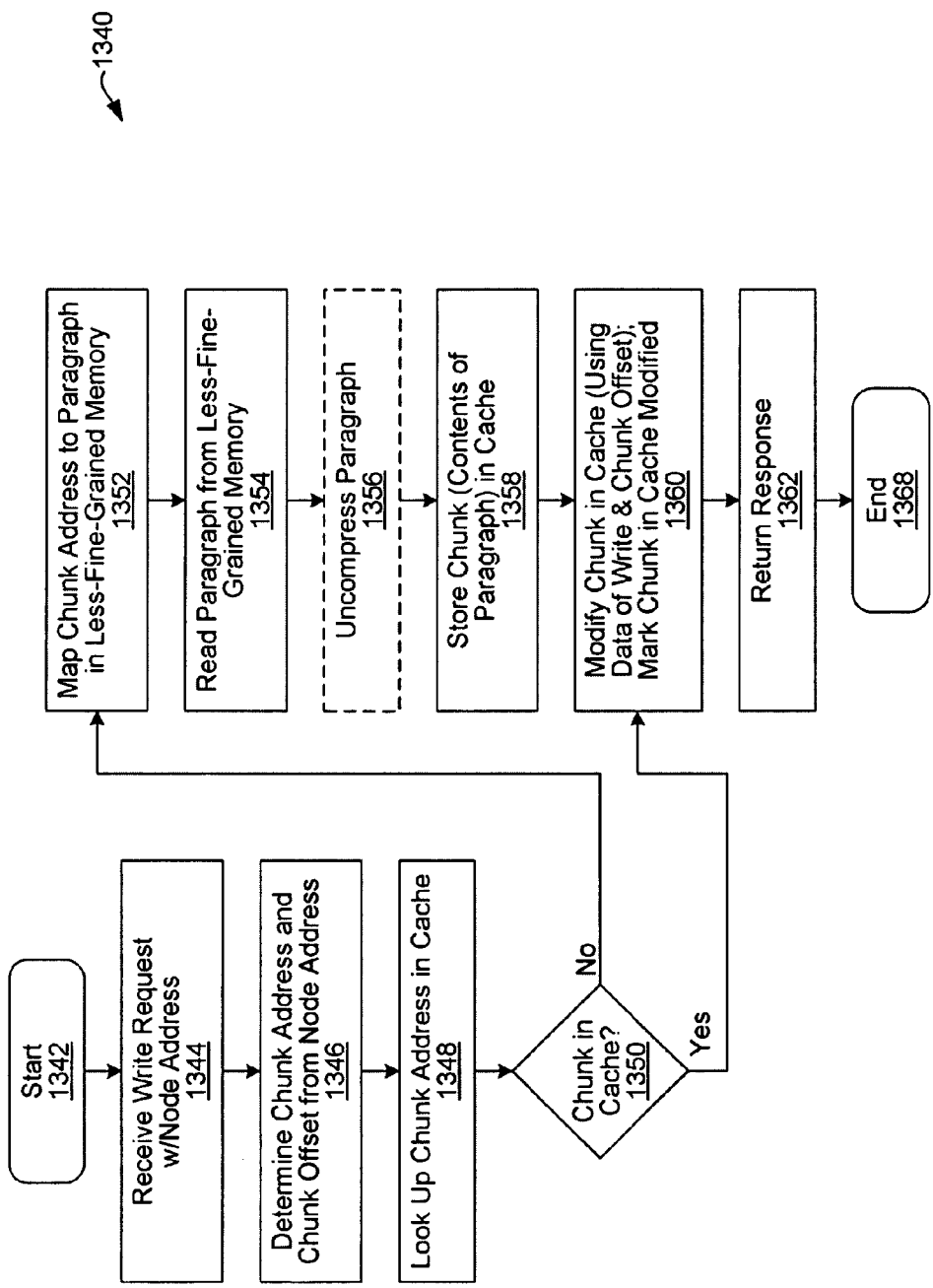
FIG. 13B illustrates an embodiment of a process for managing a write request.

In a second example (illustrated in FIG. 13B), software writes al least a portion of one of the chunks stored in the less-fine-grained memory. (In various embodiments, a write of more than a single one of the chunks is managed as multiple writes of at least a portion of one or more of the chunks.) The following functions are performed, not necessarily in the order shown, in response to the software write:

- A write request (of a size less than or equal to the size of one of the chunks) from the particular processor and including a particular node address is routed over one or more of the communications links (and selectively via zero or more of the respective interconnect switches) to a (local or remote) memory sub-system controller (1344).
- The particular node address is broken into a chunk address (referring to a particular one of the chunks) and an offset within the particular chunk (1346).
- If the particular chunk is stored in a cache and/or in a write buffer in the fine-grained memory (1348, 1350 "Yes"), the particular chunk (in the cache and/or the write buffer) is modified in response to the write request (1360). The particular chunk is marked as "modified" (in the cache and/or the write buffer). (In this fashion, the cache and/or the write buffer coalesce multiple writes to a same one of the chunks.) A response is returned to the write request (1362).
- Else (1350 "No"), the chunk address is mapped via a map in the fine-grained memory to a particular one of the paragraphs in a particular page in the less-fine-grained memory (1352).
- The particular paragraph (and optionally, the particular page) is read from the less-fine-grained memory (1354). In some embodiments, the particular paragraph optionally and/or selectively contains compressed data, and the compressed data is uncompressed (1356).
- The contents of the particular paragraph are placed in the cache and/or in the write buffer in the fine-grained memory as at least the particular chunk (1358).
- At least a portion of the particular chunk, as defined by the offset within the particular chunk, is modified (in the cache and/or in the write buffer) in response to the write request (1360). The particular chunk is marked as "modified" (in the cache and/or the write buffer). A response is returned to the write request (1362).

Figure 13C:
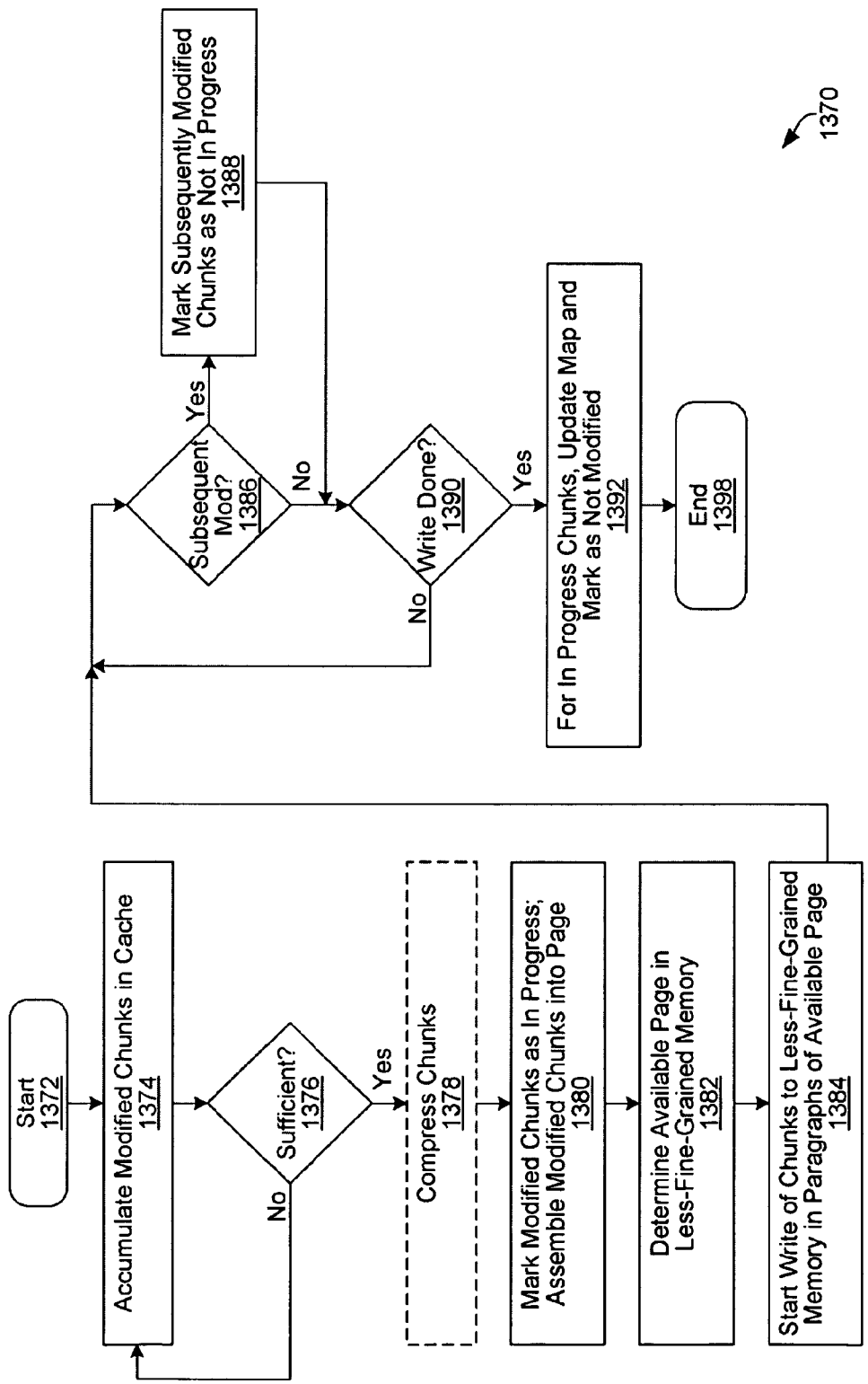
FIG. 13C illustrates an embodiment of a process for managing writing of modified chunks from a cache to a less-fine-grained memory.

Subsequently (as illustrated in FIG. 13C), the modified particular chunk (in the cache and/or in the write buffer) is written to the less-fine-grained-memory. The following functions are performed, not necessarily in the order shown, to write one or more modified ones of the chunks:

- When there are sufficient modified ones of the chunks (1374, 1376) to write at least some of the respective paragraphs of one of the pages of the less-fine-grained memory, the modified chunks are marked as "in progress", the modified chunks are assembled into paragraphs, the paragraphs are assembled into a page (1380), and the page is written to the less-fine-grained memory at a particular physical address (1384). In some embodiments, modified chunks from any locations (not necessarily contiguous locations) are accumulated for writing to the respective paragraphs of a page. In some embodiments, one or more contiguous modified chunks are compressed prior to writing the compressed, modified chunks to the respective paragraphs of a page. In some embodiments, the particular physical address is obtained from a list of previously-erased (available) pages (1382). In some embodiments, the modified chunks are optionally and/or selectively compressed (1378) prior to writing to the less-fine-grained memory.
- A subsequent modification to an "in progress" one of the modified chunks marks the subsequently-modified "in progress" chunk as not "in progress" (1386 "Yes", 1388).
- After the write of the page to Hie less-fine-grained memory completes (1390 "Yes"), for each of the modified chunks, the map is updated to reflect the particular physical address (and the respective paragraph within the page) as the new location of the chunk (1392). For each of the modified chunks that have not been subsequently modified (those that are "in progress"), the chunk is marked as not "modified" and not "in progress", and, optionally, the (formerly) modified chunk is removed from the cache and/or the write buffer. In some embodiments, a list of free paragraphs is maintained on a per-page basis as part of a page information table. In some embodiments, the list of free paragraphs is maintained on a per-block basis as part of a block information table. In some embodiments, a list of partially-unused pages (and/or blocks) is maintained. When a first one of the respective paragraphs of a particular page (and/or of a particular block) is freed, the particular page (and/or the particular block) is added to the list of partially-unused pages (and/or blocks). When the last one of the respective paragraphs of the particular page (and/or block) is freed, the particular page (and/or the particular block) is removed from the list of partially-unused pages (and/or blocks) and is added to the list of unused but not yet erased pages (and/or blocks).

In some embodiments, each of the chunks has a respective epoch field to enable defragmentation and/or recovery in the event of certain types of failure. Each time a particular one of the chunks is written to the less-fine-grained memory, the respective epoch field is incremented, and is stored in the less-fine-grained memory with particular chunk. In various embodiments, writing a particular one of the chunks to a particular one of the paragraphs also writes the respective epoch field to a portion of extra space of the corresponding page. In further embodiments, information specifying a respective node address of the particular chunk is also written to a portion of extra space of the corresponding page. In some embodiments, each of the pages includes a respective epoch field for each of the respective paragraphs. In various embodiments where a particular one of the paragraphs is enabled to store a compressed version of one or more of the chunks, the compressed version of the one or more chunks includes a header, and the header includes the respective epoch fields of at least some of the one or more chunks.

In some embodiments, the respective epoch field of each of the chunks is stored in the map along with other information of the each chunk. Each time a particular one of the chunks is written to the less-fine-grained memory, the respective epoch field in the map is incremented. Except for transient periods when the particular chunk is in a process of being written to the less-fine-grained memory, and except for certain types of failures, such as a power outage during the writing of the particular chunk to the less-fine-grained memory, solely one of the paragraphs in the less-fine-grained memory is associated with information, stored in the corresponding page, that specifies the particular chunk by both the respective node address and the respective epoch field. In some embodiments and/or usage scenarios, the map is optionally recreated from information stored in the pages, such as the nodes addresses and the epoch fields of the chunks.

According to various embodiments, modified chunks are selected for writing based on factors such as: how long the chunk has been in the cache and/or the write buffer; a last access time of the chunk; a last modification time of the chunk; least-recently-used information; locality of the chunk with respect to a node address space containing the chunk; locality of the chunk with respect to ones of the nodes most recently accessing the chunk; and similar factors of contiguous chunks.

In some embodiments and/or usage scenarios, the less-fine-grained memory accessible via a particular node address space is managed, at least in part, using memory allocation techniques. For example, when an element is created in the particular node address space, such as by a software application executing on the respective processors, space for the element is allocated in the particular node address space, the space accessible via a respective element identifier of the element. Continuing the example, the particular node address space is associated with a free list (such as a pool of available blocks and/or pages), and blocks (or pages) are allocated as needed from the free list to provide physical storage for the element. When the element is modified, in various embodiments, the element is remapped to a new (physical) location, and the previous physical location of the element becomes free. Remapping of the element changes the physical location for the element, and does not (in various embodiments) change the respective element identifier used to access the element in the particular node address space. (In various embodiments, the software application is able to free the element when it is no longer needed, and freeing the element also frees the physical location of the element.) Physical storage of the previous physical location of the element is only re-usable when an entire block containing the physical storage of the previous physical location is similarly free (as a block must be erased before any memory in the block is re-writable). In various embodiments, a portion of the less-fine-grained memory associated with the particular node address space is kept unallocated to account for physical storage consumed by re-written elements.

In some embodiments, a block becomes fragmented when elements stored in paragraphs in the block are re-written, causing the elements to be remapped to a new location, and leaving holes (where the re-written elements used to be) in the block. Coalescing moves remaining paragraphs (non-holes) in one or more fragmented blocks to new blocks, compacting the remaining paragraphs so that there are substantially no holes in the new blocks. Once all the remaining paragraphs are moved from a particular one of the fragmented blocks (leaving the particular block empty) the particular block is optionally and/or selectively erased and re-used (such as for further coalescing of other fragmented blocks, and/or for new data that is being written).

In some embodiments, the fine-grained memory is, at least in part, non-volatile. In a first example, at least a portion of the fine-grained memory is coupled to a battery back-up. In a second example, at least a portion of the fine-grained memory includes a non-volatile memory, such as FRAM. In a third example, at least a portion of the memory sub-system including at least a portion of the fine-grained memory is coupled to a battery back-up. In various embodiments in which at least a portion of the fine-grained memory is non-volatile, the map and optionally other data structures, such as a page information table, reside in the non-volatile portion of the fine-grained memory, and epoch fields are not stored in the map. In further embodiments, epoch fields are not stored in any of the data structures, including data structures in extra space of pages of the less-fine-grained memory. According to various embodiments, one or more of: a cache and/or a write-buffer for the less-fine-grained memory is stored in a non-volatile portion of the fine-grained memory; and a non-volatile portion of the fine-grained memory is used by software executing on the respective processors for information used in failure recovery, such as information related to data replication among the nodes.

In some embodiments, reads of the less-fine-grained memory are not enabled to pass writes to the less-fine-grained memory. In some embodiments, a read and/or a write of the less-fine-grained memory is not enabled to pass a write to the less-fine-grained memory at a same address. In some embodiments, a read of the less-fine-grained memory "snoops" (by-passes data from) any previous writes to the less-fine-grained memory at a same address. In some embodiments, a write to the less-fine-grained memory merges write data into write data of a previous write (such as stored in a write buffer) at a same address. In various embodiments, each cache tag of the cache includes a "lock" bit, and during a period from when a particular modified one of the chunks is selected to be written to the less-fine-grained memory until the map is updated to reflect the new location of the particular chunk, the particular chunk is locked in the cache and is not evictable.

Figure 17:
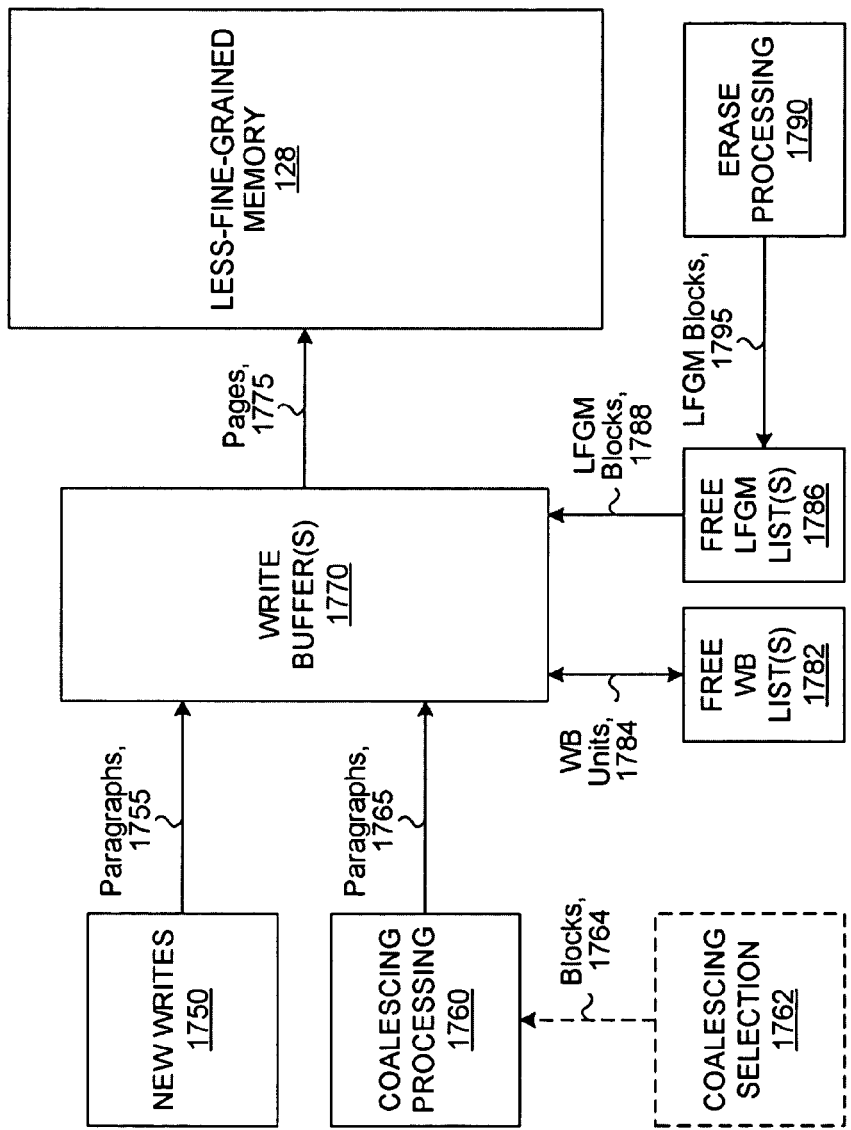
FIG. 17 illustrates an embodiment of a flow for writing data to a less-fine-grained memory.

In some embodiments, a memory sub-system controller provides a path between the fine-grained memory and the less-fine-grained memory. In a first example, the fine-grained memory includes a cache of at least a portion of the less-fine-grained memory, enabling a cached portion of the less-fine-grained memory to be accessed from the fine-grained memory, and enabling multiple writes to the less-fine-grained memory to be merged in the cache. In a second example, the memory sub-system controller provides software-controllable copy operations (such as via a DMA controller) between the less-fine-grained memory and the fine-grained memory, enabling the less-fine-grained memory to be treated similar to a storage device or other device having block-based transfers. In a third example, at least a portion of the fine-grained memory is used as a software-controlled write buffer (such as, in some embodiments, write buffer(s) 1770 as illustrated in FIG. 17) for the less-fine-grained memory. Software organizes the at least a portion of the fine-grained memory in pages and/or blocks (such as pages and/or blocks of a same size as pages and/or blocks of the less-fine-grained memory), and modified elements (such as chunks and/or objects) are stored in the pages and/or blocks of the at least a portion of the fine-grained memory. When a page and/or block in the at least a portion of the fine-grained memory is full (or nearly full), software is configured to write the (nearly) full page and/or block to an empty page and/or block of the less-fine-grained memory, and to update respective maps of one or more node address spaces containing each of the elements in the (nearly) full page and/or block to refer to the (formerly) empty page and/or block of the less-fine-grained memory. Continuing the third example, the at least a portion of the fine-grained memory is preferably a non-volatile portion, such as by having a battery back-up power source.

In some embodiments, a particular one of the nodes uses a cache to store recently accessed ones of the chunks. According to various embodiments, the cache is responsive to one or more of: requests from the respective processors of the particular node; and requests from others of the nodes received via the respective interconnect switch of the particular node. In various embodiments, the cache uses a portion of the fine-grained memory for both a data portion (storing the chunks) and a tag portion (maintaining an association between node addresses of the chunks and locations in the cache). In some embodiments, the tag portion of the cache is in a dedicated memory, such as SRAM. According to various embodiments, the cache stores chunks from one or more node address spaces according to one or more factors such as: any portion of the one or more node address spaces; any portion of the one or more node address spaces corresponding to the less-fine-grained memory; a cacheable portion of the one or more node address spaces; a portion of the one or more node address spaces local to the particular node; and any combination of the preceding factors. In some embodiments, the cache is divided into a local portion for accesses from the respective processors of the particular node, and a global portion for accesses from others of the nodes.

In some embodiments, the cache acts as a write buffer in that modified ones of the chunks are stored in the cache, and are subsequently written to the less-fine-grained memory. In other embodiments, a write buffer independent of a cache is used. The cache and/or the write buffer act as a write coalescing buffer in that a plurality of writes of a particular one of the chunks stored in the cache and/or the write buffer modifies the particular chunk in the cache and/or the write buffer, thus coalescing the writes (and obviating a need to write the less-fine-grained memory more than one time for the plurality of writes).

In various embodiments, the cache is or acts as a versioning cache. In some embodiments, a versioning cache performs uncommitted modifications to particular ones of the chunks that are modified by on-going (not yet committed or aborted) transactions, and retains the previous (pre-modification) state of the particular chunks. In further embodiments, the versioning cache is enabled to "unwind" (undo) uncommitted modifications, such as when a transaction is aborted, and to restore the previous state of the particular chunks. When a transaction is committed, the versioning cache is enabled to no longer retain the previous state of the particular chunks. In some embodiments, the versioning cache enables a particular one of the transactions to access modifications of the particular transaction. In further embodiments, the versioning cache prevents transactions from observing modifications of other, not-yet-committed transactions.

In some embodiments, a versioning cache uses a linked list for each versioned entry in the cache. A cache tag of an entry of the versioning cache indicates that the entry has more than one version, and a pointer associated with the cache tag points to a head of a list of previous versions of the entry. When a transaction is committed, previous versions at a tail of the list are no longer needed, and are deallocated When a transaction is aborted, modified versions at the head of the list are no longer needed, and are deallocated.

In some embodiments, a pool of available (unused and erased) ones of the pages (and/or of the blocks) in the less-fine-grained memory is managed, such as in a free list. When a number of modified ones of the elements are to be written to the less-fine-grained memory, an available one of the pages (and/or one of the blocks) from the pool is selected to store the modified elements. According to various embodiments, the selection of an available page (and/or of an available block) is based on factors such as: a page (and/or a block) local to a particular one of the nodes; a page (and/or a block) not local to a particular one of the nodes; a page (and/or a block) with a relatively smaller number of previous writes; a page (and/or a block) with a relatively smaller number of previous erase operations; a page (and/or a block) based on a network and/or interconnect load; a page (and/or a block) from a memory device with low utilization, such as bandwidth utilization and/or capacity utilization; and any combination of the preceding factors.

In some embodiments, a pool of to-be-erased (unused but not yet erased) ones of the pages (and/or ones of the blocks) in the less-fine-grained memory is managed. When all of the respective paragraphs in a particular one of the pages (and/or a particular one of the blocks) have been written to other locations, the particular page (and/or the particular block) is ready to be erased. When all of the respective pages in a particular one of the blocks are ready to be erased, the particular block is ready to be erased. In some embodiments, a background operation erases ones of the blocks that are ready to be erased, and then places respective pages of the erased blocks in the pool of available pages. In other embodiments, erased blocks are maintained in the pool of available blocks. In some embodiments, status of blocks is tracked in a block information table.

In some embodiments, a pool of partially-unused ones of the pages (and/or of the blocks) in the less-fine-grained memory is managed. When a particular one of the paragraphs is freed (such as by the element stored in the particular paragraph being re-written), and when the remaining respective paragraphs of the corresponding page (and/or the corresponding block) are all in-use, the corresponding page (and/or the corresponding block) is added to the pool of partially-unused pages (and/or blocks). The pool of partially-unused pages (and/or blocks) is periodically policed, such as by examining all of the pages (and/or blocks) in the pool, to determine particular ones of the pages (and/or of the blocks) in the pool that have less than a first threshold number of respective paragraphs in use and/or more than a second threshold number of available (unused) space. The respective in-use paragraphs of the particular pages (and/or of the particular blocks) are reallocated to others of the pages (and/or of the blocks), as if the respective in-use paragraphs had been written, and the particular pages (and/or the particular blocks) are added to the pool of to-be-erased pages (and/or blocks). In various embodiments, the pool of partially-unused ones of the pages (and/or of the blocks) is a doubly-linked list and a particular one of the pages (and/or of the blocks) added to the list is removed, possibly from the middle of the list, when all of the respective paragraphs of the particular page (and/or of the particular block) become unused.

In some embodiments where a list of unused but not yet erased pages is maintained, a similar procedure to the above enables particular ones of the pages from the list of unused but not yet erased pages to be combined into the corresponding unused but not yet erased block. In various embodiments, the list of unused but not yet erased pages is a doubly-linked list and a particular one of the pages added to the list is removed, possibly from the middle of the list, when all of the respective pages of the corresponding block become unused but not yet erased.

In some embodiments, contents of a first cache of a first one of the nodes are distributed across a plurality of the nodes such that any modification to one of the chunks stored in the first cache is, prior to the modification being acknowledged, stored in a second cache of a second of the nodes. For example, when a write request modifies a previously-unmodified one of the chunks in the first cache, a response is not sent to the write request until the modified chunk has been "mirrored" in the second cache. In the event of a failure of the first node, the mirrored version of the modified chunk is still extant in the second cache and retains the modifications. In some embodiments, mirroring of the cache provides redundancy on write, in that all writes to the first cache are performed in both the first cache and the second cache.

In some embodiments, at least a portion of the less-fine-grained memory, such as a shard, is mirrored across two or more of the nodes such that any piece of the at least a portion of the less-fine-grained memory of a first one of the nodes has a copy at a second one of the nodes. In various embodiments, a first section of the less-fine-grained memory is mirrored by the first node and the second node, and a second section of the less-fine-grained memory is mirrored by the first node and a third one of the nodes, the third node different from the second node. In some embodiments, mirroring of the less-fine-grained memory is based on physical addresses of the less-fine-grained memory, and each of the pages of the at least a portion of the less-fine-grained memory is mirrored. In other embodiments, mirroring of the less-fine-grained memory is based on a node address space that is mapped to the less-fine-grained memory, and each of the paragraphs of the at least a portion of the less-fine-grained memory that is referenced via the respective local map of the node address space is mirrored. In some embodiments, mirroring of the less-fine-grained memory provides redundancy on write, in that all writes to the at least a portion of the less-fine-grained memory of the first node are performed in both the at least a portion of the less-fine-grained memory of the first node and in a copy in another of the nodes. In various embodiments, a particular one of the first node and the second node is enabled to manage modifications of the at least a portion of the less-fine-grained memory, and the other one of the first node and the second node mirrors the modifications under management of the particular node.

According to various embodiments, the less-fine-grained memory is mirrored in sections, the sections according to one or more of: an element basis; a paragraph basis; a page basis; a block basis; a range basis; a software-configurable basis, such as a shard basis and/or a partition basis; and a node basis. In some embodiments, one of the first node and the second node is a master (also called a home node) for the at least a portion of the less-fine-grained memory, and requests for the at least a portion of the less-fine-grained memory are satisfied by the master, if the master is available. In other embodiments, either one of the first node and the second node satisfies requests for the at least a portion of the less-fine-grained memory. For example, information associated with a particular node address space indicates for each shard of the particular node address space a subset (including a proper subset) of the nodes that are enabled to provide corresponding portions of the respective less-fine-grained memories of the subset of the nodes.

In some embodiments, at least a portion of the less-fine-grained memory of a first one of the nodes is accessible to others of the nodes via a first one or more node address spaces used by the other nodes, and is mirrored at a second one of the nodes, so that the second node has a copy of the at least a portion of the less-fine-grained memory of the first node. In some embodiments, the second node is a hot standby node. In other embodiments, the second node is an active one of the nodes, and at least a portion of the less-fine-grained memory of the second node is accessible to others of the nodes via a second one or more node address spaces used by the other nodes. In further embodiments, the at least a portion of the less-fine-grained memory of the second node is mirrored at a third one of the nodes. In further embodiments, the third node is the same as the first node. In some embodiments, in response to a failure of the first node, routing of communications among the nodes (such as via the respective global maps of the first one or more node address spaces) is updated so that requests to access the at least a portion of the less-fine-grained memory of the first node are directed to the second node.

In some embodiments, data stored in at least a portion of the less-fine-grained memory is mirrored across a plurality of nodes in a RAID-like fashion. When each one of a set of the nodes, such as four of the nodes, writes a respective page in the respective at least a portion of the less-fine-grained memory, the respective pages are sent to a particular one of the nodes not in the set, and the particular node writes a single page that combines, such as by XORing, the respective pages of each of the set. Data stored in the at least a portion of the less-fine-grained memory on a failing one of the set is recoverable using the respective pages on others of the set, and the combined page on the particular node.

According to various embodiments, data of the less-fine-grained memory is mirrored in a variety of ways, a few of which are described above. Mirroring enables redundant storage of data so that failure of one copy of the data, such as due to loss of access to a particular one of the nodes, docs not lose the data. In some embodiments, a write access is not committed until the write access is completed in a mirrored fashion. According to various embodiments, a transaction is not committed until one or more of: write accesses of the transaction are completed in a mirrored fashion; a transaction log for the transaction is recorded in non-volatile storage; and other techniques for ensuring integrity of transactions. In various embodiments, recovery after a failure, such as a loss of one of the nodes, is, at least in part, by software. For example, software uses a transaction log to ensure that all logged transactions are correctly completed. In some embodiments, software uses a mirrored copy of data to aid in recovery.

In some embodiments, at least some data in the less-fine-grained memory is stored in a compressed fashion. In some embodiments, at least some data in the fine-grained memory, such as a cache for the less-fine-grained memory, is stored in a compressed fashion. A cache (or a write buffer) in the fine-grained memory stores ones of the chunks of memory having node addresses corresponding to physical locations in the less-fine-grained memory. When a number of modified ones of the chunks in the cache (or the write buffer) is sufficient, the modified chunks are written to the less-fine-grained memory. According to various embodiments, the function of writing the modified chunks includes one or more of: writing the modified chunks as is (without compression); compressing individual ones of the modified chunks; compressing as a group a plurality of the modified chunks; and compressing as a group a plurality of one of the chunks that are contiguous (in a node address space containing the chunks) and include al least some of the modified chunks. In some embodiments, the compression and the writing operate on a plurality of ones of the chunks, only some of which are modified.

In some embodiments, a first number of one or more of the chunks are compressed into a second number of one or more of the paragraphs, where the second number is less than or equal to the first number. Due to the compression, the last one of the one or more paragraphs is optionally not completely full. A size (a number of bytes) stored with each one of the paragraphs is used, at least in part, to correctly uncompress the paragraph. According to various embodiments, a paragraph type code stored with each one of the paragraphs includes one or more of: unused, uncompressed, compressed, compressed start, compressed continue, compressed end, and reserved for future use. In some embodiments, the paragraph type code specifies a type of compression used on the paragraph. In some embodiments, the paragraph type code specifies one or more dictionaries used in compression of the paragraph. In some embodiments, the dictionaries are global dictionaries. In various embodiments, when the one or more chunks are compressed into the one or more paragraphs, a compressed version of the one or more chunks is prepended with a header prior to storing the header and the compressed version in the one or more paragraphs. According to various embodiments, the header includes one or more of: a type of compression; a list of zero or more global dictionaries used in the compression; and status and/or mapping information of at least some of the one or more chunks, such as an epoch field of at least some of the one or more chunks.

In an example, one or more original ones of the chunks that are contiguous (in a node address space containing the original chunks), at least some of which are modified, are compressed. The compressed version of the original chunks takes less space than the original chunks. Whereas each of the original chunks without compression consumes a separate one of the paragraphs in the less-fine-grained memory, the compressed version of the original chunks consumes a smaller number of the paragraphs. Advantageously, less space in the less-fine-grained memory is needed (and less write bandwidth to the less-fine-grained memory is needed) to store the original chunks. In some embodiments and/or usage scenarios, a particular one or more of the paragraphs storing the compressed version of the original chunks all reside within a single page. In some embodiments and/or usage scenarios, the compressed version of the original chunks resides within a single one of the paragraphs. A particular page is allocated from a pool of available pages for the ones of the paragraphs representing the compressed version of the original chunks (as well as any other ones of the paragraphs to be written, compressed or otherwise, that help fill the particular page), and the particular page is written in the less-fine-grained memory with the compressed version of the original chunks. The map (in the fine-grained memory) is modified to associate each of the original chunks with the particular page and with a first one of the paragraphs representing the compressed version of the original chunks. A subsequent read of a particular one of the original chunks (not hitting in the cache) reads the particular page and one or more of the paragraphs representing the compressed version of the original chunks, decompresses the one or more paragraphs, and returns the particular chunk.

In some embodiments, a size of one of the chunks is substantially a size of a plurality of paragraphs, such as four paragraphs. (Paragraphs, in various embodiments, have additional space used for information such as an error detecting code.) The map (in the fine-grained memory) associates each one of the chunks with one or more of the paragraphs (e.g., four paragraphs). In some embodiments, for at least some uncompressed data, the one or more paragraphs are respective paragraphs within a corresponding page. In various embodiments and/or usage scenarios, a compressed one of the chunks consumes fewer of the paragraphs, perhaps as few as one of the paragraphs, thus saving space in the less-fine-grained memory.

In some embodiments, compression of one or more of the chunks uses information in the one or more chunks. In some embodiments, compression of one or more of the chunks uses a dictionary, such as a global dictionary. According to various embodiments, a type stored with the compressed version of the one or more chunks specifies one or more of: a type of compression used; and a list of one or more dictionaries used as part of the compression. In some embodiments, the list of dictionaries is provided as a list of addresses, such as addresses in the fine-grained memory, where the dictionaries are stored. In some embodiments, the list of dictionaries is provided as a list of indices into a table of one or more dictionary pointers, each of the dictionary pointers specifying a location and/or a size of a respective one of the dictionaries. According to various embodiments, the table of dictionary pointers is stored, in whole or in part, in one or more of: a special memory, such as an SRAM; in the fine-grained memory; in the fine-grained memory with a cache in an SRAM; in CSRs (control/status registers); and in any other type or types of memory.

In some embodiments, multiple compression algorithms are used, substantially in parallel, when compressing one or more of the chunks, and best results (such as best compression) of the multiple compression algorithms are used as a compressed version of the one or more chunks. In further embodiments, an indication of the one of the multiple compression algorithms producing the best results is stored with the compressed version of the one or more chunks. In some embodiments, one or more of the compression algorithms use one or more dictionaries. According to various embodiments, the contents of the dictionaries are provided, at least in part, by one or more of: software; firmware; hardware; statistical analysis of at least some of the data stored in the less-fine-grained memory; hardware-maintained statistics of data written to at least a portion of the less-fine-grained memory; and by user configuration. In some embodiments, at least one dictionary is global and is used by one of the compression algorithms for all data being compressed. In various embodiments, at least some of the dictionaries are associated with particular parts of the less-fine-grained memory, and/or with particular types of write requests.

In some embodiments, the map (in the fine-grained memory) includes information regarding the caching of each mapped one of the chunks. According to various embodiments, a mapping table entry for a particular chunk includes one or more of: information to identify a page in the less-fine-grained memory; information to determine one or more particular ones of the respective paragraphs in the page; a valid bit; a field with status information for the particular chunk, such as an in-progress bit; a bit indicating the particular chunk is in a cache; and an address in a cache. In some embodiments, a mapping table entry for a particular one of the chunks includes a bit indicating the particular chunk is in a cache, and a table of cache tags is used to locate a cached version of the particular chunk in the fine-grained memory.

In some embodiments, a particular one of the nodes has a "hot standby" node, the hot standby node enabled to take over operation for the particular node in the event that the particular node either fails or is to be taken out of service. In various embodiments, the hot standby node is shared by several of the nodes, and the hot standby node is enabled to sync up (acquire at least a portion of the dynamic state of) one of the several nodes.

EXAMPLE EMBODIMENTS

In concluding the introduction to the detailed description, what follows is a collection of example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims.

EC1) A system including:
a fine-grained memory;
a less-fine-grained memory, at least a portion of the less-fine-grained memory accessible by a processor via an address space;
wherein the less-fine-grained memory is divided into a plurality of independently-writable pages, each of at least some of the pages divided into a plurality of respective logical partitions;
wherein the fine-grained memory includes a map between a plurality of sections of the address space and physical addresses of the logical partitions; and
wherein at least some accesses by the processor via the address space are mapped via the map to accesses of the logical partitions.

EC2) The system of EC1, wherein regions of the less-fine-grained memory smaller than a size of one of the pages of the less-fine-grained memory are not independently writable.

EC3) The system of EC1, wherein the sections of the address space are fixed-sized chunks in the address space.

EC4) The system of EC3, wherein the sections of the address space are all of a same size.

EC5) The system of EC1, wherein the sections of the address space are of variable sizes.

EC6) The system of EC5, wherein the sections of the address space are objects in the address space.

EC7) The system of EC1, wherein the logical partitions are not all of a same size.

EC8) The system of EC7,
wherein a particular one of the pages is divided into at least a first one of the logical partitions and a second one of the logical partitions; and
wherein the first logical partition is a different size than the second logical partition.

EC9) The system of EC1,
wherein each of the sections of the address space is indentified via a respective key; and
wherein the map includes a hash table accessed using the keys.

EC10) The system of EC1,
wherein each of the sections of the address space is indentified via a respective address in the address space; and
wherein the map includes a table accessed using at least a portion of the addresses.

EC11) The system of EC1, wherein the fine-grained memory includes a write buffer for the less-fine-grained memory.

EC12) The system of EC11,
wherein the processor is configured to accumulate writes to two or more of the sections of the address space in a page of the write buffer; and
wherein the processor is further configured to subsequently write the page of the write buffer to a particular one of the pages of the less-fine-grained memory.

EC13) The system of EC12, wherein the processor is further configured to determine the particular page of the less-fine-grained memory.

EC14) The system of EC12, wherein a size of the page of the write buffer is a same size as a user-accessible size of the particular page of the less-fine-grained memory.

EC15) The system of EC12,
wherein the less-fine-grained memory is divided into a plurality of independently-erasable blocks, each of the blocks including a respective portion of the pages of the less-fine-grained memory; and
wherein the processor is further configured to maintain a free list of free ones of the blocks of the less-fine-grained memory.

EC16) The system of EC15, wherein the processor is further configured to determine the particular page of the less-fine-grained memory by allocating one of the blocks from the free list.

EC17) The system of EC16, wherein the processor is further configured to allocate one of the blocks from the free list according to respective wear information of each of the blocks.

EC18) The system of EC17, wherein the free list is ordered according to the respective wear information of the blocks.

EC19) The system of EC12, wherein one of the writes in the page of the write buffer is a write of data of one of the logical partitions read from the less-fine-grained memory to coalesce the less-fine-grained memory.

EC20) The system of EC19,
wherein the one of the writes in the page of the write buffer is a first one of the writes, and the one of the logical partitions is a first one of the logical partitions; and
wherein a second one of the writes in the page of the write buffer is a write of data of a second one of the logical partitions read from the less-fine-grained memory to coalesce the less-fine-grained memory; and
wherein the first logical partition and the second logical partition are on different ones of the pages of the less-fine-grained memory.

EC21) The system of EC12, wherein at least one of the writes in the page of the write buffer is a write of new data from an application program.

EC22) The system of EC12, wherein the processor is further configured to update two or more of a plurality of entries of the map in conjunction with the write of the page of the write buffer to the particular page of the less-fine-grained memory.

EC23) The system of EC22, wherein the two or more entries of the map are the ones of the entries of the map that map between the two or more of the sections of the address space and ones of the physical addresses of the logical partitions.

EC24) The system of EC23, wherein the processor is further configured to update the two or more entries of the map to refer to ones of the physical addresses of at least some of the respective logical partitions of the particular page of the less-fine-grained memory.

EC25) The system of EC12, further including a DMA controller configured to manage the write of the page of the write buffer to the particular page of the less-fine-grained memory.

EC26) The system of EC25, wherein the processor is enabled to control the DMA controller.

EC27) The system of EC11, wherein the write-buffer is non-volatile.

EC28) The system of EC11,
further including a battery back-up power source; and
wherein the write-buffer is configured to operate using the battery back-up power source.

EC29) The system of EC28, wherein the write buffer is temporarily non-volatile.

EC30) The system of EC28, wherein the write buffer is non-volatile for a sufficient duration to preserve contents of the write buffer in the less-fine-grained memory.

EC31) The system or EC28,
further including a memory sub-system controller coupled to the less-fine-grained memory; and
wherein the memory sub-system controller is configured, in event of a power disruption, to copy at least a portion of contents of the write buffer to a region of the less-fine-grained memory.

EC32) The system of EC31, further including a power detection circuit enabled to signal the event of a power disruption.

EC33) The system of EC1,
wherein the address space is a plurality of address spaces; and
wherein each of the address spaces is associated with a respective software entity.

EC34) The system of EC33, wherein at least some of the software entities are containers.

EC35) The system of EC33, wherein the at least a portion of the less-fine-grained memory is a shard.

EC36) The system of EC33, wherein the less-fine-grained memory includes a plurality of shards, each of the shards associated with one of the address spaces.

EC37) The system of EC33, wherein two of the shards are associated with a same one of the address spaces.

EC38) The system of EC1,
wherein the sections of the address space are associated with objects; and
wherein the logical partitions are not all of a same size.

EC39) The system of EC38, wherein at least some of the objects correspond to more than one of the logical partitions.

EC40) The system of EC1, wherein each of the logical partitions is a same size.

EC41) The system of EC1, wherein at least a portion of the fine-grained memory is accessible by the processor via the address space.

EC42) The system of EC1, wherein the less-fine-grained memory includes two or more memory devices.

EC43) The system of EC42, wherein a first one of the pages residing in a first one of the memory devices is a different size than a second one of the pages residing in a second one of the memory devices.

EC44) The system of EC1, wherein one or more memory devices including the less-fine-grained memory are installed on one or more DIMMs.

EC45) The system of EC44, wherein each of the logical partitions residing in a particular one of the memory devices is a same size.

EC46) The system of EC1, wherein at least a portion of the less-fine-grained memory is used by the processor as a general-purpose memory.

EC47) The system of EC1, wherein at least a portion of the fine-grained memory is used by the processor as a general-purpose memory.

EC48) The system of EC1, wherein the fine-grained memory further includes a cache of at least some of the contents of the less-fine-grained memory.

EC49) The system of EC48, wherein the cache is organized according to a size of data in the logical partitions.

EC50) The system of EC1, wherein the less-fine-grained memory is a random-access, semiconductor memory.

EC51) The system of EC50, wherein the less-fine-grained memory is selected from the group consisting of mobile DRAM, DRAM, PRAM, FRAM, flash memory, and any page-based semiconductor memory.

EC52) The system of EC1,
wherein the system further includes a memory sub-system controller, and
wherein the memory sub-system controller is enabled to map the at least some accesses to the accesses of the logical partitions.

EC53) The system of EC52, wherein one or more memory devices including the less-Fine-grained memory are installed on one or more DIMMs.

EC54) The system of EC53, wherein the memory sub-system controller is coupled to the less-fine-grained memory via one or more logic devices.

EC55) The system of EC54, wherein the memory sub-system controller communicates with the logic devices using a protocol.

EC56) The system of EC55, wherein the protocol supports a command set at a higher-level than dial supported by the logic devices.

EC57) The system of EC55, wherein the protocol includes a command to read mapping information stored in a particular one of the pages.

EC58) The system of EC57, wherein the mapping information is read without reading all of the particular page.

EC59) The system of EC55, wherein the protocol includes a command to read at least a portion of a particular one of the respective logical partition of a particular one of the pages, and an amount of data read is based, at least on part, on a first portion of the logical partition.

EC60) The system of EC54, wherein the logic devices are selected from the group consisting of ASICs, FPGAs, CPLDs, and PLDs.

EC61) The system of EC54, wherein each of the DIMMs includes one of the logic devices and a plurality of the memory devices.

EC62) The system of EC54, wherein each of the DIMMs includes one or more of the logic devices and a plurality of the memory devices.

EC63) The system of EC1, wherein the system further includes the processor.

EC64) The system of EC1,
wherein the system further includes a memory sub-system controller, the memory sub-system controller coupled to the fine-grained memory and to the less-fine-grained memory;
wherein the system further includes an interconnect switch coupled to the processor and to the memory sub-system controller; and
wherein the at least some accesses are routed by the interconnect switch memory to the memory sub-system controller.

EC65) The system of EC64, wherein the interconnect switch is coupled to the processor via a communications link.

EC66) The system of EC64,
wherein the interconnect switch is a first interconnect switch;
wherein the first interconnect switch is coupled to the processor via a second interconnect switch; and
wherein the second interconnect switch is coupled to the processor via a processor communications link, and is coupled to the first interconnect switch via a switch communications link.

EC67) The system of EC1,
wherein the system further includes a memory sub-system controller, the memory sub-system controller coupled to the fine-grained memory and to the less-fine-grained memory;
wherein the memory sub-system controller is enabled to manage one or more sequential write streams, each of the sequential write streams writing data to a respective sequence of the pages; and
wherein some accesses by the processor via the address space perform writes using the sequential write streams.

EC68) The system of EC67, wherein at least a portion of the at least some accesses perform writes using the sequential write streams.

EC69) The system of EC67, wherein the sequential write streams are managed without use of the map.

EC70) The system of EC67, wherein the processor writes to a transaction log using one of the sequential write streams.

EC71) The system of EC1,
wherein the system further includes a memory sub-system controller, the memory sub-system controller coupled to the fine-grained memory and to the less-fine-grained memory; and
wherein the memory sub-system controller is enabled to provide ACID memory properties for the at least some accesses.

EC72) The system of EC71, wherein the memory sub-system controller is enabled to provide transaction coherency for ones of a plurality of transactions among the at least some accesses.

EC73) The system of EC1,
wherein the system further includes a memory sub-system controller, the memory sub-system controller coupled to the fine-grained memory and to the less-fine-grained memory; and
wherein the memory sub-system controller is enabled to provide filtering for at least some of the read ones of the at least some accesses.

EC74) The system of EC73, wherein for a particular one of the at least some read accesses, the memory sub-system controller is enabled to read a plurality of records, and to filter the records based, at least in part, upon a list of filter criteria.

EC75) The system of EC74, wherein for the particular read accesses, the memory sub-system controller is enabled to return a subset of the records as at least part of a response, the subset matching the list of filter criteria.

EC76) A system including:
a processor;
an external memory sub-system coupled to the processor, the external memory sub-system including a first region of fine-grained memory, a second region of less-fine-grained memory, and a memory sub-system controller coupled to the fine-grained memory and to the less-fine-grained memory, the memory sub-system controller enabled to manage accesses from the processor, each of the accesses including a respective address within at least a portion of an address space; and
wherein at least a portion of the less-fine-grained memory is accessible by the processor via the at least a portion of the address space.

EC77) The system of EC76, wherein the processor is a multi-core processor.

EC78) The system of EC76, wherein the address space includes a PCI address space.

EC79) The system of EC76, wherein the address space is a PCI address space.

EC80) The system of EC76, wherein the memory sub-system controller includes one or more DMA controllers, at least one of the DMA controllers to manage transfers between the fine-grained memory and the less-fine-grained memory.

EC81) The system of EC80, wherein the processor is enabled to control the DMA controllers.

EC82) The system of EC80, wherein at least some of the transfers between the fine-grained memory and the less-fine-grained memory are from the less-fine-grained memory.

EC83) The system of EC82, wherein the at least some of the transfers are to a write buffer in the fine-grained memory.

EC84) The system of EC83, wherein a coalescing-processing thread is configured to control the at least some of the transfers.

EC85) The system of EC80, wherein at least some of the transfers between the fine-grained memory and the less-fine-grained memory are from a write buffer in the fine-grained memory.

EC86) The system of EC85, wherein the processor is configured to manage the write buffer.

EC87) The system of EC76, wherein at least a portion of the fine-grained memory is accessible by the processor via the at least a portion of the address space.

EC88) The system of EC76, wherein the fine-grained memory includes a cache, the cache storing at least a portion of the contents of less-fine-grained memory.

EC89) The system of EC76,
wherein the system further includes a cache, the cache storing at least a portion of contents of the less-fine-grained memory; and
wherein the cache is managed by the memory sub-system controller.

EC90) The system of EC89, wherein a data portion of the cache resides in the fine-grained memory.

EC91) The system of EC89, wherein the cache stores at least some of the at least a portion of the less-fine-grained memory accessible by the processor.

EC92) The system of EC89, wherein at least some of the accesses from the processor return data from the cache.

EC93) The system of EC89, wherein at least some of the accesses from the processor allocate data in the cache.

EC94) The system of EC89, wherein at least some of the accesses from the processor evict data from the cache.

EC95) The system of EC76, further including a map, the map used to map the respective addresses of at least some of the accesses from the processor to physical addresses of physical locations in the less-fine-grained memory.

EC96) The system of EC95, wherein the map is resident, at least in part, in a respective memory of the processor.

EC97) The system as in any one of EC76, EC95, and EC96, wherein the less-fine-grained memory is a page-based memory having a plurality of independently writable pages.

EC98) The system of EC97, wherein the memory sub-system controller enables at least some of the accesses from the processor to the less-fine-grained memory to access less than one of the pages of the less-fine-grained memory.

EC99) The system of EC98, wherein the at least some of the accesses include write accesses.

EC100) The system of EC97, wherein the fine-grained memory includes a write buffer for the less-fine-grained memory.

EC101) The system of EC100, wherein the write buffer is managed by the processor.

EC102) The system of EC100, wherein the processor is enabled to write a plurality of independent elements less than a size of one of the pages of the less-fine-grained memory to the less-fine-grained memory via the write buffer.

EC103) The system of EC102, wherein at least some of the elements are read from the less-fine-grained memory to coalesce the less-fine-grained memory.

EC104) The system of EC103, wherein a first one of the at least some of the elements is read from a first one of the pages of the less-fine-grained memory and a second one of the at least some of the elements is read from a second one of the pages of the less-fine-grained memory, the second page different from the first page.

EC105) The system of EC76,
wherein the fine-grained memory includes a map, the map used to map the respective addresses of at least some of the accesses from the processor to the at least a portion of the less-fine-grained memory to physical addresses of physical locations in the less-fine-grained memory; and
wherein the map is managed by the memory sub-system controller.

EC106) The system as in any one of EC88, EC89, EC95, and EC105, wherein the less-fine-grained memory is a page-based memory.

EC107) The system of EC106, wherein the memory sub-system controller enables at least some of the accesses from the processor to the less-fine-grained memory to access less than a page of the less-fine-grained memory.

EC108) The system of EC107, wherein the at least some of the accesses include write accesses.

EC109) The system of EC107, wherein the at least some of the accesses include sequential write accesses.

EC110) The system of EC107, wherein the at least some of the accesses include read accesses.

EC111) The system as in any one of EC95, and EC105, wherein the memory sub-system controller is further enabled to manage a cache, the cache storing at least a portion of the contents of less-fine-grained memory.

EC112) A method including:
providing an address from a processor as part of an access to an external memory sub-system, the address within an address space;
determining whether the address is within a region of the address space mapped to at least a portion of a less-fine-grained memory; and
if the address is within the region,
mapping the address to a physical address within the less-fine-grained memory, and
performing the access at the physical address.

EC113) The method of EC112, wherein the address space is a node address space.

EC114) The method of EC112, wherein the determining is via a memory sub-system controller.

EC115) The method of EC112, wherein the mapping is via a memory sub-system controller.

EC116) The method of EC115, wherein the memory sub-system controller is external to the processor.

EC117) The method of EC115, wherein the external memory sub-system includes the memory sub-system controller and the less-fine-grained memory.

EC118) The method of EC112,
wherein the region is a first region; and
further including determining whether the address is within a second region mapped to at least a portion of a fine-grained memory.

EC119) The method of EC118, further including if the address is within the second region, performing the access to the fine-grained memory EC120) The method of EC119, wherein the fine-grained memory includes a first type of semiconductor memory, and the less-fine-grained memory includes a second type of semiconductor memory.

EC121) The method of EC120, wherein the first type of semiconductor memory is selected from the group consisting of SRAM and DRAM.

EC122) The method of EC120, wherein the first type of semiconductor memory is a volatile memory type.

EC123) The method of EC122, wherein the first type of semiconductor memory has a battery back-up system.

EC124) The method of EC120, wherein the second type of semiconductor memory is selected from the group consisting of flash, FRAM, MRAM, PRAM, and any page-based semiconductor memory.

EC125) The method of EC120, wherein the second type of semiconductor memory is a non-volatile memory type.

EC126) The method of EC119, wherein the mapping is via a mapping table stored in the fine-grained memory.

EC127) The method of EC112, wherein the mapping maps each of a plurality of chunks of the region of the address space to a corresponding one of a plurality of sections of the less-fine-grained memory.

EC128) The method of EC127, wherein the mapping maps the address to a particular one of the sections.

EC129) The method of EC128, further including if the address is within the region of the address space, determining whether a copy of contents of the section is resident within a cache.

EC130) The method of EC129, wherein the cache is organized according to sections.

EC131) The method of EC127,
wherein multiple ones of the chunks are mapped to a same corresponding section of the less-fine-grained memory; and
wherein contents of the multiple chunks are stored, at least in part, in the same corresponding section as compressed data.

EC132) The method of EC131, wherein data stored in the same corresponding section include a header and the compressed data.

EC133) The method of EC132, wherein the header includes one or more of the group consisting of
- a type of compression used to produce the compressed data,
- a specification of one or more dictionaries used, at least in part, to produce the compressed data,
- one or more epoch fields, each of the epoch fields associated with one of the multiple chunks.
- a size field specifying, at least in part, a size of the compressed data,
- a low-bits field including a portion of the address, and
- a chunk count field, specifying a number of the multiple chunks.

EC134) The method of EC132,
further including compressing the multiple chunks to produce the compressed data;
wherein the compressing uses a particular one of one or more global dictionaries; and
wherein the header includes a specification of the particular global dictionary.

EC135) The method of EC132, wherein the header and the compressed data are stored in the same corresponding section.

EC136) The method of EC135, wherein a size of the header and the compressed data is less than a data capacity of the same corresponding section.

EC137) The method of EC131, wherein the compressed data is stored in the same corresponding section and one or more contiguous sections.

EC138) The method of EC137, wherein the same corresponding section and the one or more contiguous sections reside in one of a plurality of pages of the less-fine-grained memory.

EC139) The method of EC131, further including compressing the multiple chunks to produce the compressed data.

EC140) The method of EC139, wherein the compressing uses a particular one of one or more global dictionaries.

EC141) The method of EC127, wherein each of the corresponding sections is a page of the less-fine-grained memory.

EC142) The method of EC127,
wherein the less-fine-grained memory includes a plurality of pages, at least some of the pages including a respective plurality of the corresponding sections; and
wherein a first one of the chunks is mapped to a first one of the corresponding sections, a second one of the chunks is mapped to a second one of the corresponding section, the first corresponding section not identical to the second corresponding section, and the first corresponding section and the second corresponding section being ones of the respective corresponding sections of a particular one of the pages.

EC143) The method of EC142, wherein each of the pages is a separately writable portion of the less-fine-grained memory.

EC144) The method of EC143, wherein the corresponding sections are not separately writable.

EC145) The method of EC112, further including if the address is within the region of the address space, determining whether a copy of contents of the less-fine-grained memory associated within the address is resident within a cache.

EC146) The method of EC145, wherein the cache is accessed by addresses within the address space.

EC147) A method including:
providing an address from a processor as part of an access to an external memory system, the address within an address space;
determining whether the address is within a region of the address space corresponding to at least a portion of a less-fine-grained memory;
if the address is within the region, selecting a particular one of a plurality of pages of the less-fine-grained memory;
reading the particular page starting at an offset determined, at least in part, by the address;
returning a first portion of the particular page to the processor independent of reading a remaining portion of the particular page; and
wherein units of the less-fine-grained memory smaller than a page and within the at least a portion of the less-fine-grained memory are not independently writable.

EC148) The method of EC147, wherein the offset is a non-zero offset.

EC149) The method of EC147, wherein the reading reads solely the first portion of the particular page and a corresponding CRC.

EC150) The method of EC147,
wherein the reading reads the first portion of the particular page and a corresponding CRC; and
further including, subsequent to the reading, performing a CRC check on the first portion of the particular page using the corresponding CRC.

EC151) The method of EC150, further including, if the CRC check detects an error, reading the particular page and using an ECC code in the particular page to correct the error.

EC152) The method of EC150, further including, if the CRC check detects an error, reading at least a sub-page of the particular page and using an ECC code associated with the sub-page to correct the error.

EC153) The method of EC147,
wherein the less-fine-grained memory is local to the processor; and
further including if the address is not within the region, sending at least a portion of the address as part of a message via an external communication link to another processor.

EC154) The method of EC153, wherein the at least a portion of the less-fine-grained memory is a portion of storage of a container.

EC155) The method of EC154, wherein a shard of the container includes the at least a portion of the less-fine-grained memory.

EC156) The method of EC155, wherein the selecting is, at least in part, via a local map associated with the shard.

EC157) The method of EC147, wherein the address is a key.

EC158) The method of EC147, wherein the determining is, at least in part, via a routing table.

EC159) The method of EC158, wherein the routing table is a global map.

EC160) The method of EC158, wherein the selecting is, at least in part, via a local map.

EC161) The method of EC147,
wherein each of at least some of the pages is divided into a plurality of respective sub-portions;
wherein the selecting is via a map from sections of the address space to ones of the sub-portions, the map accessed, at least in part, by a portion of the address; and
wherein the particular page and the offset are specified by the map.

EC162) The method of EC161, wherein the first portion is contained within one of the respective sub-portions of the particular page.

EC163) The method of EC161, wherein the first portion is one of the respective sub-portions of the particular page.

EC164) The method of EC161, further including, reading at least some of the remaining portion of the particular page.

EC165) The method of EC164, wherein the reading the at least some of the remaining portion reads at least one of the respective sub-portions of the particular page.

EC166) The method of EC161, wherein the external memory system includes the less-fine-grained memory and the map.

EC167) The method of EC147, wherein the external memory system includes the less-fine-grained memory.

EC168) A method including:
providing an address from a processor as part of an access to an external memory system, the address within an address space;
determining whether the address is within a region of the address space corresponding to at least a portion of a less-fine-grained memory;
if the address is within the region, selecting a particular one of a plurality of pages of the less-fine-grained memory;
reading a first portion of the particular page starting at an offset determined, at least in part, by the address;
determining if the first portion has an error using a respective portion-specific error detecting code stored in the first portion; and
wherein units of the less-fine-grained memory smaller than a page and within the at least a portion of the less-fine-grained memory are not independently writable.

EC169) The method of EC168,
wherein each of at least some of the pages is divided into a plurality of respective sub-portions;
wherein the selecting is via a map from sections of the address space to ones of the sub-portions, the map accessed, at least in part, by a portion of the address;
wherein the first portion is one of the respective sub-portions; and
wherein the particular page and a location of the first portion within the particular page are specified by the map.

EC170) The method of EC169, further including, if the first portion has an error, reading a page information portion of the particular page.

EC171) The method of EC170, wherein the page information portion and the respective sub-portions of the particular page include the particular page.

EC172) The method of EC170, wherein the page information portion is distinct from the respective sub-portions of the particular page.

EC173) The method of EC168, further including, if the first portion has an error, reading a page information portion of the particular page.

EC174) The method of EC173, further including correcting the error using the respective portion-specific error detecting code of the first portion and information in the page information portion.

EC175) The method of EC174, wherein the information in the page information portion includes one or more error detecting codes that are orthogonal in their data coverage to the respective portion-specific error detecting code of the first portion.

EC176) The method of EC175, wherein the correcting includes constructing a first candidate error by burst-trapping using the respective portion-specific error detecting code of the first portion, constructing a second candidate error by burst-trapping using one of the orthogonal error detecting codes, and performing a correction if the first candidate error and the second candidate error identify a same error.

EC177) The method of EC176, further including
reading a remainder of the particular page, the remainder including at least a second portion;
determining if the second portion has an error using a respective portion-specific error detecting code stored in the second portion; and
not correcting the error if the second portion has an error.

EC178) The method of EC168, wherein the external memory system includes the less-fine-grained memory.

EC179) A system including:
a processor coupled to an external memory sub-system;
a memory sub-system controller enabled to manage accesses from the processor, each of the accesses including a respective address within at least a portion of an address space;
wherein the at least a portion of the address space corresponds, at least in part, to at least a portion of a page-based memory;
wherein particular ones of the processor accesses, as determined, at least in part, by the memory sub-system controller, are to the at least a portion of the page-based memory; and
wherein the memory sub-system controller enables at least some of the particular accesses to access less than a page.

EC180) The system of EC179, further including the external memory sub-system.

EC181) The system of EC180, wherein the external memory sub-system includes the memory sub-system controller.

EC182) The system of EC180, wherein the external memory sub-system includes the page-based memory.

EC183) The system of EC179, wherein the address space is a node address space.

EC184) The system of EC179, wherein one or more of the at least some of the particular accesses are write accesses.

EC185) The system of EC179,
wherein the at least a portion of the address space corresponds, at least in part, to at least a portion of a fine-grained memory; and
wherein the fine-grained memory includes a cache, the cache storing at least some of the contents of the at least a portion of the page-based memory.

EC186) The system of EC179,
wherein the at least a portion of the address space corresponds, at least in part, to at least a portion of a fine-grained memory; and
wherein the fine-grained memory includes a map, the map used to map the respective addresses of the particular accesses to physical addresses of physical locations in the at least a portion of the page-based memory.

EC187) The system of EC186,
wherein the at least a portion of the page-based memory includes a plurality of pages, each of the pages includes a plurality of logical partitions, the map mapping the respective addresses of the particular accesses to ones of the logical partitions; and
wherein one or more of the at least some of the particular accesses are accesses to the logical partitions.

EC188) The system of EC186, wherein the map is managed by the memory sub-system controller.

EC189) The system of EC179,
wherein the system further includes a cache, the cache storing at least some of the contents of the at least a portion of the page-based memory; and
wherein the cache is managed by the memory sub-system controller.

EC190) The system as in any one of EC185, EC186, and EC189, wherein the memory sub-system controller is further enabled to manage a write buffer for the al least a portion of the page-based memory.

EC191) A method including:
providing an address from a processor as part of an access to an external memory system, the address within an address space;
determining whether the address is within a region of the address space corresponding to at least a portion of a less-fine-grained memory, the at least a portion of the less-fine-grained memory including a plurality of pages, each of the pages including a respective plurality of sub-portions;
if the address is within the region, selecting a particular one of the sub-portions;
reading data of the particular sub-portion; and
selectively uncompressing, based on information in the data, at least some of the data.

EC192) The method of EC191, wherein the external memory system includes the less-fine-grained memory.

EC193) The method of EC191, further including determining if the particular sub-portion has an error using an error detecting code in the data.

EC194) The method of EC193, further including correcting the error prior to the uncompressing.

EC195) The method of EC193, wherein the information in the data includes one or more of
an indication of a size of a valid portion of the data,
a low-bits field,
a type of compression, and
an indication of a compression dictionary.

EC196) A method including:
providing an address from a processor as part of an access to an external memory system, the address within an address space,
determining whether the address is within a region of the address space mapped to at least a portion of a less-fine-grained memory, the at least a portion of the less-fine-grained memory including a plurality of pages, each of the pages including a plurality of respective sub-portions;
if the address is within the region, mapping the address, using a map in a fine-grained memory, to a physical address in the less-fine-grained memory, the physical address specifying a particular one of the sub-portions;
reading data of the particular sub-portion;
uncompressing the particular sub-portion producing uncompressed data; and
returning a portion less than all of the uncompressed data in response to the access.

EC197) The method of EC196, wherein the mapping maps each of a plurality of chunks of the address space to a corresponding one of the sub-portions.

EC198) The method of EC197,
wherein multiple ones of the chunks are mapped to a same corresponding sub-portion; and
wherein the multiple chunks are stored, at least in part, in the same corresponding sub-portion as compressed data.

EC199) The method of EC198, wherein data stored in the same corresponding sub-portion include a header and at least some of the compressed data.

EC200) The method of EC199, wherein the header and the compressed data are stored in the same corresponding sub-portion.

EC201) The method of EC199,
further including compressing the multiple chunks to produce the compressed data;
wherein the compressing uses a particular one of one or more global dictionaries; and
wherein the header includes a specification of the particular global dictionary.

EC202) The method of EC198, wherein the compressed data is stored in the same corresponding sub-portions and one or more contiguous sub-portions.

EC203) The method of EC202, wherein the same corresponding sub-portion and the one or more contiguous sub-portions are ones of the respective sub-portions of one of the pages.

EC204) The method of EC198 further including compressing the multiple chunks to produce the compressed data.

EC205) The method of EC204, wherein the compressing uses a particular one of one or more global dictionaries.

EC206) A method including:
providing a request to access an external memory system from a processor, the request including a particular command of a plurality of commands and an address within an address space;
determining whether the address is within a region of the address space mapped to at least a portion of a less-fine-grained memory;
if the address is within the region, mapping the address to a physical address within the less-fine-grained memory;
performing the access at the physical address; and
wherein the commands support ACID memory properties.

EC207) The method of EC206,
wherein the less-fine-grained memory is a page-based memory including a plurality of pages, each of the pages in the at least a portion of the less-fine-grained memory includes a plurality of logical partitions; and
wherein the mapping associates addresses within the region with ones of the logical partitions.

EC208) The method of EC206, wherein the external memory sub-system includes the less-fine-grained memory.

EC209) The method of EC206, wherein the commands support transaction coherency.

EC210) The method of EC206, wherein the commands support concurrency control.

EC211) The method of EC206, further including, prior to the providing, acquiring a lock.

EC212) The method of EC211,
wherein the request is a first request; and
wherein the acquiring is a result of a previous request from the processor.

EC213) The method of EC214, wherein one of the commands support the acquiring.

EC214) The method of EC211, further including, subsequent to the performing, releasing the lock.

EC215) The method of EC206, wherein the commands support acquiring a particular one of a plurality of locks.

EC216) The method of EC215, further including, subsequent to the performing, releasing the particular lock.

EC217) The method of EC206, wherein the commands include a transaction start command and a transaction commit command.

EC218) The method of EC217, wherein the commands further include a transaction status command.

EC219) The method of EC217,
wherein the request is a particular one of a plurality of requests; and
further including recording, within a transaction, read ones of the requests and write ones of the requests that are part of the transaction.

EC220) The method of EC219, wherein the transaction includes the particular request.

EC221) The method of EC219, further including detecting conflicts between others of the requests and at least some of the recorded requests of the transaction.

EC222) The method of EC219,
wherein a first one of a plurality of nodes includes the processor, each of the nodes including a respective interconnect switch, the respective interconnect switches coupling the nodes; and
wherein at least some of the others of the requests are from others of the nodes.

EC223) The method of EC206,
wherein the region is a first region; and
further including determining whether the address is within a second region of the address space corresponding to at least a portion of a fine-grained memory.

EC224) The method of EC223, further including if the address is within the second region, performing the access to the fine-grained memory.

EC225) The method of EC223, wherein the mapping is via a mapping table stored in the fine-grained memory.

EC226) A method including:
providing a memory access request including an address from a processor, the address within an address space;
processing the address to determine whether the address is for a local memory or a remote memory;
forwarding the request to a memory controller, the memory controller selected from among a local memory controller and one or more remote memory controllers based, at least in part, on the processing, the local memory controller and each of the one or more remote memory controllers coupled to a respective less-fine-grained memory;
determining, at the memory controller, whether the address is within a region mapped to at least a portion of the respective less-fine-grained memory;
if the address is within the region, mapping the address to a physical address within the respective less-fine-grained memory; and
accessing the respective less-fine-grained memory at the physical address.

EC227) The method of EC226,
wherein the respective less-fine-grained memory is a page-based memory including a plurality of pages, each of the pages in the at least a portion of the respective less-fine-grained memory includes a plurality of logical partitions; and
wherein the mapping associates addresses within the region with ones of the logical partitions.

EC228) The method of EC226, further including returning a result to the processor in response to the memory access request.

EC229) The method of EC228, wherein the memory access request is a read request and the response includes data read from the respective less-fine-grained memory at the physical address.

EC230) The method of EC228, wherein the memory access request is a read request and the response includes data read from a respective cache of the at least a portion of the respective less-fine-grained memory.

EC231) The method of EC230, wherein the respective cache is accessed, at least in part, by the address.

EC232) The method of EC226,
wherein the respective less-fine-grained memory includes a plurality of pages; and wherein the memory controller enables the memory access request to access less than a page.

EC233) The method of EC232, wherein the memory access request is a write request.

EC234) The method of EC232, wherein the memory controller provides concurrency control for the memory access request.

EC235) The method of EC232, wherein the memory controller provides ACID memory properties for the memory access request.

EC236) The method of EC232, wherein the memory controller provides transaction coherency for a transaction including the memory access request.

EC237) The method of EC226, wherein the forwarding includes look-up based routing using, at least in part, the address.

EC238) The method of EC226, wherein the forwarding includes source routing based, at least in part, on the address.

EC239) The method of EC238, wherein the forwarding further includes modifying the request by permuting the address.

EC240) The method of EC239, wherein the permuting is a rotation.

EC241) A system including:
a plurality of nodes, each node including one or more respective processors, a respective interconnect switch, and a respective memory sub-system, the respective memory sub-system including a respective memory sub-system controller and a respective less-fine-grained memory coupled to the respective memory sub-system controller, and the respective interconnect switch coupled to the respective processors and to the respective memory sub-system controller,
wherein the nodes are coupled via the respective interconnect switches; and
wherein the respective processors of a particular one of the nodes are enabled to access at least a portion of the respective less-fine-grained memory of each of the nodes via a respective node address space.

EC242) The system of EC241, wherein at least a portion of the respective node address space contains a plurality of regions, each of the regions associated with a respective one of the nodes.

EC243) The system of EC241, wherein at least a portion of the respective node address space contains a plurality of regions, each of the regions corresponding to at least a portion of the less-fine-grained memory of a respective one of the nodes.

EC244) The system of EC243, wherein the regions are arranged in the respective node address space in an interleaved fashion.

EC245) The system of EC241, wherein each of one or more external accesses of the respective processors of the particular node is enabled to be processed by the respective interconnect switch and is enabled to be selectively forwarded by the respective interconnect switch to the respective memory sub-system controller or to another of the nodes, the selective forwarding based, at least in part, on a respective address of the each external access, the respective address within the respective node address space.

EC246) The system of EC245,
wherein a particular one of the external accesses is forwarded to the respective memory sub-system controller of the particular node; and wherein the respective memory sub-system controller is enabled to determine if the respective address of the particular external access is to a region of the node respective address space that is mapped to the respective less-fine-grained memory of the particular node.

EC247) The system of EC241,
wherein each of one or more external accesses of the respective processors of the particular node is enabled to be processed by the respective interconnect switch of the particular node and, based, at least in part, on a respective address of the each external access, and is enabled to be selectively forwarded by the respective interconnect switch to a particular one of the respective memory sub-system controllers; and
wherein the respective address is within the respective node address space.

EC248) The system of EC247, wherein the forwarding is, at least in part, via the respective interconnect switch of a destination one of the nodes, and the particular memory sub-system controller is the respective memory sub-system controller of the destination node.

EC249) The system of EC248, wherein, for at least some of the external accesses, the destination node is the particular node.

EC250) The system of EC248, wherein, for at least some of the external accesses, the respective memory sub-system controllers are enabled to provide ACID memory properties.

EC251) The system of EC248, wherein, for at least some of the external accesses, the respective memory sub-system controllers are enabled to detect conflicts between the at least some of the external accesses access and at least some others of a plurality of accesses received by the respective memory sub-system controllers.

EC252) The system of EC251, wherein at least some of the plurality of accesses are received from others of the nodes.

EC253) The system of EC247,
wherein a particular one of the respective memory sub-system controllers receiving a particular one of the forwarded external accesses is the respective memory sub-system controller of a destination one of the nodes; and
wherein the particular memory sub-system controller is enabled to determine if the respective address of the particular external access is to a region that is mapped to the respective less-fine-grained memory of the destination node.

EC254) The system of EC253, wherein the region is a region of the respective node address space of the destination node.

EC255) The system of EC256, wherein the forwarding is enabled to map the respective address of the particular external access from the respective node address space of the particular node to the respective node address space of the destination node.

EC256) The system of EC253, wherein the memory sub-system further includes a respective fine-grained memory, the respective fine-grained memory coupled to the respective memory sub-system controller.

EC257) The system of EC256,
wherein the respective address of the particular external access is mapped, via a map stored in the respective fine-grained memory of the destination node, to a physical address of a physical location in the respective less-fine-grained memory of the destination node; and
wherein the particular external access accesses the physical location.

EC258) The system of EC247, wherein at least some of the external accesses are enabled to be performed using ACID memory properties.

EC259) The system of EC258, wherein the ACID memory properties are managed, at least in part, by the respective interconnect switch of the particular node.

EC260) The system of EC258, wherein the ACID memory properties are managed, at least in part, by one or more of the respective memory sub-system controllers.

EC261) A method including:
requesting, from a processor, an access of an external memory system, the access including a particular address in an address space, the external memory system including a less-fine-grained memory, the less-fine-grained memory including a plurality of pages;
determining, by a memory sub-system controller, that the particular address is within a portion of the address space mapped by a map to a mapped portion of the less-fine-grained-memory, the map including a plurality of entries, the map stored in a fine-grained memory;
reading, by the memory sub-system controller, a particular one of the entries;
reading, by the memory sub-system controller, at least a portion of a particular one of the pages at a particular physical address based, at least in part, on the particular entry; and
returning, from the memory sub-system controller, a response to the processor.

EC262) The method of EC261, wherein the reading of the particular entry selects the particular entry based, at least in part, on the particular address.

EC263) The method of EC261, wherein the external memory system further includes the memory sub-system controller.

EC264) The method of EC261, wherein the external memory system further includes the fine-grained memory.

EC265) The method of EC261,
wherein the access is a read access; and
wherein the response includes the at least a portion of the particular page.

EC266) The method of EC261,
further including uncompressing, by the memory sub-system controller, the at least a portion of the particular page producing an uncompressed version of the at least a portion of the particular page;
wherein the access is a read access; and
wherein the response includes at least a portion of the uncompressed version of the at least a portion of the particular page.

EC267) The method of EC261, wherein the less-fine-grained memory is coupled to the memory sub-system controller.

EC268) The method of EC261, wherein one or more memory devices including the less-fine-grained memory are installed on one or more DIMMs.

EC269) The method of EC268, wherein the memory sub-system controller is coupled to the less-fine-grained memory via one or more logic devices.

EC270) The method of EC269, wherein the logic devices are selected from the group consisting of ASICs, FPGAs, CPLDs, and PLDs.

EC271) The method of EC269, wherein each of the DIMMs includes one or more of the logic devices and a plurality of the memory devices.

EC272) The method of EC261, further including processing the particular address to determine whether the access is for a local memory or a remote memory.

EC273) The method of EC261, further including receiving, at the memory sub-system controller, the access.

EC274) The method of EC261, further including reading, by the memory sub-system controller, the particular page.

EC275) The method of EC261, further including storing, by the memory sub-system controller, the at least a portion of the particular page in a cache.

EC276) The method of EC261,
wherein each one of the pages within the mapped portion of the less-fine-grained-memory includes a plurality of respective paragraphs; and
wherein each of the entries of the map associates a respective range of addresses in the address space with one of the paragraphs.

EC277) The method of EC276, wherein a number of the entries is smaller than a number of the paragraphs.

EC278) The method of EC277, wherein the number of the entries is more than half of the number of the paragraphs.

EC279) The method of EC277, wherein a control processor maintains a number of available ones of the paragraphs at more than approximately 10% of the number of the entries.

EC280) The method of EC276,
wherein each of the respective ranges is a respective chunk of the address space; and
wherein each of the respective ranges is of a same size, called a chunk size.

EC281) The method of EC280, wherein a size of each of the paragraphs is at least as large as the chunk size.

EC282) The method of EC280,
wherein the particular address is within a particular one of the chunks,
wherein the particular entry of the map associates the particular chunk with a particular one of the paragraphs; and
wherein the particular paragraph is in the particular page.

EC283) The method of EC282, wherein a second entry of the map associates a second one of the chunks with the particular paragraph.

EC284) The method of EC283, wherein the particular paragraph stores a compressed version of the particular chunk and the second chunk.

EC285) The method of EC276, wherein each of the entries of the map includes a physical address of a respective one of the pages.

EC286) The method of EC285, wherein each of the entries of the map further includes an identifier specifying one of the respective paragraphs of the respective page.

EC287) A method of writing to a less-fine-grained memory, the method including:
storing, at least in part by at least one processor, a plurality of pieces of data into a particular one of a plurality of pages of a write buffer, the write buffer in a fine-grained memory, a size of the pages of the write buffer being a same size as a multiple including one of a user-accessible size of pages of a less-fine-grained memory;
copying, subsequent to the storing, the particular page of the write buffer to a particular one of the pages of the less-fine-grained memory;
maintaining a map including a plurality of entries, wherein each of the pieces of data is associated with a corresponding one of the entries in the map; and
wherein a minimum writable unit of the less-fine-grained memory is one of the pages of the less-fine-grained memory.

EC288) The method of EC287, wherein each of at least some of the pieces of data includes a respective Cyclic Redundancy Check (CRC) to detect errors in the piece of data.

EC289) The method of EC288, further including generating the respective Cyclic Redundancy Checks.

EC290) The method of EC287, further including reading a first portion less than all of a first one of the pages of the less-fine-grained memory and a second portion less than all of a second one of the pages of the less-fine-grained memory, where each of the first portion and the second portion includes a respective data portion and a respective CRC, where a first one of the pieces of data includes the respective data portion of the first portion and a second one of the pieces of data includes the respective data portion of the second portion, and where the first page is different from the second page.

EC291) The method of EC290, wherein the first piece of data further includes a respective CRC.

EC292) The method of EC290, wherein each of the first page and the second page is different from the particular page of the less-fine-grained memory.

EC293) The method of EC290, wherein the reading and the storing are performed, at least in part, by a DMA controller.

EC294) The method of EC290, wherein the reading is according to a coalescing processing thread.

EC295) The method of EC294, further including, executing, by the at least one processor, the coalescing processing thread.

EC296) The method of EC287, wherein a size of the pages of the less-fine-grained memory is larger than the user-accessible size of the pages of the less-fine-grained memory.

EC297) The method of EC296, wherein at least some of the pages of the less-fine-grained memory include an overhead portion and a user-accessible portion, the user-accessible portion configured to hold data written by the at least one processor, the user-accessible portion of the user-accessible size.

EC298) The method of EC297, wherein the overhead portion includes error detection and/or correction information for the user-accessible portion.

EC299) The method of EC296, wherein the user-accessible size of the pages of the less-fine-grained memory is at least 512 bytes.

EC300) The method of EC287, wherein a minimum writable unit of the fine-grained memory is smaller than the user-accessible size of the pages of the less-fine-grained memory.

EC301) The method of EC287, wherein at least some of the pieces of data are objects.

EC302) The method of EC301, wherein the objects are not all of a same size.

EC303) The method of EC287, wherein at least some of the pieces of data are non-contiguous in an address space.

EC304) The method of EC287, wherein at least some of the pieces of data are fixed-sized chunks of data.

EC305) The method of EC287, wherein at least some of the storing is by a plurality of different processes executing on the at least one processor.

EC306) The method of EC287, wherein at least some of the storing is by a plurality of different threads executing on the at least one processor.

EC307) The method of EC287, wherein the at least one processor is two or more processors.

EC308) The method of EC287, wherein the copying is performed, at least in part, via a DMA controller.

EC309) The method of EC287, further including, for a particular one of the pieces of data, determining the particular page of the write buffer.

EC310) The method of EC309, wherein the determining selects the particular page of the write buffer according to remaining space in the particular page of the write buffer.

EC311) The method of EC287, further including determining the particular page of the less-fine-grained memory.

EC312) The method of EC311, wherein the determining selects the particular page of the less-fine-grained memory according to wear-leveling information.

EC313) The method of EC287, further including allocating the particular page of the less-fine-grained memory from a free list.

EC314) The method of EC287,
wherein each of the corresponding entries of the map includes a physical location in the less-fine-grained memory for the piece of data associated with the corresponding entry.

EC315) The method of EC314, wherein the maintaining the map, for a particular one of the pieces of data, includes updating the physical location in the corresponding entry to refer to a respective portion of the particular page of the less-fine-grained memory.

EC316) The method of EC315, wherein the respective portion of the particular page of the less-fine-grained memory is specified, at least in part, as an offset in the particular page of the less-fine-grained memory.

EC317) The method of EC314, wherein each of the corresponding entries of the map further includes a respective identifier of the piece of data associated with the corresponding entry.

EC318) The method of EC317, wherein the respective identifier is a key.

EC319) The method of EC314, wherein each of the corresponding entries of the map is specified by a respective identifier of the piece of data associated with the corresponding entry.

EC320) The method of EC319, wherein the respective identifier is a key.

EC321) The method of EC319, wherein the respective identifier is at least a portion of an address.

EC322) The method of EC321, wherein the address is in a node address space.

EC323) A method of coalescing a less-fine-grained memory, the method including:
merging a first logical partition stored in a first one of a plurality of pages of a less-fine-grained memory and a second logical partition stored in a second one of the pages of the less-fine-grained memory into a particular one of one or more pages of a write buffer in a fine-grained memory, where each of the pages of the less-fine-grained memory is enabled to store a plurality of the logical partitions;
writing, subsequent to the merging, the particular page of the write buffer to a third one of the pages of the less-fine-grained memory;
maintaining a map including a plurality of entries, each of the entries associating a respective identifier of one of a plurality of elements in a node address space with a respective one of the logical partitions of a respective one of the pages of the less-fine-grained memory;
wherein a minimum writable unit of the less-fine-grained memory is one of the pages of the less-fine-grained memory; and
wherein the first page, the second page, and the third page are all different ones of the pages of the less-fine-grained memory.

EC324) The method of EC323,
wherein prior to the writing, a first one of the elements having a respective first identifier is associated via a particular one of the entries of the map with the first logical partition; and
wherein the maintaining includes updating the particular entry to associate the first identifier with a third logical partition stored in the third page.

EC325) The method of EC323, wherein each of the pages of the less-fine-grained memory is at least 256 bytes in size.

EC326) The method of EC323, wherein a minimum writable unit of the write buffer is smaller than a size of one of the pages of the less-fine-grained memory.

EC327) The method of EC323, wherein, prior to the merging the first logical partition, the first page stores at least two of the logical partitions.

EC328) The method of EC323, further including, subsequent to the merging the first logical partition, erasing a block of the less-fine-grained memory containing the first page of the less-fine-grained memory.

EC329) The method of EC328, further including, subsequent to the erasing, adding the block to a free list.

EC330) The method of EC329, further including, determining the third page of the less-fine-grained memory based, at least in part, on the free list.

EC331) A method of writing to a less-fine-grained memory, the method including:
copying a particular one of a plurality of elements into a particular one of a plurality of regions of a write buffer in a fine-grained memory;
allocating from a free list, according to an expected write frequency associated with the particular region of the write buffer, a particular one of a plurality of blocks of a less-fine-grained memory, the free list storing addresses of zero or more of the blocks, each of the blocks including a plurality of respective pages, each of the blocks enabled to contain a plurality of respective logical partitions, and where a particular one of the blocks is enabled to contain more of the respective logical partitions than a number of the plurality of respective pages in the particular block;
updating a map including a plurality of entries, each of the entries associating a respective identifier of one of the elements with a respective one of the logical partitions of a respective one of the blocks of the less-fine-grained memory, where the updating associates the respective identifier of the particular element with the particular block via the map;
writing, subsequent to the copying, the particular region of the write buffer to at least a portion of the particular block; and
wherein a minimum writable unit of the less-fine-grained memory is one of the pages of the less-fine-grained memory.

EC332) The method of EC331, wherein the addresses of the zero or more of the blocks are physical addresses of the zero or more of the blocks.

EC333) The method of EC331, wherein the portion of the particular block is one of the respective pages in the particular block.

EC334) The method of EC331, further including, prior to the copying, selecting the particular region of the write buffer from the plurality of regions of the write buffer.

EC335) The method of EC334, wherein the selecting is based, at least in part, on an expected write frequency of the particular element.

EC336) The method of EC335, wherein the expected write frequency of the particular element is a same expected write frequency as an expected write frequency associated with the particular region of the write buffer.

EC337) The method of EC335, wherein the expected write frequency of the particular element is a coalescing age of the particular element.

EC338) The method of EC337, wherein the coalescing age of the particular element is based, at least in part, on a number of times in a row that the particular element has been reallocated in the less-fine-grained memory due to coalescing.

EC339) The method of EC331, wherein the particular region of the write buffer is a size of a user-accessible portion of one of the pages of the less-fine-grained memory.

EC340) The method of EC331, wherein the particular region of the write buffer is a size of a user-accessible portion of one of the blocks of the less-fine-grained memory.

EC341) The method of EC331, wherein the plurality of blocks of the less-fine-grained memory are ones of blocks of the less-fine-grained memory associated with a particular one of a plurality of shards.

EC342) The method of EC331, wherein the plurality of blocks of the less-fine-grained memory are ones of blocks of the less-fine-grained memory associated with a particular one of a plurality of coalescing regions of the less-fine-grained memory.

EC343) The method of EC331, further including:
erasing one of the plurality of blocks of the less-fine-grained memory; and
adding the erased block to the free list.

EC344) The method of EC343, wherein the erasing is performed by an erasing thread.

EC345) The method of EC343,
wherein each of the plurality of blocks of the less-fine-grained memory is associated with respective wear information; and
wherein the adding is according to the respective wear information of the erased block.

EC346) The method of EC345, wherein the respective wear information of the erased block includes a count of a number of times the erased block has been erased.

EC347) The method of EC345, wherein the free list is organized as a plurality of sub-free lists, each of the sub-free lists associated with a respective range of the wear information.

EC348) The method of EC345, wherein each of the plurality of blocks of the less-fine-grained memory is configured to store the respective wear information.

EC349) The method of EC331, further including, prior to the copying, performing a put operation to store the particular element to the less-fine-grained memory via the write buffer.

EC350) The method of EC331, further including, prior to the copying, reading the particular element from a previous one of the blocks other than the particular block of the less-fine-grained memory.

EC351) The method of EC350, wherein, prior to the updating, the respective identifier of the particular element is associated with the previous block via the map.

EC352) The method of EC331, wherein the elements are elements in a node address space.

EC353) The method of EC331, wherein the copying places the particular element adjacent to a previous one of the elements copied into the particular region of the write buffer.

EC354) The method of EC353,
where the copying includes storing a Cyclic Redundancy Check (CRC) with the particular element; and
wherein the CRC is a function of the particular element.

EC355) The method of EC353, where, subsequent to the copying, a Cyclic Redundancy Check (CRC) is between the previous element and the particular element in the particular region of the write buffer.

EC356) The method of EC355, where the CRC is a CRC of the previous element.

EC357) The method of EC355, where, subsequent to the copying, solely the CRC is between the previous element and the particular element in the particular region of the write buffer.

EC358) A system comprising:
a plurality of nodes, each of the nodes comprising
a respective means for processing,
a respective means for externally communicating,
a respective means for fine-grained storing, and
a respective means for less-fine-grained storing, the respective means for less-fine-grained storing comprising a plurality of independently-writable pages;
means for interconnecting, the means for interconnecting coupling the nodes via the respective means for externally communicating;
wherein the means for less-fine-grained storing as an aggregate are configured to store a plurality of elements, each of the elements having a respective element identifier;
wherein the respective means for fine-grained storing of each of at least a first subset of the nodes is enabled to store a respective global map, the respective global map configured to determine for each of the elements, based at least in part on a portion of the respective element identifier, a respective home one of the nodes of the element;
wherein, at each of the nodes,
the respective means for less-fine-grained storing is enabled to store a respective subset of the elements, and
the respective means for fine-grained storing is enabled to store a respective local map, the respective local map having a plurality of entries, each one of the respective subset of the elements associated with a corresponding and distinct one of the entries, each of the entries comprising fields which when populated store a respective physical location of the element associated with the entry, the respective physical location comprising an address of a respective one of the pages of the respective means for less-fine-grained storing and a respective offset within the respective page;
wherein at a particular one of the first subset of the nodes, the respective means for processing is configured to
determine, via the respective global map, the respective home node of a particular one of the elements, and
forward an access of the particular element to the respective means for processing of the respective home node of the particular element;
wherein, at the respective home node of the particular element, the respective means for processing is configured to
access, via the respective local map, the respective physical location of the particular element in the respective means for less-fine-grained storing, and
return a response to the access of the particular element to the respective means for processing of the particular node; and
wherein the particular element and at least one other of the respective subset of the elements of the respective home node of the particular element are enabled to be stored at a same time in the respective page of the respective physical location of the particular element.

EC359) The system of EC358, wherein the means for processing comprises a processor.

EC360) The system of EC358, wherein the means for less-fine-grained storing comprises a non-volatile, solid-ate memory.

EC361) The system of EC360, wherein the means for less-fine-grained storing comprises flash memory.

EC362) The system of EC358, wherein the means for fine-grained storing comprises Dynamic Random Access Memory (DRAM).

EC363) The system of EC358, wherein the means for externally communicating comprises a Network Interface Controller (NIC).

EC364) The system of EC358, wherein the means for interconnecting comprises a network switch.

EC365) A system comprising:
- a fine-grained memory comprising a plurality of independently-writable words;
- a less-fine-grained memory comprising a plurality of independently-writable pages, at least a portion of the less-fine-grained memory accessible by an application executing on a processor via an address space,
- wherein units of the less-fine-grained memory smaller than one of the pages are not independently writable, and where each of at least some of the pages is enabled to be logically partitioned into a plurality of respective logical partitions;
- wherein each of the words of the fine-grained memory is less than one half a size of one of the pages of the less-fine-grained memory;
- wherein the fine-grained memory comprises a map, the map having a plurality of entries, each entry corresponding to a respective one of a plurality of sections of the address space, each entry enabled to store a respective physical address of one of the logical partitions; and
- wherein at least some accesses by the application via the address space are enabled to be mapped via the map to accesses of the logical partitions.

EC366) The system of EC365, wherein the less-fine-grained memory is a solid-state, non-volatile memory.

EC367) The system of EC365, wherein the respective physical address comprises an identifier of a respective one of the at least some of the pages of the less-fine-grained memory, and a respective offset within the respective page.

EC368) The system of EC367, wherein the respective offset is enabled to specify any one of at least 64 separately addressable locations within the respective page.

EC369) The system of EC367,
- wherein a particular one of the entries of the map is enabled to store a first one of the physical addresses, the particular entry corresponding to a particular one of the sections of the address space;
- wherein a write access by the application to the particular section of the address space is enabled to update the particular entry to store a second one of the physical addresses; and
- wherein the respective page of the first physical address is different from the respective page of the second physical address.

EC370) The system of EC369, wherein the respective offset of the first physical address is different from the respective offset of the second physical address.

EC371) The system of EC367, wherein the sections of the address space are of a same size.

EC372) The system of EC365,
- wherein each of the logical partitions is enabled to store a respective error detecting code, and
- wherein each of the at least some of the pages is enabled to store a respective error correcting code, the respective error correcting code configured to correct an error in the respective logical partitions of the page, and a portion of the page separate from the respective logical partitions of the page is enabled to store at least a portion of the respective error correcting code.

EC373) The system of EC365, wherein the physical addresses are in a PCI address space.

EC374) The system of EC365, wherein the address space is a node address space.

EC375) A system comprising:
- a plurality of nodes, each of the nodes comprising
  - a respective processor,
  - a respective external interface,
  - a respective less-fine-grained memory comprising a plurality of independently-writable pages, where a smallest writable unit of the respective less-fine-grained memory is one of the pages, where each of the pages is greater than 256 bytes in size, and where the respective less-fine-grained memory is a solid-state, non-volatile memory, and
  - a respective fine-grained memory comprising a plurality of independently-writable words, and where each of the words is 144 bytes or less in size;
- an interconnect switch coupling the nodes via the respective external interfaces;
- wherein each of the less-fine-grained memories is configured to store a respective plurality of elements, each of the elements having a respective element identifier;
- wherein, at a particular one of the nodes, the respective processor is configured to access a particular one of the elements via a global map enabled to be stored in the respective fine-grained memory, the global map configured to determine a home one of the nodes of the particular element via the respective element identifier of the particular element;
- wherein, at the home node of the particular element, the respective processor is configured to
  - access a particular one of the pages of the respective less-fine-grained memory that is configured to store the particular element, and
  - return a response to the access of the particular element to the respective processor of the particular node;
- wherein each of the elements smaller in size than one half of a size of one of the pages of the less-fine-grained memory is enabled to be stored in the less-fine-grained memory along with a respective error detecting code; and
- wherein the particular element and at least one other of the elements are enabled to be stored in the particular page at a same time, the respective error detecting code of the particular element separate from the respective error detecting code of the at least one other element.

EC376) The system of EC375, wherein the elements are not all of a same size.

EC377) The system of EC376, wherein the particular element and the at least one other of the elements are different in size.

EC378) The system of EC376, wherein at least some of the elements are enabled to have a size in a range from a minimum size to a maximum size.

EC379) The system of EC375, wherein a type of the respective error detecting code is according to a size of the element.

EC380) The system of EC375, wherein each of the pages of each of the less-fine-grained memories enabled to store more than one of the elements is further enabled to store an error correcting code protecting the more than one of the elements, the error correcting code different from the respective error detecting codes of the more than one of the elements.

EC381) The system of EC380, wherein the error correcting code comprises an independent error correcting code for each of a plurality of sub-pages of the page.

EC382) The system of EC380, wherein the error correcting code comprises the respective error detecting codes of at least one of the more than one of the elements.

EC383) The system of EC375, wherein the particular node is the home node of the particular element.

EC384) The system of EC375, wherein the respective error detecting code is a Cyclic Redundancy Check (CRC).

EC385) The system of EC375, wherein the respective error detecting code is an error correcting code.

EC386) The system of EC375,
  wherein the access is a read access; and
  wherein the respective processor of the home node of the particular element is further configured, as part of the access of the particular element, to read the particular element from the particular page, and not read all of the at least one other of the elements from the particular page.

EC387) The system of EC386, wherein the respective processor of the home node of the particular element is further configured to determine whether there is an error in the particular element via the respective error detecting code of the particular element.

EC388) The system of EC375, wherein the respective element identifier of the particular element comprises an address of the particular element.

EC389) The system of EC388, wherein the address is an address in a node address space.

EC390) The system of EC375, wherein the respective element identifier of the particular element comprises a text string.

EC391) The system of EC390, wherein, for each of at least some of the elements including the particular element, a respective one of the less-fine-grained memories is further configured to store the respective element identifier along with the element.

EC392) The system of EC375, wherein the respective external interface comprises a Network Interface Controller (NIC).

EC393) A system comprising:
  a plurality of nodes, each of the nodes comprising
    a respective processor,
    a respective network interface,
    a respective solid-state, non-volatile memory comprising a plurality of independently-writable pages, where units of the respective memory smaller than one of the pages are not independently writable, where each of the pages is greater than 128 bytes in size, and where the memories as an aggregate are configured to store a plurality of elements, each of the elements having a respective element identifier,
    a respective global map configured to determine, for each of a respective first subset of the elements and via at least a first portion of the respective element identifiers, a respective home one of the nodes of each of the respective first subset of the elements, and
    a respective local map configured to store, for each of a respective second subset of the elements and via at least a second portion of the respective element identifiers, a respective physical location in the respective memory of each of the respective second subset of the elements, the respective physical location comprising an address of a respective one of the pages of the respective memory and a respective offset within the respective page;
  an interconnection network coupling the nodes via the respective network interfaces; and
  wherein, at a particular one of the nodes, the respective processor is configured to access a particular one of the elements via the respective global map of the particular node, and via the respective local map of the respective home node of the particular element.

EC394) The system of EC393, wherein the elements are not all of a same size

EC395) The system of EC394, wherein at least some of the elements are enabled to have any size in a range from a minimum size to a maximum size.

EC396) The system of EC393, wherein the respective processor of the particular node is further configured to access the particular element via a forwarding of the access to the respective home node of the particular element.

EC397) The system of EC396, wherein the forwarding of the access is enabled to use the respective network interface of the particular node, the interconnection network, and the respective network interface of the respective home node of the particular element.

EC398) The system of EC396, wherein the respective processor of the respective home node of the particular element is configured, in response to receiving the forwarding of the access, to determine, via the respective local map of the respective home node of the particular element, the respective physical location in the respective memory of the particular element.

EC399) The system of EC398, wherein the respective processor of the respective home node of the particular element is further configured, in response to receiving the forwarding of the access, to
  access the respective memory of the respective home node of the particular element at the respective physical location of the particular element, and
  return a response to the respective processor of the particular node.

EC400) The system of EC393, wherein the particular node is the respective home node of the particular element.

EC401) The system of EC393, wherein the particular element and at least one other of the elements are enabled to be stored at a same time in a same one of the pages of the respective memory of the respective home node of the particular element.

EC402) The system of EC401, wherein the particular element and the at least one other of the elements are different in size.

EC403) The system of EC401, wherein a replica of the particular element is enabled to be stored in a particular one of the pages of the respective memory of a replica one of the nodes, the replica node different from the respective home node of the particular element.

EC404) The system of EC403, wherein, at the same time as the particular element and the at least one other of the elements are enabled to be stored in the same page of the respective memory of the respective home node of the particular element, the replica of the particular element is enabled to be stored in the particular page, and a replica of the at least one other element is enabled to be stored in an other one of the pages of the respective memory of the replica node, the other page different from the particular page.

EC405) The system of EC393, wherein each of the elements smaller in size than one half of a size of one of the pages of a particular one of the respective memories is enabled to be stored along with a respective error detecting code in the particular memory.

EC406) The system of EC405, wherein the respective error detecting code is a Cyclic Redundancy Check (CRC).

EC407) The system of EC405, wherein the respective error detecting code is an error correcting code.

EC408) The system of EC405, wherein a type of the respective error detecting code is according to a size of the element.

EC409) The system of EC405, wherein each of the pages of the particular memory enabled to store more than one of the elements is further enabled to store an error correcting code protecting the more than one of the elements, the error correcting code different from the respective error detecting codes of the more than one of the elements.

EC410) The system of EC409, wherein the error correcting code comprises an independent error correcting code for each of a plurality of sub-pages of the page.

EC411) The system of EC409, wherein the error correcting code comprises the respective error detecting codes of at least one of the more than one of the elements.

EC412) The system of EC393, wherein the address of the respective one of the pages is an address in a PCI address space.

EC413) The system of EC393,
wherein the respective global map of the particular node is a first global map of a container; and
wherein the respective global map of an other one of the nodes is a second global map of the container.

EC414) The system of EC413, wherein contents of the first global map are same as contents of the second global map.

EC415) The system of EC413, wherein contents of the first global map are transitorily different from contents of the second global map.

EC416) The system of EC393, wherein the respective offset is an index within the respective page of the respective memory, the index having a granularity of no more than 64 bytes.

EC417) A system comprising:
a fine-grained memory comprising a plurality of independently-writable words;
a less-fine-grained memory comprising a plurality of pages, where portions of the pages of the less-fine-grained memory are not independently writable, where each of the pages of the less-fine-grained memory is at least three times a size of one of the words of the fine-grained memory, and where the less-fine-grained memory is non-volatile;
wherein the fine-grained memory comprises a map between respective element identifiers of a plurality of elements and corresponding physical locations of the elements in the less-fine-grained memory, and where each of the elements is associated, via the respective element identifier, with a corresponding and distinct one of a plurality of entries of the map;
wherein the fine-grained memory further comprises a data portion of a write coalescing buffer, the data portion of the write coalescing buffer organized as a plurality of pages, a size of each of the pages of the data portion of the write coalescing buffer being sufficient to contain a respective user-accessible portion of a particular one of the pages of the less-fine-grained memory;
wherein data of a first write of a first one of the elements and data of a second write of a second one of the elements, the first element different from the second element, are enabled to be stored at a same time in a particular one of the pages of the data portion of the write coalescing buffer; and
wherein the particular page of the data portion of the write coalescing buffer is enabled to be written to the particular page of the less-fine-grained memory.

EC418) The system of EC417, wherein the less-fine-grained memory is a solid-state memory.

EC419) The system of EC417, wherein the elements are not all of a same size.

EC420) The system of EC419, wherein the first element and the second element are different in size.

EC421) The system of EC417, wherein a size of each of the pages of the data portion of the write coalescing buffer is smaller than a size of one of the pages of the less-fine-grained memory.

EC422) The system of EC417, further comprising a processor, the processor configured to update the map so that the respective element identifier of the first element is mapped via the map to one of the physical locations that is within the particular page of the less-fine-grained memory.

EC423) The system of EC417, further comprising a Direct Memory Access (DMA) controller, wherein the DMA controller is enabled to transfer the particular page of the data portion of the write coalescing buffer to the particular page of the less-fine-grained memory.

EC424) The system of EC417, wherein storage of the first element in the particular page of the less-fine-grained memory and storage of the second element in the particular page of the less-fine-grained memory are separate.

EC425) The system of EC417, wherein storage of the first element in the particular page of the data portion of the write coalescing buffer comprises an error detecting code covering the first element.

EC426) The system of EC425, wherein the error detecting code docs not cover the second element.

EC427) The system of EC425, wherein the particular page of the less-fine-grained memory is enabled to store an error correcting code protecting contents of the particular page of the less-fine-grained memory including storage of the first element in the particular page of the less-fine-grained memory, the error correcting code different from the error detecting code covering the first element.

EC428) The system of EC417,
further comprising a back-up power source, and
wherein the data portion of the write coalescing buffer is enabled to be powered by the back-up power source.

EC429) The system of EC428, wherein at least a portion of the fine-grained memory is not enabled to be powered by the back-up power source.

EC430) The system of EC429, wherein the at least a portion of the fine-grained memory comprises at least a portion of the map.

EC431) The system of EC417, wherein the data portion of the write coalescing buffer is at least temporarily non-volatile.

EC432) The system of EC417, wherein each of the entries is enabled to store the corresponding physical location in the less-fine-grained memory of the element associated with the entry, the corresponding physical location comprising a respective page of the less-fine-grained memory and a respective offset within the respective page.

EC433) The system of EC417,
further comprising a processor and a Direct Memory Access (DMA) controller, and
wherein the processor is configured to program the DMA controller, and the DMA controller is enabled to perform the first write.

EC434) The system of EC433,
wherein the DMA controller is further enabled to compute an error detecting code according to the data of the first write, and is enabled to store the error detecting code in the particular page of the data portion of the write coalescing buffer; and
wherein the error detecting code is configured to detect subsequent errors to the data of the first write.

EC435) The system of EC434, wherein the DMA controller is further enabled to
compute an error correcting code according to the particular page of the data portion of the write coalescing buffer, and
transfer the particular page of the data portion of the write coalescing buffer along with the error correcting code to the particular page of the less-fine-grained memory.

EC436) The system of EC434, wherein the error detecting code is a Cyclic Redundancy Check (CRC).

EC437) The system of EC417, wherein the particular page of the less-fine-grained memory comprises the respective user-accessible portion and a respective overhead portion.

EC438) The system of EC437, wherein storage of the first element in the particular page of the less-fine-grained memory and storage of the second element in the particular page of the less-fine-grained memory are in the respective user-accessible portion of the particular page of the less-fine-grained memory.

EC439) The system of EC438, wherein the respective overhead portion of the particular page of the less-fine-grained memory is enabled to store an error correcting code protecting the respective user-accessible portion of the particular page of the less-fine-grained memory.

EC440) The system of EC439, wherein storage of the first element in the respective user-accessible portion of the particular page of the less-fine-grained memory comprises an error detecting code covering the first element.

EC441) The system of EC417, wherein the respective element identifier of the first element comprises an address of the first element.

EC442) The system of EC441, wherein the address is an address in a node address space.

EC443) The system of EC417, wherein the respective element identifier of the first element comprises a text string.

EC444) The system of EC443, wherein, for each of at least some of the elements including the first element, the less-fine-grained memory is configured to store the respective element identifier along with the element.

EC445) The system of EC444, wherein the respective element identifiers of the at least some of the elements are not all of a same size.

EC446) A system comprising:
a processor;
a solid-state, non-volatile memory comprising a plurality of independently-writable pages, where units of the memory smaller than one of the pages of the memory are not independently writable, and where each of the pages of the memory comprises a respective user-accessible portion;
a data portion of a write buffer comprising a plurality of pages, a size of each of the pages of the data portion of the write buffer being sufficient to contain the respective user-accessible portion of one of the pages of the memory;
a back-up power source;
a power disruption detection unit enabled to detect an interruption in a primary power source;
a power disruption response unit coupled to the power disruption detection unit;
wherein the data portion of the write buffer is enabled to be powered by the back-up power source; and
wherein the power disruption response unit is configured to save at least an active subset of the pages of the data portion of the write buffer in respective determined ones of the pages of the memory in response to the power disruption detection unit detecting the interruption in the primary power source.

EC447) The system of EC446, further comprising a volatile memory, the volatile memory comprising the data portion of the write buffer.

EC448) The system of EC447, wherein the volatile memory is enabled to be powered by the primary power source.

EC449) The system of EC446,
wherein the processor is configured to store a plurality of pieces of data into respective regions within a particular one of the pages of the data portion of the write buffer; and
further comprising a map, the map comprising a plurality of entries, wherein each of the pieces of data is associated with a corresponding and distinct one of the entries of the map, each of the entries specifics a respective physical location in the memory, and the respective physical location comprises an address of a respective one of the pages of the memory and a respective offset within the respective page.

EC450) The system of EC449, wherein the pieces of data are not all of a same size.

EC451) The system of EC449, wherein the processor is configured to read a particular one of the pieces of data by using the map to determine the respective physical location in the memory specified by the corresponding entry of the particular piece of data.

EC452) The system of EC451, wherein the respective determined page of the memory of the particular page of the data portion of the write buffer is the respective page of the respective physical location of the one of the entries corresponded to by one of the pieces of data.

EC453) The system of EC449, wherein the respective determined page of the memory of the particular page of the data portion of the write buffer is configurable by the processor.

EC454) The system of EC446,
wherein the processor is configured to read the data portion of the write buffer; and
wherein the processor is further configured to use the write buffer as a cache of the memory.

EC455) The system of EC446, wherein each of the pages of the memory further comprises a respective overhead portion.

EC456) The system of EC455, wherein the respective overhead portion of a particular one of the pages is enabled to store an error correcting code protecting the respective user-accessible portion of the particular page.

EC457) The system of EC446, wherein the back-up power source is a battery back-up power source.

EC458) A memory system comprising:
a first, solid-state, non-volatile memory comprising a plurality of independently-writable pages, a minimum writable unit of the first memory being one of the pages of the first memory, each of at least some of the pages of the first memory comprising a respective user-accessible portion;

a second, solid-state, non-volatile memory comprising a plurality of independently-writable words, each of the words of the second memory no more than one third a size of one of the pages of the first memory, the second memory coupled to the first memory; and wherein a write from a source to the first memory, a size of the write less than one half of a size of one of the pages of the first memory, is enabled to be buffered in a page of a write buffer in the second memory, and acknowledged by the memory system to the source as complete to the first memory prior to the page of the write buffer being copied to the respective user-accessible portion of a particular one of the pages of the first memory.

EC459) The system of EC458, further comprising a back-up power source coupled to provide secondary power to the second memory so as to enable the second memory to preserve contents stored therein when primary power is absent.

EC460) The system of EC459, wherein the second memory is temporarily non-volatile.

EC461) The system of EC459, wherein the back-up power source is a battery back-up power source.

EC462) The system of EC458, wherein the first memory comprises a flash memory.

EC463) The system of EC458, wherein the page of the write buffer is one of a plurality of pages of the write buffer.

EC464) The system of EC463, wherein a size of each of the pages of the write buffer is sufficient to contain the respective user-accessible portion of the particular page of the first memory.

EC465) The system of EC464, wherein a size of each of the pages of the first memory is sufficient to contain one of the pages of the write buffer.

EC466) The system of EC458, wherein the write from the source to the first memory is enabled to compute a respective error detecting code according to data of the write, and to store the respective error detecting code in the page of the write buffer in the second memory.

EC467) The system of EC466, wherein the respective error detecting code is enabled to be copied to the respective user-accessible portion of the particular page of the first memory as part of the page of the write buffer.

EC468) The system of EC467,
wherein each of the pages of the first memory is associated with a respective overhead portion, the respective overhead portion distinct from the respective user-accessible portion; and
wherein the respective overhead portion of the particular page of the first memory is enabled to store an error correcting code protecting the respective user-accessible portion of the particular page of the first memory.

EC469) The system of EC468, wherein each of the pages of the first memory further comprises the respective overhead portion.

EC470) The system of EC468,
wherein the first memory comprises a plurality of blocks, each of the blocks comprising a respective one or more of the pages of the first memory; and
wherein one of the blocks of the first memory comprising the particular page of the first memory comprises the respective overhead portion of the particular page of the first memory.

EC471) The system of EC470, wherein the respective user-accessible portion of the particular page of the first memory is all of the particular page of the first memory.

EC472) The system of EC470, wherein a minimum erasable unit of the first memory is one of the blocks of the first memory.

EC473) The system of EC468, wherein a read of the data of the write from the first memory is enabled to
read solely a portion less than all of the respective user-accessible portion of the particular page of the first memory, and
determine if there is an error in the portion less than all of the respective user-accessible portion of the particular page of the first memory using the respective error detecting code as stored in the respective user-accessible portion of the particular page of the first memory.

EC474) The system of EC473, wherein the read of the data of the write from the first memory is further enabled, in response to determining that there is the error in the portion less than all of the respective user-accessible portion of the particular page of the first memory, to
read the error correcting code from the respective overhead portion of the particular page of the first memory, and
use the error correcting code to correct the error.

EC475) The system of EC466, wherein the respective error detecting code is a Cyclic Redundancy Check (CRC).

EC476) The system of EC458, wherein the source is via software executing on a processor.

EC477) The system of EC476, wherein the software is an application.

EC478) The system of EC458, wherein the memory system is configured to determine the particular page of the first memory.

EC479) The system of EC458,
further comprising a map having a plurality of entries;
wherein the write is a first one of a plurality of writes, each of the writes having a respective identifier; and
wherein each of the writes is associated with a corresponding and distinct one of the entries via the respective identifier, and each of the entries comprises a respective physical location in the first memory of the one of the writes corresponding to the entry.

EC480) The system of EC479, wherein the memory system is configured to maintain the map.

EC481) The system of EC479, wherein a second one of the writes is enabled to be
buffered in the page of the write buffer at a same time as the first write is buffered in the page of the write buffer, and
acknowledged by the memory system as complete to the first memory prior to the page of the write buffer being copied to the respective user-accessible portion of the particular page of the first memory.

EC482) The system of EC481, wherein a size of the second write is different from the size of the first write.

EC483) The system of EC481, wherein the size of the first write is less than 128 bytes.

EC484) A method of accessing a non-volatile, less-fine-grained memory using a write coalescing buffer in a fine-grained memory, the write coalescing buffer comprising a plurality of pages, a size of each of the pages of the write coalescing buffer being sufficient to contain a user-accessible portion of one of a plurality of pages of the less-fine-grained memory, a minimum writable unit of the less-fine-grained memory being one of the pages of the less-fine-grained memory, a size of a minimum writable unit of the fine-grained memory being less than one third a size of the minimum writable unit of the less-fine-grained memory, the method comprising:

storing a plurality of pieces of data into respective regions within a particular one of the pages of the write coalescing buffer;

copying, subsequent to the storing, the particular page of the write coalescing buffer to a particular one of the pages of the less-fine-grained memory; and maintaining a map comprising a plurality of entries, where each of the pieces of data is associated with a corresponding and distinct one of the entries of the map, each of the entries specifying a respective physical location in the less-fine-grained memory, where the respective physical location comprises an address of a respective page of the less-fine-grained memory and a respective offset within the respective page of the less-fine-grained memory, and where, for each of the pieces of data, the maintaining comprises updating the corresponding entry of the map so that the address of the respective page of the corresponding entry specifies an address of the particular page of the less-fine-grained memory, and so that the respective offset of the corresponding entry is according to the respective region of the piece of data.

EC485) The method of EC484, wherein the less-fine-grained memory is a solid-state memory.

EC486) The method of EC484, wherein a size of each of the pages of the write coalescing buffer is less than a size of one of the pages of the less-fine-grained memory.

EC487) The method of EC484, wherein the respective offset is an index within the respective page of the less-fine-grained memory, the index having a granularity of no more than 64 bytes.

EC488) The method of EC487, wherein the respective offset is an index within the respective page of the less-fine-grained memory, the index having a granularity of no more than eight bytes.

EC489) The method of EC484, wherein the pieces of data are not all of a same size.

EC490) The method of EC489, wherein at least one of the pieces of data is less than 64 bytes in size.

EC491) The method of EC484, wherein the storing of each of the pieces of data comprises:

computing a respective error detecting code according to the piece of data; and storing the respective error detecting code along with the piece of data in the respective region within the particular page of the write coalescing buffer.

EC492) The method of EC491, wherein the pieces of data are not all of a same size.

EC493) The method of EC491, wherein the copying comprises:

computing an error correcting code according to the particular page of the write coalescing buffer; and storing the error correcting code along with the particular page of the write coalescing buffer in the particular page of the less-fine-grained memory.

EC494) The method of EC493, further comprising reading, subsequent to the copying, a particular one of the pieces of data; and wherein the reading comprises obtaining, via the corresponding entry of the particular piece of data, a particular one of the respective physical locations, the respective page of the particular physical location being the particular page of the less-fine-grained memory, and the respective offset of the particular physical location being an offset of the particular piece of data within the particular page of the less-fine-grained memory, and retrieving a portion less than all of the particular page of the less-fine-grained memory according to the address of the particular page of the less-fine-grained memory and the offset of the particular piece of data, the portion less than all of the particular page of the less-fine-grained memory including the particular piece of data and the respective error detecting code of the particular piece of data and not including the error correcting code.

EC495) The method of EC494, wherein at least one of the pieces of data other than the particular piece of data is stored in a portion of the particular page of the less-fine-grained memory other than the portion less than all of the particular page of the less-fine-grained memory.

EC496) The method of EC494, wherein the reading further comprises determining, via at least a part of the portion less than all of the particular page of the less-fine-grained memory and using the respective error detecting code of the particular piece of data stored in the portion less than all of the particular page of the less-fine-grained memory, if the particular piece of data stored in the portion less than all of the particular page of the less-fine-grained memory has an error.

EC497) The method of EC496, wherein the reading further comprises, if the determining determines that the particular piece of data stored in the portion less than all of the particular page of the less-fine-grained memory has the error, retrieving at least a second portion of the particular page of the less-fine-grained memory, the second portion of the particular page of the less-fine-grained memory including the error correcting code, and correcting, via the error correcting code stored in the second portion of the particular page of the less-fine-grained memory, the error.

EC498) The method of EC484, wherein each of the pieces of data is associated with the corresponding entry via a respective identifier of the piece of data.

EC499) The method of EC498, wherein each of the corresponding entries of the map is enabled to store the respective identifier of the piece of data associated with the corresponding entry.

EC500) The method of EC498, wherein the respective identifier comprises a text siring.

EC501) The method of EC484, wherein each of the corresponding entries of the map is specified by a respective identifier of the piece of data associated with the corresponding entry.

EC502) The method of EC484, wherein the respective offset of the corresponding entry of each of the pieces of data is a respective index according to the respective region within the particular page of the write coalescing buffer.

EC503) The method of EC502, wherein the respective index has a granularity of no more than 16 bytes.

EC504) The method of EC484, wherein the storing is, at least in part, by a processor.

EC505) The method of EC484, wherein each of the entries stores the respective physical location in the less-fine-grained memory.

EC506) A method of writing to a non-volatile memory, the non-volatile memory comprising a plurality of blocks, each of the blocks comprising a respective plurality of pages, each of the blocks enabled to contain a respective plurality of logical partitions, a minimum writable unit of the non-volatile memory being one of the pages of the non-volatile memory, the method comprising:

storing a particular one of a plurality of elements and a respective error detecting code of the particular element into a region of a write buffer in a volatile memory;

allocating from a free list a particular one of the blocks of the non-volatile memory, the free list storing addresses of zero or more of the blocks, where the particular block is enabled to contain more of the logical partitions than a number of the plurality of pages in the particular block;

updating a map comprising a plurality of entries, each of the entries associating a respective one of the elements with a respective one of the logical partitions of a respective one of the blocks of the non-volatile memory, where the updating associates the particular element with one of the logical partitions of the particular block via the map;

computing, according to the region of the write buffer, an error correcting code; and writing, subsequent to the storing, the region of the write buffer and the error correcting code to at least a portion of the particular block.

EC507) The method of EC506, wherein the non-volatile memory is a solid-state memory.

EC508) The method of EC506, wherein the region of the write buffer is one of a plurality of pages of the write buffer, a size of each of the pages of the write buffer sufficient to contain a user-accessible portion of one of the pages of the non-volatile memory.

EC509) The method of EC508, wherein a size of one of the pages of the write buffer is smaller than a size of one of the pages of the non-volatile memory.

EC510) The method of EC506, wherein the region of the write buffer is one of a plurality of blocks of the write buffer, a size of each of the blocks of the write buffer sufficient to contain a user-accessible portion of one of the blocks of the non-volatile memory.

EC511) The method of EC510, wherein a size of one of the blocks of the write buffer is smaller than a size of one of the blocks of the non-volatile memory.

EC512) The method of EC506, wherein the region of the write buffer is a particular one of a plurality of regions of the write buffer.

EC513) The method of EC512, wherein the allocating is according to an expected write frequency associated with the particular region of the write buffer.

EC514) The method of EC512, wherein the free list is one of a plurality of free lists, each of the regions of the write buffer associated with one of the free lists.

EC515) The method of EC512, further comprising, prior to the storing, selecting the particular region of the write buffer from the plurality of regions of the write buffer.

EC516) The method of EC515, wherein the selecting is based, at least in part, on an expected write frequency of the particular element.

EC517) The method of EC516, wherein the expected write frequency of the particular element is a coalescing age of the particular element.

EC518) The method of EC517, wherein the coalescing age of the particular element is based, at least in part, on a number of times in a row that the particular element has been reallocated in the non-volatile memory due to coalescing.

EC519) The method of EC516, wherein the expected write frequency of the particular element is a same expected write frequency as an expected write frequency associated with the particular region of the write buffer.

EC520) The method of EC506, wherein the plurality of blocks of the non-volatile memory are ones of blocks of the non-volatile memory associated with a particular one of a plurality of coalescing regions of the non-volatile memory.

EC521) The method of EC506, further comprising:
erasing one of the blocks; and
adding the erased block to the free list.

EC522) The method of EC521, wherein the erasing is performed by an erasing thread.

EC523) The method of EC521,
wherein each of the blocks is associated with respective wear information; and
wherein the adding is according to the respective wear information of the erased block.

EC524) The method of EC523, wherein the respective wear information of the erased block comprises a count of a number of times the erased block has been erased.

EC525) The method of EC523, further comprising storing the respective wear information of a particular one of the blocks in the particular block.

EC526) The method of EC506, wherein the updating is prior to completion of the writing.

EC527) The method of EC506, further comprising, prior to the storing, performing a put operation to store the particular element to the non-volatile memory via the write buffer.

EC528) The method of EC527, further comprising, in event of a power disruption of a primary power source coupled to the volatile memory, powering the volatile memory with a back-up power source.

EC529) The method of EC528, further comprising acknowledging completion of the put operation to non-volatile storage prior to the writing.

EC530) The method of EC528, further comprising, in the event of the power disruption being subsequent to the storing and prior to the writing, saving the region of the write buffer to a portion of the non-volatile memory.

EC531) The method of EC530, wherein the portion of the non-volatile memory is the at least a portion of the particular block.

EC532) The method of EC506, further comprising, prior to the storing, reading the particular element from a previous one of the blocks, the previous block different from the particular block.

EC533) The method of EC532, wherein, prior to the updating, the particular element is associated with one of the logical partitions of the previous block via the map.

EC534) The method of EC506, wherein the storing comprises computing, according to the particular element, the respective error detecting code of the particular element.

EC535) The method of EC534, further comprising, prior to the writing, storing a second one of the elements into the region of the write buffer, the second element different from the particular element, the second element not overlapping the particular element in the region of the write buffer.

EC536) The method of EC535, wherein a size of the particular element is different from a size of the second element.

EC537) The method of EC535, wherein, subsequent to the writing, the error correcting code protects the particular element and the second element.

EC538) The method of EC537, wherein the respective error detecting code of the particular element solely covers the particular element.

EC539) A method for accessing a distributed, solid-state, non-volatile memory, the distributed solid-state, non-volatile memory comprising a plurality of shards, each of the shards comprising a plurality of pages, each of the shards associated with a respective local map, a minimum writable unit of the distributed, solid-state, non-volatile memory being one of the pages, the method comprising:

global mapping, via a first map, a respective element identifier of a particular one of a plurality of elements stored in the distributed, solid-state, non-volatile memory to determine a home one of the shards of the particular element;

local mapping, via the respective local map of the home shard of the particular element, the respective element identifier of the particular element to a physical location in the home shard of the particular element, the physical location comprising an address of a particular one of the pages of the home shard of the particular element and an offset within the particular page, where the offset is an index within the particular page, the index having a granularity of no more than 64 bytes; and reading a portion of the home shard of the particular element starting at the offset within the particular page, the portion storing the particular element and a respective error detecting code of the particular element.

EC540) The method of EC539, wherein the portion of the home shard of the particular element includes a part of the particular page and at least a part of an other one of the pages of the home shard of the particular element; and wherein at least some of the particular element is stored on the other page.

EC541) The method of EC540, wherein the other page stores an error correcting code separate from the respective error detecting code of the particular element; and further comprising determining, subsequent to the reading, if the particular element has an error using the respective error detecting code of the particular element, and correcting, in response to the determining, the error via the error correcting code.

EC542) The method of EC539, wherein the particular page stores at least a part of the particular element and at least a part of an other one of the elements.

EC543) The method of EC542, wherein a size of the particular element is different from a size of the other element.

EC544) The method of EC542, wherein the at least a part of the other element is not stored in the portion of the home shard of the particular element.

EC545) The method of EC542, wherein the particular page stores all of the particular element.

EC546) The method of EC545, wherein the particular page stores an error correcting code separate from the respective error detecting code of the particular element, and further comprising determining, subsequent to the reading, if the particular element has an error using the respective error detecting code of the particular element, and correcting, in response to the determining, the error via the error correcting code.

EC547) The method of EC546, further comprising reading, in response to the determining, the error correcting code by reading a portion of the particular page separate from the portion of the home shard of the particular element.

EC548) The method of EC539, wherein the local mapping comprises accessing, via the respective element identifier of the particular element, a particular one of a plurality of entries of the respective local map of the home shard of the particular element, the particular entry storing the physical location.

EC549) The method of EC539, wherein the respective error detecting code of the particular element is a Cyclic Redundancy Check (CRC).

EC550) The method of EC539, further comprising determining, subsequent to the reading, if the particular element has an error using the respective error detecting code of the particular element.

EC551) The method of EC550, further comprising using the respective error detecting code of the particular element solely to determine if the particular element has the error.

EC552) The method of EC550, wherein the particular page stores an error correcting code separate from the respective error detecting code of the particular element.

EC553) The method of EC552, wherein the portion of the home shard of the particular element does not include the error correcting code.

EC554) The method of EC552, further comprising correcting, in response to the determining, the error via the error correcting code.

EC555) A computer-readable medium having a set of instructions stored therein which when executed by a computer causes the computer to perform procedures including the elements of any one of the methods of EC112 through EC178, or EC191 through EC240, or EC261 through EC357, or EC484 through EC554.

EC556) A system comprising a plurality of means, interconnected with one another, for performing, in combination with one another, respective ones of all steps recited in any one of the methods of EC112 through EC178, or EC191 through EC240, or EC261 through EC357, or EC484 through EC554.

System

In some embodiments, a data processing system includes a single node (such as node 100 in FIG. 1A or node 180 in FIG. 1D); in other embodiments, a data processing system includes a plurality of nodes. In various embodiments where the data processing system includes a plurality of nodes, the nodes perform tasks in a distributed fashion.

In some embodiments and/or usage scenarios, a system includes a plurality of nodes (such as system 190 in FIG. 1C or system 191 in FIG. 1E), each node includes a respective fine-grained memory, a respective less-fine-grained memory, and a respective interconnect switch for coupling among the nodes, and the system is enabled to perform memory-intensive tasks by advantageously using the less-fine-grained memories to store quantities of data. In various embodiments, at least a portion of the respective less-fine-grained memory of each of the nodes is accessible by all of nodes via one or more node address spaces, enabling the at least a portion of the respective less-fine-grained memories to form a global, shared memory. In further embodiments, the less-fine-grained nature of the global, shared memory is advantageously hidden from respective processors of the nodes by respective memory sub-system controllers of the nodes. The respective memory sub-system controller of a particular one of the nodes is enabled to accept requests from any of the respective processors, the requests having a finer granularity of access than that supported by the respective less-fine-grained memory of the particular node, and to manage the respective less-fine-grained memory to support the finer granularity of access. According to various embodiments, the fine-grained memory has a granularity of access for write that is one or more of: at least as small as eight bytes; at least as small as sixteen bytes; and at least as small as a size of a cache line of the respective processors. According to various embodiments, the less-fine-grained memory has a granularity of access for write that is one or more of: at least as large as 256 bytes; at least as large as 1K bytes; at least as large as 2K bytes; at least as large as 4K bytes; and at least larger than the size of a cache line.

In some usage scenarios, data stored in the respective less-fine-grained memories is allocated such that processing of the data is substantially local to each of the nodes. In other usage scenarios, each of the nodes accesses data stored in the respective less-fine-grained memories via the node address space(s), substantially irrespective of whether the data is local to the accessing one of the nodes.

In some embodiments, a plurality of tasks are performed on the nodes. In various embodiments, each node performs one or more of the tasks. In further embodiments, at least some of the tasks include a front-end portion and a back-end portion. In some embodiments, each task is broken into a front-end portion and a back-end portion, and a first one or more of the nodes is associated with the front-end portion, and a second one or more of the nodes is associated with the back-end portion. According to various embodiments, the front-end portion includes one or more of: user interface; query parsing; sub-task creation; sub-task control; management of the back-end portion; results aggregation; and other sub-tasks not directly operating on raw data processed by the task. According to various embodiments, the back-end portion includes one or more of: receiving one or more sub-tasks from the front-end portion; any of various operations on the raw data, including reading, writing, searching, filtering, and aggregating; and other sub-tasks not performed by the front-end portion.

In some embodiments, at least a portion of a task, such as a back-end portion, is partitioned into a plurality of sub-tasks, and each of a plurality of nodes performs one of the sub-tasks. For example, a query task is broken into a front-end portion and a back-end portion, and the back-end portion is partitioned into a plurality of sub-tasks, each of at least some of the sub-tasks performed on a respective one of a plurality of nodes. In various embodiments, a database is partitioned so that each of the nodes includes a respective portion of the database, and the partitioning of the back-end portion assigns a sub-task to each of the nodes including a relevant one of the respective portions of the database. In some embodiments, the respective portion of the database of a particular one of the nodes resides, at least in part, in a respective less-fine-grained memory of the particular node.

Node

FIGS. 1A, 1B, and 1D illustrate embodiments of a portion of a system including a node having a fine-grained memory and a less-fine-grained memory. According to various embodiments, a node (such as node 100 in FIG. 1A, or node 150 in FIG. 1B, or node 180 in FIG. 1D) includes one or more of: one or more respective processors (CPUs 110.0 and 110.1 in FIG. 1A, CPU(s) 110 in FIGS. 1B and 1D); a respective memory sub-system (108); a respective Southbridge chip (SB 118 in FIGS. 1A and 1B) or other respective interconnection bridging (bridging 117 in FIG. 1D) enabling interconnections to I/O busses and/or to peripheral devices; and a respective interconnect switch (switch 116) enabling connectivity to other nodes. The respective memory sub-system includes a memory sub-system controller (112), a fine-grained memory (124), and a less-fine-grained memory (128). In some embodiments (as illustrated in FIG. 1A), the fine-grained memory is coupled to a battery back-up system (125). In further embodiments (as illustrated in FIG. 1D), the respective memory sub-system is coupled to a battery back-up system (125).

According to various embodiments, the respective processors are one or more of: a general purpose processor; an embedded processor; a network processor; an x86-compatible processor; an AMD Opteron™-family processor, an Intel x86-compatible processor; a 32-bit processor; a 64-bit processor; a multi-core processor; and any other processor capable of performing at least a portion of workload of a node. In some embodiments, all of the respective processors of a particular one of the nodes are of a same type, in other embodiments, some of the respective processors of a particular one of the nodes are not of a same type. In some embodiments, one of the respective processors of a first node is of a first type, and one of the respective processors of a second node is of a second type, the second type different from the first type.

In some embodiments, each of the respective processors has one or more directly connected memories, such as an external cache or a directly connected DRAM memory. As illustrated in FIGS. 1A, 1B and 1D, CPU 110.0 is optionally coupled to directly connected memory 134.0 via coupling 132.0, CPU 110.1 is optionally coupled to directly connected memory 134.1 via coupling 132.1, and CPU(s) 110 are optionally coupled to directly connected memory 134 via coupling 132.

In various embodiments, such as illustrated in FIG. 1D, CPU complex 109 includes the respective processors (CPU(s) 110), the directly connected memory (directly connected memory 134), and connectivity to other components (bridging 117). CPU complex 109 is enabled to execute operating system software (such as Linux) including drivers and interrupt routines, to execute applications programs (such as a database program), and to execute control and management software to control and manage node 180. According to the type of CPU(s) 110 (such as whether CPU(s) 110 are Intel or AMD processors), there are various components of CPU complex 109, and there are various ways in which the components are organized. In a first example, bridging 117 includes a Northbridge chip coupled to CPU(s) 110 and to directly connected memory 134, and a Southbridge chip coupled to the Northbridge chip. In the first example, CPU(s) 110 are coupled to each other via the Northbridge chip. In a second example, each of CPU(s) 110 is optionally coupled to a portion of directly connected memory 134, and at least one of CPU(s) 110 is coupled to bridging 117. In the second example, each one of CPU(s) 110 is coupled to at least one other of CPU(s) 110.

In some embodiments, each of the respective processors of a particular one of the nodes is enabled to communicate via one or more processor communications links, such as link(s) 136 (as illustrated in FIGS. 1A and 1B) coupling the CPUs to switch 116, link(s) 131 (as illustrated in FIG. 1B) coupling the CPUs to the memory sub-system controller, and link(s) 137 (as illustrated in FIG. 1D) coupling the CPUs to bridging 117. In some embodiments, the respective processors are coupled to each other via processor communications links, such as link(s) 114 (as illustrated in FIG. 1A) coupling CPU 110.0 and CPU 110.1. According to various embodiments, the processor communications links are compatible with one or more of: PCI Express; HyperTransport™; InfiniBand®, and any other high-speed communications link and/or protocol. In various embodiments, at least some of the processor communications links are compatible with a high-speed, point-to-point, inter-processor, interconnect protocol. In some embodiments, the respective interconnect switch is coupled to at least one of the respective processors by one or more of the processor communications links. (Herein, a communications link is generally, but not always, referred to as optionally including a plurality of links, hence communications link 136, for example, is referred to as link(s) 136. For example, some communications links, such as a communications link compatible with PCI Express, use a plurality of lanes to implement the communications link.)

In some embodiments, one or more of the respective processors have additional couplings, such as a coupling (138) to SB 118 (as illustrated in FIGS. 1A and 1B), or a coupling 137 to bridging 117 (as illustrated in FIG. 1D), or the optional couplings to the directly connected memories. According to various embodiments, each of the additional couplings independently uses various technologies and protocols, including using a same technology and protocol as the processor communications links.

In various embodiments, such as illustrated in FIG. 1D, the respective processors are part of a CPU complex (CPU complex 109), and the CPU complex is coupled to other components of node 180, such as to memory sub-system 108 via link(s) 133, and to switch 116 via link(s) 135. According to various embodiments, the links from CPU complex 109 are compatible with one or more of: PCI Express; HyperTransport™; InfiniBand®; and any other high-speed communications link and/or protocol. According to various embodiments, the links from CPU complex 109 are provided by one or more of: bridging 117, such as via one or more PCI Express links; and the respective processors, such as via one or more HyperTransport™ links.

In some embodiments, switch 116 is coupled via external link(s) 146 to one or more other nodes (148). While switch 116 has a limited number of external links, in various embodiments, a larger number (than the number of external links) of the nodes are interconnected via the respective interconnect switches of intermediate ones of the nodes, or via an external switch (such as switch 116' as illustrated in FIG. 1E). In some embodiments, the interconnections provided by the respective interconnect switches enable the respective processors of each of the nodes to access at least a portion of the respective memory sub-system, such as a portion of the less-fine-grained memory, of all of the nodes. In some embodiments, such as illustrated in FIG. 1D, switch 116 includes one or more Network Interface Controllers (NIC(s) 119). In further embodiments, NIC(s) 119 are coupled to CPU complex 109 via one or more PCI Express link(s) (such as link(s) 135).

In some embodiments, switch 116 is combined with memory sub-system controller 112 in a single device, such as ASIC 105 (as illustrated in FIG. 1A). According to various embodiments, ASIC 105 is one or more of: an FPGA; a gate-array; a full-custom integrated circuit; and any other type of integrated circuit device. If combined into one device, coupling 130 between switch 116 and memory sub-system controller 112 is an internal connection. In other embodiments, switch 116 and memory sub-system controller 112 are in different devices on different boards and/or in different enclosures, and coupling 130 is, or is similar to, one of the external links of switch 116. In further embodiments, memory sub-system controller 112 incorporates interconnect switch functionality similar to that of switch 116, and supports one or more external links, one of which is coupling 130.

In some embodiments, switch 116 is combined, in whole or in part, with one or more of the CPUs. In a first example, switch 116 is combined with CPU(s) 110 in a single device, such as ASIC 106 (as illustrated in FIG. 1B). According to various embodiments, ASIC 106 is one or more of: an FPGA; a gate-array; a full-custom integrated circuit; and any other type of integrated circuit device. In a second example, the CPUs include a portion of the functionality of switch 116, as illustrated by the processor communications links (and other couplings) of CPU(s) 110. In a third example, bridging 117 (in FIG. 1D) includes some or all of the functionality of NIC(s) 119. In further embodiments, switch 116, memory sub-system controller 112, and one or more of the CPUs are combined in a single device. As in this and previous examples, and as illustrated in FIGS. 1A, 1B, and 1D, various interconnections and physical arrangements of components of a node are within a scope of techniques described herein.

According to various embodiments, the respective Southbridge chip (SB 118 in FIGS. 1A and 1B) or the respective interconnection bridging (bridging 117 in FIG. 1D) supports a number of connections to devices, such as peripherals 142. In some embodiments and/or usage scenarios, at least some of the peripherals are components of a node, such as a local disk drive or a PCMCIA card slot. In some embodiments and/or usage scenarios, at least some of the peripherals are external to the node, such as plug-in peripherals. In various embodiments, external devices (145) are optionally coupled via the respective Southbridge chip. In a first example, the respective Southbridge chip provides connectivity to an Ethernet connection, and communication via the Ethernet connection uses, at least in part, an iSCSI protocol to communicate to external storage devices. In a second example, the respective Southbridge chip supports a Universal Serial Bus (USB) connection, enabling connection of external devices such as a DVD drive. According to various embodiments, booting of the respective processors is, at least in part, via one or more of: a peripheral coupled via the respective Southbridge chip; an external device coupled via the respective Southbridge chip; an Ethernet or other network connection connected via the respective Southbridge chip; another one of the nodes via the respective interconnect switch; a boot image in the less-fine-grained memory via the memory sub-system controller of the respective memory sub-system; a local boot memory; a peripheral card slot, such as a PCMCIA card slot; a control and/or management processor; and other similar techniques.

According to various embodiments, at least some of the nodes further include one or more of: a boot memory, such as a ROM, PROM, or EEPROM; a PCMCIA card slot capable of connecting to a boot memory and/or device; a respective management processor; and one or more respective management and/or diagnostic connections, such as a management Ethernet connection and/or a serial management bus. In various embodiments, the management and/or diagnostic connections are coupled via the respective Southbridge chip.

In some embodiments, at least some of the nodes further include I/O connections to storage devices, such as an Ethernet connection using, at least in part, an iSCSI protocol, or a Fibre Channel connection. In various embodiments, the I/O connections to storage devices are coupled via the respective Southbridge chip. In some usage scenarios, the I/O connections are used, at least in part, to load and/or to back up contents of the less-fine-grained memory. In some embodiments, booting of the respective processors is via the I/O connections.

In some embodiments, the one or more respective processors of each of the nodes enable the node to operate as a symmetric multi-processor. In some embodiments, at least one of the respective processors is a multi-core processor. In further embodiments, the one or more respective processors include at least two AMD Opteron™ processors, each of the AMD Opteron™ processors having at least two processing cores.

In some embodiments, the one or more respective processors of each of the nodes operate, at least in part, in a cache coherent fashion. In further embodiments, communication and/or information exchange among the nodes is not cache coherent. According to various embodiments, communication among the nodes uses one or more of: a message-based protocol (message passing); a cell-based protocol; a frame-based protocol; and a packet-based protocol. In some embodiments, communication among the nodes uses, at least in part. ACID memory properties and provides a memory consistency model. In various embodiments, the communication among the nodes provides atomic transactions. In some embodiments, the ACID memory properties are supported, at least in part, via message-based communication among the nodes.

According to various embodiments, various portions of memory addressable by the respective processors are managed using one or more of cache coherency, and ACID memory properties. In some embodiments, at least a portion of the less-fine-grained memory is managed using ACID memory properties. In further embodiments, at least a portion of the less-fine-grained memory of each of the nodes is accessible by all of the nodes in one or more node address spaces, and the at least a portion of the less-fine-grained memory of each of the nodes is managed using ACID memory properties. In some embodiments, using ACID memory properties includes exchanging information among the nodes using a message-based protocol.

In some embodiments, at least some of the nodes are "memory-only" and do not include the respective processors. As illustrated in FIG. 1, memory-only node 101 includes the respective interconnect switch and the respective memory sub-system. In various embodiments, at least some of the memory-only nodes optionally include the respective Southbridge chip. In some embodiments and/or usage scenarios, memory-only nodes enable scaling of an amount of accessible memory in one or more node address spaces independent of scaling processing power. In various embodiments, a memory-only node includes one or more control processors, such as control processor 359 (illustrated in FIG. 3B).

In some embodiments, at least some of the nodes are "processor-only" and do not include the respective memory sub-system. In some embodiments and/or usage scenarios, a processor-only one of the nodes and a memory-only one of the nodes are coupled via the respective interconnect switches to form a unit similar, except for physical configuration and the presence of an additional copy of switch 116, to one or more of node 100 (as illustrated in FIG. 1A), node 150 (as illustrated in FIG. 1B), and node 180 (as illustrated in FIG. 1D).

In some embodiments, as illustrated in FIG. 1D, there is a plurality of respective memory sub-systems (memory sub-systems 108 and 108'). According to various embodiments, the respective memory sub-systems are one or more of: each coupled independently to CPU complex 109 (such as via multiple copies of link(s) 133); and coupled to each other, such as in a daisy-chain (for example, as illustrated in FIG. 3C).

Interconnect Switch

FIG. 1C illustrates an embodiment of a portion of a system including a plurality of nodes, the nodes interconnected by respective interconnect switches. FIG. 1E illustrates an embodiment of a portion of a system including a plurality of nodes interconnected by a switch. In some embodiments, the respective interconnect switch of a particular one of the nodes includes a plurality of ports, each port providing a respective switch communications link. The switch communications links are used, at least in part, to provide node-to-node connectivity. At least one of the ports couples the respective interconnect switch to at least one of the respective processors of the particular node (as illustrated by link(s) 136 in FIG. 1A, and by link(s) 135 in FIG. 1D). In some embodiments, all of the switch communications links are of a same type as the processor communications links. In other embodiments, at least some of the switch communications links are of a different type than the processor communications links In some embodiments, a first node uses a first type of processor communications links, and a second node uses a second type of processor communications links, the second type different from the first type.

In a first example illustrated in FIG. 1C, in some embodiments the respective interconnect switches are seven-port switches. At each of at least some of the nodes, such as node 100, one of the ports couples the respective interconnect switch to the respective processors (as illustrated by link(s) 136 in FIG. 1A, not illustrated in FIG. 1C), and others of the ports (as illustrated by external link(s) 146 in FIG. 1A, and by external links 146.0-146.5 in FIG. 1C) couple to others of the plurality of the nodes (148.0-148.5, optionally other nodes 158.2 and additional nodes not illustrated) as a portion of a multi-dimensional interconnect. FIG. 1C also illustrates further portions of the multi-dimensional interconnect, such as link 156.1 (coupling node 148.0 to node 148.1), and link 156.2 (coupling node 148.2 to other nodes 158.2). In some embodiments, the multi-dimensional interconnect is a hypercube. In various embodiments, node 100 has additional external connections, such as coupling 144 to external devices 145 (such as illustrated in FIG. 1A). In further embodiments, others of the nodes are coupled to a same one of external devices 145 and/or to different ones of external devices 145.

In a second example, in some embodiments the respective interconnect switches are four-port switches. At each of at least some of the nodes, two of the ports couple the respective interconnect switch to at least two of the respective processors of the node, and the other two ports redundantly couple the node to respective ports of two external switches of a switch complex. Couplings from the at least some of the nodes to the switch complex enable inter-communication among the nodes.

In a third example illustrated in FIG. 1E, in some embodiments the nodes (such as node 180 as illustrated in FIG. 1D) are coupled via the respective interconnect switches of the nodes through external switch 116'. As illustrated in FIG. 1E, nodes 180, 149.1, 149.2, ..., 149.N are coupled through external switch 116' via external links 146, 146.1, 146.2, ..., 146.N. According to various embodiments, external switch 116' is one or more of: similar or substantially similar to switch 116 (as illustrated in FIG. 1A); a multi-port switch; a single-tier switch; a multi-tier switch, a switching network; representative of a LAN, a WAN, or the Internet; and any other network suitable for interconnecting nodes.

Figure 2B:
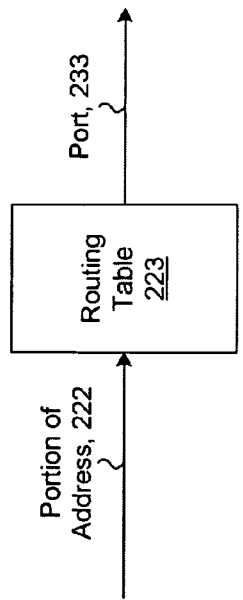
FIG. 2B illustrates an embodiment of a routing table.
Figure 2C:
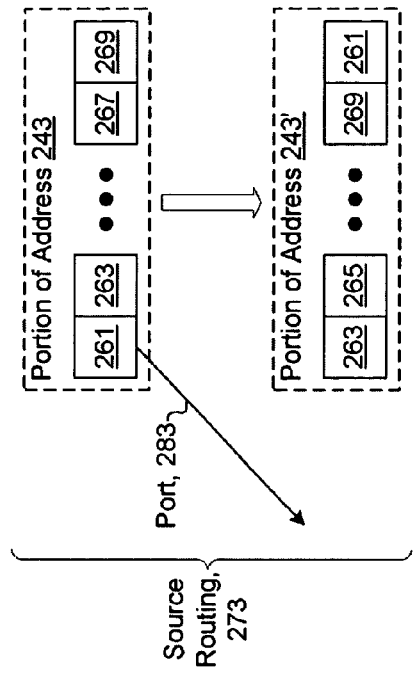
FIG. 2C illustrates an example of source routing.
Figure 2A:
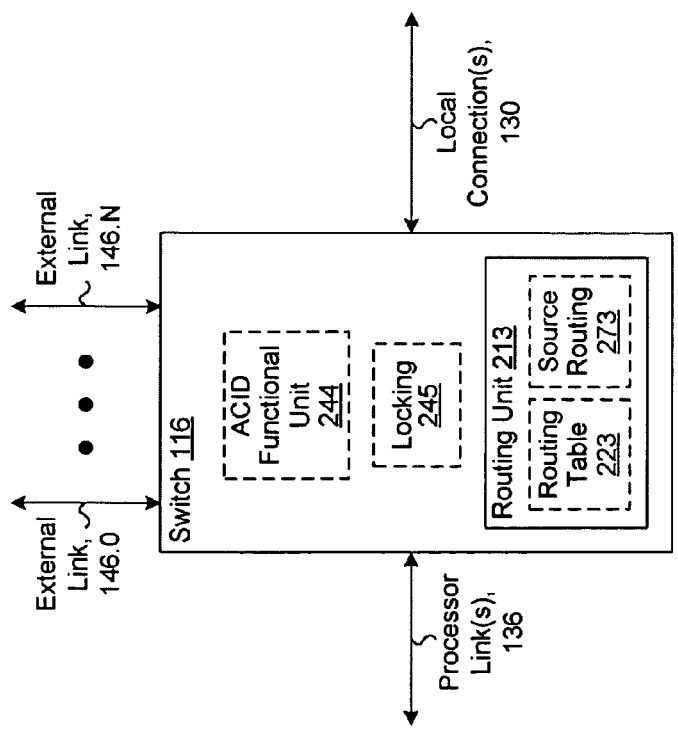
FIG. 2A illustrates an embodiment of an interconnect switch.

FIG. 2A illustrates an embodiment of an interconnect switch. In some embodiments, switch 116 (such as illustrated in FIG. 1A) includes a plurality of ports, the ports providing links/connections such as processor communications link(s) 136, external links 146.0-146.N and local connection(s) 130. According to various embodiments, communications received and/or transmitted via switch 116 include one or more of packets, frames, cells, and messages. In some embodiments, at least some of the communications include a respective address (or a respective key of a respective object), and switch 116 uses the respective addresses (or the respective key) to route the communications from a respective input (receiving) port to a respective output (transmitting) port, and towards a respective destination. In some embodiments, the respective addresses are addresses in one or more node address spaces (or the respective objects are in one or more node address spaces).

In some embodiments, switch 116 modifies a particular one of the communications after the particular communication is received by switch 116. According to various embodiments, the modifications done to the particular communication include one or more of: modifying the respective address (such as by modifying the respective address to a destination and/or next-hop address); modifying a header of the particular communication; appending a header to the particular communication; removing a header of the particular communication; and reformatting the particular communication (such as when the respective transmitting port uses a different format and/or protocol than the respective receiving port). The at least some of the communications received by switch 116 are switched and/or routed from a receiving port to a transmitting port by a routing unit (213). According to various embodiments, routing unit 213 uses one or more of: a routing table, such as routing table 223; source routing, such as illustrated by source routing 273; and any other techniques for address-based or key-based routing. According to various embodiments, the routing is based, at least in part, on one or more of: a portion of the respective address; the respective key; and the respective receiving port. In a first example, in some embodiments, there are multiple copies of routing table 223, one for each receiving port. In a second example, in some embodiments, some of the ports use a different address modification procedure, as part of source routing, than others of the ports. In a third example, there are multiple copies of routing table 223, one for each of one or more software entities, such as containers. In some embodiments, the routing is updated dynamically, such as in response to the failure of a node.

In some embodiments, each of the respective interconnect switches includes respective ACID functional unit and/or locking logic. As illustrated in FIG. 2A, switch 116 optionally includes ACID functional unit 244 and/or locking logic 245. In various embodiments, ACID functional unit 244 includes locking logic 245. The locking logic provides a hardware-supported locking mechanism, enabling the respective processors of the particular one of the nodes including switch 116, and in some embodiments any of the respective processors among others of the nodes, to use one or more hardware-supported locks, such as semaphores, counting semaphores, or any of other similar mechanisms. In some embodiments, locking logic 245 enables software to access one or more hardware supported locks from any of the nodes, and in a manner that is transparent to a location (on one or more of the nodes) where the locks reside.

In some embodiments, locking logic 245 uses a CAM or another type of associative structure to implement a number of locks, up to a maximum supported in the CAM. Each interconnect switch implements some number of locks, and a total number of locks in the system increases with a number of nodes. In some embodiments, each one of the locks is associated with a respective queue of processors waiting for the lock, and when the lock is released by a first processor, a next processor in the queue is granted the lock.

In some embodiments, locking logic 245 uses atomic operations to memory, such as via the memory sub-system controller of the particular node, to implement a number of locks stored in memory, such as in the fine-grained memory of the particular node. In some usage scenarios, storing locks in memory enables placing the locks with and/or within associated data structures. In various embodiments, the memory sub-system controller provides one or more types of atomic operations on at least a portion of memory, and locking logic 245 uses the atomic operations via the memory sub-system controller to manage the locks.

In some embodiments, switch 116 provides a queuing mechanism enabling a number of the respective processors of the nodes to request a particular one of the locks, and to be granted the particular lock in a serial order, each succeeding one of the respective processors in the queue receiving a grant of the lock after a preceding one of the respective processors in the queue has freed (released) the lock. In further embodiments, the queuing enables individual threads running on the respective processors to be enqueued awaiting a lock, and the individual threads to be notified of granting of the lock.

According to various embodiments, ACID functional unit 244 provides and/or manages, for data mapped in the node address space, one or more of: versioning; conflict detection; logging; replication; and ACID memory properties. In some embodiments, the ACID functional unit provides ACID memory properties to concurrent transactions executing on the nodes. According to various embodiments, ACID functional unit 244 uses one or more of: concurrency control; locking; transaction logging; and other memory consistency techniques. In some embodiments, locking is used as part of and/or in conjunction with transaction logging to provide ACID memory properties and/or atomic transactions.

In some embodiments, ACID functional unit 244 uses a locking mechanism to provide ACID memory properties. In various embodiments, a lock is acquired for a transaction, either implicitly as part of starting a transaction or as an explicit command, and at least some of the operations (such as accesses) of the transaction are kept isolated from other operations. In some embodiments, one or more locks are provided by ACID functional unit 244. In further embodiments, a plurality of locks is provided by the ACID functional units of the respective interconnect switches of the nodes. In some embodiments, the locks are in a global space enabling access to any of the locks from any of the nodes.

In a first example of lock usage, a read of a particular address as part of a transaction and performed under a lock prevents a subsequent write of the particular address from proceeding until the lock is released, such as when the transaction completes (or is aborted). In a second example of lock usage, a write of a particular address as part of a transaction and performed under a lock prevents a subsequent read and/or write from proceeding until the lock is released. In various embodiments, there are multiple types of read and/or write accesses with different behaviors with respect to other accesses, such as a read that blocks writes, and a read that blocks both reads and writes. In some embodiments, when a subsequent access is blocked by a lock, the access is queued until the access is enabled to be completed. In other embodiments, when a subsequent access is blocked by a lock, a status code indicating the lock is returned for the access, enabling software to retry and/or use other strategies. In some embodiments, access to an object via a respective key is treated similarly to access to an addressable region by a respective address. In further embodiments, locking and/or ACID memory properties of the object are controllable using the respective key similar to how the locking and/or ACID memory properties of the addressable region are controllable using the respective address.

Switch 116 (as illustrated in FIG. 2A) receives a plurality of communications from link(s) 136 and/or from external links 146.0-146.N. In some embodiments, the ACID functional unit is enabled to track one or more series of respective ones of the communications. In some embodiments, solely local ones of the series (series sent from the respective processors of the particular one of the nodes including switch 116 and/or received from link(s) 136) are tracked by ACID functional unit 244. In various embodiments, ACID functional unit 244 is enabled to operate with the respective ACID functional unit of the respective interconnect switches of others of the nodes to enable tracking portions of the local series that access the respective memory sub-systems of the other nodes, and/or to enable tracking other series of communications from the respective processors of the other nodes. In some embodiments, ACID functional unit 244 communicates with the respective ACID functional unit of the other nodes via external links 146.0-146.N. In some embodiments, the ACID functional units of the nodes communicate using a message-based protocol.

In some embodiments, the respective communications of a particular one of the series are identified by a tag and/or an identifier of each of the respective communications. For example, a portion of a header of each of the respective communications includes a tag identifying the particular series. In some embodiments, the tag is a portion of an address. In some embodiments, each of the respective communications of the series includes a respective command and/or a respective type specifying a ACID memory properties operation and/or function. In some embodiments, each of the series includes a starting one of the respective communications, and a committing and/or an aborting one of the respective communications. Respective communications of each of the series are compared with at least some of the communications received by switch 116, and conflicts among the communications are detected. In some embodiments, particular ones of the communications, such as communications of the series, are examined to determine conflicts with the respective communications of the series. In some embodiments, particular ones of the communications, such as communications marked (for example, in a command) as not having ACID memory properties, are not examined to determine conflicts. For example, in various embodiments, there are multiple types of a read commands, such as a committed read (that participates in conflict checking), and an uncommitted read (that docs not participate in conflict checking).

In some embodiments, ACID functional unit 244 maintains a transaction table recording active ones of the series. When a particular one of the series is initiated, such as by a starting respective communication of the series, a particular one of a plurality of entries of the transaction table is allocated for the series. When the particular series is completed, such as by a committing or aborting respective communication of the series, the particular transaction table entry is deallocated. The particular transaction table entry records some or all of the respective communications of the series. In some embodiments, the transaction table enables checking for conflicts with the respective communications of the series. In some embodiments, the transaction table enables "unwinding" (undoing the effects of) an aborted one of the series. According to various embodiments, the transaction table is stored in one or more of: an internal memory, such as an SRAM; an external memory, such as a DRAM; the fine-grained memory; and any combination thereof.

In some embodiments, a request to access a particular memory address (or a particular object) as part of a transaction using ACID memory properties from the respective processors of a particular node is forwarded via the respective interconnect switch of the particular node to an other of the nodes where the physical memory associated with the particular memory address (or the particular object) resides. The respective interconnect switch of the particular node maintains a record of the access until one or more of: a response from the other node is received; and the transaction is committed or aborted. In some usage scenarios, such as for certain types of read accesses, the determining of conflicts for the access is performed at the other node, and a portion of the response from the other node includes an indication of success (no conflicts) or failure (conflicts). In some usage scenarios, such as for certain types of wife accesses, the determining of conflicts for the access is performed at the other node, the other node returns a response, and the other node maintains a record of the access until the respective interconnect switch of the particular node requests a status conflict of the access. Tire other node then returns a response to the status conflict request including an indication of success (no conflicts) or failure (conflicts) for the access. In further embodiments, the indication of success or failure returned from the other node aggregates multiple accesses at the other node that are part of a same transaction.

In some embodiments, a versioning cache is enabled to record a prior state of any data (such as data in the less-fine-grained memory, and/or in a cache of the less-fine-grained memory) modified by a write access. In the event that a transaction has a conflict and/or is aborted, the versioning cache is enabled to restore the prior state of the data, undoing the effects of write accesses of the transaction.

In various embodiments, a particular one of the series is enabled to be successfully committed if no conflicts were detected for the respective communications of the series. In some embodiments, an originator, such as a processor, of the respective committing communication of a particular one of the series is returned a response including an indication of success (such as a lack of conflicts) or failure (such as an occurrence of a conflict) of the particular series. In further embodiments, the originator is enabled to send a communication requesting status of the particular series prior to sending the respective committing communication, and a response includes an indication of current success or failure of the particular series.

In some embodiments, control logic (such as a portion of the ACID functional unit), in response to the failure of the particular series, is enabled to unwind (undo) any side effects (such as modifications of one of the less-fine-grained memories) of the particular series. In further embodiments, the unwinding operates on one or more of the nodes accessed by ones of the respective communications of the particular series. In some embodiments, at least a portion of the unwinding is managed and/or controlled by software, such as by software running on the originator. In some embodiments, the ACID functional unit advantageously uses a cache of the less-fine-grained memory to store multiple versions of a portion of the less-fine-grained memory to support the unwinding. In some embodiments, the cache is a versioning cache.

In some embodiments, the respective processors include some or all of the ACID functional unit. In various embodiments, a first portion of the ACID functional unit in the respective processors operates with a second portion of the ACID functional unit in the respective interconnect switch. In various embodiments, a portion of the ACID functional unit in the respective processors of a particular one of the nodes operates with ACID functional unit located in others of the nodes to enable non-local accesses to use ACID memory properties.

Figure 2E:
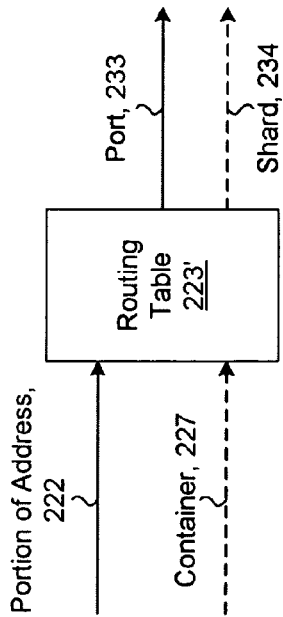
FIGS. 2E and 2F illustrate embodiments of a routing table enabling per-container routing.
Figure 2F:
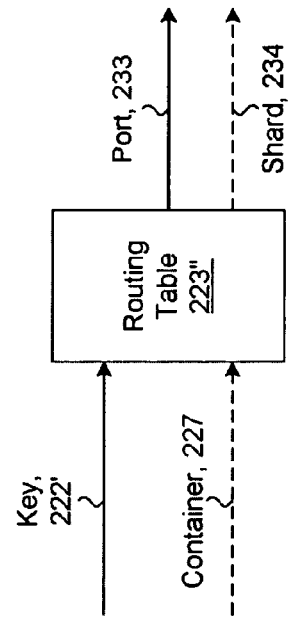

FIGS. 2B, 2E, and 2F illustrate embodiments of a routing table, such as a routing table usable with routing unit 213 (as illustrated in FIG. 2A). A communication received from a receiving one of the ports of switch 116 includes an address, such as a node address, or a key associated with an object. As illustrated in FIG. 2B (or FIG. 2E), a portion of the address (222) is looked up in a routing table (223 in FIG. 2B, or 223' in FIG. 2E) to produce a destination port number (233). As illustrated in FIG. 2F, a key (222') is looked up in a routing table (223") to produce a destination port number (233). As illustrated in FIGS. 2E and 2F, the routing table optionally uses additional look-up information in the form of a container identifier (container 227). In some embodiments, using a container identifier in a routing look-up enables each container to have a respective node address space. According to various embodiments and/or usage scenarios, a portion of an address (or a key) looked up in a routing table such as routing table 223' (or routing table 223") along with a first container identifier is mapped to a same port and/or to a different port as the same portion of the address (or the same key) looked up in the routing table along with a different container identifier.

In some embodiments, the destination port number specifies a destination one of the ports. According to various embodiments, the destination port number includes one or more of: a port number, such as a port number of a switch; a network address, such as a MAC address or an IP address; network protocol information, such as a TCP/IP port and/or socket number; and any other information to identify and/or to route a message to a particular one of the nodes. According to various embodiments and/or usage scenarios, the message includes either at least a portion of the address used for the routing table look-up, or the key used for the routing table look-up. In further embodiments and/or usage scenarios, the particular node receiving the message uses the portion of the address or the key to identify and/or to access data in the respective memory sub-system of the particular node, such as a paragraph in the respective less-fine-grained memory of the particular node. In still further embodiments and/or usage scenarios, routing table look-ups using additional look-up information including a container identifier, such as illustrated in FIGS. 2E and 2F, optionally and/or selectively produce a shard identifier (shard 234), where the shard identifier corresponds to a partition of the less-fine-grained memory of the particular node. The message further includes the shard identifier, and the particular node additionally uses the shard identifier to identify and/or to access the paragraph in the respective less-fine-grained memory.

According to various embodiments: the routing table is a RAM, and the portion of the address serves as an address to the RAM; the routing table is a cache, and the address is looked up to see if the address hits in the cache; the routing table is a CAM, and the address is looked up to see if the address hits in the CAM; and other techniques for look-up-based routing. In some embodiments, additional look-up information is presented along with the portion of the address for the look-up. According to various embodiments, the additional look-up information includes one or more of: a port number specifying the receiving port; information from a header of the communication; utilization information, such as transmit queue depths at each of the ports; status information of the ports, such as whether each of the ports is active; and identification of a particular node address space, such as a container identifier. In various embodiments, the routing table determines additional results via the look-up. According to various embodiments, the additional results include one or more of: quality of service information; priority information; information specifying modifications to the address of the communication; and information specifying modifications to the header of the communication.

According to various embodiments and/or usage scenarios, a routing unit (such as routing unit 213) performs a routing table look-up of a portion of an address (such as via routing table 223 in FIG. 2B or routing table 223' in FIG. 2E) or a key (such as routing table 223" in FIG. 2F) using one or more of: mapping and/or a table look-up of a portion of the bits (such as the high-order bits) of the portion of the address (or of the key); hashing, such as by using a hash function, of the portion of the address (or of the key); indexing/searehing data structures, such as B-trees; a content-addressable memory; any other techniques for routing, mapping, table look-up, and/or indexing/searehing; and any combination of the foregoing.

In some embodiments, functions of routing unit 213 are performed by software executing on the respective processors of a particular one of the nodes. In further embodiments, a routing look-up is performed by software executing on the respective processors of the particular node, using a routing table such as routing table 223 in FIG. 2B, routing table 223' in FIG. 2E, or routing table 223" in FIG. 2F. In further embodiments, the routing table is stored in the respective fine-grained memory of the particular node.

FIG. 2C illustrates an example of source routing. A communication received from a receiving one of the ports includes an address, such as a node address. A portion of the address (243) is mapped to a modified portion of an address (243'). Part of the mapping extracts a destination port number (283), the destination port number specifying a destination one of the ports. As illustrated in FIG. 2C, high-order bits (261) of the portion of the address are selected as the destination port number, and the portion of the address is rotated so that the high-order bits become least-significant bits. For example, using three high-order bits enables selection of up to eight destination ports. In various embodiments, the destination port number is a function, at least in part, of the high-order bits. In some embodiments, the modified portion of the address replaces the portion of the address in the communication. In this manner, a subsequent one of the respective interconnect switches receiving the modified portion of the address in a forwarded version of the communication is able to perform source routing in a substantially similar fashion.

Memory Sub-System

Figure 3A:
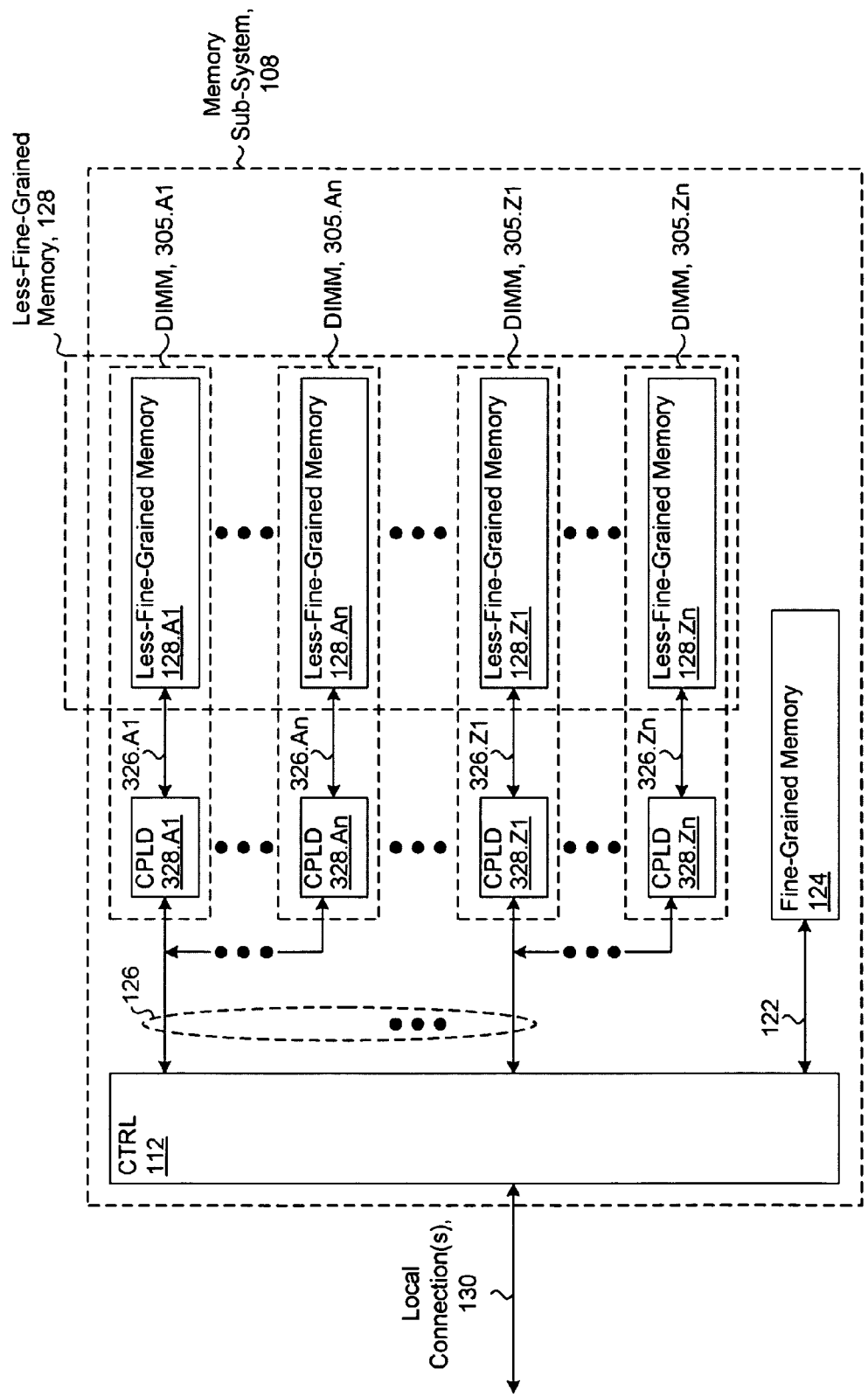
FIGS. 3A and 3C illustrate embodiments of a portion of a system managing a fine-grained memory and a less-fine-grained memory.
Figure 3B:
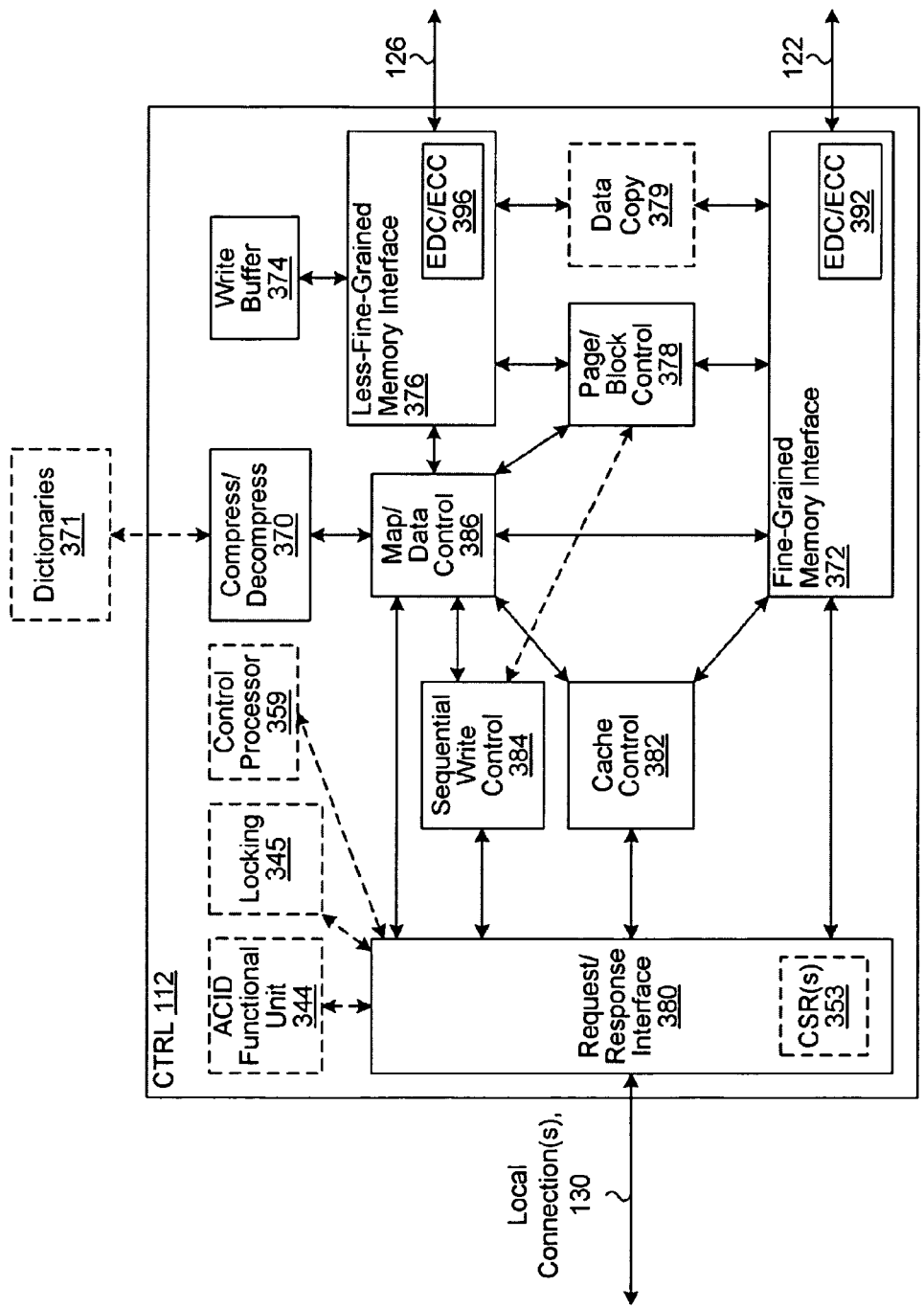
FIGS. 3B and 3D illustrate embodiments of a memory sub-system controller.
Figure 3C:
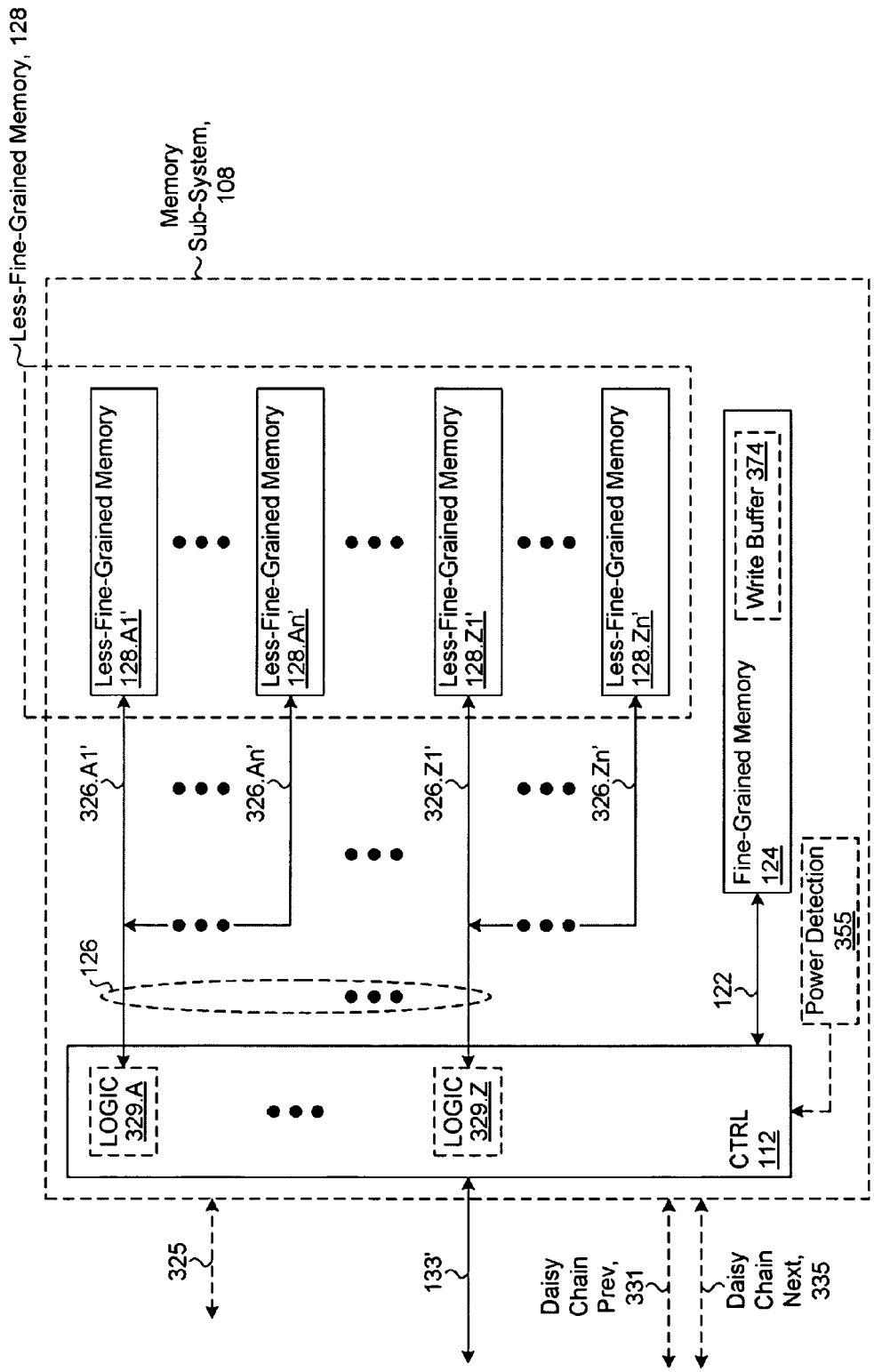

FIGS. 3A and 3C illustrate embodiments of a portion of a system managing a fine-grained memory and a less-fine-grained memory. In some embodiments, the respective memory sub-system (108) of a particular one of the nodes includes a memory sub-system controller (112), a fine-grained memory (124), and a less-fine-grained memory (128). (See also FIGS. 1A, 1B, and 1D.) In various embodiments, at least some of the nodes include one or more respective memory sub-system controllers to manage at least a portion of the respective memory sub-system. In some embodiments, there is at least one memory sub-system controller for the fine-grained memory, and at least one memory sub-system controller for the less-fine-grained memory. In other embodiments, one or more memory sub-system controllers jointly manage the fine-grained memory and/or the less-fine-grained memory. For example, as illustrated in FIG. 3A, less-fine-grained memory 128 is managed via a combination of memory sub-system controller 112 and one or more CPLDs (328.A1, . . . , 328.An, . . . , 328.Z1, . . . , 328.Zn).

In some embodiments, the respective memory sub-system is directly coupled to the respective CPU complex. In some embodiments, the respective memory sub-system is coupled to the respective CPU complex via an intermediate card, such as a card illustrated in FIG. 3E or FIG. 3F.

In some embodiments, the respective memory sub-system includes and/or is coupled to a power detection circuit (355 as illustrated in FIG. 3C) to detect a disruption in a system power supply (powering various of the components of the particular node, such as the respective memory sub-system). According to various embodiments, the power detection circuit is one or more of: a circuit included in memory sub-system 108; a circuit included in memory sub-system controller 112; a circuit included in a power supply and/or other power control electronics and coupled to the respective memory sub-system and/or to the respective CPU complex; and any combination of the foregoing. There are many techniques for detecting power disruptions, either independently or in conjunction with a battery back-up. For example, one technique uses a threshold detector powered by the battery back-up. On detection of a power disruption (as reported via power detection circuit 355), memory sub-system controller 112 is optionally configured to selectively perform various state-saving tasks, such as saving a portion of the fine-grained memory in the less-fine-grained memory.

According to various embodiments, the memory sub-system controller is responsible and/or is configured for one or more of the following functions: managing access to the fine-grained memory; managing access to the less-fine-grained memory; allocating blocks in the less-fine-grained memory; allocating pages in the less-fine-grained memory; allocating paragraphs in the less-fine-grained memory; managing a map in the fine-grained memory; managing a page information table in the fine-grained memory and/or in the less-fine-grained memory; managing a block information table in the fine-grained memory and/or in the less-fine-grained memory; maintaining lists of pages, such as a list of partially-unused pages (and/or blocks), a list of available pages, or a list of unused but not yet erased pages; maintaining lists of paragraphs, such as a list of unused but not yet erased paragraphs; maintaining lists of blocks, such as a list of unused but not yet erased blocks; managing and/or supporting reallocation of pages; managing a cache; managing a versioning cache; managing a write buffer; managing a write coalescing function; managing a compression function; managing a decompression function; managing and/or controlling error detection; managing and/or controlling error correction; managing ACID memory properties; managing and/or controlling, while operating under battery back-up power in the event of a power disruption, saving of a portion of the fine-grained memory in the less-fine-grained memory; initialization of any of the preceding functions; and any combination of the preceding functions. In various embodiments, some or all of the preceding functions are managed and/or controlled, at least in part, by firmware and/or by software, such as by software executing on the respective processors of the particular one of the nodes including the memory sub-system controller. In some embodiments, the memory sub-system controller is enabled to manage accesses to the fine-grained memory and/or the less-fine-grained memory in a manner that is cache coherent with respect to one or more caches of the respective processors. In some embodiments, the memory sub-system controller is enabled to manage accesses from the respective processors of a plurality of the nodes to the fine-grained memory and/or the less-fine-grained memory in a manner that provides ACID memory properties. In further embodiments, at least some of the accesses are transaction coherent.

In some embodiments, the memory sub-system controller optimizes accesses to the fine-grained memory and/or to the less-fine-grained memory by, at least in part, maintaining respective queues of pending read and/or write operations, performing the pending operations in a preferred order, and detecting conflicts between a received operation and operations in the respective queues. In various embodiments, there are independent ones of the respective queues for the fine-grained memory and for the less-fine-grained memory. According to various embodiments, the respective queues are organized according to one or more of: the fine-grained memory; the less-fine-grained memory; read operations; write operations; and operation priority. In further embodiments, there are independent ones of the respective queues for read operations and for write operations.

In some embodiments, the memory sub-system controller optimizes accesses to the fine-grained memory by, at least in part, maintaining a cache of a portion of the contents of the fine-grained memory. In further embodiments, the cache is a versioning cache. In still further embodiments, the versioning cache operates in conjunction with an ACID functional unit to support unwinding of failed transactions.

In some embodiments, the memory sub-system controller optimizes accesses to the less-fine-grained memory by, at least in part, maintaining a cache of a portion of contents of the less-fine-grained memory. In further embodiments, the cache is a versioning cache. In still further embodiments, the versioning cache operates in conjunction with an ACID functional unit to support unwinding of failed transactions. Paragraphs and/or pages read from the less-fine-grained memory are stored in the cache, and requests for data in the less-fine-grained memory return copies of the data from the cache, if present in the cache, in preference to reading the data from the less-fine-grained memory. Requests to write data to the less-fine-grained memory write copies of the data in the cache, if present in the cache, in preference to writing the data to the less-fine-grained memory. Data that is dirty (modified by a write request) in the cache is written to the less-fine-grained memory as a background (lower priority than the accesses) operation. In some embodiments and/or usage scenarios, multiple writes to a same page and/or a same paragraph are coalesced in the cache. In some embodiments, the cache stores chunks of memory from a node address space, each chunk corresponding to one of the paragraphs of the less-fine-grained memory. In further embodiments, tags of the cache are based upon node addresses in the node address space, and re-allocation of a particular one of the chunks to a different one of the paragraphs, such as when the chunk is written to the less-fine-grained memory, does not change a location of the particular chunk in the cache.

In some embodiments, the cache is a local cache and stores solely contents of the respective less-fine-grained-memory and/or the respective fine-grained memory of the particular one of the nodes including the memory sub-system controller. Any request for a particular portion of memory is forwarded to the respective memory sub-system of a particular one of the nodes where the portion of memory resides, where the request is optionally and/or selectively processed using a local cache of the particular node. In other embodiments, the cache is a global cache, and stores contents of the respective less-fine-grained-memory and/or the respective fine-grained memory of any of the nodes. For example, in various embodiments, the data retrieved in response to a request from the respective processors of a particular one of the nodes to access the less-fine-grained memory of another of the nodes is cached in a global cache of the particular node. In some embodiments, a request for a particular portion of memory is optionally answered by a node other than a particular one of the nodes where the portion of memory resides, such as by a node having a cached copy of the portion of memory, and inter-node coherency requests are used, in various embodiments, to maintain coherency of respective caches of the nodes. In some embodiments, the respective memory sub-system controller is coupled to the respective interconnect switch, and particular ones of accesses of the respective processors, whether to the respective memory sub-system of the particular node or to one of the respective memory sub-systems of others of the nodes are selected for storing in the cache.

In some embodiments, the memory sub-system controller optimizes accesses to the less-fine-grained memory by, at least in part, maintaining a write buffer including a plurality of write buffer pages (and/or blocks), the write buffer pages (and/or blocks) storing contents of pages (and/or blocks) that are pending writing to the less-fine-grained memory. According to various embodiments, a page (and/or a block) to be written to the less-fine-grained memory (and to be stored in one of the write buffer pages (and/or blocks) as one of the pages (and/or blocks) pending writing) is determined, at least in part, by one or more of: a write of dirty data from a cache; a write to a region of sequential writes filling a current page (and/or a current block); a write to a non-cached and/or "raw" region; and other techniques that result in some or all of a page (and/or a block) of the less-fine-grained memory being modified. For example, in some embodiments, a page (and/or a block) to be written to the less-fine-grained memory and stored in one of the write buffer pages (and/or blocks) is gradually filled with modified paragraphs. When the page (and/or the block) is full (or substantially full), the page (and/or the block) is then queued for writing to the less-fine-grained memory. In various embodiments, at any one time, zero or more of the write buffer pages (and/or blocks) are being gradually filled, and zero or more of the write buffer pages (and/or blocks) are queued for writing or in the process of being written to the less-fine-grained memory.

In some embodiments, a read request for data of the less-fine-grained memory snoops the write buffer, and a response to the read request optionally and/or selectively returns some or all of the read data from the write buffer. In some embodiments, a write request for the less-fine-grained memory snoops the write buffer, and in response to the write request, optionally and/or selectively, data of the write request modifies data in the write buffer. In various embodiments, snooping of the write buffer snoops individual elements stored in the write buffer. In some embodiments and/or usage scenarios, snooping of the write buffer enables the write buffer to act as a cache. In a first example, the respective local map entry of a node address space used to access a particular element includes an indication that the particular element is pending in the write buffer, and optionally includes a location of the particular element in the write buffer. In a second example, the write buffer is associated with one or more maps similar to the respective local map of a node address space containing a particular element, and access to the particular element looks up the respective element identifier of the particular element in the write-buffer-associated maps (in addition to a look-up in the respective local map of the node address space).

According to various embodiments, the write buffer selects a particular one of the write buffer pages (and/or blocks) for writing to the less-fine-grained memory according to one or more of: a timestamp of the particular write buffer page (and/or the particular write buffer block); a least-recently used and/or a most/recently used indication associated with one or more of the write buffer pages (and/or blocks); utilization of the less-fine-grained memory by accesses; utilizations of one or more portions of the less-fine-grained memory, such as the portions including the pages (and/or blocks) pending writing; a first-in-first-out order; a first-in-last-out order; a random order; a priority order based on priority information associated with at least some of the pages (and/or blocks) pending writing; a type, such as a region of the less-fine-grained memory, of at least some of the pages (and/or blocks) pending writing; fullness, such as fullness of one of the write buffer pages (and/or blocks) being gradually filled; and other factors. According to various embodiments, utilization is measured, at least in part, as one or more of bandwidth, capacity, queue depths, and any combination thereof.

According to various embodiments, the fine-grained memory includes one or more of: SRAM, DRAM, mobile DRAM, PRAM, FRAM, embedded memory, and any memory type providing random access and a granularity of no more than a size of a cache line of the respective processors for write access. For example, in some embodiments, a first part of the fine-grained memory uses SRAM, and a second part of the fine-grained memory uses DRAM. In some embodiments, at least a portion of the fine-grained memory is packaged on DIMMs. In further embodiments, the DIMMs are DDR DRAM DIMMS and/or FBDIMMs. According to various embodiments, the memory sub-system controller is coupled (122) to at least a portion of the fine-grained memory by an interconnect such as one or more of: a mobile DRAM interface; a DDR DRAM interface; an AMB interface; and any memory chip connection interface and/or protocol. According to various embodiments, one or more of: the memory sub-system controller includes at least a portion of the fine-grained memory; and at least a portion of the fine-grained memory (for example, a memory directly connected to one of the respective processors) is accessed via a local communication link, such as link(s) 133 (as illustrated in FIG. 1D). For example, in some embodiments, the fine-grained memory includes some or all of directly connected memory 134 (as illustrated in FIG. 1D). In some embodiments, the fine-grained memory includes a first portion from directly connected memory 134 (such as illustrated in FIG. ID), and a second portion from memory sub-system 108 and directly coupled to memory sub-system controller 112. In further embodiments, the second portion has a battery back-up, such as battery back-up 125 (as illustrated in FIG. 1D and/or FIG. 3F). In still further embodiments, the second portion includes mobile DRAM. In some embodiments and/or usage scenarios, mobile DRAM has advantages in power and/or ease of use with a battery back-up.

According to various embodiments, the less-fine-grained memory includes one or more of: DRAM, PRAM, FRAM, flash memory, and any memory type providing random access and having a granularity of more than the size of a cache line for write access. According to various embodiments, the memory sub-system controller is coupled (126) to the less-fine-grained memory by an interconnect such as one or more of: a flash memory chip interface; a special-purpose interface; and any memory chip connection interface and/or protocol. In some embodiments, the less-fine-grained memory includes a plurality of portions (128.A1, . . . , 128.An, . . . , 128.Z1, . . . , 128.Zn as illustrated in FIG. 3A, or 128.A1', . . . , 128.An', 128.Z1', . . . , 128.Zn' as illustrated in FIG. 3C), each of the portions including one or more memory chips, such as one or more memory chips sharing a data bus, or two or more memory chips stacked in a single package. In further embodiments, some of the portions share a data bus and have separate control signals to enable parallel operation of the portions. For example, in some embodiments, portions 128.A1', . . . , 128.An' (as illustrated in FIG. 3C) have a common data bus, but at least some separate control signals. In further embodiments, such as illustrated in FIG. 3A, each portion is controlled by a respective sub-controller, such as a CPLD (328.A1, . . . , 328.An, . . . , 328.Z1, . . . , 328.Zn as illustrated in FIG. 3A), enabling independent and/or parallel control of the portions. In various embodiments, each of the portions and the respective CPLD are packaged together on a DIMM (DIMMs 305.A1, . . . , 305.An, . . . , 305.Z1, . . . , 305.Zn as illustrated in FIG. 3A). In other embodiments, an FPGA or an ASIC is used instead of or in addition to one or more of the respective CPLDs. In still other embodiments, as illustrated in FIG. 3C, sub-controller logic similar to that of the CPLDs is subsumed into memory sub-system controller 112 (as illustrated by logic 329.A, . . . , 329.Z in FIG. 3C). In various embodiments, there is one of the respective sub-controllers for each of the data busses. For example, in some embodiments, there is one sub-controller (such as logic 329.A as illustrated in FIG. 3C) for portions 128.A1', ..., 128.An', and the sub-controller is enabled to independently control each of portions 128.A1', ..., 128.An' (with the restriction that data transfers to portions 128.A1', ..., 128.An' are via a common data bus).

In some embodiments, each of the sub-controllers (the CPLDs as illustrated in FIG. 3A, or the logic similar to that of the CPLDs and subsumed into memory sub-system controller 112 as illustrated in FIG. 3C) is coupled to a respective one of the portions of the less-fine-grained memory. Each of the sub-controllers is enabled to queue one or more requests (commands) for one or more of the respective portions of the less-fine-grained memory in a respective command queue. (For example, in some embodiments, there is one of the respective command queues for each of the respective portions.) According to various embodiments, the queued commands in a particular one of the sub-controllers are performed in one or more of: a strict, arrival order; an order that permits some read requests to pass other read requests; an order that does not permit any request to pass a write request; and an order that permits certain requests to pass other requests provided that a set of memory-ordering rules, such as to support a memory-ordering model, is not violated. In various embodiments, requests (such as read requests and/or write requests) for the less-fine-grained memory are queued in the respective command queues, enabling a large number of requests at one time to be in progress and/or to be queued for the less-fine-grained memory.

Figure 3D:
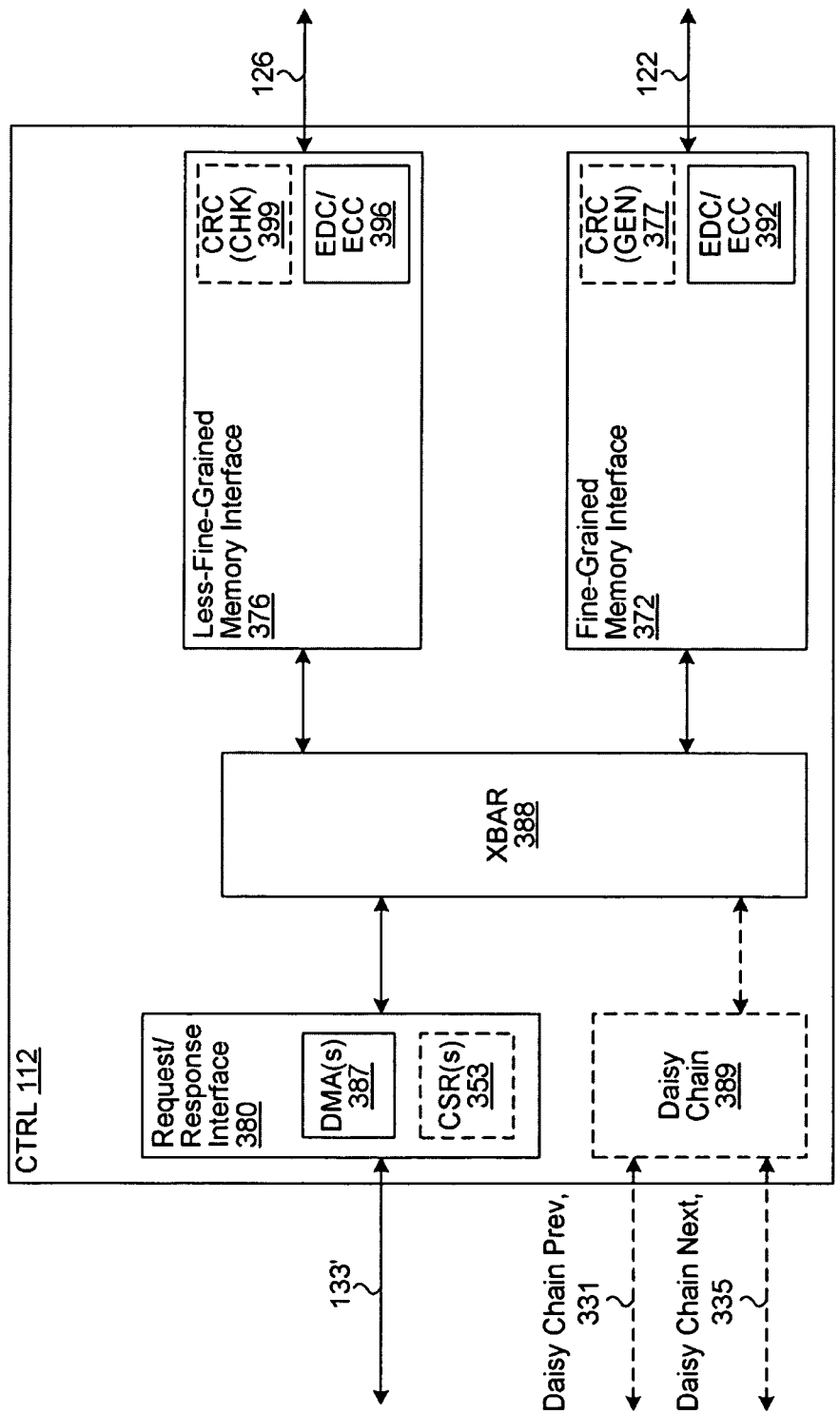

In some embodiments, at least some of the requests for the less-fine-grained memory are sourced by software executing on the respective processors of the particular one of the nodes containing the memory sub-system controller of the less-fine-grained memory. The requests are queued in various ones of the respective command queues. In further embodiments, the requests are via a controller or other logic, such as data copy logic 379 (as illustrated in FIG. 3B) or DMA(s) 387 (as illustrated in FIG. 3D). In some embodiments, the software is enabled to perform a substantially parallel access to a plurality of the portions of the less-fine-grained memory by sourcing a corresponding plurality of requests. In a first example, a part of the less-fine-grained memory a size of four pages is accessed in substantially the access time of a single page by reading the less-fine-grained memory in a striped fashion, one page-sized piece from each of one of four of the portions of the less-fine-grained memory. In a second example, a part of the less-fine-grained memory a size of one page is accessed in less than the latency of a single page by reading the less-fine-grained memory in a striped fashion, one quarter-page-sized piece from each of one of four of the portions of the less-fine-grained memory. In either the first example or the second example, in further embodiments, the four of the portions of the less-fine-grained memory are optionally and/or selectively any of the portions of the less-fine-grained memory, and do not, for example, have to be sequential, contiguous, or otherwise related ones of the portions.

In some embodiments, the memory sub-system controller uses a special-purpose interface to communicate with the sub-controllers, which in turn communicate with the portions of the less-fine-grained memory. In various embodiments, the memory sub-system controller provides one or more of the special-purpose interfaces, each of the special-purpose interfaces coupled to one or more of the sub-controllers. According to various embodiments, the special-purpose interface uses a communications protocol including one or more of: packet-based and/or frame-based transfers; tagged, packet-based and/or frame-based transfers with interleaving of multiple streams of packets; split request/response transfers; high reliability via an ECC code; and high reliability via error detection and retry. In some embodiments, the special-purpose interface includes at least one clock and an 8-bit or 16-bit data bus running at speeds in a range of 100 MHz to 400 MHz. In some embodiments, data on the special-purpose interface is sent on both edges of the at least one clock. In some embodiments, the data bus is bi-directional; in other embodiments, the data bus has two, uni-directional portions. In some embodiments, the special-purpose interface includes two or more clocks, at least one clock from the memory sub-system controller to the sub-controllers, and at least one clock from the sub-controllers to the memory sub-system controller.

In some embodiments, the communications protocol of the special-purpose interface supports a command set at a higher-level than that supported by the memory chips. In a first example, a read-map-info command of the communications protocol is used to read mapping information of a specified one of the pages of one of the memory chips. Reading the mapping information includes reading a first portion of the specified page, and optionally, depending on the first portion, reading other portions of the specified page. Continuing the example, if a chunk count field of the mapping information of a particular one of the respective paragraphs of the specified page indicates that the particular paragraph stores a compressed version of one or more chunks, then an initial portion of the particular paragraph is additionally read, a size of the initial portion based on the chunk count field, to retrieve additional mapping information for the compressed chunks. In a second example, a read command of the communications protocol is used to read contents of a specified one of the paragraphs of one of the memory chips. Reading the specified paragraph includes reading a paragraph type of the specified paragraph and other information stored in per-paragraph information of the corresponding page. Based, at least in part, on the paragraph type, the per-paragraph information, and optionally and/or selectively an initial portion of the specified paragraph, such as a header of compressed data stored in the specified paragraph, an amount of data read in response to the read command is selectively controlled. If the specified paragraph stores compressed data that does not fill the specified paragraph, only valid data in the specified paragraph is read.

In some embodiments, at least one of the respective processor uses one or more levels of cache (such as a first-level cache of a processor) to access the respective memory sub-system. In some embodiments, the respective processors access at least a portion of the respective memory sub-system in a cache coherent fashion. In other embodiments, at least a portion of the less-fine-grained memory of the respective memory sub-system is accessed by the respective processors in other than a cache coherent fashion. In some embodiments, at least a portion of the less-fine-grained memory of the respective memory sub-system is accessed by the respective processors using ACID memory properties.

In some embodiments, a portion of the respective memory sub-system of a particular one of the nodes including at least some of the fine-grained-memory and/or at least some of the less-fine-grained memory is accessible via the respective interconnect switch by one or more of the nodes. In some embodiments, accesses to the portion of the respective memory sub-system by the respective processors of the particular node are treated substantially similarly to accesses to the portion of the respective memory sub-system by others of the nodes. In other embodiments, at least some of the accesses to the portion of the respective memory sub-system by the respective processors of the particular node are managed by the particular node using, at least in part, ACID memory properties. In further embodiments, at least some of the accesses to the portion of the respective memory sub-system from others of the nodes are managed by the others of the nodes using, at least in part, ACID memory properties. In still further embodiments, the particular node is enabled to participate in the ACID memory properties of the at least some of the accesses from the others of the nodes. In various embodiments, the ACID memory properties are enabled by a combination of hardware and/or software. For example, the respective memory sub-system supports the ACID memory properties by providing, at least in part, one or more of: non-volatile memory; atomic operations; locking; versioning; transaction coherency; transaction unwinding; mirroring; transaction logging; and other consistency and coherency techniques.

In some embodiments, at least some of the less-fine-grained memory is accessed indirectly using a (local) map stored in the fine-grained memory, such as the respective local map data structure of a node address space. In some embodiments, use of the map enables physical locations of data in the less-fine-grained memory to be independent of element identifiers (such as addresses or keys) used by the respective processors to access contents of the less-fine-grained memory, such as elements stored in the less-fine-grained memory.

In some embodiments, at least a portion of the fine-grained memory is used by the respective processors of the particular node and/or of others of the nodes for general software access (i.e., as general purpose memory) According to various embodiments, other portions of the fine-grained memory are used for one or more of: a cache for the less-fine-grained memory; a write buffer for the less-fine-grained memory (such as write buffer 374 as illustrated in FIG. 3C); a page information table for pages of the less-fine-grained memory; a block information table for blocks of the less-fine-grained memory; one or more maps (such as the respective maps of one or more node address spaces) for accessing at least a portion of the less-fine-grained memory; and other data structures, tables, and/or other information.

In some embodiments, at least a region of the less-fine-grained memory is used by the respective processors of the particular node and/or of others of the nodes for general software access (i.e., as general purpose memory). According to various embodiments, other portions of the less-fine-grained memory are used for one or more of: a sequential write region; a pool of unused but not yet erased pages and/or blocks; a pool of available (erased) pages and/or blocks; a page information table for pages of the less-fine-grained memory; a block information table for blocks of the less-fine-grained memory; code, such as a boot image or an executable program; file and/or other data; configuration information, such as node configuration and/or system configuration information; node history and/or status, such as an error log; and other tables and/or other information. In various embodiments, one or more of the regions and/or pools are accessible via a portion of a node address space, such as a contiguous range of node addresses. In various embodiments, one or more of the regions and/or pools are non-contiguous in physical locations of the less-fine-grained memory, and are managed via a map and/or via a list, such as a linked list.

In some embodiments, the less-fine-grained memory includes one or more sequential write regions. In various embodiments, the one or more sequential write regions are part of the general software access region. In some embodiments, each sequential write region is associated with a write pointer including an address in a node address space. Each of the sequential write regions enables the respective processors to write sequential information to the less-fine-grained memory more efficiently than to the general software access region. For example, data in the general software access region is cached, so that a write to a portion of a particular page in the general software access region first reads the particular page into the cache. Continuing the example, a write to a portion of a particular page (or of a particular block) in the sequential write region writes to a page-sized (or block-sized) buffer, and when the buffer is full, one of the pages (or one of the blocks) of the less-fine-grained memory is written with contents of the buffer, advantageously avoiding reading the less-fine-grained memory, and avoiding use of the cache. In some embodiments, writing data in the sequential write region on a page basis enables more frequent writing, so that a smaller amount of data is stored outside of the less-fine-grained memory. In some embodiments, managing writing of data in the sequential write region on a block basis enables processing of write data in larger units, reducing overhead and/or increasing amounts of data available for compression.

In some embodiments, as illustrated in FIG. 3C, two or more memory sub-systems (such as memory sub-system 108 as illustrated in FIGS. 1D and 3C, and memory sub-system 108' as illustrated in FIG. 1D) are configured to be coupled via a daisy chain connection (daisy chain previous 331 and daisy chain next 335). At least one of the memory sub-systems is coupled to a CPU complex (such as CPU complex 109 as illustrated in FIG. 1D), and ones of the memory sub-systems that are not coupled to the CPU complex are interconnected to others of the memory sub-systems, and thus more indirectly coupled to the CPU complex, by the daisy chain connection. For example, as illustrated in FIG. 1D, memory sub-system 108 is coupled to CPU complex 109 via link(s) 133. Memory sub-system 108' is, in some embodiments, coupled to memory sub-system 108 using daisy chain connections 331 and 335 (such as with daisy chain next 335 of memory sub-system 108 coupled to daisy chain previous 331 of memory sub-system 108').

Figure 3F:
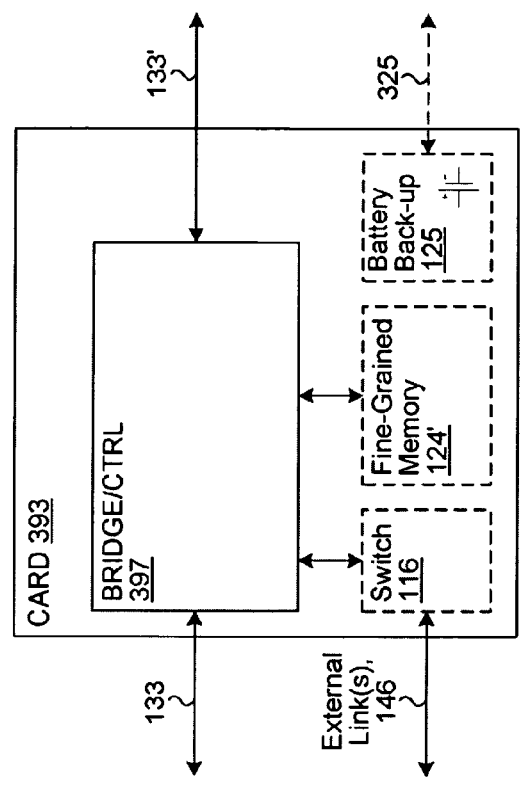
FIGS. 3E and 3F illustrate embodiments of a card enabled to couple a CPU complex to one or more memory sub-systems.

In some embodiments, memory sub-system controller 112 is enabled, in the event of a power disruption, to preserve at least a portion of fine-grained memory 124 in a non-volatile memory, such as, in various embodiments, less-fine-grained memory 128. In further embodiments, the at least a portion of fine-grained memory 124 includes at least a portion of write buffer 374 (as illustrated in FIG. 1D). In some embodiments, at least a portion of memory sub-system 108 is, in the event of a power disruption, enabled to be powered by a battery back-up power source (such as battery back-up 125 as illustrated in FIG. 3F connecting to memory sub-system 108 via optional connection 325 as illustrated in FIGS. 3C and 3F) to provide a sufficient duration of power to preserve the at least a portion of fine-grained memory 124. In various embodiments, control state (such as Control/Status Registers that are writable by software) in memory sub-system controller 112 is used to provide a correspondence between the at least a portion of fine-grained memory 124 and a region of the non-volatile memory used to preserve the at least a portion of fine-grained memory 124. In some embodiments and/or usage scenarios, preserving the at least a portion of fine-grained memory 124 in the non-volatile memory in the event of a power disruption enables writes to less-fine-grained memory 128 that are buffered in the at least a portion of fine-grained memory 124 to be committed when the at least a portion of fine-grained memory 124 is written, without having to wait for completion of slower, page-based writes to less-fine-grained memory 128.

Figure 3E:
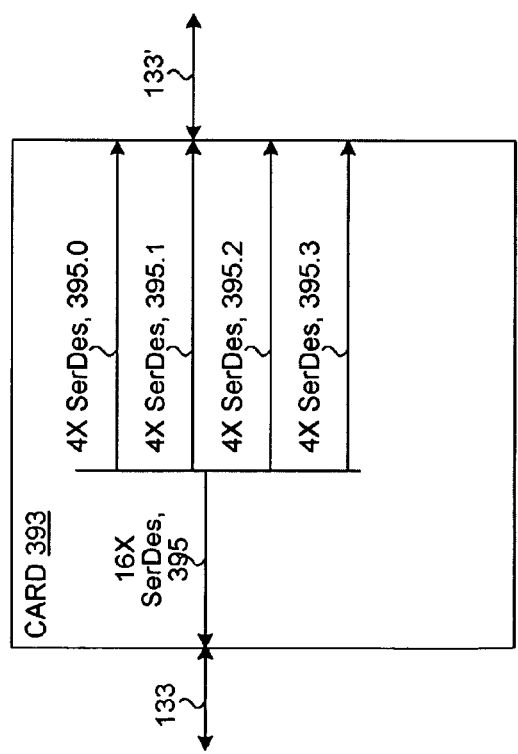

FIGS. 3E and 3F illustrate embodiments of a card enabled to couple a CPU complex to one or more memory sub-systems. FIGS. 3E and 3F illustrate two of many possible techniques for coupling CPU complex 109 (as illustrated in FIG.

1D) to memory sub-system 108 (as illustrated in FIG. 3C). Link(s) 133 of CPU complex 109 are coupled to card 393, and card 393 provides link(s) 133' to memory sub-system 108 (as illustrated in FIG. 3C), and optionally provides other similar links to other memory sub-systems or to other components. In some embodiments, card 393 is a PCI card (such as a PCI Express card).

As illustrated in FIG. 3E, link(s) 133 represent a multi-lane bus, such as a 16-lane PCI Express bus. Card 393 includes wiring that provides a subset of the lanes of link(s) 133, such as four of the lanes, as link(s) 133'. Optionally, other subsets of the lanes of link(s) 133 are provided to other memory sub-systems or to other components.

As illustrated in FIG. 3F, card 393 includes bridge/control chip 397. Bridge/control chip 397 receives link(s) 133 and provides link(s) 133' to memory sub-system 108 (as illustrated in FIG. 3C), and optionally provides other similar links to other memory sub-systems or to other components. According to various embodiments, link(s) 133' are one or more of: a same protocol as link(s) 133; a different protocol than link(s) 133; a same bandwidth as link(s) 133; and a different bandwidth than link(s) 133. For example, in some embodiments, link(s) 133 are a multi-lane, PCI Express bus of a first bandwidth, and link(s) 133' are a multi-lane, PCI Express bus of a second, smaller bandwidth. In various embodiments, bridge/control chip 397 is configured to perform protocol conversion between a protocol of link(s) 133 and a protocol of link(s) 133', and/or to perform some or all of functions of a memory sub-system controller (such as memory sub-system controller 112 as illustrated in FIG. 3C). For example, in some embodiments, bridge/control chip 397 performs some or all of the functions described elsewhere herein with regard to memory sub-system controller 112.

According to various embodiments, bridge/control chip 397 is one or more of: an FPGA; an ASIC; a network processor, and any chip or combination of chips to receive link(s) 133 and to provide link(s) 133'.

As illustrated in FIG. 3F, card 393 optionally includes switch 116 and/or fine-grained memory 124'. In some embodiments, switch 116 (as illustrated in FIGS. 1A, 1B, and 1D) is located on card 393. In some embodiments, some or all of fine-grained memory 124 (as illustrated in FIGS. 1A, 1B, and 1D) is located on card 393 (as illustrated by fine-grained memory 124'). In further embodiments, all of fine-grained memory 124 is located on card 393.

As illustrated in FIG. 3F, card 393 includes optional battery back-up 125. In some embodiments, battery back-up for the one or more memory sub-systems is included on card 393, and connection 325 from battery back-up 125 provides power to memory sub-system 108 (as illustrated in FIG. 3C). In other embodiments, battery back-up 125 provides back-up for card 393, but not for any of the memory sub-systems. In some embodiments, battery back-up 125 is located elsewhere in the particular node, such as in a disk bay of the particular node, and is coupled to card 393.

FIGS. 3B and 3D illustrate embodiments of a memory sub-system controller. Memory sub-system controller 112 is coupled (via local connection(s) 130 as illustrated in FIG. 3B, or link(s) 133' as illustrated in FIG. 3D) to other components of the particular one of the nodes including the memory sub-system controller (such as to switch 116 in FIG. 1A, or to CPU complex 109 in FIG. 1D, optionally via a card such as card 393 as illustrated in FIG. 3E or 3F). The memory sub-system controller includes request/response interface 380 to receive requests sent from or forwarded from the other components, and to send responses back to the other components. Request/response interface 380 is coupled to other blocks of memory sub-system controller 112, such as blocks that are able to process requests and return responses, such (as illustrated in FIG. 3B) as cache control 382, sequential write control 384, map/data control 386, and fine-grained memory interface 372, or such (as illustrated in FIG. 3D) as less-fine-grained memory interface 376. In various embodiments, request/response interface 380 is coupled to one or more other blocks of memory sub-system controller 112 for diagnostic and/or control communications. In some embodiments, request/response interface 380 includes a bus interface, such as a PCI Express interface, for communication via local connection(s) 130 (as illustrated in FIG. 3B) or link(s) 133' (as illustrated in FIG. 3D).

In various embodiments, such as illustrated in FIG. 3D, request/response interface 380 is coupled to one or more other blocks of memory sub-system controller 112 via a crossbar (XBAR), such as XBAR 388. In some embodiments, XBAR 388 is a full crossbar, allowing all of the blocks of the memory sub-system controller that are coupled to XBAR 388 to inter-communicate. In other embodiments, XBAR 388 is a partial crossbar, and at least some of the possible interconnections among the blocks of the memory sub-system controller that are coupled to XBAR 388 are either disallowed or are lower in bandwidth. For example, in some embodiments, daisy chain connectivity 389 as illustrated in FIG. 3D is coupled to XBAR 388, but is solely enabled to access request/response interface 380 via XBAR 388 (and is not, for example, permitted to access fine-grained memory interface 372).

As illustrated in FIG. 3B, in various embodiments, request/response interface 380 is coupled to ACID functional unit 344 to provide ACID memory properties to certain ones of the requests. In various embodiments, request/response interface 380 is coupled to locking logic 345 to provide locking operations, such as semaphores, to the respective processors.

In some embodiments, the requests include a respective address, such as a node address or a PCI Express address, and request/response interface 380 selectively sends at least some of the requests to the other blocks based, at least in part, on the respective address. For example, a particular region of a node address space is associated with a cacheable portion of the less-fine-grained memory, and requests with a respective address in the particular region are sent to cache control 382. In various embodiments, some of the requests are processed directly by request/response interface 380. For example, in some embodiments, request/response interface 380 includes CSRs 353, and some of the requests are requests to read and/or to write one or more of a plurality of control/status registers (CSRs) of CSRs 353. In various embodiments, control processor 359 (as illustrated in FIG. 3B) is enabled to read and/or to write at least a portion of the CSRs. The CSRs are used to control, to modify, and/or to observe behavior of the memory sub-system controller, and by reading and/or writing the CSRs, the respective processors and/or control processor 359 are enabled to manage and/or to control operation of the memory sub-system controller.

As illustrated in FIGS. 3B and 3D, memory sub-system controller 112 includes fine-grained memory interface 372 coupling the memory sub-system controller (via coupling 122) to a fine-grained memory (such as fine-grained-memory 124 of FIG. 1A). The fine-grained memory interface includes logic 392 to encode data sent to the fine-grained memory and to decode data received from the fine-grained memory for error detection and/or error correction. In some embodiments, such as illustrated in FIG. 3D, the fine-grained memory interface includes logic 377 to selectively perform CRC generation (and optionally and/or selectively CRC checking) on portions of data, such as paragraphs, written to (or read from) the fine-grained memory.

As illustrated in FIGS. 3B and 3D, memory sub-system controller 112 includes less-fine-grained memory interface 376 coupling the memory sub-system controller (via coupling 126) to a less-fine-grained memory (such as less-fine-grained-memory 128 of FIG. 1A). In some embodiments, less-fine-grained memory interface 376 is coupled to the less-fine-grained memory via one or more CPLDs or similar sub-controllers (such as sub-controllers within memory sub-system controller 112), and less-fine-grained memory interface 376 reads, writes, and/or manages the less-fine-grained memory via communication with the CPLDs (or the sub-controllers), such as by using the special-purpose interface described above. The less-fine-grained memory interface includes logic 396 to encode data sent to the less-fine-grained memory and to decode data received from the less-fine-grained memory for error detection and/or error correction. In some embodiments, such as illustrated in FIG. 3D, the less-fine-grained memory interface includes logic 399 to selectively perform CRC checking (and optionally and/or selectively CRC generation) on portions of data, such as paragraphs, read from (or written to) the less-fine-grained memory. In various embodiments and/or usage scenarios, providing CRC checking on data read from the less-fine-grained memory enables portions of data, such as paragraphs, to be reliably read, even if the paragraphs are smaller than a unit (such as a sub-page) of the less-fine-grained memory having ECC coverage.

In some embodiments, less-fine-grained memory interface 376 manages the less-fine-grained memory on a page and/or on a block basis, and finer granularities of organization, such as paragraphs, are managed by other portions of memory sub-system controller 112 and/or other components of the particular node (including software executing on the respective processors of the particular node). According to various embodiments, less-fine-grained memory interface 376 is one or more of: enabled to read the less-fine-grained memory on a paragraph basis; enabled to read the less-fine-grained memory on a sub-page basis; and enabled to read the less-fine-grained memory on a page basis, and additionally enabled to read a specified paragraph of a particular page first. In various embodiments, less-fine-grained memory interface 376 manages reading and writing of extra information in each page (and/or in each block), including per-paragraph information and/or per-page information (and/or per-block information). In further embodiments, the extra information includes error detection and/or correction information, such as information generated by logic 396.

In some embodiments, less-fine-grained memory interface 376 is coupled to a write buffer, such as write buffer 374. According to various embodiments, the write buffer is used for one or more of: to buffer, to merge, and/or to delay writes to the less-fine-grained memory; and to enable read accesses to the less-fine-grained memory to pass write accesses. In some embodiments, memory sub-system controller 112 provides direct access for read requests to less-fine-grained memory interface 376, but at least some write requests to less-fine-grained memory interface 376 are performed indirectly using write data buffered in the write buffer. In further embodiments, a data portion of the write buffer is included in the fine-grained memory and is accessed via fine-grained memory interface 372. In various embodiments, the write buffer is "snooped" so that accesses to data that are stored in the write buffer are managed according to memory-ordering rules.

In various embodiments, as illustrated in FIG. 3C, write buffer 374 is a part of fine-grained memory 124 (and is coupled to less-fine-grained memory interface 376 via XBAR 388 of memory sub-system controller 112 as illustrated in FIG. 3D). In further embodiments, fine-grained memory 124 includes a data portion of the write buffer, and a control portion of the write buffer (such as for managing and/or snooping the write buffer) is elsewhere, such as in directly connected memory 134 (as illustrated in FIG. 1D). In other embodiments, the write buffer is located in whole or in part elsewhere in the particular node, such as in one or more of: another memory, such as an SRAM, in or coupled to the memory sub-system controller; in another portion of the fine-grained memory, such as in the respective processor memory; and in any other volatile, non-volatile, or temporarily non-volatile memory of the particular node. For example, in some embodiments, a first portion of the write buffer is temporarily non-volatile and is used for writing new elements to the less-fine-grained memory, and a second portion of the write buffer is volatile and is used for coalescing the less-fine-grained memory.

In a first example, in some embodiments, a read access to the less-fine-grained memory that hits in the write buffer uses, at least in part, data found in the write buffer. In a second example, a write access to the less-fine-grained memory that hits in the write buffer merges write data into data found in the write buffer. Continuing the second example, the write buffer acts, at least in part, similar to a cache for data that is being written to the less-fine-grained memory, and frequently-written data selectively reside in the write buffer for a period of time. The frequently-written data are optionally and/or selectively periodically written to the less-fine-grained memory, and/or are written to the less-fine-grained memory in an event of a power disruption (for example, while operating using back-up power, such as from battery back-up 125 as illustrated in FIG. 3F). In various embodiments, non-volatility (or temporary non-volatility) of the write buffer, such as via back-up power or use of a non-volatile memory for at least a portion of the write buffer enables one or more of: decreased commit latency for writes (compared to waiting for the writes to complete to the less-fine-grained memory); and a decreased minimum size for committed writes (compared to a minimum write size, such as a page, of the less-fine-grained memory).

In some embodiments, such as illustrated in FIG. 3B, memory sub-system controller 112 provides direct access for requests to fine-grained memory interface 372, and indirect access to less-fine-grained memory interface 376 via map/data control 386. In some embodiments, such as illustrated in FIG. 3D, memory sub-system controller 112 provides direct access for read requests to less-fine-grained memory interface 376, but at least some write requests to less-fine-grained memory interface 376 are performed indirectly using write data buffered in a write buffer stored in the fine-grained memory (and accessed via fine-grained memory interface 372). According to various embodiments, non-cacheable requests for the less-fine-grained memory are sent via one or more of: less-fine-grained memory interface 376; and map/data control 386. In various embodiments, "raw" (unmapped) requests for the less-fine-grained memory are sent through map/data control 386. In other embodiments, request/response interface 380 is coupled to less-fine-grained memory interface 376, and raw requests for the less-fine-grained memory are sent directly to less-fine-grained memory interface 376.

In some embodiments, such as illustrated in FIG. 3D, memory sub-system controller 112 includes DMA(s) 387.

According to various embodiments, DMA(s) 387 manage data transfers between one or more of: memory accessible via link(s) 133', such as directly connected memory 134 as illustrated in FIG. 1D; fine-grained memory 124 using fine-grained memory interface 372 and via coupling 122; less-fine-grained memory 128 using less-fine-grained memory interface 376 and via coupling 126; and other memories, such as a memory included in or accessible by memory sub-system controller 112. According to various embodiments. DMA(s) 387 are controlled, at least in part, by one or more of: software executing on the respective processors of the particular node; a control processor, such as control processor 359 as illustrated in FIG. 3B; and other processors enabled to access memory sub-system controller 112, such as via link(s) 133'. In some embodiments, there are a plurality of independent DMA controllers in DMA(s) 387, such as one for each of: data transfers from memory accessible via link(s) 133' to fine-grained memory 124; data transfers from fine-grained memory 124 to less-fine-grained memory 128; and data transfers from less-fine-grained memory 128 to memory accessible via link(s) 133'. In further embodiments, there is an independent DMA controller in DMA(s) 387 for data transfers from less-fine-grained memory 128 to fine-grained memory 124 that is optionally and/or selectively used for coalescing (defragmentation) of less-fine-grained memory 128. In various embodiments, each of the independent DMA controllers is enabled to perform a plurality of DMA operations in an interleaved and/or substantially parallel fashion. Of course, in other embodiments, other independent DMA controllers are used for data transfers between other pairs of memories. Further, in various embodiments, a single DMA controller is enabled to manage one or more transfers between a plurality of pairs of memories. In a first example, in some embodiments, one DMA controller is enabled to manage transfers to and/or from less-fine-grained memory 128, independent of a source of the transfer. In a second example, a single DMA controller is enabled to manage one or more transfers in parallel between any of memory accessible via link(s) 133', fine-grained memory 124, and less-fine-grained memory 128.

In some embodiments, DMA(s) 387 are enabled to operate under control of a pool (such as a list or a circular list) of descriptors. Software, such as software executing on the respective processors, writes commands into the pool of descriptors (as long as the pool of descriptors is not full), and DMA(s) 387 serve the commands from the pool of descriptors. Of course, in various embodiments, the pool of descriptors is and/or includes one or more pools of descriptors, such as one pool of descriptors for each independent DMA controller, and/or one pool of descriptors for each one of a plurality of priority levels. In some embodiments, DMA(s) 387 communicate completion of the commands via a result queue (such as a list or a circular list). As each command is processed, a result (including items such as one or more of status, errors, and data) is placed in the result queue. Of course, in various embodiments, the result queue is and/or includes one or more result queues, such as one result queue for each of the pools of descriptors.

In some embodiments, at least some of the data transfers managed by DMA(s) 387 from fine-grained memory 124 to less-fine-grained memory 128 are from a write buffer, such as write buffer 374 in fine-grained memory 124 (as illustrated in FIG. 3C). In various embodiments, at least some data transfers that write to less-fine-grained memory 128 and that are less than a size of a page are performed as two independent data transfers, each managed by DMA(s) 387: a first data transfer to the write buffer; and a subsequent data transfer, such as once the write buffer has accumulated a full page of data, from the write buffer to less-fine-grained memory 128. In further embodiments, the write buffer is managed by software, such as software executing on the respective processors of the particular node. According to various embodiments, data transfers managed by DMA(s) 387 and writing to less-fine-grained memory 128 are one or more of: always from a writer buffer in fine-grained memory 124; from any portion of fine-grained memory 124; optionally and/or selectively from other sources, such as from memory accessible via link(s) 133'. For example, in some embodiments, a data transfer managed by DMA(s) 387 from link(s) 133' to less-fine-grained memory 128 is optionally and/or selectively permitted when a size of the data transfer is a multiple (including a multiple of one) of a size of a page of less-fine-grained memory 128.

According to various embodiments, data transfers managed by DMA(s) 387 to or from less-fine-grained memory 128 are one or more of: solely within a page of the less-fine-grained memory; solely within a block of the less-fine-grained memory; permitted to cross at least one page boundary (but not a block boundary) of the less-fine-grained memory; and permitted to cross block boundaries of the less-fine-grained memory.

In some embodiments, such as illustrated in FIG. 3B, cacheable requests for the less-fine-grained memory are sent through cache control 382. Cache control 382 is coupled to fine-grained memory interface 372, and cacheable requests for the less-fine-grained memory access a cache in the fine-grained memory and use data in the cache on a cache hit, or optionally update the cache with data from the less-fine-grained memory on a cache miss. Cache control 382 is coupled to less-fine-grained memory interface 376 via map/data control 386, enabling the cacheable requests to selectively and/or optionally be mapped. In some embodiments, cache control 382 includes one or more RAMs, and the RAMs make up a portion of the cache. In a first example, a portion of the cache resides within cache control 382. In a second example, a tag portion of the cache resides within cache control 382. In a third example, a separate side cache resides within cache control 382. In a fourth example, cache control 382 implements a two-level cache, a first (lowest) level uses the RAMs, and a second level is in the fine-grained memory. According to various embodiments, units of tagged data storage in the cache include one or more of: chunks, paragraphs; pages; blocks; cache lines of one of the respective processors of a node; a transfer unit of the fine-grained memory; a granularity and/or a transfer unit of other components and/or devices in the memory sub-system; and other units corresponding to request data granularities. In some embodiments, the cache tracks (tags) data using node addresses. In other embodiments, the cache tags data using physical addresses. In various embodiments where the cache tags data with physical addresses, map/data control 386 communicates to cache control 382 physical addresses of paragraphs and/or pages that become unused.

In some embodiments, the cache is enabled to store modified data. When new data is to be stored in the cache, previous data is optionally and/or selectively removed (evicted) to make room for the new data. If the previous data is modified ("dirty"), the previous data is written back (such as to the less-fine-grained memory). In various embodiments, cache control 382 is enabled to evict modified data by communicating the modified data, along with an address of the modified data, to map/data control 386. In some embodiments, cache control 382 is enabled to accept requests from request/response interface 380 to "flush" data—to mark the data as invalid if the data is not modified, or to evict the data and then mark the data as invalid if the data is modified. In various embodiments, cache control 382 is enabled to perform a variety of cache operations, such as flushing specified addresses or specified portions of the cache, in response to requests.

In some embodiments, at least some of the requests to cache control 382 are prefetch requests. Similar to a cacheable read request, a prefetch request loads data (for example, the unit of tagged data storage, such as a chunk) from the less-fine-grained memory into the cache. Unlike a cacheable read request, a prefetch request does not return data in a response. In some embodiments, data placed in the cache from the less-fine-grained memory in response to a prefetch request is accessible in the cache by either a subsequent read request or a subsequent write request (until the data is evicted from the cache). In various embodiments, prefetch requests are enabled to prefetch a list of optionally non-contiguous data items (fetching the unit of tagged of tagged data storage corresponding to each element of the list). In some embodiments, prefetch requests are "strided" and the list is specified as a starting address, a skip (offset) to a subsequent address, and a count of a number of addresses to prefetch.

In some embodiments, sequential write requests for the less-fine-grained memory are managed, at least in part, by software executing on the respective processors, and using zero or more pages in a write buffer in the fine-grained memory (such as write buffer 374 as illustrated in FIG. 3C). In various embodiments, such as illustrated in FIG. 3B, sequential write requests for the less-fine-grained memory are sent through sequential write control 384. In some embodiments, a request received by request/response interface 380 is determined to be a sequential write request if an address of the request is within one or more sub-regions of a general software access area of the less-fine-grained memory, the sub-regions associated with streams of sequential writes managed by sequential write control 384. In a first example, one or more CSRs specify node address space upper and lower bounds of one or more sequential write regions. In a second example, sequential write control 384 provides request/response interface 380 with node addresses of zero or more regions (such as page-sized regions) corresponding to zero or more current streams of sequential writes.

Sequential write control 384 is coupled to less-fine-grained memory interface 376 via map/data control 386, enabling the sequential write requests to selectively and/or optionally be mapped. In various embodiments, sequential write control 384 includes one or more RAMs to buffer one or more independent streams of sequential writes. In other embodiments, sequential write control 384 is coupled to fine-grained memory interface 372, and the streams of sequential writes are buffered in the fine-grained-memory. In some embodiments, sequential write control 384 accumulates write data from a plurality of sequential write requests in a stream of sequential writes into paragraph and/or page units, and forwards the accumulated write data as a portion of a write request to map/data control 386.

In some embodiments, such as illustrated in FIG. 3B, sequential write control 384 is coupled to page/block control 378 to request available pages and/or blocks. According to various embodiments, sequential write control 384 manages the streams of sequential writes on one or more of: a page basis; and a block basis. In some embodiments, sequential write control 384 allocates the less-fine-grained memory on a block basis, and operates on the less-fine-grained memory on a page basis, breaking allocated blocks into pages as pages are used. In other embodiments, sequential write control 384 allocates and operates on the less-fine-grained memory on a block basis. The following description assumes that sequential write control 384 allocates and operates on the less-fine-grained memory on a page basis.

Prior to a particular one of the streams of sequential writes filling a respective page, a new available page is requested from page/block control 378, and a portion of data written in the respective page includes an address, such as a physical address, of the new available page, thus forming a forward linked list of pages of the particular stream of sequential writes. In some embodiments, data written to the new available page includes an address, such as a physical address, of the respective page, thus forming a backward linked list of the pages of the particular stream of sequential writes. In various embodiments, the forward and/or backward links are stored in a per-page information portion of the respective page and/or the new available page. In some embodiments, sequential write control 384 is enabled to manage a request to initiate the particular stream of sequential writes, and in response to the request, returns a physical address of a first page used by the particular stream of sequential writes. In various embodiments, sequential write control 384 is enabled to process a request to return the physical address of the respective page being filled by the particular stream of sequential writes. Software running on respective processors of one of the nodes is enabled, via use of the returned physical addresses and raw (unmapped) and/or non-cacheable read requests, to read data written by the particular stream of sequential writes, either in a page-forward or a page-backward order.

In some embodiments, such as illustrated in FIG. 3B, map/data control 386 manages buffering of data of the streams of sequential writes (as described above). Sequential write control 384 forwards write requests for each of the particular stream of sequential writes to map/data control 386, and map/data control 386 accumulates write data from a plurality of sequential write requests of each of the streams of sequential writes. In some embodiments, map/data control 386 advantageously uses compress/decompress 370 to compress the accumulated write data prior to writing to the less-fine-grained memory. For example, in some embodiments, each of the streams of sequential writes is associated with a respective circular sequential write buffer, each of the respective write buffers enabled to store a plurality of pages, such as four pages. When the respective sequential write buffer of a particular one of the streams of sequential writes is nearly full, an initial portion (starting at a respective current read pointer) of the respective sequential write buffer is compressed to produce up to a page of write data, which is then written to a page of the less-fine-grained memory, optionally not filling the full page (if a high compression ratio was achieved). The respective read pointer is then advanced past the initial portion of the respective sequential write buffer.

In some embodiments, software is enabled to "flush" one of the streams of special writes, causing the respective write buffer to be written to the less-fine-grained memory. In other embodiments, software is enabled to determine which of a plurality of sequential write requests has or has not been written to the less-fine-grained memory. For example, each of a plurality of sequential write requests of a particular stream of sequential writes has a respective tag, and software is enabled to associate tags with the sequential write requests, and to determine status of each of the sequential write requests by using, at least in part, the respective tag. In some embodiments, a sequential write request is one of a plurality of requests in a transaction, and the transaction is not enabled to be committed until data of the sequential write request is written to the less-fine-grained memory.

In some embodiments, pages of the particular stream of sequential writes are written with a particular page type (stored in respective per-page information of the pages) indicating that the pages are part of a stream of sequential writes. In further embodiments, the respective per-page information includes an indication of which of a plurality of streams of sequential writes the particular stream is. In the event of a failure of a node, such as due to a power outage, pages of each of the plurality of streams of sequential writes are located, and data in the streams of sequential writes are processed in a correct order, using one or more of: the page type information; the stream indications; and the forward and backward links.

According to various embodiments, such as illustrated in FIG. 3B, page/block control 378 manages one or more of: a page information table; a block information table; a list of partially-unused pages (and/or blocks); a list of unused but not yet erased pages (or blocks); a list of available (erased) pages (or blocks); and other data structures and/or lists used in management of the less-fine-grained memory. In some embodiments, various of the tables, the data structures, and/or the lists managed by page/block control 378 are stored in the fine-grained-memory, and accordingly page/block control 378 is coupled to fine-grained memory interface 372. Page/block control 378 is coupled to less-fine-grained memory interface 376 to enable page/block control 378 to selectively request erasure of blocks of pages that are unused. In some embodiments, some of the tables, the data structures, and/or the lists managed by page/block control 378 are stored in the less-fine-grained-memory. In further embodiments, the tables, the data structures, and/or the lists stored in the less-fine-grained-memory are back-up copies of active versions in the fine-grained-memory.

In some embodiments, page/block control 378 is coupled to map/data control 386 to provide available paragraphs and/or pages and/or blocks for writing, and to receive communication regarding unused paragraphs and/or pages and/or blocks for updates of the tables, the data structures, and/or the lists. In some embodiments, page/block control 378 determines when a particular one of the pages (or a particular one of the blocks) is unused, such as when all of the respective paragraphs of the particular page (or the particular block) have been returned by map/data control 386. In some embodiments, page/block control 378 determines when a particular one of the blocks is unused (when all of the respective pages of the particular block are unused). In some embodiments, page/block control 378 is coupled to request/response interface 380, and accepts requests to return unused pages (or unused blocks), and/or to allocate available pages (or available blocks).

In some embodiments, page/block control 378 provides available pages (or available blocks) to map/data control 386. In some embodiments, page/block control 378 provides available pages (or available blocks) to sequential write control 384. According to various embodiments, selection of an available page (or an available block) is based, at least in part, on one or more of: a first-in-last-out order; a first-in-first-out order, a random order; information stored in the available pages (or in the available blocks), such as accounting information; a count of a number of times the available pages (or the available blocks) have been written; a count of a number of times the available pages (or the available blocks) have been erased; locations of the available pages (or the available blocks) on physical devices, such as DIMMs or memory chips; utilization of physical devices; and other history and/or statistics information. According to various embodiments, utilization is measured, at least in part, as one or more of: bandwidth, capacity, queue depths, and any combination thereof.

In some embodiments, the list of available pages (or a list of available blocks) is a plurality of lists, each of the lists corresponding to a respective range of counts of previous write and/or erase usages of the available pages (or the available blocks), and pages (or blocks) are allocated from the lists in a frequency substantially proportional to a magnitude of the ranges. For example, in some embodiments, there are four lists corresponding to ones of the available pages that have been written and/or erased: less than or equal to 1000 times (a first list); more than 1000 but less than or equal to 10000 times (a second list); more than 10000 but less than or equal to 100000 times (a third list); and more than 100000 times (a fourth list). When a particular one of the pages is made available, such as after being erased, the particular page is added to the appropriate one of the lists, based, at least in part, upon a count of previous write and/or erase usages of the particular page. Continuing the example, when allocating one of the available pages, ten of the available pages are allocated from the first list for every one of the available pages allocated from the second list (assuming the first list is non-empty). Similarly, ten of the available pages are allocated from the second list for every one of the available pages allocated from the third list. The fourth list is solely used if the first list, the second list, and the third list are all empty. In some embodiments, the lists are organized in manners other than in powers of 10, such as in powers of other numbers, or such as by a frequency distribution of the write and/or erase information, as determined either statically at initialization or dynamically during operation. In various embodiments, rates of removing pages from the lists are determined in fashions other than proportionality of the magnitude of the ranges of the counts of previous usages. In some embodiments, the lists are organized into sub-lists, the sub-lists organized according to other factors such as locations of the available pages on physical devices, and utilization of physical devices.

In some embodiments and/or usage scenarios, map/data control 386 maps respective addresses, such as node addresses, of requests to physical addresses in the less-fine-grained memory. Map/data control 386 is coupled to fine-grained memory interface 372 to provide access to a map stored in the fine-grained memory. Map/data control 386 is coupled to less-fine-grained memory interface 376 to forward mapped (or raw, if the mapping is selectively and/or optionally performed) requests. Map/data control 386 is coupled to cache control 382 and to sequential write control 384 so that cache control 382 and sequential write control 384 are enabled to access the less-fine-grained memory via one or more maps. Map/data control 386 is coupled to page/block control 378 to enable selection of available paragraphs and/or pages and/or blocks for writing. In some embodiments, map/data control 386 returns physical addresses of unused but not yet erased paragraphs and/or pages and/or blocks to page/block control 378. In various embodiments, map/data control 386 includes one or more RAMs, and the RAMs make up a cache of the map(s) and/or a write buffer for the map(s).

In some embodiments, for mapped read requests, map/data control 386 maps respective addresses of the read requests to physical addresses in the less-fine-grained memory, and forwards the requests (using the physical addresses) to less-fine-grained memory interface 376. In some embodiments, the mapping is on a paragraph (a portion of a page) basis, and maps a chunk in an address space, such as a 512 B chunk, to a physical address of a physical location in the less-fine-grained memory, the physical location being a portion of a page (or of a block), such as a paragraph. In some embodiments, the mapping is on a paragraph (a portion of a page or a block) basis, and maps an object in an address space, using a key of the object, to at least one physical address of a physical location in the less-fine-grained memory, the physical location being a portion of a page (or of a block), such as a paragraph.

In some embodiments and/or usage scenarios, a write request (at a particular address) to the less-fine-grained memory that writes less than a full page first reads the less-fine-grained memory (at a particular physical address) and caches one or more original paragraphs read from the less-fine-grained memory. According to various embodiments, the cache is one or more of: the cache of cache control 382; a cache in map/data control 386; a write buffer in map/data control 386; and any RAM structure for storing and/or merging data. If the write request is raw (unmapped), then the particular address is the particular physical address. If the write request is mapped then the particular address is mapped via the map(s) to determine the particular physical address. Data of the write request is merged into the one or more original paragraphs read from the less-fine-grained memory, producing one or more merged paragraphs. In some embodiments, at least some read accesses to the less-fine-grained memory read a full page, so that a number of merged paragraphs is, in some usage scenarios, less than a number of original paragraphs (zero or more of the original paragraphs are not modified by the write request, and one or more of the original paragraphs are modified by the write request).

In some embodiments, map/data control 386 manages a pool of available paragraphs (for example, as a list of physical address of available paragraphs), and requests available pages (or available blocks) via page/block control 378 to replenish the pool. For mapped write requests, map/data control 386 determines a particular one or more available paragraphs to hold the one or more merged paragraphs. Particular ones of table entries of the map(s) corresponding to the modified ones of the original paragraphs are determined based, at least in part, on the particular address, and the particular table entries are read. Physical addresses (obtained from the particular table entries) of the modified ones of the original paragraphs are communicated to page/block control 378 as unused paragraphs. The particular table entries are written with the physical addresses of the particular available paragraphs. Subsequently, contents of the merged paragraphs are written to the particular available paragraphs. In some embodiments, writing of the particular available paragraphs occurs when a cache evicts the merged paragraphs. In some embodiments, map/data control 386 manages writing of the particular available paragraphs. In various embodiments, map/data control 386 allocates available respective paragraphs of a particular page (or of a particular block) in order, and maintains a page-sized (or a block-sized) write buffer. When all paragraphs of the particular page (or the particular block) have been written, a request to write the particular page (or the particular block) is sent to less-fine-grained memory interface 376, and a next available page (or a next available block) is used to allocate paragraphs for subsequent writes until the next available page (or the next available block) is similarly consumed.

As an example of operation, in some embodiments, of memory sub-system controller 112, a write request (to write a portion of a chunk at a particular address) is received from a requester by request/response interface 380, and the write request is forwarded to cache control 382. If the particular address hits in the cache (i.e., the contents of the chunk are stored in the cache), then the chunk stored in the cache is modified (such as via a write operation using fine-grained memory interface 372, if a data portion of the cache resides in the fine-grained memory), and a response is returned via request/response interface 380. If the particular address does not hit in the cache, then a location in the cache is allocated to hold the chunk (optionally causing eviction of a second chunk), and a read request for the particular address is sent to map/data control 386. Map/data control 386 uses the map(s) (accessed via fine-grained memory interface 372) to determine a particular physical address corresponding to the particular address (that is, a particular paragraph corresponding to the chunk), and sends a read request for the particular physical address to less-fine-grained memory interface 376. Less-fine-grained memory interface 376 returns data read from the particular paragraph in the less-fine-grained memory to map/data control 386, which forwards the data to cache control 382. Write data of the write request is merged into the data read from the less-fine-grained memory, and the modified data is stored at the location in the cache (such as via fine-grained memory interface 372, if a data portion of the cache resides in the fine-grained memory). Cache control 382 updates tag information of the cache to specify the chunk at the particular address as contents of the location. Cache control 382 returns a response to the requester via request/response interface 380. In various embodiments, the cache is allocated/evicted on a page basis, rather than a paragraph basis, enabling the less-fine-grained memory to be read a page at a time. In further embodiments, the cache stores and tags data in a granularity of paragraphs, and allocation of a page evicts zero or more paragraphs (up to a number of paragraphs in a page). In some embodiments, the cache is allocated/evicted on a paragraph basis, and map/data control 386 is enabled to insert one or more additional paragraphs read from a page (in addition to a desired paragraph) into the cache, optionally evicting other paragraphs in consequence.

Continuing the example, if the location in the cache held modified data and caused eviction of the second chunk, cache control 382 sends contents of the second chunk and an address of the second chunk (obtained from the cache tags prior to the update of the tag information) to map/data control 386. Map/data control 386 writes the contents of the second chunk to a particular one of a plurality of paragraphs in a current page-sized write buffer, each of the plurality of paragraphs having a corresponding physical address within a particular page of the less-fine-grained memory, a physical address of the particular page associated with the page-sized write buffer. Accordingly, the second chunk is associated with the physical address of the particular paragraph. Map/data control 386 uses the map(s) to access a particular table entry of the map(s) corresponding to the second chunk address, and to read from the particular table entry a previous physical address corresponding to the second chunk address (that is, a previous paragraph corresponding to the second chunk). The previous physical address is sent to page/block control 378 as an available paragraph. The particular table entry is modified to specify the second chunk physical address (the physical address of the particular paragraph).

Continuing the example further, if the write to the page-sized write buffer used a last paragraph in the page-sized write buffer, a write request is sent to less-fine-grained memory interface 376 to write the page-sized write buffer as the particular page (at the physical address of the particular page). A request is sent to page/block control 378 to obtain a physical address of an available page, and the page-sized write buffer is associated with the physical address of the available page for a subsequent write request from cache control 382.

In some embodiments, map/data control 386 and/or less-fine-grained memory interface 376 track pending read and/or write requests. In some embodiments, a subsequent request that "hits" a particular one of the pending requests is delayed until the particular pending request completes. In various embodiments, a subsequent request that hits a particular one of the pending requests is merged and/or combined with the particular pending request. For example, a subsequent read request for a portion of a particular page of the less-fine-grained memory returns data read by a prior read request for the particular page.

In some embodiments, map/data control 386 and/or less-fine-grained memory interface 376 support raw (unmapped) read, write, and/or erase requests to the less-fine-grained memory. In some embodiments, raw read, write, and/or erase requests provide physical addresses in the less-fine-grained memory. In some embodiments, raw read, write, and/or erase requests provide addresses in a region of a node address space, the region having a direct correspondence, such as a one-to-one map, with physical locations in the less-fine-grained memory. In various embodiments, a result of a raw write request is undefined unless a physical location being written is an erased page. In further embodiments, a result of a raw write request is undefined unless the raw write request is writing an entire page. In some embodiments, map/data control 386 and/or less-fine-grained memory interface 376 provide and/or manage one or more write buffers (such as write buffer 374 as illustrated in FIG. 3B or 3C) for raw write requests so that requests with sizes of less than a page are accumulated, and so that the less-fine-grained memory is writable on a page basis. In some embodiments, at least some of the raw read and/or write requests enable software access to at least some of per-paragraph information and/or at least some of per-page information of pages being accessed. In a first example, CSRs are used to selectively control behavior of raw read and/or write requests, such as whether the raw read and/or write requests include the per-page information (or whether the per-page information is managed by hardware as with non-raw requests). In a second example, particular CSRs are used to store at least some of the per-paragraph information and/or at least some of the per-page information obtained via a raw read request; the particular CSRs are readable to access the per-paragraph and/or the per-page information. In a third example, particular CSRs are written with copies of at least some of the per-paragraph information and/or at least some of the per-page information; a subsequent raw write request to a particular page uses contents of the particular CSRs as at least a portion of write data for the particular page.

In some embodiments, control processor 359 is enabled to perform raw read, write, and/or erase requests of the less-fine-grained memory. According to various embodiments, raw read, write, and/or erase requests are used for one or more of: diagnostic purposes; management purposes; initialization purposes; error handling purposes, such as correcting errors in the less-fine-grained memory; policing purposes; managing regions of the less-fine-grained memory that are not managed by the memory sub-system controller; and other control purposes. In some embodiments, raw read accesses are used, at least in part, to determine pages that have fewer than all paragraphs in use.

In some embodiments, use of a reallocate request to memory sub-system controller 112 enables software to decrease fragmentation of the less-fine-grained memory. In some usage scenarios, a reallocate request is used when a particular page (or a particular block) has one or more unused paragraphs. By reallocating used paragraphs in the particular page (or the particular block) to other pages, the particular page (or the particular block) becomes unused and is added to the list of unused but not yet erased pages (or blocks). In some embodiments, the reallocate request operates on a physical address of the particular page (or the particular block). The particular page (or the particular block) is read, and mapping information in the particular page (or the particular block) is compared with the map(s) (in the fine-grained memory) to determine paragraphs of the particular page (or the particular block) that are consistent with the map(s). The consistent paragraphs are written to new locations, as if the chunks corresponding (via the map(s)) to the consistent paragraphs had been written by a write request, thus relocating the chunks to new paragraphs. Any paragraphs of the particular page (or the particular block) that are inconsistent are unused and are not reallocated. In various embodiments, the reallocate request operates on a threshold basis where consistent paragraphs of the particular page (or the particular block) are reallocated if there are less than a threshold number of consistent (in use) paragraphs. In some embodiments, the reallocate requests operates on a paragraph basis, rather than a page (or a block) basis, and reallocates an individual paragraph if the paragraph is consistent with the map(s). In various embodiments, an epoch field associated with each paragraph (such as epoch field 977 in FIG. 9D) and with table entries of the map(s) provides a further consistency check.

In some embodiments, such as illustrated in FIG. 3B, map/data control 386 is coupled to compress/decompress 370. In some embodiments, a chunk to be written to the less-fine-grained memory (as at least a portion of a particular paragraph) is optionally and/or selectively first compressed by compress/decompress 370, and a paragraph read from the less-fine-grained memory is optionally and/or selectively decompressed by compress/decompress 370. Accordingly, less bandwidth is consumed by the transfer of each compressed paragraph. In some embodiments where map/data control 386 buffers a particular page prior to writing contents of the particular page to the less-fine-grained memory, the entire contents of the particular page are compressed using compress/decompress 370. In some embodiments, map/data control 386 attempts to fill a current paragraph with a compressed version of one or more chunks. In some embodiments, map/data control 386 attempts to fill a plurality of paragraphs, such as remaining space in a page-sized write buffer, with a compressed version of one or more chunks. In some embodiments, as part of compressing one or more chunks, compress/decompress 370 prepends a header to the compressed version of the one or more chunks. In various embodiments, the header includes mapping and/or status information of the one or more chunks, such as an epoch field of at least some of the chunks.

In some embodiments, cache control 382 and map/data control 386 cooperatively select data for eviction from the cache and writing to the less-fine-grained memory in a compressed fashion via compress/decompress 370. In various embodiments, cache control 382 selects for eviction one or more contiguous chunks at least some of which are modified, and the one or more chunks are compressed as a unit. In various embodiments, at least some of the modified chunks are not evicted, and are marked as not modified. In some embodiments, map/data control 386 communicates to cache control 382 an amount of available space in a page-sized write buffer, such as a number of chunks, and cache control 382 supplies one or more chunks to fill the available space. In some embodiments, map/data control 386 compresses a stream of contiguous chunks sent from cache control 382, using back pressure to indicate when a current paragraph and/or a page-sized write buffer is full. In further embodiments, not all of the chunks sent from cache control 382 are modified, and some non-modified chunks are evicted. In other embodiments, at least some non-modified chunks are written to the less-fine-grained memory, but are not evicted from the cache. In some embodiments, one or more chunks are provisionally evicted from the cache by cache control 382, and map/data control 386 selectively returns ones of the chunks not used in filling a current paragraph and/or a page-sized write buffer with compressed data. In some embodiments, a particular chunk is evicted from the cache, and a range of chunks before and/or after the particular chunk are processed by compress/decompress 370. In further embodiments, a portion of the range of chunks including the particular chunk and having an acceptable compression ratio is selected for writing (in a compressed fashion) to the less-fine-grained memory, and the portion of the range of chunks is evicted from the cache.

In some embodiments, when a particular page storing compressed data is read from the less-fine-grained memory, a number of chunks in the particular page is not known in advance. In further embodiments, map/data control 386 is enabled to decompress (via compress/decompress 370) some or all of contents of the particular page, and to provide at least some resulting chunks to cache control 382 for allocation and storing in the cache. In some embodiments, read and/or write requests via request/response interface 380 do not directly allocate locations in the cache, and solely allocate locations in the cache after map/data control 386 has read the less-fine-grained memory, and returned a number of chunks to be allocated. In some embodiments, read requests via request/response interface 380 do not directly allocate locations in the cache, and a write request via request/response interface 380 directly allocates sufficient locations to store data of the write request, pending a merge with data read from the less-fine-grained memory.

According to various embodiments, compress/decompress 370 uses one or more of: run-length encoding; Huffman encoding; Lempel-Ziv compression; Lempel-Ziv-Welch compression; Dynamic Markov compression; dictionary-based compression; other compression techniques; and any combination thereof. In some embodiments, compress/decompress 370 uses one or more dictionaries, such as dictionaries 371. According to various embodiments, the dictionaries are stored in one or more of: a memory of memory sub-system controller 112, such as an SRAM; the fine-grained memory; the less-fine-grained memory; the fine-grained memory with a back-up copy in the less-fine-grained memory; and a separate memory device, such as an SRAM and/or a DRAM. In some embodiments, memory sub-system controller 112 maintains a cache of at least a portion of one or more dictionaries that are stored in the fine-grained memory and/or the less-fine-grained memory.

In various embodiments, the dictionaries are global dictionaries. In some embodiments, different portions of the less-fine-grained memory are compressed and/or decompressed with different ones of the dictionaries. For example, a particular range of node addresses is enabled to be compressed (and decompressed) with a particular one of the dictionaries. In some embodiments, compress/decompress 370 and/or other components of memory sub-system controller 112 are enabled to gather statistics used in creation of the dictionaries. In some embodiments, memory sub-system controller 112 is enabled to create and/or update one or more the dictionaries dynamically.

In some embodiments, at least some of the respective memory sub-system controllers include a respective ACID functional unit. As illustrated in FIG. 3B, memory sub-system controller 112 includes ACID functional unit (344) coupled to request/response interface 380. Request/response interface 380 receives a plurality of communications from local connection(s) 130. The ACID functional unit provides ACID memory properties to one or more series of respective ones of the communications. In some embodiments, solely local ones of the series (series sent from the respective processors of the particular one of the nodes including memory sub-system controller 112) are managed by ACID functional unit 344. In various embodiments, ACID functional unit 344 is enabled to operate with the respective ACID functional unit of the respective memory sub-system controllers of others of the nodes to enable tracking portions of the local series that access the respective memory sub-systems of the other nodes, and/or to enable tracking other series of communications from the respective processors of the other nodes. In some embodiments, ACID functional unit 344 communicates with the respective ACID functional unit of the other nodes via local connection(s) 130 and the respective interconnect switch. In some embodiments, the ACID functional units of the nodes communicate using a message-based protocol. In various embodiments, ACID functional unit 344 operates substantially similarly to ACID functional unit 244 as described with regard to FIG. 2A, a difference being a location of the logic.

In some embodiments, at least some of the respective memory sub-system controllers include respective locking logic. As illustrated in FIG. 3B, memory sub-system controller 112 includes locking logic (345) coupled to request/response interface 380. In various embodiments, locking logic 345 operates substantially similarly to locking logic 245 as described with regard to FIG. 2A, a difference being a location of the logic. In some embodiments, locking logic is coupled to fine-grained memory interface 372 to provide storage for locks and/or for other data structures. According to various embodiments, locking logic 345 provides one or more of: binary semaphores; counting semaphores, P/V primitives; atomic enqueue/dequeue operations; other forms of mutual exclusion primitives; atomic statistics operations, such as increment; atomic arithmetic operations; and any combination thereof. In some embodiments, locking logic 345 operates in a specified region of the fine-grained memory. In other embodiments, locking logic 345 operates in any region of the fine-grained memory and/or of the less-fine-grained memory.

In some embodiments, at least some of the respective memory sub-system controllers include data copy logic. As illustrated in FIG. 3B, memory sub-system controller 112 includes data copy logic (379) coupled to fine-grained memory interface 372 and to less-fine-grained memory interface 376 via map/data control 386. As illustrated in FIG. 3D, DMA(s) 387 are coupled to less-fine-grained memory interface 376 and to fine-grained memory interface 372 via XBAR 388 and have, at least in part, a similar function to data copy logic 379. Herein, references to the data copy logic refer to one or more of data copy logic 379, DMA(s) 387, and other similar data copying or DMA logic.

According to various embodiments, the data copy logic accesses the less-fine-grained memory in one or more of: a mapped fashion, such as via the map(s); and a raw (unmapped) fashion. In some embodiments, accesses to the less-fine-grained memory from the data copy logic use write buffer 374 (such as illustrated in FIG. 3B or 3C); in other embodiments, the data copy logic bypasses write buffer 374 and/or provides independent write buffering.

In some embodiments, the data copy logic is coupled to request/response interface 380. In some embodiments, the data copy logic is controlled via CSRs. In various embodiments, the data copy logic provides a way to copy data between the less-fine-grained memory and the fine-grained memory under control of software. According to various embodiments, the data copy logic is controlled by one or more of: software running on control processor 359; software running on the respective processors of the particular one of the nodes including memory sub-system controller 112; and software running on the respective processors of any of the nodes. For example, software programs one or more CSRs, such as CSRs 353, to control operation of the data copy logic. A first CSR provides a starting address in the fine-grained memory, a second CSR provides a starting address in the less-fine-grained memory, and a third CSR provides control and status information for copying data, such as a direction (to or from the less-fine-grained memory), a count (such a number of bytes or other units), and a "go" bit to initiate an operation.

In some embodiments, the data copy logic provides (or is used to provide) periodic back-up of the fine-grained memory. For example, a set of CSRs, similar to those in the example above, is provided, and an additional control field specifies a repeat period, such a number of clock cycles. Once every repeat period, the data copy logic performs the indicated transfer operation. In further embodiments, a region being copied to is a circular buffer, and CSRs specify an upper address in addition to the starting address. A first copy at a first time fills a portion of the circular buffer, and a second copy at a subsequent time continues filling the circular buffer from where the first copy ended. In various embodiments, the periodic back-up is managed and/or controlled, at least in part, via software.

In some embodiments, such as illustrated in FIG. 3B, memory sub-system controller 112 includes control processor 359. According to various embodiments, control processor 359 provides one or more of: initialization of data structures, such as the map(s), the page information table, and/or the cache; handling of an run-time errors; processing of any errors detected by logic 392 and/or logic 396; correction of any errors detected by logic 392 and/or logic 396; diagnostic processing; maintenance processing; policing of the less-fine-grained memory; defragmentation of the less-fine-grained memory; and other control functions. In various embodiments, control processor 359 is coupled to less-fine-grained memory interface 376 to access program data stored in the less-fine-grained memory. In various embodiments, control processor 359 is coupled to fine-grained memory interface 372 to access the fine-grained-memory as general-purpose memory. In some embodiments, control processor 359 includes and/or manages one or more external connections, such as a serial connection or an Ethernet connection.

In some embodiments, control processor 359 communicates with the respective processors of the particular one of the nodes including memory sub-system controller 112, at least in part, via the fine-grained memory and/or via the directly connected memory of the respective processors, such as by using a message-based protocol. In some embodiments, control processor 359 communicates with the respective processors, at least in part, via CSRs 353. For example, particular ones of the CSRs serve as shared read and/or write pointers to a region of the fine-grained memory used for the message-based protocol. In some embodiments, control processor 359 is enabled to communicate via local connection(s) 130 with external devices 145 via SB 118 (as illustrated in FIG. 1A). According to various embodiments, control processor 359 is coupled to request/response interface 380 for one or more of: access to CSRs 353; communications, via local connection(s) 130, with other components of the particular node, such as communication with SB 118 to access peripherals 142 and/or external devices 145; sending interrupts to the respective processors of the particular node; communication with the respective processors of the particular node using messages in the directly connected memory of the respective processors; and receiving requests and sending response via local connection(s) 130.

According to various embodiments, booting of control processor 359 is, at least in part, via one or more of: any component of the particular node, or any peripheral or external device accessible via local connection(s) 130, such as a peripheral coupled via the respective Southbridge chip; a boot image in the less-fine-grained memory; a boot memory coupled to the control processor, such as a ROM, PROM, or EEPROM; a PCMCIA card slot coupled to the control processor, and capable of connecting to a boot memory and/or device; and other similar techniques. According to various embodiments, control processor 359 manages and/or controls one or more respective management and/or diagnostic connections of the particular node, such as a management Ethernet connection and/or a serial management bus. In some embodiments, the management and/or diagnostic connections are coupled via the respective Southbridge chip. In other embodiments, the management and/or diagnostic connections are coupled more directly to the control processor, such as by coupling to memory sub-system controller 112.

In some embodiments, such as illustrated in FIG. 3D, memory sub-system controller 112 includes optional daisy chain connectivity 389 providing optional daisy chain connections (daisy chain previous 331 and daisy chain next 335) for other memory sub-system controllers (such as from other memory sub-systems). The daisy chain connections enable links(s) 133' (via request/response interface 380) to couple CPU Complex 109 (as illustrated in FIG. 3D) to a plurality of memory sub-systems that are daisy-chained together. In some embodiments, the daisy chain connections are coupled to request/response interface 380 via XBAR 388. In other embodiments (not illustrated in FIG. 3D), the daisy chain connections are coupled directly to request/response interface 380.

Figure 2D:
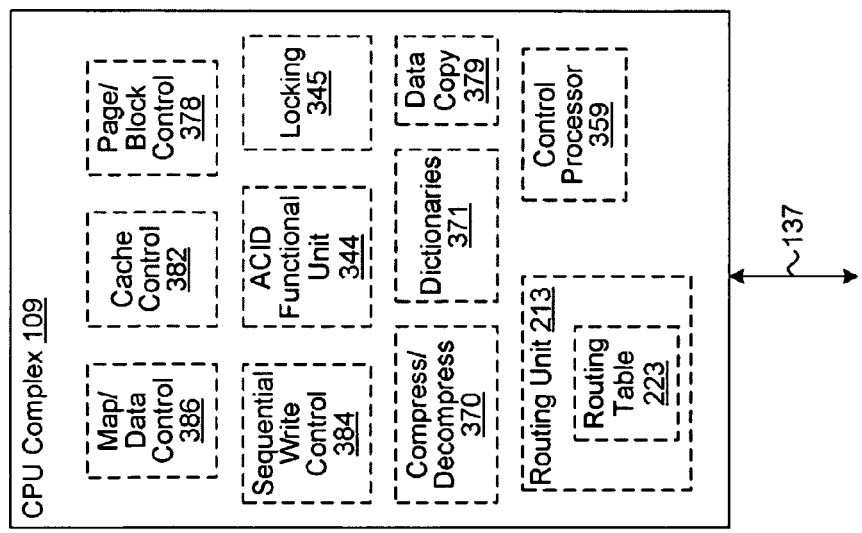
FIG. 2D illustrates an example of logical portions of a CPU complex.

In some embodiments, one or more functions of memory sub-system controller 112 (or of other components, such as switch 116 as illustrated in FIG. 1A) are performed, at least in part, by software executing on the respective processors of the particular node. As illustrated in FIG. 2D, CPU complex 109 (also illustrated in FIG. 1D) includes one or more of the functions of memory sub-system controller 112 and/or of switch 116, including map/data control 386, cache control 382, page/block control 378, sequential write control 384, ACID functional unit 344, locking logic 345, compress/decompress 370, dictionaries 371, data copy logic 379, routing unit 213, and control processor 359. According to various embodiments, zero or more of the preceding functions are performed in whole or in part by CPU complex 109, using a combination of the respective processors, directly connected memory 134, and other components of CPU complex 109. For example, in some embodiments, one or more functions of data copy logic 379 are performed by a combination of software executing on the respective processors of the particular node and DMA(s) 387 (as illustrated in FIG. 3D).

Memory Contents

FIG. 4A illustrates an embodiment of contents of a fine-grained memory. Fine-grained memory 124 includes a plurality of regions. According to various embodiments, the regions are one or more of: an area used for general software access (422); a mapping table (424); a cache and/or a write buffer (426); a page information table (428); and a block information table (429). In some embodiments, the block information table is combined with or is a part of the page information table.

In some embodiments, a portion or all of fine-grained memory 124 is accessible via one or more sequential portions of a node address space. In various embodiments, the portions of the node address space correspond to one or more of the regions of fine-grained memory 124. For example, in some embodiments, node k fine-grained memory 515 (as illustrated in FIG. 5A) corresponds to general software access region 422. In further embodiments, the correspondence is via a map or an address translation mechanism.

In some embodiments, the fine-grained memory regions are determined by partitioning of an address space, such as a node address space. According to various embodiments, the regions are specified by one or more of: fixed boundaries, such as a bottom or a top of the fine-grained memory; boundaries of devices; hardware memories and/or registers such as CSRs storing information specifying the regions; and a table specifying the regions. In various embodiments, the regions are contiguous in physical addresses of the fine-grained memory. In other embodiments, one or more of the regions are interleaved so that not all locations of a particular one of the regions are contiguous in the node address space.

In some embodiments, a processor memory, such as directly connected memory 134 as illustrated in FIG. 1D, includes some or all of the regions of fine-grained memory 124. For example, in various embodiments, directly connected memory 134 includes regions of fine-grained memory 124 except for the cache and/or the write buffer 426, which is coupled to memory sub-system controller 112 (as illustrated in FIG. 3C by write buffer 374).

FIG. 4B illustrates an embodiment of contents of a less-fine-grained memory. Less-fine-grained memory 128 includes a plurality of regions, each of the regions including one or more of a plurality of pages of the less-fine-grained memory. According to various embodiments, the regions are one or more of: an area used for general software access (472); a sequential write region (474); a region of unused but not yet erased pages (476); a region of available (erased) pages (478); a region for tables (480); and a region for code (482). In some embodiments, at least some of the pages (and/or blocks) in the area used for general software access are partially-unused. In various embodiments, the sequential write region is combined with and/or is a part of the general software access region. In some embodiments, the table region is not used. In other embodiments, the table region stores back-up copies of data structures, lists, and/or tables stored in the fine-grained memory, such as page information table 428. In various embodiments, the table region stores copies of dictionaries used as part of compression and/or decompression of data stored in the less-fine-grained memory. In some embodiments, the code region is not used. In other embodiments, the code region stores executable objects, such as programs or an operating system boot image, such as used by control processor 359 (as illustrated in FIG. 3B).

In some embodiments, a portion or all of less-fine-grained memory 128 is accessible via one or more sequential portions of a node address space. In various embodiments, the portions of the node address space correspond to one or more of the regions of less-fine-grained memory 128. For example, in some embodiments, node k less-fine-grained memory 525 (as illustrated in FIG. 5A) corresponds to general software access region 472. In further embodiments, the correspondence is via a map or an address translation mechanism.

In some embodiments, at least some of the less-fine-grained memory regions are determined by partitioning of an address space, such as a node address space or a physical address space. According to various embodiments, the regions are specified by one or more of: fixed boundaries, such as a bottom or a top of the less-fine-grained memory; boundaries of devices; hardware memories and/or registers such as CSRs storing information specifying the regions; and a table specifying the regions. In various embodiments, the regions are contiguous in physical addresses of the less-fine-grained memory. In other embodiments, one or more of the regions are interleaved so that not all locations of a particular one of the regions are contiguous in the node address space.

In some embodiments, at least some of the less-fine-grained memory regions are determined by linked lists or other similar techniques. In further embodiments, a partitioning of the less-fine-grained memory divides the less-fine-grained memory into a first number of regions having separate, fixed partitions, and a second number of regions sharing a single partition. Within the shared partition, one or more linked lists specify the association between the regions and pages (and/or blocks) of the less-fine-grained memory. In some embodiments, a number of the lists is less than a number of the regions. For example, in some embodiments, the general software access region (including the sequential write region), the unused but not yet erased region, and the erased region are all within a particular partition. Pages (and/or blocks) in the unused but not yet erased region are maintained in a first linked list; pages (and/or blocks) in the erased region are maintained in a second linked list; and pages (and/or blocks) not in either of the lists are in the general software access region. In some embodiments, at least some of the pages (and/or blocks) in the general software access region are in a list of partially-unused pages (and/or blocks). Continuing the example, in further embodiments, the general software access region is accessed via a map maintained in the fine-grained memory.

Node Address Space

FIGS. 5A, 5B, and 5D illustrate embodiments of a node address space. In some embodiments, the respective processors of a particular one of the nodes use a respective node address space to access at least a portion of the respective memory sub-system. In further embodiments, each of the nodes has a respective node address space, and each of the nodes is enabled to access a portion of respective memory sub-system of each of others of the nodes via the respective node address space. In other embodiments, there is a plurality of node address spaces, each associated with a software entity, such as a container.

In some embodiments, a node address space used by a particular one of the nodes selectively includes a local portion for accessing the respective memory sub-system of the particular node and/or a remote portion for accessing the respective memory sub-systems of at least some of the other nodes. According to various embodiments, the local portion includes one or more of: a first part for accessing at least a portion of the fine-grained memory of the particular node; and a second part for accessing at least a portion of the less-fine-grained memory of the particular node. In various embodiments, the local portion and the remote portion are interleaved. For example, in some embodiments, a portion of the less-fine-grained memory of the particular node is arranged in the node address space with portions of the less-fine-grained memories of the other nodes, and is not adjacent to a portion of the fine-grained memory of the particular node. In some embodiments, the remote portion includes one or more regions, each of the regions providing access to a portion of a respective one of the less-fine-grained memories of the other nodes. In various embodiments, one of the regions provides access to a portion of the less-fine-grained memory of the particular node. In some embodiments and/or usage scenarios, the regions are not all of a same size. In some embodiments and/or usage scenarios, there are gaps in the address space (ranges of the address space not able to access any memory) between at least some of the regions.

In various embodiments, the respective interconnect switch of the particular node is enabled to route a request including a particular node address from the respective processors of the particular node to either the respective memory sub-system of the particular node (if the particular node address is within the local portion), or to one of the other nodes (if the particular node address is within the remote portion). According to various embodiments, the respective interconnect switch routes the request using one or more of: a routing table; source routing; and other techniques for determining a destination, based, at least in part, on a node address or on a key of an object.

In some embodiments, routing information is updated dynamically. For example, in an event of failure of a particular one of the nodes, a back-up one of the nodes (having a mirrored copy of a portion of the less-fine-grained memory of the particular node) is enabled to take over functionality of the particular node. By updating routing information, requests that would have gone to the particular node go to the back-up node. Accordingly, in some embodiments, the "nodes" in the node address space are "virtual" in that a specific one of the nodes assigned to a particular region of the node address space is optionally and/or selectively changed dynamically.

Node address space 500 illustrated in FIG. 5A, node address space 550 illustrated in FIG. 5B, and container node address space 570 illustrated in FIG. 5D are examples of different embodiments of a node address space having different partitions. In some embodiments, at least some of the partitions are a contiguous portion of the node address space. In some embodiments, the partitions are interleaved. In some embodiments, there are "holes" (gaps) in the node address space, enabling particular ones of the partitions to be aligned on fixed boundaries, such as power-of-two address boundaries. For example, alignment gap 544 in FIG. 5A (and similarly alignment gap 594 in FIG. 5B) is used to align node 1 less-fine-grained-memory 521 (and subsequent partitions) onto an appropriate boundary. In some embodiments, each of the partitions represents a respective portion of the respective less-fine-grained memory allocated at a respective one of the nodes. In further embodiments and/or usage scenarios, objects are distributed among the partitions so that a particular one of the objects resides in a respective one of the partitions. In some embodiments, partitions of a container node address space are termed shards. According to various embodiments, one or more of: all shards (across a plurality of container node address spaces) are of a same size; each of a plurality of container node address spaces has a respective shard size for shards of the container node address space; and within a single container node address space, a first shard and a second shard are of different sizes.

In some embodiments, as illustrated in FIG. 5A, the node address space contains a region (531) used for special accesses to the respective memory sub-system of the particular node and/or other components of the particular node, such as raw accesses and/or diagnostic/management accesses. In a first example, a first portion of the node address space is used to provide raw (unmapped) access to at least a portion of the less-fine-grained memory. In a second example, a second portion of the node address space is used to provide memory-mapped functions, where accesses to addresses in the second portion are processed, and operations are performed depending, at least in part, on the addresses. As illustrated in FIG. 5A, node k raw/diagnostic memory 531 is optionally separated from other regions of the node address space by alignment gap 546. In some embodiments, the raw/diagnostic memory region enables accesses to the fine-grained memory and/or to the less-fine-grained memory of the particular node to operate in a diagnostic and/or a raw fashion where software is enabled, via CSRs, to have additional control over the accesses, such as enabling direct observation and/or manipulation of data that is otherwise under hardware control. For example, in some embodiments, raw/diagnostic accesses enable software to observe and/or to manipulate per-page information stored in pages of the less-fine-grained memory. In various embodiments, accesses to the fine-grained memory and/or to the less-fine-grained memory via the raw/diagnostic memory region are mapped via CSRs. For example, in some embodiments, the raw/diagnostic memory region is smaller than a size of the less-fine-grained memory of the particular node, and information in one or more CSRs specifies a base address in the less-fine-grained memory. Accesses that are in a window within the raw/diagnostic memory region associated with the less-fine-grained memory are mapped using the base address, enabling all locations in the less-fine-grained memory to be accessible via the window.

As illustrated in FIGS. 5A and 5B, in some embodiments, a portion (including all) of the node address space is used to access the fine-grained memories of one or more of the nodes. For example, in some embodiments, node k fine-grained memory 515 corresponds to general software access region 422 (as illustrated in FIG. 4A). As illustrated in FIG. 5A, the node address space contains a portion of the fine-grained memory of solely one of the nodes (node k fine-grained memory 515). As illustrated in FIG. 5B, the node address space contains a portion of the fine-grained memory of each of the nodes (node 1 fine-grained memory 511 through node n fine-grained memory 519). In various embodiments, each of the nodes uses a respective node address space similar to node address space 500, where the portion of the fine-grained memory in the respective node address space is local to the each node.

As illustrated in FIGS. 5A, 5B, and 5D, in some embodiments, a portion of the node address space is used to access the less-fine-grained memories of one or more of the nodes. For example, in some embodiments, node k less-fine-grained memory 525 corresponds to general software access region 472 (as illustrated in FIG. 4B). The node address space contains a portion of the less-fine-grained memory of each of at least some of the nodes (node 1 less-fine-grained memory 521 through node n less-fine-grained memory 529). In some embodiments, each of the nodes uses a respective node address space similar to node address space 500 or node address space 550. In other embodiments, software entities, such as containers, have a respective node address space, such as one similar to container node address space 570, and ones of the nodes accessing one of the software entities use the respective node address space. In some embodiments, all of the respective node address spaces are substantially the same. In other embodiments, portions of the respective node address space are arranged differently for each of the nodes and/or for each of the software entities. In a first example, in some embodiments, the local fine-grained memory of each of the nodes is at a fixed location in the respective node address space, such as at the bottom. In a second example, a first container node address space has partitions (shards) on nodes A, B, and C, and a second container node address space has partitions (shards) on nodes A, B, D, and E.

In some embodiments, the portions of the less-fine-grained memories of each of the nodes accessible via the node address space are not a power-of-two in size. In various embodiments, there are holes in the node address space (ranges of the node address space not corresponding to memory) between ranges corresponding to the portions. For example, in some embodiments, there is a hole between node 1 less-fine-grained memory 521 and node 2 less-fine-grained memory 522. In some embodiments and/or usage scenario, software is aware of the holes, and does not use ranges of the node address space corresponding to the holes. In other embodiments, the portions of the less-fine-grained memories of each of the nodes are arranged in the node address space without holes, even if some of the portions are not a power-of-two in size, or are of different power-of-two sizes.

In some embodiments, the portions of the less-fine-grained memories of each of the nodes accessible via the node address space are interleaved on a portion basis, so that a respective contiguous range of addresses in the node address space corresponds to each of the portions. In various embodiments, software is aware of the correspondence between the respective ranges and the nodes including the portions, and arranges the organization of data stored in the less-fine-grained-memories to distribute accesses across the nodes. In other embodiments, the portions are arranged in the node address space in an interleaved fashion using a granularity smaller than a size of one of the portions, such as a page granularity or a block granularity. For example, with page granularity, sequential page-sized accesses to the node address space are distributed across a plurality of the nodes.

In some embodiments, the portions of the less-fine-grained memories of each of at least some of the nodes accessible via the node address space correspond to more than one of the partitions of the node address space. For example, with reference to FIG. 5D, both node k less-fine-grained-memory 525 and node n less-fine-grained-memory 529 reside on a same one of the nodes.

In some embodiments, the portions of the less-fine-grained memories of each of the nodes accessible via the node address space contain compressed data. For example, node 1 less-fine-grained memory 521 has a range in the node address space of 2 TB, but an actual size of the portion of the less-fine-grained memory of node 1 accessible via node 1 less-fine-grained memory 521 is only 1 TB. In various embodiments, utilizations of each of the portions of the less-fine-grained memories of each of the nodes are visible to software, and software allocates data in the less-fine-grained memories based, at least in part, on the utilizations. Accordingly, if a particular one of the portions of the less-fine-grained memory of each of the nodes accessible via the node address space is achieving a lower compression ratio (compared to others of the portions), then software attempts to allocate less data in the particular portion. In some embodiments, a utilization of a particular one of the portions of the less-fine-grained memory of a particular one of the nodes is determinable by reading CSRs of the memory sub-system controller of the particular node. For example, a first CSR provides a count of a number of available pages in the less-fine-grained memory, and a second CSR provides a count of a number of unused but not yet erase pages in the less-fine-grained memory. Using the first CSR and/or the second CSR, and knowing a size of the portion, a utilization of the portion is determined.

In some embodiments, the portions of the less-fine-grained memories of each of the nodes accessible via the node address space are not a power-of-two in size. For example, the less-fine-grained memory of a particular one of the nodes is 1 TB in size, but the portion of the less-fine-grained memory of the particular node accessible via the node address space is only 0.75 TB in size because some amount of the less-fine-grained memory is reserved for various overheads, such as a pool of available pages for writing. In some embodiments, a range of the node address space corresponding to the portion of the less-fine-grained memory of the particular node is a power-of-two in size, and is larger than an actual size of the portion of the less-fine-grained memory of the particular node. In further embodiments, at least some of the data stored in the portion of the less-fine-grained memory of the particular node is compressed, enabling an effective size of the portion of the less-fine-grained memory of the particular node accessible via the node address to be larger than the actual size. Continuing the above example, the range of the node address space corresponding to the portion of the less-fine-grained memory of the particular node accessible via the node address space is 2 TB, even though the actual size of the portion is 0.75 TB. In some embodiments, software is notified, such as via an interrupt to one of the respective processors of the particular node, if utilization of the portion of the less-fine-grained memory of the particular node exceeds a threshold. For example, if a number of available pages for writing drops below a threshold, an interrupt is generated. In some embodiments, in response to the interrupt, software runs a defragmentation routine to increase a number of available page in the less-fine-grained memory of the particular node.

Mapping

In some embodiments, a portion of the fine-grained memory of a particular one of the nodes serves as one or more maps between a portion of a node address space and at least a portion of the less-fine-grained memory. In some embodiments, each of at least some of the map(s) includes a respective plurality of table entries, and each of the table entries maps a section (such as a contiguous range of addresses) of the node address space to a corresponding physical address of a physical location in the at least a portion of the less-fine-grained memory. In various embodiments, each of at least some of the map(s) is in a granularity of chunks of the node address space, such as 512 B chunks, and has a respective table entry for each chunk, the respective table entry including one of the corresponding physical addresses. In other embodiments, each of at least some of the map(s) includes a respective plurality of table entries, and each of the table entries maps an object (via a key of the object) in the node address space to a corresponding physical address of a physical location in the at least a portion of the less-fine-grained memory. In various embodiments, each one of the nodes having a partition (a shard) of a container node address space has a respective map for the shard.

In some embodiments, the physical locations are each large enough to store one of the chunks (or one of the objects). In other embodiments, multiple ones of the physical locations are used to store one of the chunks (or one of the objects), and each table entry of the map(s) includes multiple ones of the corresponding physical addresses. In a first example, in some embodiments, a chunk is 2 KB, the corresponding physical locations store 512 B (of data mapped from the node address space), and each mapping table entry includes four of the corresponding physical addresses. Continuing the example, if a particular one of the chunks is stored uncompressed, the particular chunk uses four physical locations. If the particular chunk is compressed into a size less than or equal to 512 B, the particular chunk is storable in one physical location, and solely one of the four corresponding physical addresses in a mapping table entry for the chunk is used to map the chunk. In a second example, an object is larger than a page of the less-fine-grained memory, and a mapping table entry for the object refers to a plurality of pages, such as a first paragraph on a first page, zero or more pages in the middle, and a last paragraph on a last page. In a third example, an object is larger than a block of the less-fine-grained memory, and a mapping table entry for the object refers to a first block including a first portion of the object and to a second block including a remaining portion of the object. In a fourth example, an object is larger than a remaining portion of a first block of the less-fine-grained memory, and, in conjunction with placing a first portion of the object in the remaining portion of the first block, a mapping table entry for the object is updated to refer solely to the first block. Data stored in the first block, such as in a header associated with the first potion of the object, includes a pointer (such as a physical location) to a second block including a remaining portion of the object. Continuing the fourth example, a block table (such as a block table with one entry per block stored in the fine-grained memory) stores the pointer to the second block in an entry of the block table for the first block. The pointer to the second block stored in the first block enables building an initial version of the block table at an initialization time.

In some embodiments where data is stored in a compressed fashion in the less-fine-grained memory, a range of addresses mapped by a particular one of the map(s) (such as a range of node k less-fine-grained memory 525 as illustrated in FIG. 5A) is larger than a size of the at least a portion of the less-fine-grained memory to which node addresses within the range are mapped. In further embodiments, multiple table entries of the particular map store a same one of the corresponding physical addresses, as multiple ones of the chunks are optionally compressed and stored in a single one of the physical locations.

In some embodiments, a particular one of the map(s) is a local map. In some usage scenarios, a local map reduces a size of the mapping table entries of the local map, since paragraphs (or, in some embodiments, pages) are mapped within a region smaller than the full node address space, such as a region a size of capacity of a memory chip, or a region of the node address space corresponding to a particular one of the nodes or to a partition on a particular one of the nodes (such as node k less-fine-grained memory 525 as illustrated in FIG. 5A). In a first example, the particular map includes a plurality of independent chip-specific maps, each of the chip-specific maps is associated with a respective one of a plurality of memory chips, and each paragraph in a particular one of the memory chips is mapped solely within the chip-specific map associated with the particular memory chip. A particular paragraph is enabled to be mapped to reside anywhere within the memory chip including the particular paragraph, but is not enabled to be mapped to reside within a different one of the memory chips. In a second example, each of at least some of the nodes has a respective map for a respective portion of the less-fine-grained memory of the node, and each paragraph is enabled to be mapped to reside solely within one of the respective portions of the less-fine-grained memory.

In some embodiments, a particular one of the map(s) is a global map such that any chunk in a portion of the node address space mapped to the less-fine-grained memory of any of the nodes is enabled to reside in any physical paragraph of the less-fine-grained memory of any of the nodes. In some usage scenarios, a global map enables migration of data via (gradually) relocating the data from one set of pages to another (and updating the particular map accordingly as each page is migrated). In some embodiments, use of a global map requires communication among the nodes to maintain the global map.

FIG. 5C illustrates an example of mapping a chunk in a less-fine-grained portion of a node address space to a paragraph in one or more less-fine-grained memory devices. A portion of a node address space corresponding to the less-fine-grained memory, such as node k less-fine-grained-memory 525 (such as illustrated in FIG. 5A), is divided into a plurality of fixed-size chunks (chunk 1 571 through chunk y 579). A less-fine-grained memory (such as less-fine-grained memory 128 of FIG. 1A) includes one or more memory devices (595), the less-fine-grained memory as a whole including a plurality of pages (such as page 1 596). Each of the pages includes one or more respective paragraphs (paragraph 1 581 through paragraph p 589). In some embodiments, each of the pages further includes per-page information separate from the respective paragraphs of the page (per-page information 597 associated with page 1 596).

A particular one of the chunks, chunk x 575, is determined based on a node address within the portion of the node address space of the particular chunk. The node address of the particular chunk specifies an index of the particular chunk (chunk index 565) among all of the chunks in the portion of the node address space. The chunk index is used as at least part of a look-up in a mapping table, such as mapping table 424 (also illustrated in FIG. 4A) to determine a physical address (555) of a particular paragraph in the less-fine-grained memory corresponding to the particular chunk. For example, as illustrated in FIG. 5C, chunk index 565 is looked up in mapping table 424 to produce physical address 555 of paragraph m 585.

Figure 5E:
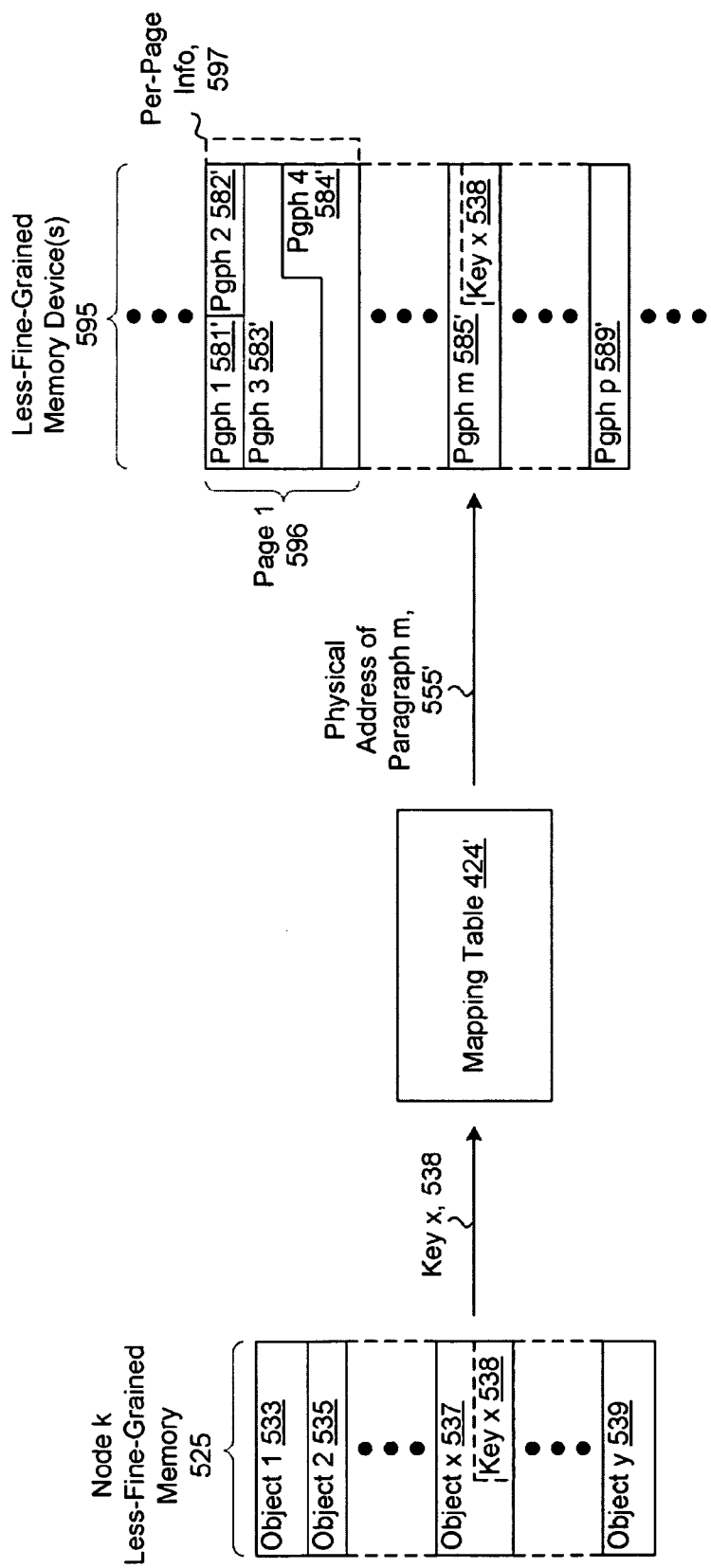
FIG. 5E illustrates an example of mapping objects in a less-fine-grained portion of a node address space to a paragraph in one or more less-fine-grained memory devices.

FIG. 5E illustrates an example of mapping an object in a less-fine-grained portion of a node address space to one or more paragraphs in one or more less-fine-grained memory devices. As illustrated in FIG. 5E, a portion of a node address space corresponding to the less-fine-grained memory, such as node k less-fine-grained-memory 525 (such as illustrated in FIG. 5D), is used to store a plurality of variable-size objects (object 1 533, object 2 535, . . . , object x 537, . . . , and object y 539).

A less-fine-grained memory (such as less-fine-grained memory 128 of FIG. 1D) includes one or more memory devices (595), the less-fine-grained memory as a whole including a plurality of pages (such as page 1 596). Each of the pages includes zero or more respective paragraphs (paragraph 1 581', paragraph 2 582', paragraph 3 583', . . . , paragraph m 585', . . . , paragraph p 589'). (In a first example, one of the pages is empty and includes no paragraphs. In a second example, one of the pages includes a start of a paragraph, and the paragraph ends in a different one of the pages.) In some embodiments, each of the pages further includes per-page information separate from the respective paragraphs of the page (per-page information 597 associated with page 1 596). In further embodiments, per-page information 597 is stored in another page within the same block of less-fine-grained memory devices 595 as page 15%. In other embodiments, additional information similar to per-page information 597 is maintained and stored on a block basis, rather than on a page basis.

According to various embodiments, the paragraphs individually are one or more of: variable in size; stored with a header including a size of the paragraph; stored with a header including an indication that the paragraph continues an object from a previous paragraph, such as a previous paragraph in a different block; less than the size of a page; no larger than the size of a page; less than the size of a block; no larger than the size of a block; larger than the size of a block; able to span page boundaries within a block; able to span block boundaries of physically contiguous (such as by being contiguous in addressing of a memory device) blocks; able to span block boundaries of logically contiguous (such as by being contiguous in a node address space) blocks; and including, such as by being terminated with, a CRC protecting contents of the paragraph.

In some embodiments, node k less-fine-grained-memory 525 corresponds to a partition of a node address space, such as a shard. The plurality of variable-size objects resides in the shard, but any particular one of the objects does not have a determined address within the shard. A mapping table (such as mapping table 424') is used to map a respective key of each of the objects to one or more paragraphs in one or more less-fine-grained memory devices, where at least a portion of the physical memory of the less-fine-grained memory devices corresponds (via the mapping table) to the shard.

A particular one of the objects in the portion of the node address space, object x 537, is determined based on a desired key. According to various embodiments, the desired key is one or more of: a fixed size; a variable size up to a maximum size; and a variable size without limit. For example, in some embodiments and/or usage scenarios, the desired key is a text string such as an SQL query associated with the object. In some embodiments, the desired key is optionally and/or selectively stored with the object, as illustrated by key x 538.

The desired key of the particular object is used to determine a physical address (555') of a particular paragraph in the less-fine-grained memory corresponding to the particular object The desired key is used as at least part of a look-up in a mapping table, such as mapping table 424' (similar to mapping table 424 as illustrated in FIG. 4A) to determine at least one physical address (555') of a particular paragraph in the less-fine-grained memory corresponding to the particular object. For example, as illustrated in FIG. 5E, key x 538 is looked up in mapping table 424' to produce physical address 555' of paragraph m 585'. According to various embodiments, mapping table 424' includes one or more of: a hash table; a B-tree; a content-addressable memory; and any other mapping technique or mechanism for looking up keys. In some embodiments, each entry of mapping table 424' is enabled to include and/or to reference two or more paragraphs, enabling each of the entries to map an object to a plurality of paragraphs.

Figure 15B:
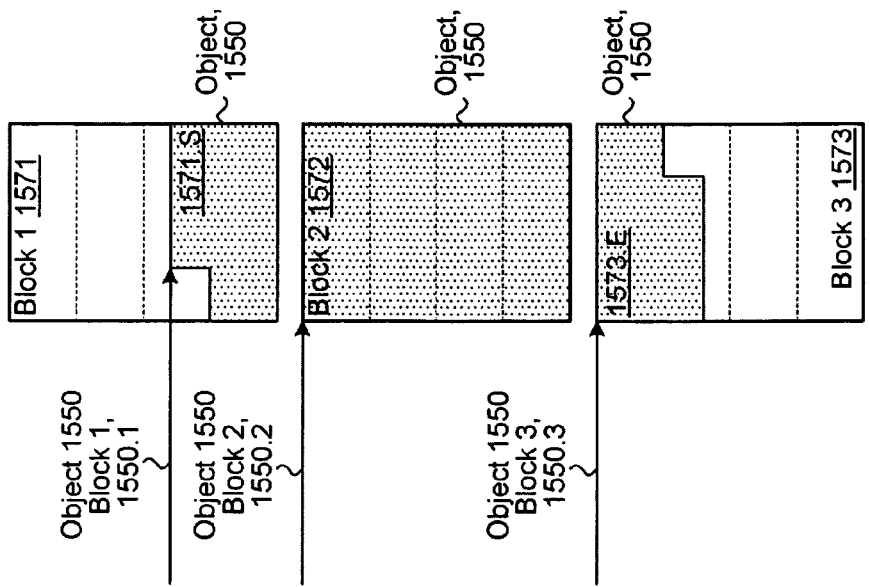
FIG. 15B illustrates an example of an object spanning more than one block of a less-fine-grained memory.
Figure 15A:
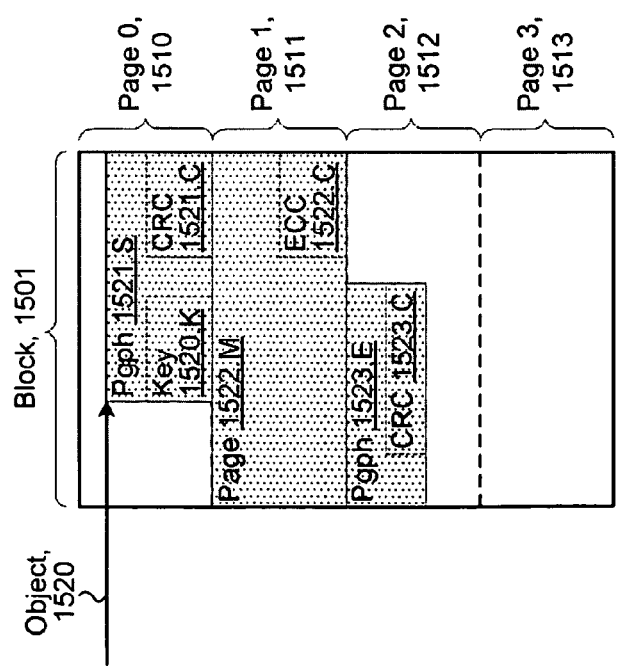
FIG. 15A illustrates an example of an object stored within a block of a less-fine-grained memory.

FIG. 15A illustrates an example of an element, such as an object, stored within a block of a less-fine-grained memory. FIG. 15B illustrates an example of an element, such as an object, spanning more than one block of a less-fine-grained memory. In various embodiments, such as some embodiments similar to those described with reference to FIG. 5E, elements in a node address space are mapped to fixed-sized and/or variable-size paragraphs in less-fine-grained memory devices. In further embodiments, objects in the node address space are mapped to zero or more variable-size paragraphs and/or zero or more pages (or blocks) in the less-fine-grained memory devices. In some embodiments, fixed-sized chunks are managed similarly to variable-sized objects, with one difference being a fixed size and/or alignment of the paragraphs holding the fixed-sized chunks.

According to various embodiments, the less-fine-grained memory is managed on one or more of: a page basis; and a block basis. As illustrated in FIG. 15A, block 1501 includes one or more pages (for example, four pages 1510, 1511, 1512, and 1513 as illustrated in FIG. 15A). According to various embodiments, each block contains one or more of: unused space, including unused pages; unwritten pages; partially written pages; partially used pages; written pages; variable-size paragraphs; and fixed-sized paragraphs.

As illustrated in FIG. 15A, the physical storage for object 1520 (shown with a stipple pattern, and including three portions paragraph 1521.S, page 1522.M, and paragraph 1523.E) spans multiple pages of block 1501. In some embodiments, an element that spans multiple pages is stored as a plurality of pieces, one piece for each of the pages on which the element resides. In further embodiments and/or usage scenarios, a piece of the element that is smaller than a page is selectively stored as a paragraph within one of the pages, allowing other portions of the page to be used for other elements. In still further embodiments, pieces of the element that use a full page (or, in some embodiments, a full sub-page) use a page-level (or sub-page-level) ECC code, rather than a CRC. For example, object 1520 is stored as three pieces in block 1501; paragraph 1521.S is a first piece stored in page 0 1510; page 1522.M is a second piece stored in (as) page 1 1511; and paragraph 1523.E is a third piece stored in page 2 1512. Each of paragraph 1521.S and paragraph 1523.E has a respective CRC (1521.C and 1523.C), while page 1522.M uses a respective ECC code (1522.C) of page 1 1511. (The respective ECC codes of page 0 1510, page 2 1512, and page 3 1513, which are present in some embodiments, are not illustrated in FIG. 15A.) In various embodiments, a (local) map entry of an element that is contained within a block includes a starting offset within the block and a length, with a number of pieces of the element within the block determined by a number of page boundaries crossed by the element.

In some embodiments, a key of object 1520 (key 1520.K) is stored in one of the pieces of the object, such as in paragraph 1521.S. In further embodiments, the key is stored in a fixed place in the object, such as at a start of the object, so that a (global and/or local) map entry for the object is also usable to find a physical location of the key (and so that the key does not require a separate (global and/or local) map entry). In some embodiments, the key is stored with a separate CRC covering solely the key. In various embodiments and/or usage scenarios, having the separate CRC covering the key enables the key to be read (with error detection) independent of reading all of the object.

As illustrated in FIG. 15B, the physical storage for object 1550 (shown with a stipple pattern, and including three portions 1571.S, block 2 1572, and 1573.E) spans multiple blocks (block 1 1571, block 2 1572, and block 3 1573). In some embodiments, an element that spans multiple blocks is mapped as a plurality of blocks, one block for each of the blocks on which the element resides. In further embodiments and/or usage scenarios, a piece of the element that is smaller than a block is selectively stored as one or more pieces within one of the blocks, similar to object 1520 as illustrated in FIG. 15A. For example, object 1550 is stored in three blocks: a first portion 1571.S is stored in block 1 1571; a second portion is stored in (as) block 2 1572; and a third portion 1573.E is stored in block 3 1573. Each of portions 1571.S and 1573.E is stored similarly to object 1520, as illustrated in FIG. 15A, while the second portion uses all (of the user-available space) of block 2 1572. In various embodiments, a (local) map entry of an element that spans a plurality of blocks includes an independent sub-entry for each block. For example, as illustrated in FIG. 15B, the first portion, the second portion, and the third portion are pointed to (such as from a (local) map entry) by pointer object 1550 block 1 1550.1, pointer object 1550 block 2 1550.2, and pointer object 1550 block 3 1550.3, respectively. In various embodiments, each of the block pointers includes a starting offset within the respective block, and a length. In some embodiments, each of the block pointers includes an indication as to whether the block pointer references a full or a partial block, and the length is only included (or is only meaningful) if the block pointer references less than a full block.

Figures 6A, 6B:
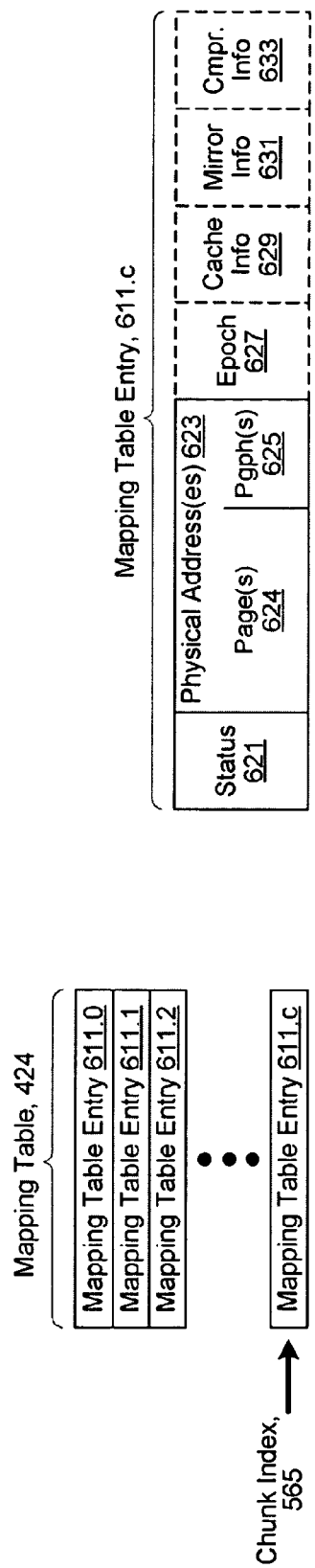
FIG. 6A illustrates an embodiment of a mapping table.
FIG. 6B illustrates an embodiment of a mapping table entry.

FIG. 6A illustrates an embodiment of a mapping table. Mapping table 424 (also illustrated in FIG. 4A) includes a plurality of mapping table entries (611.0 through 611.w). Chunk index 565 (also illustrated in FIG. 5C) is used to access the mapping table to retrieve contents of a corresponding mapping table entry, such as mapping table entry 611.c. According to various embodiments, the mapping table includes one or more of: an array of mapping table entries; a list of mapping table entries, such as a linked list; a hash-based structure; an associative structure, such as a CAM, of mapping table entries; and any other data structure supporting an index-based or address-based look-up.

FIG. 6B illustrates an embodiment of a mapping table entry. According to various embodiments, mapping table entry 611.c includes a plurality of fields such as one or more of: a status field (621); one or more physical addresses (623); an epoch field (627); a cache information field (629); a mirroring information field (631), and compression information (633).

In some embodiments, the status field of a particular mapping table entry stores information related to a chunk of the less-node address space corresponding to the particular mapping table entry. According to various embodiments, a state of the status field is optionally and/or selectively one or more of: valid; invalid (such as for a hole in the node address space); pending (such as in a process of being read and/or written); pending read (such as in a process of being read); pending write (such as in a process of being written); pending policing (such as in a process of being policed); in cache (present in a cache); in write buffer (present in a write buffer); mirrored on one or more other nodes; and any combination thereof. In some embodiments, one or more of the states are stored in the status field as one or more separate bits, thus enabling the one or more states to be represented independent of others of the states.

In some embodiments, each mapping table entry includes one or more physical addresses (623) where a respective chunk corresponding to the mapping table entry is stored. In some embodiments, each of the physical addresses specifies a page (624), and a paragraph within the page (625). In some embodiments, each mapping table entry includes a single physical address corresponding to a physical location of a paragraph in the less-fine-grained memory storing contents of the respective chunk.

In some embodiments, mapping table entries include information of cache status of respective chunks, such as cache information 629 in mapping table entry 611.c. For example, in some embodiments, each mapping table entry includes information specifying one or more nodes that have a cached copy of the respective chunk.

In some embodiments, mapping table entries include information of mirroring status of respective chunks, such as mirror information 631 in mapping table entry 611.c. For example, in some embodiments, each mapping table entry includes information specifying one or more nodes that have a mirrored copy of the respective chunk. In some embodiments, the mirror information includes one or more node IDs. In some embodiments, the mirror information includes one or more mirror table indices, and the mirror table indices are looked up in a mirror table (such as a table in CSRs) to specify ID and/or routing information of one or more nodes.

In some embodiments, mapping table entries include compression information, such as compression information 633 in mapping table entry 611.c. According to various embodiments, the compression information includes one or more of: a type of compression to be used when compressing the respective chunk; a specification of one or more dictionaries to be used with the compression; and other information to enable controlling and/or managing the compression.

In some embodiments, the epoch field (627) in the mapping table entries is used, at least in part, to build an initial version of the map(s) at an initialization time. This is described further in the section "MAP, PAGE INFORMATION TABLE, AND BLOCK INFORMATION TABLE INITIALIZATION" below.

Page Information Table and Block Information Table

FIG. 7A illustrates an embodiment of a page information table. FIG. 7D illustrates an embodiment of a block information table. Page information table 428 (also illustrated in FIG. 4A) includes a plurality of entries (711.0 through 711.x). The page information table is used to maintain information about pages of the less-fine-grained memory. Block information table 429 (also illustrated in FIG. 4A) includes a plurality of entries (761.0 through 761.v). The block information table is used to maintain information about blocks of the less-fine-grained memory. According to various embodiments, the page information table and/or the block information table are stored in one or more of: the fine-grained memory; the less-fine-grained memory; a combination of the fine-grained memory and the less-fine-grained memory; and the fine-grained memory with a back-up copy in the less-fine-grained memory.

In some embodiments, page information table 428 is accessed by page index 710 to select a particular one of the page information table entries, such as page information table entry 711.p. In some embodiments, block information table 429 is accessed by block index 760 to select a particular one of the block information table entries, such as block information table entry 761.b. In some embodiments, page index 710 (block index 760) is a portion of a physical address, such as a physical address in the less-fine-grained memory.

FIG. 7B illustrates an embodiment of a page information table entry. According to various embodiments, each of the entries in the page information table, storing information about a corresponding one of the pages, includes one or more of: a page status field (721) providing status of the corresponding page; a link field (723) including one or more links and enabling page information table entries to be linked in one or more lists; a paragraph status field (725) providing status and related information of paragraphs in the corresponding page; an accounting information field (728); and information on mirroring of the corresponding page (729). In some embodiments, the accounting information field includes one or more of: an epoch field (727); and a count field (730). The count field is used to store a number of times that the particular page containing the accounting information has been written and/or erased. Each time that a particular page is written, the count field stored in the page table entry corresponding to a particular page is incremented. (A copy of the count field stored in the particular page itself is also incremented.) In some embodiments, accounting information field 728 in a page information table entry is a copy of accounting information field 955 (as illustrated in FIG. 9B) from the corresponding page.

FIG. 7E illustrates an embodiment of a block information table entry. According to various embodiments, each of the entries in the block information table, storing information about a corresponding one of the blocks, includes one or more of: a block status field (771) providing status of the corresponding block; a link field (773) including one or more links and enabling block information table entries to be linked in one or more lists; a page status field (775) providing status of pages in the corresponding block; a paragraph status field (777) providing status of paragraphs in the corresponding block; and information on mirroring of the corresponding block (779).

In some embodiments, the status field of a particular page information table entry stores information related to a respective page in the less-fine-grained memory corresponding to the particular page information table entry. According to various embodiments, a state of the status field is optionally and/or selectively one or more of: available; partially-unused; unused but not yet erased; in use; valid; invalid; bad (e.g., the page has an uncorrectable error); pending policing (such as in a process of being policed); an indication of a region of a node address space containing the respective page; an indication that the respective page is part of a stream of sequential writes; and any combination thereof. In some embodiments, one or more of the states are stored in the status field as one or more separate bits, thus enabling the one or more states to be represented independent of others of the states.

In some embodiments, the status field of a particular block information table entry stores information related to a respective block in the less-fine-grained memory corresponding to the particular block information table entry. According to various embodiments, a state of the status field is optionally and/or selectively one or more of: available; partially-unused; unused but not yet erased; in use; valid; invalid; bad (e.g., the block has an uncorrectable error); pending policing (such as in a process of being policed); an indication of a region of a node address space containing the respective block; an indication that the respective block is part of a stream of sequential writes; and any combination thereof. In some embodiments, one or more of the states are stored in the status field as one or more separate bits, thus enabling the one or more states to be represented independent of others of the states.

In some embodiments, the epoch field (727) in the page information table entries is used, at least in part, to build an initial version of the map(s) at an initialization time. This is described further in the section "MAP, PAGE INFORMATION TABLE, AND BLOCK INFORMATION TABLE INITIALIZATION" below.

In some embodiments, page information table entries and/or block information table entries include information of mirroring status of respective pages (blocks), such as mirror information 729 in page information table entry 711.$p$ (and such as mirror information 779 in block information table entry 761.$b$). For example, in some embodiments, each page information table entry and/or block information table entry includes information specifying one or more nodes that have a mirrored copy of the respective page and/or block.

FIG. 7C illustrates an example of linking page information table entries into a linked list. FIG. 7F illustrates an example of linking block information table entries into a linked list. In some embodiments, a link field (723) in a page information table entry and/or a link field (773) in a block information table entry is used to link at least some of the table entries in one or more linked lists. In some embodiments, at least some of the lists are singly-linked (forward-only links) lists. In some embodiments, at least some of the lists are doubly-linked (forward and backward links) lists. The examples of FIGS. 7C and 7F illustrate singly-linked lists. An external head pointer for a particular one of the linked lists points to a first one of the table entries, and one of the links of the link field of each succeeding one of the table entries points to a next one of the table entries. According to various embodiments, the linked lists of the page information table entries and/or of the block information table entries include one or more of: a list of partially-unused ones of the pages and/or ones of the blocks; a list of available (unused and erased) ones of the pages (accessed via head pointer 741) and/or ones of the blocks (accessed via head pointer 791); and a list of unused but not yet erased ones of the pages (accessed via head pointer 743) and/or ones of the blocks (accessed via head pointer 793). For example, as illustrated in FIG. 7C, a list of available pages has a head pointer (741) pointing to a first available page, as specified by page information table entry 731.$p$. One of the links of the link field of page information table entry 731.$p$ points to a second available page, as specified by page information table entry 731.2. One of the links of the link field of page information table entry 731.2 indicates that the list of available pages ends by pointing to NULL entry 749.

In some embodiments, ones of the page information table entries (and/or ones of the block information table entries) corresponding to ones of the pages (and/or ones of the blocks) that are in use are not linked into any of the linked lists. In further embodiments, the link field of a particular one of the page information table entries (and/or of a particular one of the block information table entries) corresponding to a particular one of the pages (and/or to a particular ones of the blocks) that is in use includes information regarding mirroring of the page (and/or of the block), such as an ID of a node having a copy of the particular page (and/or of the particular block).

In some embodiments, when a particular one of the pages is freed (no longer in use), the particular page is added to the list of unused but not yet erased pages. In some embodiments, when a particular paragraph of a particular one of the pages is freed, the paragraph status field of the page information table entry (such as paragraph status 725) corresponding to the particular page is updated to indicate that the particular paragraph is not in use, and if all paragraphs of the particular page are not in use, then the particular page is added to the list of unused but not yet erased pages. In further embodiments, when the particular page is added to the list of unused but not yet erased pages, the page status field of the block information table entry (such as page status 775) corresponding to a particular block containing the particular page is updated to indicate that the particular page is not in use, and if all pages of the particular block are not in use, then the particular block is added to the list of unused but not yet erased blocks. In other embodiments, when a particular paragraph of a particular one of the blocks is freed, the paragraph status field of the block information table entry (such as paragraph status 777) corresponding to the particular bock is updated to indicate that the particular paragraph is not in use, and if all paragraphs of the particular block are not in use, then the particular block is added to the list of unused but not yet erased blocks.

In some embodiments, when a first one of the respective paragraphs of a particular one of the pages (and/or of the blocks) is freed, the particular page (and/or the particular block) is added to a doubly-linked list of partially-unused pages (and/or blocks). In further embodiments, when a final one of the respective paragraphs of the particular page (and/or the particular block) is freed, the particular page (and/or the particular block) is removed from the list of partially-unused pages (and/or blocks), and is added to the list of unused but not yet erased pages (and/or blocks). In some embodiments, the list of partially-unused pages (and/or blocks) is periodically policed and at least some of the pages (and/or the blocks) on the list are reallocated: in-use paragraphs are migrated to other ones of the pages (and/or of the blocks), freeing the at least some of the pages (and/or of the blocks).

In some embodiments, a particular one of the respective paragraphs of a particular one of the pages is freed solely when a chunk count portion of the paragraph status field of the page information table entry (such as paragraph status 725) corresponding to the particular page is decremented to zero. In various embodiments, at least some of the paragraphs store a compressed version of one or more of the chunks. When a particular one of the mapping table entries corresponding to a particular one of the chunks is changed (as when the particular chunk is written to a new one of the paragraphs), paragraph status information of the particular page table entry associated with a previous one of the paragraphs referred to by the particular mapping table entry is examined. A chunk count in the paragraph status information corresponding to the previous paragraph is decremented, and if the chunk count is non-zero, then the previous paragraph is still in use (some other one of the mapping table entries still refers to the previous paragraph). If the chunk count in the paragraph status information is decremented to zero, then the previous paragraph is no longer in use, and is a free one of the paragraphs. In some embodiments, if the previous paragraph is a first one of the respective paragraphs of the corresponding page (and/or block) to be freed, then the corresponding page (and/or block) is added to a list of partially-unused pages (and/or blocks). In some embodiments, if the previous paragraph is the final one of the respective paragraphs of the corresponding page (and/or block) to be freed, then the corresponding page (and/or block) is added to a list of unused but not yet erased pages (and/or block), and, in some embodiments, is removed from the list of partially-unused pages (and/or block).

In some embodiments, the list of unused but not yet erased blocks is processed to remove a particular block at the head of the list, and to issue a request to erase the particular block. In some embodiments, when the particular block is erased, the particular block is added to the list of available blocks. In some embodiments, when the particular block is erased, each page of the particular block is added to the list of available pages. In other embodiments, the list of available pages is never substantially longer than the a number of pages in a block, and the list of available pages is replenished from a list of available blocks (by allocating one of the available blocks and placing pages of the available block on the list of available pages) whenever the list of available pages is empty or nearly empty. For example, if three pages can be allocated at a time, the list of available pages is replenished by adding a block's worth of pages (assuming that there is an available block) whenever there are less than three pages on the list of available pages.

Caching, Write Buffering and Write Coalescing

Figures 8A, 8B:
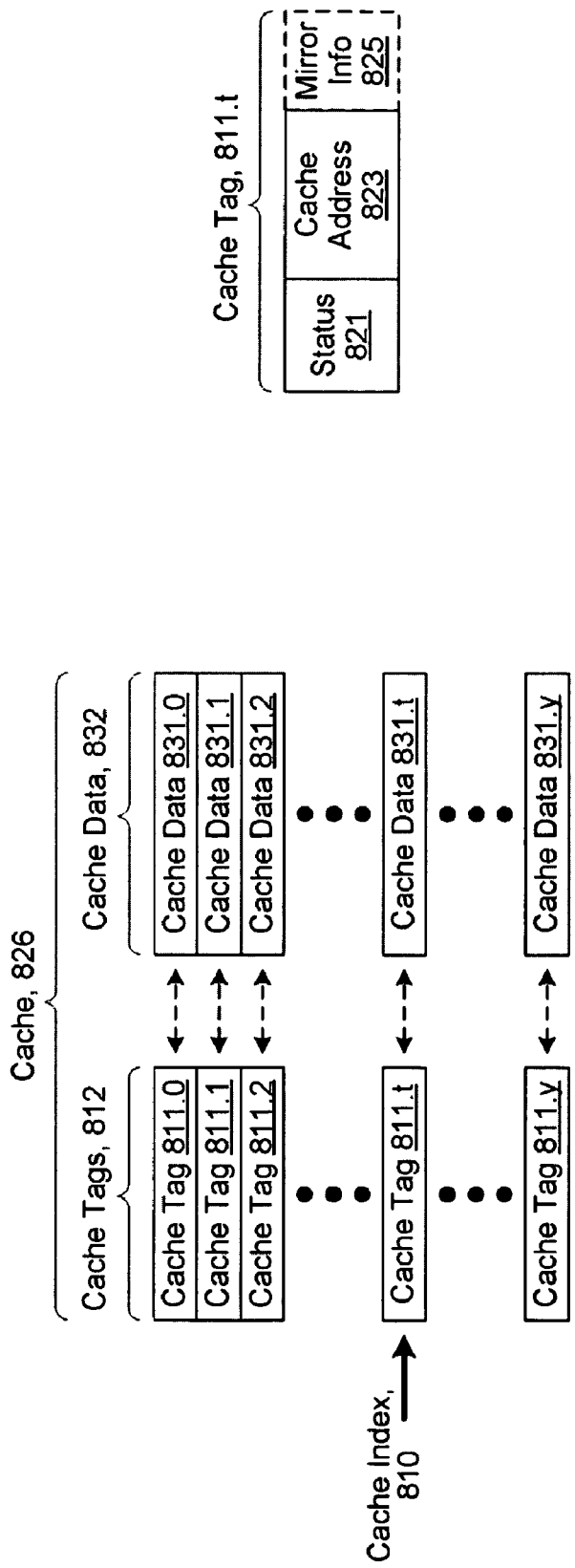
FIG. 8A illustrates an embodiment of a cache.
FIG. 8B illustrates an embodiment of a cache tag.

FIG. 8A illustrates an embodiment of a cache. Cache 826 includes cache tags 812 and cache data 832. Cache tags 812 include a plurality of cache tag entries (811.0 through 811.*y*). Cache data 832 include a plurality of cache data entries (831.0 through 831.*y*). The cache tag entries and the cache data entries have a one-to-one correspondence. The cache data entries are enabled to store a region of data, such as a chunk. In some embodiments, cache 826 resides in a region of the fine-grained memory, such as in cache and/or write buffer 426 as illustrated in FIG. 4A.

Cache 826 is accessed by cache index 810 to select a particular one of the cache tag entries, such as cache tag entry 811.*t*, and to select the corresponding data entry, such as cache data entry 831.*t*, if there is a "hit" in the particular cache tag entry. In some embodiments, cache index 810 is a portion of a node address, such as a portion of a chunk index (for example chunk index 565 in FIG. 5C). In some embodiments, a first portion of a node address is used to select a particular one of the cache tag entries, and a second portion of the node address is compared with a portion of the contents of the particular cache tag entry to determine if the node address "hits" in the cache. If the node address hits, then the cache data entry corresponding to the particular cache tag entry is selected. In some embodiments, a first portion of a node address is used to select a particular set of the cache tag entries, and a second portion of the node address is compared with a portion of the contents of each of cache tag entries of the particular set to determine if the node address "hits" in the cache (by hitting one of the cache tag entries of the particular set). If the node address hits, then the cache data entry corresponding to the hit cache tag entry is selected.

FIG. 8B illustrates an embodiment of a cache tag. According to various embodiments, each of the cache tag entries includes one or more of: a status field (821) providing status of the cache tag entry; a cache address field (823) used to determine, at least in part, if a node address hits the cache tag entry; and information on mirroring of the corresponding cache data entry (825).

In some embodiments, the status field of a particular cache tag entry stores information related to a corresponding cache data entry. According to various embodiments, a state of the status field is optionally and/or selectively one or more of: valid; invalid; allocated; pending read, such as a read from the less-fine-grained memory; pending write, such as a write to the less-fine-grained memory; pending merge, such as a merge from the less-fine-grained memory; pending eviction; least-recently used information; most-recently-used information; a last-access timestamp; a last-modification timestamp; and any combination thereof. In some embodiments, one or more of the states are stored in the status field as one or more separate bits, thus enabling the one or more states to be represented independent of others of the states.

In some embodiments, cache tag entries include information of mirroring status of corresponding cache data entries, such as mirror information 825 in cache tag entry 811.*t*. For example, in some embodiments, each cache tag entry includes information specifying one or more nodes that have a mirrored copy of the corresponding cache data entry.

In some embodiments, a particular one of the nodes include a cache, the cache resident in the fine-grained memory and caching a portion of contents of the less-fine-grained memory. According to various embodiments, the cache is searched for one or more of: all accesses to the less-fine-grained memory; all accesses to a cacheable portion of the node address space; all accesses to a portion of the node address space mapped to a region of the less-fine-grained memory of the particular node; and all accesses to a portion of the node address space mapped to the less-fine-grained memory of any of the nodes. If a read access "hits" in the cache, data is returned from the cache (rather than from the less-fine-grained memory). If a write access "hits" in the cache, data of the write modifies data in the cache (rather than in the less-fine-grained memory).

In some embodiments, if a read access misses (does not hit) in the cache, the read access returns data from the less-fine-grained memory and, in further embodiments, the data is optionally and/or selectively stored in the cache. In some embodiments, if a write access misses (does not hit) in the cache, the write access reads the less-fine-grained memory, the data read from the less-fine-grained memory is stored in the cache, and data of the write access modifies the data in the cache.

According to various embodiments, the cache is organized in a variety of ways, such as one or more of: direct-mapped;

set-associative; fully associative; multi-way set-associative; one-level; two-levels; more than two levels; and having a side cache organized in one of the preceding ways.

According to various embodiments, the cache uses various cache management policies such as one or more of: allocate on read miss; allocate on write miss; write around on write miss; and other cache management policies. According to various embodiments, the cache uses various techniques to select data to be evicted, such as one or more of: least-recently-used information; most-recently-used information; last-access-time timestamps; last-modification-time timestamps; proximity (in a node address space) to other data being evicted; and any of the foregoing applied to a set of data being considered for eviction.

In some embodiments, at least some of the nodes include a write buffer, the write buffer storing pages that are to be written to the less-fine-grained memory. According to various embodiments, the write buffer is resident in one or more of: a memory of a memory sub-system controller, such as a static RAM; and the fine-grained memory (such as in cache and/or write buffer 426 in FIG. 4A). In various embodiments, a page to be written to the less-fine-grained memory is first stored in the write buffer, and writes of pages from the write buffer to the less-fine-grained memory are scheduled in a preferred order. In some embodiments, the write buffer supports snooping, and control logic determines if reads and/or writes of the less-fine-grained memory "hit" in the write buffer. A hit on read returns data from the write buffer. A hit on a write merges data of the write into the write buffer.

Less-Fine-Grained-Memory Organization

FIGS. 9A-9D illustrate embodiments of data structures within pages of a less-fine-grained memory, and within respective paragraphs of each of the pages. As illustrated in FIG. 9A, page 910 includes one or more paragraphs (911 through 919), and a per-page information area (920). As illustrated in FIG. 9C, each of the respective paragraphs, such as paragraph 911, includes a plurality of data items (931 through 939), and a per-paragraph information area (940). In some embodiments, the data items in the respective paragraphs are organized (and accessible) in bytes. In other embodiments, the data items are organized and/or are accessible in other granularities. In some embodiments, individual ones of the data items are readable, but writes are of an entire page. In some embodiments, data items must be erased before the data items are written, and erasing is performed in a granularity of one or more pages, such as a block.

In some embodiments, a page of the less-fine-grained memory includes a power-of-two-sized main portion and a smaller power-of-two-sized extra portion, such as a 2 KB main portion and a 64 B extra portion. A size of the per-page information is selected to be large enough to store page type, mapping, accounting, and other information of the page, but not so large as to consume all of the extra portion, leaving a remainder of the extra portion for the per-paragraph information. In some embodiments, a size of the respective paragraphs of the page is selected to be an even share of the main portion, and an even share of the remainder of the extra portion. In one example, the main portion is 2 KB, the extra portion is 64 B, and the per-page information uses 40 B, leaving 24 B of the extra portion to be shared among the respective paragraphs. If there are four paragraphs in the page, then each of the paragraphs is 512 B+6B=518 B in size. In some embodiments, the storage of the respective paragraphs within the page is contiguous, even though the respective paragraphs consume a share of the extra portion. Continuing the previous example, a first one of the four paragraphs is stored at bytes 0-517 of the page, a second one of the four paragraphs is stored at bytes 518-1035 of the page, a third one of the four paragraphs is stored at bytes 1036-1553 of the page, a fourth one of the four paragraphs is stored at bytes 1554-2071 of the page, and the per-page information is at bytes 2072-2111 of the page. In some embodiments, the per-paragraph information is stored at the end of each paragraph, and for at least one of the paragraphs, the per-paragraph information is stored adjacent to the per-page information. In various embodiments, any of the respective paragraphs and/or the per-page information is independently readable. In further embodiments, the entire page is read starting with any one of the respective paragraphs and/or the per-page information.

According to various embodiments, per-page information of a particular page, such as per-page information 920, includes one or more of: a page type (951); mapping information (953), accounting information (955), an error detecting and/or error correcting code (957) protecting the per-page information, and a vertical error detecting and/or error correcting code (959) protecting contents of the particular page. In some embodiments, the per-page information error detecting code is a CRC. In some embodiments, the vertical error detecting code is a CRC. In some embodiments, some or all of the per-page information of the particular page is stored and/or is redundantly stored in the page table entry corresponding to the particular page.

In some embodiments, the page type field of the per-page information stores information related to a type of the particular page. According to various embodiments, the type is optionally and/or selectively one or more of: available (erased); in use; invalid; bad (e.g., an uncorrectable error in the particular page); an indication of a region of a node address space containing the particular page; an indication that the particular page is part of a stream of sequential writes; a type of compression algorithm and/or information specifying dictionaries used in compression of the particular page; reserved for future use; and any combination thereof. In some embodiments, one or more of the types are stored in the type field as one or more separate bits, thus enabling the one or more types to be represented independent of others of the types.

According to various embodiments, per-paragraph information of a particular paragraph, such as per-paragraph information 940, includes one or more of: a paragraph type (971); size information (973); low-order address bit information (975) (also called the low-bits field); an epoch field (977); and a per-paragraph error detecting and/or error correcting code (979) protecting contents of the particular paragraph. In some embodiments, the per-paragraph error detecting code is a CRC.

In some embodiments, the paragraph type field of the per-paragraph information stores information related to a type of the particular paragraph. According to various embodiments, the type is optionally and/or selectively one or more of: valid; invalid; unused; uncompressed; compressed; compressed start; compressed continue; compressed end; a type of compression algorithm and/or information specifying dictionaries used in compression of the particular paragraph; reserved for future use; and any combination thereof. In some embodiments, one or more of the types are stored in the type field as one or more separate bits, thus enabling the one or more types to be represented independent of others of the types.

The size information 973 and the low-order address bit information 975, stored in the per-paragraph information, are used, at least in part, to support management of compressed data stored in paragraphs. At least some paragraphs storing compressed data, such as a particular paragraph with a paragraph type of compressed end, are not full and are correctly uncompressed by knowing where valid data ends. In some embodiments, size information 973 is used in conjunction with paragraph type 971 to determine an amount of data in a particular paragraph to decompress. In various embodiments, size information 973 has sufficient bits to store a number in a range from 1 to one less than a maximum amount of data in the particular paragraph. In a first example, a paragraph with a paragraph type of compressed start is a full paragraph, and the entire paragraph is decompressed. In a second example, a paragraph with a paragraph type of compressed end is not a full paragraph, and a portion of the paragraph from a first one of the data items of the paragraph through a number of the data items of the paragraph specified by the size information is decompressed. In some embodiments, the low-order address bit information of a particular paragraph is stored as a portion of a node address in mapping information associated with the particular paragraph, such as in mapping entry 1 1011 (illustrated in FIG. 10B). In other embodiments, the mapping information does not include the low-order address bit information, and the low-order address bit information is stored in the per-paragraph information.

In some embodiments, each paragraph has associated epoch information stored in epoch field 971. In some embodiments, epoch field 1071 (in FIG. 10C) stores epoch information associated with a particular page including the epoch field. In other embodiments, epoch field 1071 includes independent epoch information for each paragraph of the particular page. Storing epoch information for each of the paragraphs in a particular page in the respective per-page information, rather than (and/or in addition to) in the respective per-paragraph information, enables the epoch information for each paragraph of the particular page to be determined by reading the respective per-page information, which also provides the mapping information. In some embodiments, this advantageously speeds up initialization of the map(s) (and other tables).

In some embodiments, when a particular paragraph is read in response to an access for a chunk at a particular address, low-order address bits stored in the particular paragraph are used, at least in part, to determine where the chunk is within compressed data contents of the particular paragraph. For example, if lower-order bits of the particular address match low-order address bit information 975, then the chunk is a first chunk in the particular paragraph. If the lower-order bits of the particular address do not match low-order address bit information 975, then the chunk is a subsequent chunk in the particular paragraph, and a difference between the lower-order bits of the particular address and the low-order address bit information determines a location of the chunk in an uncompressed version of the compressed data contents of the particular paragraph.

Figure 10C:
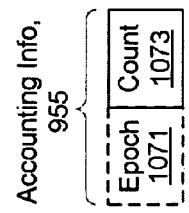
FIGS. 10A-10C illustrate embodiments of data structures within a page and within a paragraph.
Figure 10A:
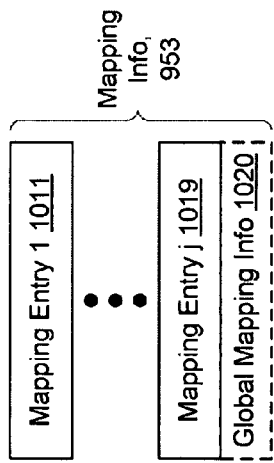
Figure 10B:
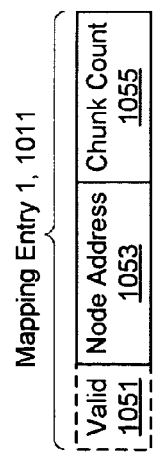

FIGS. 10A-10C illustrate embodiments of data structures within one of the pages and within one of the paragraphs. In some embodiments, not all of the pages (and/or not all of the paragraphs) use same data structures. In a first example, a page type field of a particular page determines a format of data structures used in the particular page. In a second example, a paragraph type field of a particular paragraph determines a format of data structures used in the particular paragraph.

As illustrated in FIG. 10A, mapping information 953 (also illustrated in FIG. 9B) includes one or more mapping entries (1011 through 1019), and optionally global mapping information 1020. In some embodiments, global mapping information 1020 provides an association, such as a map identifier, between one of a plurality of maps and the one or more mapping entries. In other embodiments, each of the mapping entries includes a respective map identifier. In various embodiments, including one or more map identifiers in mapping information 953 enables building an initial version of the corresponding one or more maps from the mapping information at initialization time.

As illustrated in FIG. 10B, each of the mapping entries, such as mapping entry 1 1011, includes: a valid indication (1051), a portion of a node address, such as a chunk index (for example chunk index 565 in FIG. 5C); and a chunk count (1055). Each of the mapping entries corresponds to a respective paragraph of a page containing the mapping information. In some embodiments, some or all of the per-paragraph information and/or of the mapping information of the respective paragraph is stored and/or is redundantly stored in the corresponding mapping table entry.

In some embodiments, mapping information 953 stores different information, depending on the page type field. For example, in some embodiments, a page used to store a portion of a stream of sequential writes does not map individual paragraphs within the page, and at least some of the mapping entries are used to store one or more of: a forward link (as a physical address) to a next page in the stream of sequential writes; a backward link (as a physical address) to a previous page in the stream of sequential writes; and an identifier of the stream of sequential writes.

In some embodiments, valid indication 1051 is a single bit indicating that the mapping entry is either valid or is not valid. In other embodiments a separate valid bit is not used, and a valid indication is provided by a value of the chunk count. For example, a zero chunk count corresponds to an invalid indication, and a non-zero chunk count corresponds to a valid indication. For a particular one of the mapping entries, the valid indication is used to indicate whether the mapping entry is valid (and thus whether the respective paragraph contains data). For example, in some usage scenarios, a particular page is written with less than all paragraphs of the particular page filled, and mapping entries having respective unfilled paragraphs do not have a valid indication.

In some embodiments, the chunk count and the node address are used when building the map(s) at initialization. Providing the node address in each of the mapping entries enables pages of the less-fine-grained memory to make up a reverse map accessed by physical addresses, and containing (in the mapping entries of each of the pages) the corresponding node addresses of each paragraph of the pages. The chunk count is used, at least in part, to support management of compressed data stored in paragraphs. In various embodiments, when initially building the map(s), the chunk count of a particular one of the map entries, if greater than one, indicates that the respective paragraph stores a number of chunks equal to the chunk count and requires a corresponding number of sequential mapping table entries in the map(s). In some embodiments, information in the respective paragraph provides a respective node address of each of one or more chunks stored in the respective paragraph, and mapping table entries corresponding to each of the chunks are used. In some embodiments, the chunk count is used to encode other information. For example, in some embodiments, a chunk count of all ones indicates that the respective paragraph is compressed in a different fashion. Data of the respective paragraph is then used to indicate a type of compression of the respective paragraph.

In some embodiments, accounting information 955 (part of per-page information 920) includes one or more of: an epoch field (1071); and a count field (1073). The count field is used to store a number of times that the particular page containing the accounting information has been written and/or erased. In some embodiments, each time that a particular page is written, the count field stored in the particular page is incremented. In other embodiments, each time that a particular page is written, the count field is written with a count of a number of times the particular page has been erased.

In some embodiments, the epoch field (1071) in the accounting information is used, at least in part, to build an initial version of the map(s) at an initialization time. This is described further in the section "MAP, PAGE INFORMATION TABLE, AND BLOCK INFORMATION TABLE INITIALIZATION" below.

Map, Page Information Table, and Block Information Table Initialization

In some embodiments, one or more of the map(s), the page information table, and the block information table is constructed at system initialization by reading information stored in extra space of each of a plurality of pages in the less-fine-grained memory. In various embodiments, solely the extra space of each page is read as part of the initialization process. In further embodiments, solely a portion of the extra space of each page, such as a portion including per-page information, is read as part of the initialization process. In other embodiments, depending on contents of the extra space of a particular one of the pages, other portions of the particular page are read.

In some embodiments, per-page information of each page includes mapping information (such as mapping information 953 as illustrated in FIG. 9B), the mapping information specifying one or more addresses in a node address space. In various embodiments, each of the one or more node addresses corresponds to one of the respective paragraphs of the page. In some embodiments, the map(s) are initially constructed by using at least a portion of the one or more node addresses as indices of table entries of the map(s), and using the physical addresses of the paragraphs (the physical address of the corresponding page containing the paragraphs and the paragraph IDs) and the correspondence between the one or more node addresses and the paragraphs of the particular page to, at least in part, construct the contents of one or more corresponding mapping table entries. In some embodiments, page type information in the per-page information of each page is also used.

In some embodiments, a page information table and/or a block information table are initially constructed substantially in parallel with the construction of the map(s), using the per-page information to construct a page information table entry for each page, and using the per-page information to provide a portion of a block information table entry for each corresponding block.

In some embodiments, erased pages are detected by determining that contents of the per-page information of a page correspond to an erased state, such as all zeroes or all ones. In various embodiments, an error detection code and/or an error correction code is used to protect the per-page information, and the error detection code and/or the error correction code is chosen such that the erased state corresponds to an uncorrectable error.

In some embodiments, zero or more pages are in an unused but not yet erased state. The mapping information of a particular unused but not yet erased page is optionally stale, in that the particular page went unused because one or more mapping table entries previously referring to the respective paragraphs of the particular page were changed to refer to corresponding new paragraphs (containing newer contents of data previously in the respective paragraphs of the particular page). (This issue also occurs with an in-use page in that a particular paragraph of the in-use page is allocated to a new paragraph when a chunk corresponding to the particular paragraph is written, leaving an unused paragraph in the in-use page.) In some usage scenarios, a node failure, such as a system crash or a power outage, potentially results in one (or more) of the paragraphs of the particular page and one (or more) of the new paragraphs having mapping information with a same node address, which causes the initial map construction procedure described above to write a same table entry of the map(s) with two different contents (corresponding to one of the respective paragraphs of the particular page and one of the new paragraphs). In some embodiments, to resolve such ambiguities, the per-page information and/or the per-paragraph information includes a per-paragraph epoch field (such as epoch field 727 in FIG. 7B, or epoch field 977 in FIG. 9D). Whenever a page is written, the respective epoch fields in the per-paragraph information of paragraphs of the page are modularly incremented (compared to a respective previous value of the respective epoch fields corresponding to previous contents of the paragraphs). For example, a value of the epoch field in the per-paragraph information of one of the new paragraphs is modularly one more than a value of the epoch field in the per-page information of the corresponding one of the respective paragraphs of the particular page. The initial map construction detects a subsequent write to a same entry, and uses the epoch information to disambiguate which one of multiple paragraphs attempting to write to the entry is most recent, thus enabling unused but not yet erased paragraphs to be detected.

According to various embodiments, a copy of the epoch field of a particular paragraph of a particular page is stored in one or more of: mapping table entries referring to the particular paragraph; the page information table entry of the particular page; per-page information stored in the particular page; and per-paragraph information stored in the particular page. In some embodiments, epoch fields in the per-page information and in the page information table are used to initially construct the map(s) and/or the page information table and/or the block information table. In some embodiments, epoch fields in the per-paragraph information and in the map(s) are used to initially construct the map(s) and/or the page information table and/or the block information table.

When initially constructing the map(s), if a subsequent write operation to an already initialized mapping table entry is detected, a value of the epoch field associated with current contents of the mapping table entry is determined and is compared with a value of the epoch field associated with the subsequent write operation. If the value of the epoch field of the subsequent write operation has a larger (in modular arithmetic) value than the value of the epoch field associated with the current contents, the subsequent write operation is allowed to proceed (and to over-write the current contents). (If the epoch field of a particular paragraph is solely stored in the particular page containing the particular paragraph, such as in a per-paragraph epoch field, the epoch field of the particular paragraph is determined, in some embodiments, by reading the mapping table entry that the subsequent write operation is attempting to write to determine the physical address of the particular page, and then reading the per-paragraph epoch field in the particular page. Similarly, the epoch field of a particular paragraph is, in some embodiments, retrieved from the page table entry corresponding to the particular page.)

In some embodiments, since the epoch field is of a fixed size, such as eight bits or sixteen bits, a number of previous versions of a particular paragraph that exceeds half of a range of the epoch field creates more extant values of the epoch field than are able to be disambiguated. Accordingly, a number of unused but not yet erased versions of a particular paragraph is kept less than or equal to half of the range of the epoch field, such as by periodic policing of all mapable paragraphs to determine unused paragraphs, and to ensure that pages containing the unused paragraphs are erased. In some embodiments, a list of partially-unused pages (and/or blocks) is maintained, and the policing considers only pages (and/or blocks) on the list of partially-unused pages (and/or blocks).

In some embodiments, each of the mapping table entries includes two versions of the epoch field an initial and/or last-policed version, and a current version. In response to writing a particular chunk corresponding to a particular mapping table entry to the less-fine-grained memory, a current version of the epoch field in the particular mapping table entry is incremented, and if the current version is more than a specifiable threshold away from an initial and/or last-policed version of the epoch field in the particular mapping table entry, then policing is initiated. After the policing has begun and/or after the policing completes, the initial and/or last-policed version of the epoch field in policed mapping table entries is made equal to the corresponding current version (or, in some embodiments, is incremented by a specified amount, or by an amount corresponding to values of epoch fields in paragraphs that were policed). In some embodiments, the policing polices only respective paragraphs of pages (and/or of blocks) in a list of partially unused pages (and/or blocks).

Figure 14:
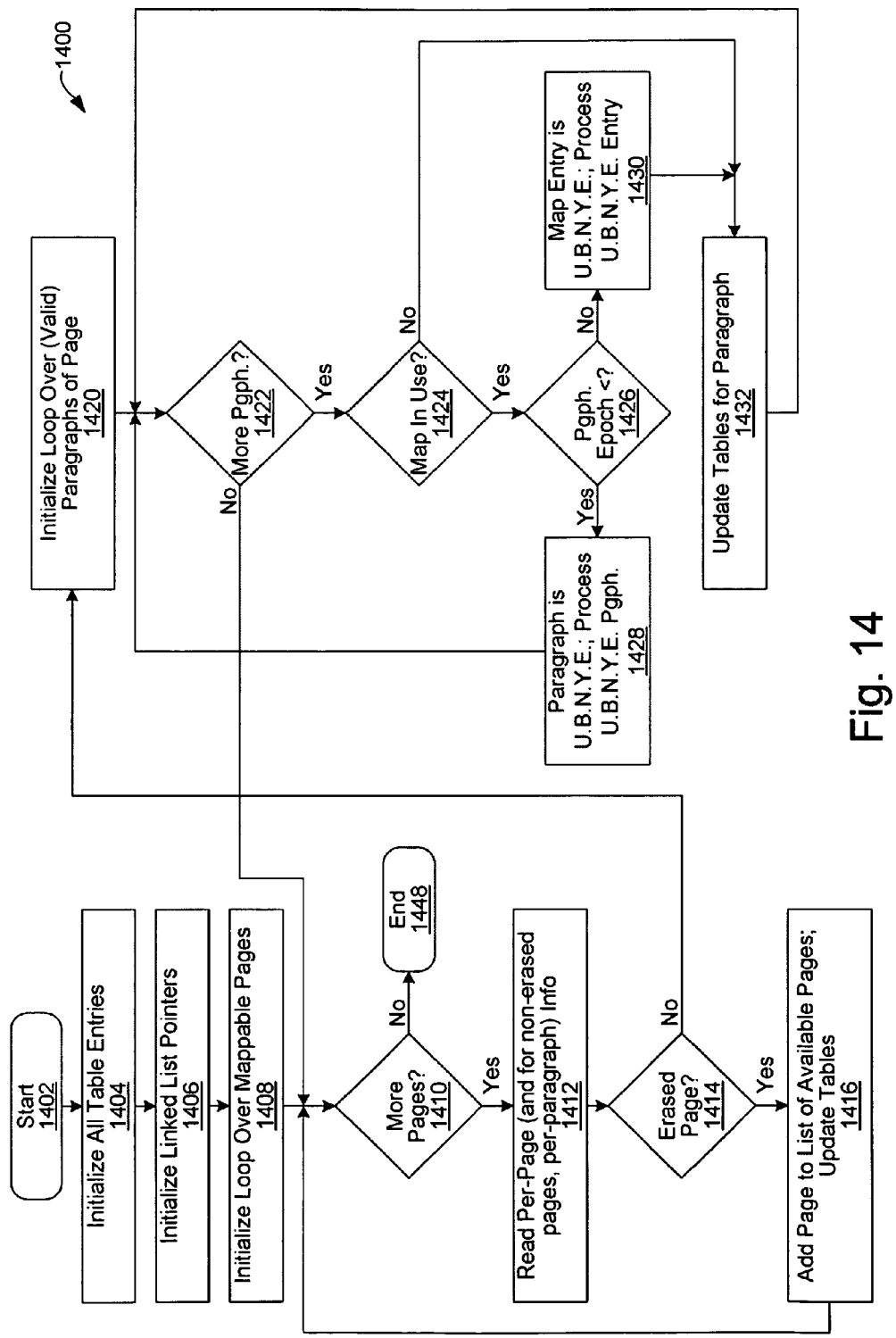
FIG. 14 illustrates an embodiment of a process for initializing tables using mapping information stored in each mapable page of a less-fine-grained memory.

In some embodiments (as illustrated in FIG. 14), the following functions are performed, not necessarily in the order shown, to initially construct a particular one of the map(s) and/or the page information table and/or the block information table:

Initialize all table entries of the particular map, the page information table, and the block information table such that a status field of each entry indicates that the entry is invalid (1404).

Initialize linked list head pointers to NULL for one or more of: a linked list of available pages, a link list of unused but not yet erased pages, a doubly-linked list of partially-unused pages (and/or of blocks), a linked list of available blocks, and a linked list of unused but not yet erased blocks (1406).

For each page in a mapable portion of the less-fine-grained memory (1408, 1410 "Yes"), read per-page information of the page, and read per-paragraph epoch fields of the page (if the per-paragraph epoch fields are stored separately from the per-page information) (1412).

Determine if the page is an erased page (1414 "Yes"). If the page is an erased page, then (1416):

Verify that the page information table entry for the page is not initialized, and write status of the entry to indicate that this is an erased page.

Add the page to the linked list of available pages (using the link field of the page information table entry).

If the block information table entry for the block containing the page is not initialized, then write status of the entry to indicate that the block contains an erased page, and update page status of the block to indicate that this particular page of the block is erased (or, in some embodiments, update paragraph status of the block to indicate that all paragraphs of this particular page of the block are erased).

If the block information table entry for the block containing the page is initialized, then write status of the entry to indicate that the block contains an erased page, and update page status of the block to indicate that this particular page of the block is erased (or, in some embodiments, update paragraph status of the block to indicate that all paragraphs of this particular page of the block are erased). If all pages (or all paragraphs) of the block are erased, then add the block to the linked list of available blocks (using the link field of the block information table entry).

Proceed to process the next page.

If the page is not an erased page (1414 "No"), read the per-page information of the page and the per-paragraph epoch fields of the page (if the per-paragraph epoch fields are stored separately), and use mapping information in the per-page information to determine the mapping table entries for each paragraph of the page. (The mapping information includes a node address for each valid paragraph in the page, and the node address corresponds to the mapping table entry for the each valid paragraph.) For each of the paragraphs (1420, 1422 "Yes"), if the mapping table entry is already initialized (1424 "Yes"), then:

Compare the epoch field associated with the already initialized mapping table entry and the epoch field of the paragraph (1426). If the epoch field of the paragraph is smaller (1426 "Yes"), then the paragraph is an unused but not yet erased paragraph.

If the epoch field of the paragraph is larger (1426 "No"), then the already initialized mapping table entry corresponds to an unused but not yet erased paragraph.

Process the unused but not yet erased paragraph (1428 or 1430) by setting the paragraph status field of a particular one of the page information table entries associated with the corresponding page of the unused but not yet erased paragraph to indicate the unused but not yet erased status of the unused but not yet erased paragraph. If all paragraphs of the corresponding page have a paragraph status of unused but not yet erased, then the corresponding page is unused but not yet erased. If the corresponding page is unused but not yet erased, add the corresponding page to the linked list of unused but not yet erased pages. (The block information table is processed in a similar fashion to the page information table, either on a per-paragraph basis, or on a per-page basis, according to various embodiments.)

If the mapping table entry is not already initialized (1424 "No"), or if the epoch field of the paragraph is larger (1426 "No"), then (1432):

Set the paragraph status field of a particular one of the page information table entries associated with the page to indicate the in-use status of the paragraph. Also, in some embodiments, set page status of the particular page information table entry to indicate this is an in-use page. In various embodiments, such as where paragraphs store compressed data, a chunk count field from the mapping information and/or a low-bits field from the per-paragraph information are copied to the paragraph status field of the particular page information table entry.

Write the mapping table entry associated with the paragraph to contain the physical address of the paragraph. In some embodiments, other information in the mapping table entry is set, such as an epoch field. (In some embodiments, such as where paragraphs store compressed data, the chunk count field specifies a number of mapping table entries that are written in a similar fashion.)

Write status of a particular one of the block information table entries corresponding to the page to indicate that the block contains an in-use paragraph, and write paragraph status of the block information table entry for the paragraph to indicate the paragraph is in-use.

In some embodiments, if the mapping information and/or the paragraph status (in the per-page information) for any of the paragraphs of the page (and/or of the block) indicates that at least one of the paragraphs is not in-use (not valid), or if any of the paragraphs is detected as an unused but not yet erased paragraph using the respective epoch field information of the paragraph, then add the page (and/or the block) to the list of partially-unused pages (and/or blocks).

Proceed to process the next page.

In some embodiments, after all of the pages in the mapable portion of the less-fine-grained memory have been processed, perform an initial policing of the list of partially-unused pages (and/or blocks) to reallocate at least some of the pages (and/or the blocks) on the list of partially-unused pages (and/or blocks) to decrease fragmentation of the less-fine-grained memory.

In some embodiments, after all of the pages in the mapable portion of the less-fine-grained memory have been processed (1410 "No", 1448), chunk counts in the paragraph status fields of the page information table entries are rectified. At least some of the chunk counts are optionally out of date because the chunk counts are copied from mapping information in the per-page information of the pages in the less-fine-grained memory, and subsequent to writing a particular page including a paragraph having compressed data (and thus having a chunk count field larger than one), modification of a particular one of the chunks in the compressed data reallocates the particular chunk to a different paragraph in the less-fine-grained memory. To rectify the chunk counts in the paragraph status fields of the page information table entries, all of the table entries in the particular map are examined. In some embodiments, type and/or status information in each of the mapping table entries indicates if the corresponding chunk is stored in a compressed form, and only mapping table entries having corresponding compressed chunks are considered. For a particular one of the mapping table entries being examined, the particular mapping table entry includes a physical address referring to a particular one of the respective paragraphs in a particular one of the pages, the particular page associated with a particular one of the page table entries. The paragraph status field of the particular page table entry includes a chunk count field and optionally a low-bits field. Using the low-bits field, or in some embodiments by examining sufficient mapping table entries around the particular entry, a number of nearby (within a range of a maximum number of contiguous chunks that are compressed as a unit) mapping table entries corresponding to chunks still stored in the particular paragraph is determined, and the chunk count of the particular page table entry is adjusted accordingly.

Policing, Fragmentation, and Coalescing

In some embodiments, as paragraphs are written to available pages (or available blocks), some pages (or some blocks) contain old versions of paragraphs that are no longer in use. The map(s) are not able to track unused paragraphs since the map(s) are based upon chunks (or on objects) and node addresses (or keys), not paragraphs and physical addresses, and the map(s) refer to the most recent paragraph associated with a particular chunk (or a particular object). In some embodiments, a linked list of available (unused) paragraphs is maintained, and the list is monitored by hardware (such as a state machine) or by software (such as on a control processor or on one of the respective processors). When multiple paragraphs of a particular page (or a particular block) are on the list, other (still in use) paragraphs of the particular page (or the particular block) are migrated to an available page (or an available block), and the particular page (or the particular block) is added to the list of unused but not yet erased pages (or the list of unused but not yet erased blocks).

In some embodiments, a list of partially-unused pages (and/or blocks) is maintained, and the list is policed (monitored) by hardware (such as a state machine) or by software (such as on a control processor or on one of the respective processors). For example, once a day, all of the pages (and/or of the blocks) on the list of partially-unused pages (and/or blocks) are examined, and at least some of the pages (and/or of the blocks) are reallocated using one or more reallocate requests, thus freeing up the at least some of the pages (and/or of the blocks) and enabling the at least some of the pages (and/or of the blocks) to be added to the list of unused but not yet erased pages (and/or blocks). According to various embodiments, the list of partially-unused pages (and/or blocks) is policed one or more of: once an hour; once a day; whenever utilization of the less-fine-grained memory falls below a threshold; whenever a particular chunk is written to a paragraph with an epoch field value more than a specified threshold away from an initial and/or last-policed value of the epoch field of the particular chunk; under user control; and any combination of the foregoing.

In some embodiments, policing reallocates paragraphs to maintain epoch fields of particular unused but not yet erased paragraphs within a specified range of the epoch field associated with a particular chunk. In some embodiments, when policing accesses a particular unused but not yet erased paragraph, the particular epoch field stored in the per-paragraph information of the particular paragraph is compared with an initial epoch field stored in a mapping table entry corresponding to a node address in mapping information in per-page information of the corresponding page of the particular paragraph. If the particular epoch field is within a specified amount of the initial epoch field, then all in-use paragraphs of the corresponding block of the particular paragraph are reallocated (to new paragraphs), and the corresponding block is erased (and is added to a list of available blocks). Subsequent to the policing, the initial epoch field is incremented by the specified amount. In some embodiments, status of mapping table entries and/or of page table entries and/or of block table entries affected by policing indicates a pending policing state during at least a portion of a period when policing is operating.

In some embodiments, software executing on a control processor, such as control processor 359 in FIG. 3B, or on one of the respective processors, periodically polices at least some pages (or at least some blocks) in the less-fine-grained memory, such as at least all pages (or at least all blocks) in a general software access region, by reading the at least some pages (or the at least some blocks) and performing management activities on the at least some pages (or the at least some blocks). In some embodiments, policing is initiated at least once a day. According to various embodiments, policing is initiated one or more of: periodically; in response to detection that a current version of an epoch field in a mapping table entry has been incremented more than a specified amount (as compared to an initial and/or last-policed version of the epoch field in the mapping table entry); in response to detection of an event, such as an ECC or CRC error, or a decrease in an amount of the less-fine-grained memory available for writing (such as an unused and erased portion of the less-fine-grained memory); and other similar reasons. In various embodiments, the policing checks for latent errors in the at least some pages (or the at least some blocks, or at least some sub-pages) by reading contents of the at least some pages (or the at least some blocks, or the at least some sub-pages) and determining if an error is detected. In some embodiments, the policing checks for fragmented pages (or fragmented blocks), and reallocates contents of the at least some pages (or the at least some blocks) to decrease fragmentation of the less-fine-grained memory. In some embodiments, contents of a particular one of the at least some pages (or the at least some blocks) are reallocated using a reallocate request. In some usage scenarios, a reallocate request is used when a particular page (or a particular block) has one or more unused paragraphs. By reallocating used paragraphs in the particular page (or the particular block) to other pages (or other blocks), the particular page (or the particular block) becomes unused and is added to the list of unused but not yet erased pages (or blocks).

Figure 16:
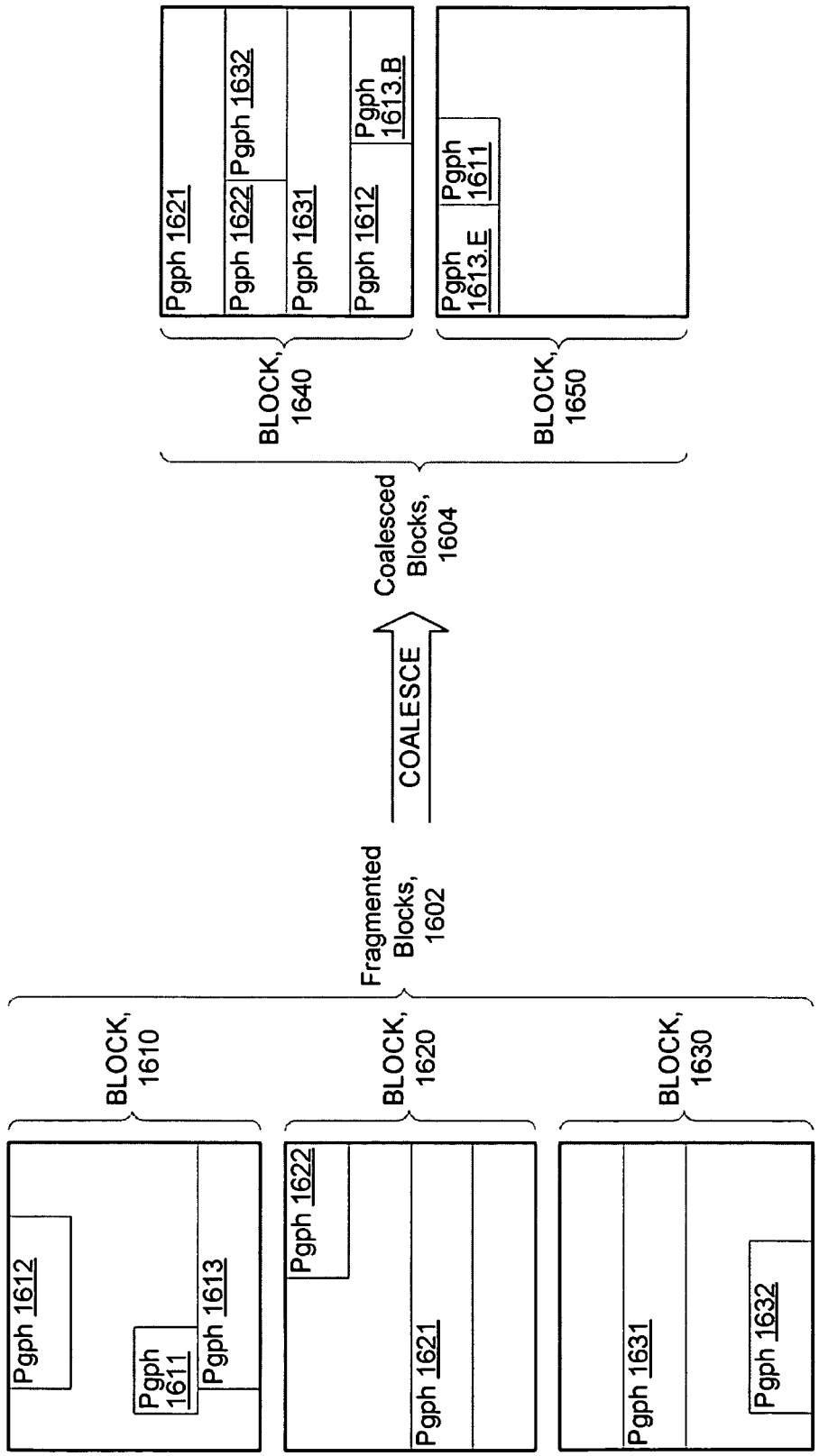
FIG. 16 illustrates an example of coalescing fragmented blocks.

FIG. 16 illustrates an example of coalescing fragmented blocks. In some embodiments, coalescing of fragmented portions of the less-fine-grained memory (also called defragmentation of the less-fine-grained memory) is performed on a block basis, as blocks are an independently erasable region (and freeing up a page of a block does not necessarily free up the entire block containing the page). As illustrated in FIG. 16, fragmented blocks 1602 contains blocks 1610, 1620, and 1630. Block 1610 has three remaining in-use paragraphs (1611, 1612, and 1613). Block 1620 has two remaining in-use paragraphs (1621, and 1622). Block 1630 has two remaining in-use paragraphs (1631, and 1632). The paragraphs are optionally variable in size, and each of the fragmented blocks has unused space (not in any of the in-use paragraphs).

Continuing in FIG. 16, coalesced blocks 1604 contains blocks 1640 and 1650. The in-use paragraphs of the fragmented blocks are relocated (such as by reading the paragraphs from the fragmented blocks and writing the paragraphs to the coalesced blocks), optionally and/or selectively without any unused space in the coalesced blocks. As illustrated in FIG. 16, paragraph 1613 is relocated from block 1610, and is divided into two paragraphs 1613.B in block 1640, and 1613.E in block 1650. In other embodiments, paragraph 1613 is not divided and is relocated solely in block 1650, leaving unused space in block 1640. Of course, FIG. 16 illustrates just one example of a way in which paragraphs are relocated, and there are many ways of performing the relocation and determining which paragraphs to relocate in what order, such as greedy algorithms, bin packing algorithms, heuristic algorithms, and other types of algorithms for relocating data and removing unused space.

In various embodiments, coalescing of fragmented blocks in the less-fine-grained memory is done by software running on the respective processors of the particular one of the nodes having the memory sub-system containing the less-fine-grained memory. In some embodiments, when fragmented blocks of the less-fine-grained memory are coalesced, paragraphs that are relocated are also remapped, such as by updating entries in the respective local map data structure of a node address space that associates elements of the node address space with ones of the relocated paragraphs.

FIG. 17 illustrates an embodiment of a flow for writing data to the respective less-fine-grained memory of a particular one of the nodes. In some embodiments and/or usage scenarios, data is written to less-fine-grained memory 128 in a form of paragraphs (paragraphs 1755 and/or paragraphs 1765) via one or more write buffers (write buffer(s) 1770). The write buffers accumulate the paragraphs into pages and/or blocks, and write the less-fine-grained memory in pages (pages 1775). According to various embodiments, write buffer(s) 1770 are organized in a variety of ways, such as per shard or per container or depending on a source of the paragraphs, and the paragraphs are accumulated in respective ones of the write buffers.

Paragraphs 1755 are provided via new writes 1750, representing writing of the less-fine-grained memory by one or more applications or other sources of write data. In some embodiments and/or usage scenarios, the new writes are modifications of existing elements stored in the less-fine-grained memory, and re-writing the existing elements includes remapping the existing elements to a new location in the less-fine-grained memory. In various embodiments, the new writes are organized in a same way as a respective one of the write buffer(s), such as per shard. In other embodiments, the new writes are organized in another manner, such as per container, and write buffers) 1770 are enabled to determine an appropriate one of the write buffer(s) for each of paragraphs 1755.

Paragraphs 1765 are provided via coalescing processing 1760, representing writing of the less-fine-grained memory due to coalescing of fragmented blocks (or movement of blocks or portions thereof for wear leveling or other reasons), such as by one or more threads performing coalescing (such as illustrated in FIG. 16). (The threads are, for example, software threads executing on the respective processors of the particular node.) In various embodiments, the coalescing writes are organized in a same way as a respective one of the write buffers), such as per shard. In other embodiments, the coalescing writes are organized in another manner, such as per container, and write buffer(s) 1770 are enabled to determine an appropriate one of the write buffer(s) for each of paragraphs 1765. In some embodiments, coalescing selection 1762, such as one or more coalescing selection threads, determines ones of the blocks of the less-fine-grained memory (blocks 1764) dial are to be coalesced by coalescing processing 1760.

The paragraphs to be written to the less-fine-grained memory (paragraphs 1755 and/or paragraphs 1765) are copied into write buffer(s) 1770. The write buffer(s) use one or more lists of free units, such as blocks, of the write buffer (free write buffer list(s) 1782) to manage (such as allocating and freeing) space in the write buffer(s). In various embodiments, the free write buffer list(s) are organized in a same way as a respective one of the write buffer(s). In other embodiments, the free write buffer list(s) are organized in another manner, such as per container, and write buffer(s) 1770 are enabled to determine an appropriate one of the free write buffer list(s) from which to allocate a unit (write buffer units 1784). In various embodiments, the write buffer(s) use one or more free lists of blocks of the less-fine-grained memory (free less-fine-grained memory list(s) 1786) to manage (such as allocating) blocks of the less-fine-grained memory into which pages 1775 are written. In further embodiments, the free list(s) of blocks of the less-fine-grained memory are filled by erase processing 1790, representing erasing of unused but not yet erased blocks of the less-fine-grained memory, such as by one or more erasing threads. In various embodiments, the free list(s) of blocks of the less-fine-grained memory are organized in a same way as a respective one of the write buffer(s), such as per shard. In other embodiments, the free list(s) of blocks of the less-fine-grained memory are organized in another manner, such as per container or based on factors such as wear of the blocks, and write buffer(s) 1770 are enabled to determine an appropriate one of the free list(s) of blocks of the less-fine-grained memory from which to allocate a block (less-fine-grained memory blocks 1788).

According to various embodiments, the free write buffer list(s) and/or the free list(s) of blocks of the less-fine-grained memory are stored in whole or in part in one or more of: the less-fine-grained memory, such in a linked list; the fine-grained memory, such in a table; a battery backed-up portion of the fine-grained memory; the respective processor memory of the particular node; and any other memory in the particular node.

Of course. FIG. 17 illustrates only some of the many possible embodiments of a flow for writing data to a less-fine-grained memory. For example, in various embodiments, the organization of the write buffer(s) or the free list(s) is different. In another example, in various embodiments, a way in which paragraphs are provided to the write buffer(s) is different, such as by treating coalescing processing as one of the applications generating the new writes.

Write Buffer

In some embodiments, a preservable portion of the fine-grained memory of a particular one of the nodes (such as some or all of fine-grained memory 124 as illustrated in FIG. 3C) is at least temporarily non-volatile. According to various embodiments, the preservable portion of the fine-grained memory is one or more of: non-volatile; temporarily non-volatile; and selectively powered, such as in the event of a power disruption, by a battery backup (such as battery back-up 125 as illustrated in FIG. 1D). Software, such as software executing on the respective processors of the particular node, is enabled to use the preservable portion of the fine-grained memory as non-volatile storage for any purposes for which non-volatile storage is used. For example, in some usage scenarios, the preservable portion of the fine-grained memory is used to store frequently written data that is required to be non-volatile.

In some embodiments, the preservable portion of the fine-grained memory serves, at least in part, as storage for information used in recovery from a power disruption. For example, software uses the preservable portion of the fine-grained memory to store system configuration information that is used during recovery from the power disruption. Continuing the example, the system configuration information includes one or more of: node configuration information; container configuration information; container replication information; hot stand-by information; node interconnection topology; and other system configuration information.

In some embodiments, the preservable portion of the fine-grained memory serves, at least in part, as at least a portion of one or more write buffers (such as write buffer 374 as illustrated in FIG. 3C or write buffer(s) 1770 as illustrated in FIG. 17) for the respective less-fine-grained memory of the particular node. According to various embodiments, the write buffer is managed by one or more of: software, such as software executing on the respective processors of the particular node; hardware, such as the respective memory sub-system controller of the particular node (for example, memory sub-system controller 112 as illustrated in FIG. 3C or FIG. 3D); and any combination of the foregoing. In some embodiments, the write buffer is organized and/or managed in units (such as sequential and/or aligned regions of the fine-grained memory). According to various embodiments, the units of the write buffer are one or more of: pages (such as pages of a same size as a page of the less-fine-grained memory); blocks (such as blocks of a same size as a block of the less-fine-grained memory); logical pages (such as logical pages that are a multiple, including one, of a size of a page of the less-fine-grained memory); logical blocks (such as logical blocks that are a multiple, including one, of a size of a block of the less-fine-grained memory); and other sizes suitable for organizing and/or managing the write buffer. In some embodiments where the units of the write buffer are at least as large as the size of a page of the less-fine-grained memory, the units of the write buffer are sub-divided into pages, and management of the units of the write buffer optionally and/or selectively performs some operations on a page basis. For example, a particular one of the units of the write buffer is the size of a block of the less-fine-grained memory, and the particular unit of the write buffer includes a plurality of pages (the size of a page of the less-fine-grained memory). Transfers of the particular unit of the write buffer to the less-fine-grained memory are performed on a page basis, so that individual ones of the pages are transferred to the less-fine-grained memory as the individual pages are filled.

According to various embodiments, one or more CSRs, such as one or more CSRs in the respective memory sub-system controller, are used to specify one or more of: one or more volatile regions in the preservable portion of the fine-grained memory; and one or more non-volatile regions, such as erased pages and/or blocks in the less-fine-grained memory. (The volatile regions in the preservable portion of the fine-grained memory are termed "volatile" since, in some embodiments, the volatile regions are temporarily non-volatile, and thus are not non-volatile, but are capable of being preserved in a non-volatile memory) In some embodiments, the non-volatile regions are regions of any non-volatile memory or non-volatile storage device, such as a hard disk. (Of course, the non-volatile regions are, in various embodiments, operable in the event of a power disruption in order to enable preservation of the preservable portion of the fine-grained memory.) In the event of a power disruption (such as detected by power detection circuit 355 as illustrated in FIG. 3C), the memory sub-system controller is enabled to copy the volatile regions to the non-volatile regions to preserve the volatile regions. In further embodiments, the memory sub-system controller is enabled to copy the volatile regions to the non-volatile regions under control of software, such as software executing on the respective processors. For example, when a page of the write buffer is full (or nearly full), software is optionally and/or selectively enabled to flush the page to a corresponding one of the non-volatile regions via the memory sub-system controller (and independent of the event of a power disruption).

In some embodiments, the non-volatile regions in the less-fine-grained memory are not made available as part of a pool of available pages and/or blocks, and are kept reserved in case there is a power disruption. In other embodiments, the non-volatile regions are allocated dynamically from the pool of available pages and/or blocks, and the pool of available pages and/or blocks is maintained larger than a minimum size to ensure that sufficient pages and/or blocks are available in case there is a power disruption. For example, in some embodiments and/or usage scenarios, each of the volatile regions is a page-sized or a block-sized region of the fine-grained memory, and is associated (via the one or more CSRs) with a corresponding page or block of the less-fine-grained memory. According to various embodiments, at least some of the volatile regions are one or more of: the size of a page (such as regions for configuration information); and the size of a block (such as regions used as a write buffer).

In some embodiments and/or usage scenarios, writes to the less-fine-grained memory are not always successful. Accordingly, in the event of a power disruption, a write from one of the volatile regions to one of the non-volatile regions is not always successful. In various embodiments, the non-volatile regions include a pool of erased pages and/or blocks of the less-fine-grained memory and do not have a specified one-toone correspondence with the volatile regions. Instead, the volatile regions are written, such as in a defined order, to the non-volatile regions, and, in the event of a failure of one or more of the writes, the failed write(s) are retried using another one of the non-volatile regions. In further embodiments, a respective tag (such as a sequence number, or a value stored in a respective CSR associated with each of the volatile regions, or a value included as part of the data stored in each of the volatile regions) is stored in each of the non-volatile regions (such as in a data portion or in an overhead portion of the non-volatile region) to enable identification of which volatile region is stored in which non-volatile region. In still further embodiments, the respective tag is and/or includes a pointer (such as a physical address) to a next (or to a previous) one of the non-volatile regions, and the ones of the non-volatile regions used to preserve the preservable portion of the fine-grained memory are linked together in a linked list by the respective tags. In some embodiments, the memory sub-system controller is enabled to build the linked list by including a respective physical address of one of the non-volatile regions as a respective tag in each of the non-volatile regions as part of preserving the preservable portion of the fine-grained memory.

According to various embodiments, data is transferred into and/or out of the fine-grained memory, including the preservable portion of the fine-grained memory, by one or more of: the respective processors of the particular node executing load and/or store instructions; the respective processors of the particular node performing put and/or get operations; the respective processors of the particular node managing a DMA controller (such as DMA(s) 387 as illustrated in FIG. 3D); transfers via the respective interconnect switch of the particular node; and any combination of the foregoing. According to various embodiments, the data is transferred to/from the fine-grained memory, including the preservable portion of the fine-grained memory, from/to one or more of: a respective processor memory of the particular node, such as directly connected memory 134 as illustrated in FIG. 1D; the less-fine-grained memory; other nodes, such as data transferred via the respective interconnect switch of the particular node; peripherals, such as peripherals 142 as illustrated in FIG. 1D; external devices, such as external devices 145 as illustrated in FIG. 1D; other memories and/or storage devices of the particular node; and any combination of the foregoing.

In some embodiments, each of at least some of the elements that are written to the write buffer (or to other portions of the fine-grained memory) are associated with a respective CRC, such as a CRC generated by logic 377 as illustrated in FIG. 3D. In various embodiments, logic 377 is enabled to generate a respective CRC, such as a 32-bit or a 64-bit CRC, for each of the at least some of the elements, and the respective CRC is stored in the write buffer (or in the other portions of the fine-grained memory) in association with the element. For example, the respective CRC is appended to the element, and the storage used by the element in the write buffer (or in the other portions of the fine-grained memory) includes storage for the respective CRC. According to various embodiments, one or more of: when the element is read from the write buffer (or from the other portions of the fine-grained memory) the respective CRC is optionally and/or selectively read; when the element is read from the write buffer (or from the other portions of the fine-grained memory) the respective CRC is optionally and/or selectively checked; and when the element is read from the write buffer (or from the other portions of the fine-grained memory) and transferred to another memory, such as to the less-fine-grained memory, the respective CRC is optionally and/or selectively transferred with the element. In various embodiments and/or usage scenarios, storing the respective CRCs in the write buffer enables pages of the write buffer to be an image of the pages as the pages are to be stored in the less-fine-grained memory. In further embodiments, overhead information is added to pages as they are written into the less-fine-grained memory, such as an error correcting code generated by logic 396, as illustrated in FIG. 3D. The image of the pages in the write buffer is an image of the pages as the pages are to be stored in the less-fine-grained memory prior to the addition of the overhead information.

In some embodiments, each of at least some of the elements that are written to a memory, such as the fine-grained memory and/or the less-fine-grained memory, are associated with a respective CRC. According to various embodiments, one or more of: the respective CRC is generated by logic associated with the memory (such as logic 377 associated with the fine-grained memory); and the respective CRC is provided from elsewhere in the particular node (such as from logic associated with a previous memory in which the element was stored, or such as a respective CRC generated by the respective processors). In further embodiments, the respective CRC is optionally and/or selectively checked when the element is read from the memory. For example, in some embodiments, a particular one of the elements stored in the respective processor memory includes a respective CRC, and when the particular element (including the respective CRC) is written to the write buffer in the fine-grained memory, the respective CRC is checked.

In some embodiments, elements in a node address space are written to the less-fine-grained memory via the write buffer. In further embodiments, ones of the elements that are a multiple, including one, of a size of a page of the less-fine-grained memory are written directly to the less-fine-grained memory (such as via DMA(s) 387), bypassing the write buffer. In some embodiments, software executing on the respective processors of the particular node manages the writing of the elements to the write buffer. In various embodiments and/or usage scenarios, staging writes to the less-fine-grained memory via the write buffer enables the writes to be acknowledged as complete (and non-volatile) prior to completion of the writes to the less-fine-grained memory. In the event of a power disruption, software is enabled to recover data written to the write buffer (and not yet transferred to desired locations in the less-fine-grained memory), and to subsequently transfer the data written to the write buffer (and saved in non-volatile regions of the less-fine-grained memory) to the desired locations in the less-fine-grained memory. In further embodiments, the recovery of the data includes remapping so dial the non-volatile regions are used as the desired locations (without a need to copy the data in the less-fine-grained memory). In other embodiments, the non-volatile regions are the desired locations and no remapping is necessary.

Writing of a particular one of the elements to the write buffer includes, in various embodiments and/or usage scenarios, selecting a unit of the write buffer in which to start the writing, starting the writing of the particular element to the selected unit of the write buffer, and if the particular element is larger than remaining space in the selected unit of the write buffer, repeating the preceding steps on a next portion of the particular element. In various embodiments, the writing of the particular element to the write buffer allocates sufficient space in the write buffer for the element and for one or more respective CRCs, such as one CRC in each of the selected units of the write buffer (or in each page of each of the selected units of the write buffer) only partially used by the element. For example, in further, embodiments and/or usage scenarios, a unit of the write buffer (or a page of the unit of the write buffer) that is completely used by the particular element does not have an appended CRC, and instead relies on sub-page-based and/or page-based error detection and/or correction of the less-fine-grained memory.

When a unit of the write buffer is full (or is substantially and/or nearly full), the unit of the write buffer is transferred (flushed) to the less-fine-grained memory, such as via DMA(s) 387. In a first example, when a particular one of the elements is written to the write buffer and fills (or nearly fills) a particular page of the write buffer, software executing on the respective processors of the particular node initiates a transfers of the particular page to an associated page of the less-fine-grained memory. In a second example, software executing on the respective processors of the particular node initiates a transfer of a particular unit of the write buffer to the less-fine-grained memory in response to a sync operation or a similar software request. In various embodiments and/or usage scenarios, the write to the associated page of the less-fine-grained memory is in progress for a time duration, such as hundreds of microseconds, and until the write to the associated page completes successfully, the particular page of the write buffer is kept allocated (and is not enabled to be re-used). In various embodiments, a page of the write buffer is nearly full if it is determined that any remaining space in the page is left empty. For example, if the remaining space in the page is only large enough to hold a CRC (and not large enough to hold any additional data, or not large enough to hold a specified minimum size of data along with the CRC), the page is nearly full.

In some embodiments, a unit of the write buffer is (or, in various embodiments, individual pages of the unit of the write buffer are) associated with a location, such as one or more pages (or one or more blocks), of the less-fine-grained memory solely when the unit of the write buffer (or an individual page of the unit of the write buffer) is ready to transfer to the less-fine-grained memory. In further embodiments, elements stored in the unit of the write buffer (or in the individual page of the unit of the write buffer) are remapped after the transfer of the unit of the write buffer (or the individual page of the unit of the write buffer) to the less-fine-grained memory, such as when the transfer to the less-fine-grained memory completes successfully.

In some embodiments, a unit of the write buffer is associated with a location, such as one or more pages (or one or more blocks), of the less-fine-grained memory when the unit of the write buffer is allocated. In further embodiments, the associated location is the one of the non-volatile regions in which the unit of the write buffer is preserved in the event of a power disruption. Elements written to the unit of the write buffer are remapped when the write to the unit of the write buffer completes. When the unit of the write buffer (or, in some embodiments, when an individual page of the unit of the write buffer) is full (or nearly full), the unit of the write buffer (or the individual page of the unit of the write buffer) is transferred to the less-fine-grained memory at the associated location. If the transfer to the less-fine-grained memory does not complete successfully, then a new associated a location of the less-fine-grained memory is determined, and any elements in the unit of the write buffer (or the individual page of the unit of the write buffer) for which the transfer to the less-fine-grained memory was not successful are remapped to the new associated location.

In some embodiments, a free list of available units of the write buffer is maintained (such as free write buffer list(s) 1782 as illustrated in FIG. 17). Initially, a portion of the fine-grained memory is determined to be used as the write buffer. In various embodiments, a size of the portion of the fine-grained memory used as the write buffer changes dynamically, such as when containers are configured and/or re-configured (such as by adding and/or removing shards to increase and/or decrease an associated amount of memory), or when additional memory is added (for example, when an additional memory sub-system is connected). Initially, all of the units of the write buffer are available (and are on the free list). As elements are written to the less-fine-grained memory via the write buffer, units of the write buffer are selectively allocated to store the elements. In various embodiments, a particular one of the allocated units of the write buffer remains allocated until the particular unit is successfully transferred to the less-fine-grained memory.

In various embodiments, the less-fine-grained memory is managed on a block basis, and units of the write buffer are logical blocks. Sequential pages in a logical block that is a size of a block of the less-fine-grained memory are in a same block of the less-fine-grained memory. In some usage scenarios, reading from and/or writing to pages in the same block of the less-fine-grained memory is slower than reading from and/or writing to pages in different blocks of the less-fine-grained memory.

In some embodiments, the units of the write buffer are logical pages and/or logical blocks that are a multiple greater than one of a size of a page and/or of a block of the less-fine-grained memory. A unit of the write buffer that is a multiple greater than one of the size of a page and/or of a block of the less-fine-grained memory enables optional and/or selective striping of writes to the less-fine-grained memory. For example, a logical block of the write buffer is a size of four blocks of the less-fine-grained memory. Four sequential pages of the logical block correspond to physical pages of the less-fine-grained memory in four independently accessible regions, such as in four different memory devices. As the logical block is sequentially filled, the pages of the logical block are striped across the four memory devices. In various embodiments and/or usage scenarios, striping enables one or more of: lower latency of access for reading by accessing multiple devices in parallel; and greater throughput for writes by accessing multiple devices sequentially (rather than one device serially). Of course, there are many ways to arrange data for logical striping, including on a paragraph basis, on any fixed-sized basis, on a sub-page basis, on a page basis, and on a block basis, and the previous example merely illustrates one of many techniques within the scope of the teachings herein.

In some embodiments, the striping of (logical) units of the write buffer to pages and/or blocks of the less-fine-grained memory is fixed, in that any striping will always use a same ordering of memory devices. For example, the striping uses devices A and B or devices C and D for striping by two, and uses devices A, B, C and D for striping by four, but is not enabled to stripe across devices A, B, F, and G for striping by four. In other embodiments, striping is fully flexible, and striping is enabled to use any of the memory devices in any order. In further embodiments, striping is fully flexible, even with a single container. For example, a first portion of the container is striped across devices A, B, C, and D, and second portion of the container is striped across devices A, G, H, and B. In various embodiments, a list of available blocks in the less-fine-grained memory is maintained per memory device to enable striping across memory devices.

In some embodiments, the write buffer is organized and/or managed on a shard basis. In further embodiments, each allocated unit of the write buffer is associated with a respective shard of the less-fine-grained memory, and the allocated unit is used solely for elements stored (or to be stored) in the respective shard. In various embodiments and/or usage scenarios, having independent units of the write buffer for each shard enables more efficient mapping of the shard, such as in a local map. According to various embodiments, there is one or more of: one free list of available units of the write buffer for all of the shards; an independent free list of available units of the write buffer for each of the shards; an independent free list of available units of the write buffer for each of the memory devices (or for each of a plurality of independently accessible portions) of the less-fine-grained memory; and an independent write buffer for each of the shards.

In some embodiments, a single allocated unit of the mite buffer is enabled, at any one time, to be used for writes of elements to a particular one of the shards. When the single allocated unit is full, another unit of the write buffer is allocated for the particular shard. In various embodiments and/or usage scenarios, having solely a single allocated unit of the write buffer enabled, at any one time, for writes to the particular shard enables more efficient management of memory-ordering rules.

In some embodiments, one or more allocated units of the write buffer are enabled, at any one time, to be used for writes of elements to a particular one of the shards. When a particular one of the elements is written, one of the allocated units is selected to store the element. According to various embodiments, the selection is by one or more of: first bit; best fit; a heuristic algorithm; a greedy algorithm; a wear-leveling algorithm; a coalescing algorithm (that mixes new data and data being coalesced); and any other algorithm or technique for selecting one or more of the allocated units to store at least a portion of the particular element.

In some embodiments, coalescing of the less-fine-grained memory uses the write buffer, or uses one or more portions of the fine-grained memory managed similarly to the write buffer, to coalesce and/or to wear level the less-fine-grained memory. According to various embodiments, the portion of the fine-grained memory used for coalescing is one or more of: volatile; non-volatile; temporarily non-volatile; selectively powered, such as in the event of a power disruption, by a battery backup (such as battery back-up 125 as illustrated in FIG. 1D); and the preservable portion of the fine-grained memory.

Figures 18A, 18B:
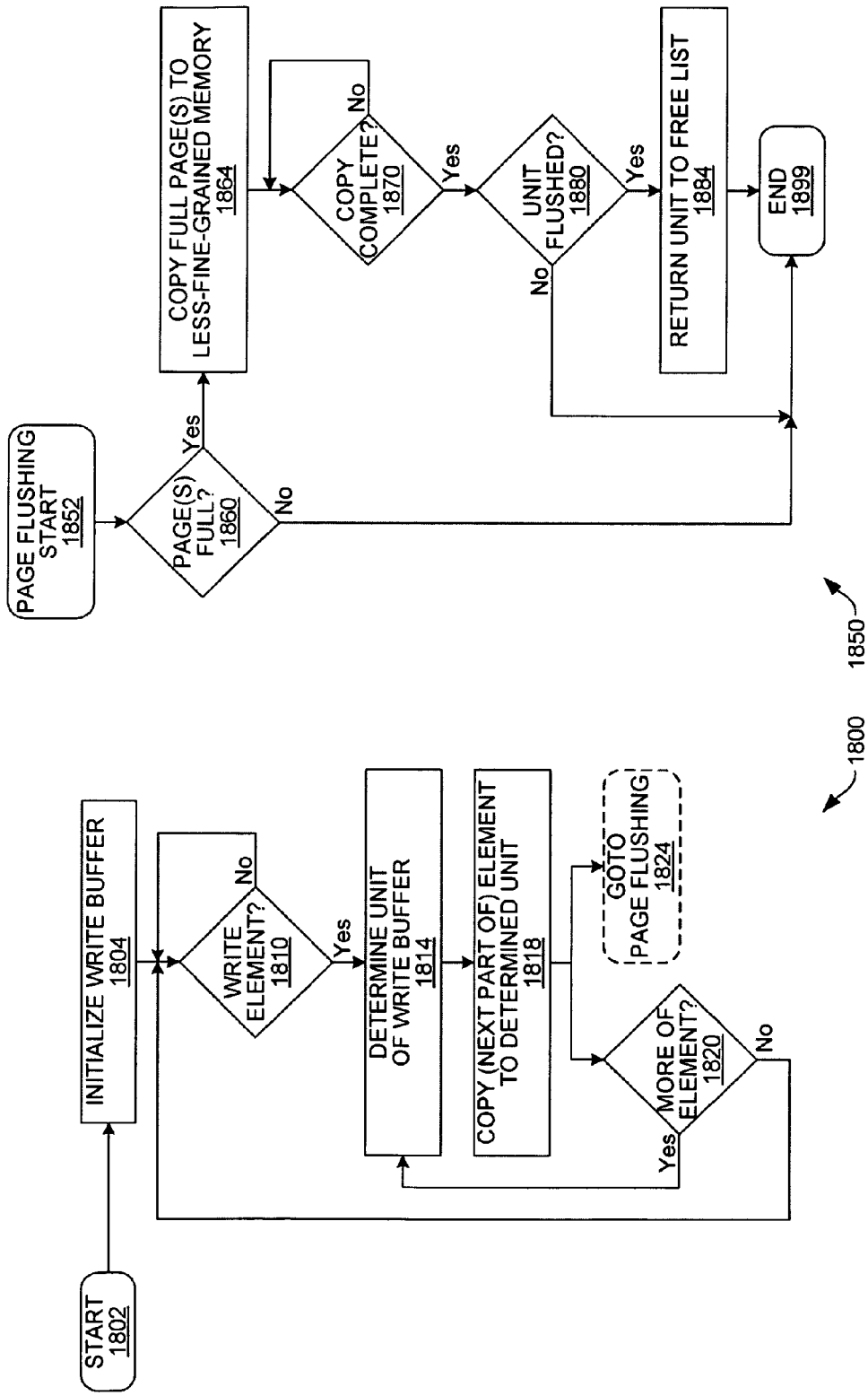
FIG. 18A illustrates an embodiment of a process for writing to a less-fine-grained memory via a write buffer.
FIG. 18B illustrates an embodiment of a process for flushing pages of a write buffer to a less-fine-grained memory.

FIG. 18A illustrates an embodiment of a process for writing to a less-fine-grained memory via a write buffer. Process 1800 starts ("START" 1802) and initializes a write buffer ("INITIALIZE WRITE BUFFER" 1804). According to various embodiments, initialization of the write buffer includes one or more of: allocating a portion of the fine-grained memory for the write buffer; dividing the write buffer into units of the write buffer; and creating one or more free lists of the units of the write buffer, such as one global free list, or one free list per shard.

When an element is written to the write buffer ("WRITE ELEMENT?" 1810), process 1800 determines a unit of the write buffer to be used to store the element ("DETERMINE UNIT OF WRITE BUFFER" 1814). According to various embodiments, the determining is based on one or more of: a shard containing the element and one or more allocated units of the write buffer associated with the shard; remaining space in a unit of the write buffer; and the free list(s). In some embodiments, the determining includes allocating a unit from the free list(s).

At least a part of the element is copied to the determined unit of the write buffer ("COPY (NEXT PART OF) ELEMENT TO DETERMINED UNIT" 1818). For example, in some embodiments and/or usage scenarios, the at least a part of the element is copied to the determined unit via a DMA operation (such as managed by DMA(s) 387 as illustrated in FIG. 3D). A page flushing sub-process is optionally and/or selectively started ("GOTO PAGE FLUSHING" 1824), such as when the copying has filled a page of the write buffer.

If the element is larger than remaining space in the determined unit ("MORE OF ELEMENT?" 1820), then process 1800 iterates to copy a next portion of the element by returning to determine a next unit of the write buffer to store the next portion of the element ("DETERMINE UNIT OF WRITE BUFFER" 1814). When a last portion of the element is copied to the write buffer, process 1800 returns to await a subsequent element to be written ("WRITE ELEMENT?" 1810).

In some embodiments, initialization of the write buffer ("INITIALIZE WRITE BUFFER" 1804) is performed at system initialization time (such as at system power-on and/or re-boot). In various embodiments, multiple instantiations of process 1800 operate substantially in parallel. For example, each time an element is written, an instantiation of (a portion of) process 1800 starting with determining a unit of the write buffer to store the element ("DETERMINE UNIT OF WRITE BUFFER" 1814) is initiated. In various embodiments, semaphores, locks, or other software techniques are used to enable the multiple instantiations of process 1800 to operate substantially in parallel.

FIG. 18B illustrates an embodiment of a process for flushing pages of a write buffer to a less-fine-grained memory. Process 1850 starts ("PAGE FLUSHING START" 1852) and determines if there are any pages of the write buffer which are full (or nearly full) and are to be flushed to the less-fine-grained memory ("PAGE(S) FULL?" 1860). If there are no pages of the write buffer that are full (or nearly full), process 1850 ends ("END" 1899). If there are pages of the write buffer that are full (or nearly full), then processing continues using a selected one or more of the pages of the write buffer that are full (or nearly full).

In some embodiments, process 1850 is only initiated when one or more pages of the write buffer are known to be full (or nearly full), and process 1850 does not include the determining if there are any pages of the write buffer which are full (or nearly full). Instead, process 1850 uses the one or more pages of the write buffer that are known to be full (or nearly full) as the selected one or more of the pages of the write buffer that are full (or nearly full).

The selected one or more pages of the write buffer are transferred to associated pages of the less-fine-grained memory ("COPY FULL PAGE(S) TO LESS-FINE-GRAINED MEMORY" 1864). According to various embodiments, the associated pages of the less-fine-grained memory are one or more of: predetermined (such as when the pages of the write buffer are allocated; and allocated as part of transferring the pages to the less-fine-grained memory. In some embodiments, as part of and/or on completion of the transferring, elements stored in the selected one or more pages are remapped.

Process 1850 then waits for completion of the transferring ("COPY COMPLETE?" 1870). If a complete unit of the write buffer has been flushed (to the less-fine-grained memory) and the unit is now unused ("UNIT FLUSHED?" 1880), then the unit is returned to a list of available units of the write buffer ("RETURN UNIT TO FREE LIST" 1884). Process 1850 then ends ("END" 1899).

In some embodiments, multiple instantiations of process 1850 operate substantially in parallel. For example, each write of an element to a unit of the write buffer that fills a page of the write buffer is enabled to start process 1850. In various embodiments, semaphores, locks, or other software techniques are used to enable the multiple instantiations of process 1850 to operate substantially in parallel.

In some embodiments, flushing of the write buffer is managed similarly to process 1850, but operating on a unit of the write buffer other than a page, such as a logical page, a block, or a logical block. For example, in some embodiments and/or usage scenarios, pages are only transferred to the less-fine-grained memory when a full stripe and/or a full unit is ready to be transferred.

Coalescing

In some embodiments, re-writing elements stored in paragraphs of the less-fine-grained memory causes the elements to be remapped to new locations in the less-fine-grained memory, and thus blocks of the less-fine-grained memory become fragmented (by leaving unused locations in the blocks where the remapped elements used to be). If not controlled, in some usage scenarios, the fragmented blocks decrease a usable amount of the less-fine-grained memory. Coalescing moves remaining paragraphs (still-used locations) in one or more fragmented blocks to new blocks, compacting the remaining paragraphs so that there are no, or substantially no, unused locations in the new blocks. Once all the remaining paragraphs are moved from a particular one of the fragmented blocks (leaving the particular block empty) the particular block is optionally and/or selectively erased and re-used (such as for further coalescing of other fragmented blocks, and/or for new data that is being written). (FIG. 16, described above, illustrates an example of coalescing fragmented blocks.)

In some embodiments and/or usage scenarios, coalescing is performed for reasons other than and/or in addition to fragmentation, such as performance or wear leveling. In a first example, paragraphs that are more likely to be accessed together are coalesced into a same block or a same page. In a second example, paragraphs that are more likely to be prefetched together are coalesced into different blocks, such as in different memory devices, so that the paragraphs are prefetchable in parallel. In a third example, paragraphs with a similar age or a similar frequency and/or pattern of writing are coalesced into a same block.

In some embodiments and/or usage scenarios, blocks (or portions thereof) of the less-fine-grained memory are moved for reasons other than fragmentation, such as wear leveling. For example, a particular one of the blocks has not been written recently, and is thus less worn than other blocks. Contents of the particular block are reallocated (re-written and remapped) to another of the blocks so that the particular block gets more use, thus making wear more even among all of the blocks. In further embodiments, the particular block is re-written to one of the blocks known to be more heavily worn, since the contents of the particular block are not (based on recent history) written frequently.

In some embodiments, coalescing of the respective less-fine-grained memory of the particular node is managed by a processor outside of the particular node, such as a control processor, or such as one of the respective processors of another of the nodes. In other embodiments, coalescing of the respective less-fine-grained memory of a particular one of the nodes is managed locally at the particular node, such as by software executing on the respective processors of the particular node, or by a combination of hardware and software on the particular node. For example, in various embodiments, coalescing is performed by the respective memory sub-system controller of the particular node as managed and/or controlled by the respective processors of the particular node.

In some embodiments, coalescing is performed globally for all of the less-fine-grained memory, or globally for at least a portion of the less-fine-grained memory, such as a general software access region. In other embodiments, coalescing is performed independently in each of one or more coalescing regions of the less-fine-grained memory. According to various embodiments, a coalescing region is one or more of: a container; a group of one or more shards, such as all shards of a container on the particular node; a shard; and a group of one or more memory devices, such as memory devices in one bank, or memory devices on one printed circuit board. In some embodiments, having coalescing regions on a shard basis enables more efficient usage of the less-fine-grained memory and/or more efficient use of resources for coalescing. In various embodiments, such as some embodiments where the less-fine-grained memory is managed and/or allocated on a shard basis, having coalescing regions on a shard basis enables independent management and/or allocation within each of the shards.

In some embodiments, coalescing is paragraph-based, and individual paragraphs are selected for coalescing based, at least in part, on one or more respective factors such as: age (for example, a time of a last write); frequency and/or pattern of writing; locality (with respect to other paragraphs); and other similar factors. In various embodiments, when all of the paragraphs in a particular one of the blocks are reallocated, the particular block is placed on the list of unused but not yet erased blocks.

In some embodiments, coalescing is page-based, individual pages are selected for coalescing, and when all respective remaining paragraphs of one of the individual pages are reallocated, the individual page is marked as unused. In further embodiments, when all the pages of a block are marked as unused, the block is placed on the list of unused but not yet erased blocks. According to various embodiments, a page is preferentially selected for coalescing when one or more of: other pages in a block containing the page are unused, such as when more than a threshold number of pages in the block are unused; when the page and/or a block containing the page has low utilization, such as more than a threshold amount of unused space; other similar page-based factors; and factors used to select blocks for coalescing as described below.

In some embodiments, coalescing is block-based, and individual blocks are selected for coalescing. In further embodiments, the blocks are logical blocks (such as when a plurality of physical blocks are treated as a logical unit for striping). When a block is selected for coalescing, all respective remaining paragraphs of the block are reallocated, and, in further embodiments, the block is placed on the list of unused but not yet erased blocks.

The following descriptions of coalescing describe block-based coalescing (including physical blocks of the less-fine-grained memory and/or logical blocks that include one or more of the physical blocks). Similar techniques are applicable to paragraph-based and/or page-based coalescing. Of course, in some embodiments, coalescing is performed as a combination of paragraph-based and/or page-based and/or block-based and/or logical-block-based coalescing. In a first example, a first coalescing region uses block-based coalescing, and a second coalescing region uses page-based coalescing. In a second example, each of one or more coalescing regions uses page-based coalescing, and block-based coalescing is performed globally over all of the one or more coalescing regions.

In some embodiments, coalescing and related operations are performed by processes and/or threads, such as threads executing on the respective processors of the particular node.

(Herein, a thread is used to refer to any program, process, or other software entity having a separate locus of control.) According to various embodiments, one or more of the following types and quantities of threads are used to perform coalescing: one or more coalescing-selection threads are used to select blocks for coalescing (such as illustrated by coalescing selection 1762 in FIG. 17); one or more coalescing-processing threads are used to perform coalescing of the blocks selected for coalescing (such as illustrated by coalescing processing 1760 in FIG. 17); and one or more erasing threads are used to perform erasing of the blocks that have been coalesced and are now unused but not yet erased (such as illustrated by erase processing 1790 in FIG. 17).

In some embodiments, one of the coalescing-selection threads and/or one of the coalescing-processing threads and/or one of the erasing threads are the same (that is, a same thread selects blocks for coalescing and/or performs coalescing of the selected blocks and/or erases the coalesced and now unused blocks). In other embodiments, the coalescing-selection threads and/or the coalescing-processing threads and/or the erasing threads are different, and each of the coalescing-processing threads operates on blocks selected by one or more of the coalescing-selection threads, and/or each of the erasing threads operates on blocks coalesced by one or more of the coalescing-selection threads.

According to various embodiments, the coalescing-selection threads (and/or the coalescing-processing threads and/or the erasing threads) are organized as one or more of: one thread performs all selection (and/or processing and/or erasing) on and/or for the particular node; one thread performs selection (and/or processing and/or erasing) for one or more of the coalescing regions; and a respective thread performs selection (and/or processing and/or erasing) for each of the coalescing regions. In a first example, in some embodiments, a respective thread of each shard performs coalescing selection, coalescing processing, and erasing for the shard. In a second example, a first one or more threads perform coalescing selection for each shard of a container on the particular node, a second thread performs coalescing processing for all of the shards of the container, and a single thread performs erasing for all of the shards on the particular node.

In some embodiments, a plurality of coalescing-selection threads perform coalescing on a same and/or on overlapping coalescing regions. In further embodiments, at least some of the coalescing-selection threads use different selection criteria. In a first example, a first coalescing-selection thread performs coalescing selection based on ECC errors, such as by policing for ECC errors, for all blocks of all shards of the less-fine-grained memory of the particular node, and, for each of the shards, each of a second one or more respective coalescing-selection threads performs coalescing selection for the blocks of the shard based on block utilization. In a second example, a first coalescing-selection thread performs coalescing selection based on relative wear (such as a number of erase cycles) for all blocks of a particular shard, and a second coalescing-selection thread perform coalescing selection for the blocks of the particular shard based on block utilization.

According to various embodiments, blocks are selected for coalescing by factors such as one or more of: read wear; write wear; ECC errors; wear leveling; utilization of the block; elapsed time and/or operations counts since a previous coalescing selection and/or a respective last write operation; and other similar factors.

In some embodiments, a coalescing-selection thread selecting blocks of a coalescing region for coalescing performs policing of at least some of the blocks (such as all of the blocks, or ones of the blocks known to have not been written since a last policing) by reading data of the blocks and/or overhead information of the blocks and/or data structures associated with the blocks. In a first example, the policing thread reads data structures associated with one of the blocks to determine one or more of read wear susceptibility, write wear susceptibility, and whether the block has been recently written (such as since a last policing). In a second example, the policing thread reads data and/or overhead information of one of the blocks to determine if the block has an ECC error. In a third example, the policing thread reads data structures associated with one of the blocks, such as the block information table, to determine a utilization of the block.

In some embodiments, reads and/or writes of blocks are tracked. In some memory devices, such as some flash memory devices, reads and/or writes of blocks adjacent to a particular block, or reads of the particular block, sometimes (with low but non-zero probability) create errors (respectively, read wear and/or write wear) in the particular block. By tracking a number of reads and/or writes on a per-block basis (or optionally and/or selectively, on a more global basis), susceptibility of blocks to read wear and/or write wear is detectable. By reallocating a particular one of the blocks (re-writing and remapping contents of the particular block so dial the particular block is erasable), errors (such as due to read wear or write wear) are prevented from accumulating indefinitely in the particular block.

In some embodiments, susceptibility to read wear and/or to write wear are detected, such as by a coalescing-selection thread, by requiring each block to be written once every read epoch and/or every write epoch. For example, a particular memory device has 32K blocks. A count of a total number of reads and/or a count of a total number of writes to the particular memory device is maintained. Each of the blocks of the particular memory device that has not been written after a read epoch of reads (such as 1M reads) and/or a write epoch of writes (such as 1M writes) is selected for coalescing (which causes any remaining paragraphs in the block to be reallocated and the block to be erased). In various embodiments, a bit map with one bit per each of the blocks is used to tag ones of the blocks that have been written (a bit of the bit map corresponding to a particular one of the blocks is set when the particular block is written). After a read epoch of reads and/or a write epoch of writes, any of the blocks that have not been written (ones of the blocks that are not tagged) are selected for coalescing. Of course, there are variations of this technique, such as counting the total number of reads and/or the total number of writes per bank of memory devices, or per memory chip within a memory device containing multiple memory chips.

In some embodiments, to avoid read wear and/or write wear, all of the blocks in a particular coalescing region are selected for coalescing periodically. At the end of each specified period (such as once per day), each of the blocks which has not been written (such as determined from a bit map, as described above), is selected for coalescing, such as by a coalescing-selection thread.

In some embodiments, reads and/or writes and/or operations (such as reads or writes) of blocks are tracked on a per-block basis, and the per-block read counts and/or write counts and/or operation counts are used to select blocks for coalescing. For example, the reads and/or writes and/or operations of each of the blocks are tracked for a specified period such as 1M reads and/or 1M writes and/or 1M operations. At the end of each of the specified periods, each of the blocks which has not been written (such as determined from a bit map, as described above), and which is determined to be a candidate for excessive read wear or excessive write wear is selected, such as by a coalescing-selection thread, for coalescing. In various embodiments and/or usage scenarios, one of the blocks is determined to be a candidate for excessive read wear or excessive write wear such as by having one or more adjacent (such as physically adjacent) ones of the blocks with a number of reads greater than a read threshold and/or a number of writes greater than a write threshold and/or a number of operations greater than an operation threshold.

In some embodiments, one or more read counters are maintained in non-volatile memory (such as the less-fine-grained memory) or in temporarily non-volatile memory (such as the preservable portion of the fine-grained memory). In further embodiments, the read counters are maintained in volatile memory, and are updated in the non-volatile memory or the temporarily non-volatile memory every N, such as every 10K, respective read operations (to reduce a number of write operations to the non-volatile memory or the temporarily non-volatile memory). In still further embodiments, in the event of a reboot (such as due to a crash) the read counters are restored to the volatile memory (from the non-volatile memory or the temporarily non-volatile memory), and are incremented by ½*N (an average number of reads that are not accounted for due to the crash). According to various embodiments, the read counters are maintained one or more of: per region of each memory device, such as per plane of each memory device; per memory chip; per memory device; per memory bank; per memory card; per node; and any other grouping of memory chips and/or devices. In some embodiments, each time each of at least some of the blocks of the less-fine-grained memory (such as the blocks in a particular one of the coalescing regions) are written, a current value of a respective one of the read counters (optionally, a current value of the respective read counter divided by a constant, M, and rounded so as to consume fewer bits) is stored in the block, such as in overhead information of the block. In various embodiments and/or usage scenarios, a manufacturer or a user specifies an excessive read limit, such as 20K reads, after which blocks are (presumed to be) more likely to be subject to effects of read wear. A coalescing-selection thread periodically reads the at least some of the blocks (or at least a portion containing the stored read counter of each of the at least some of the blocks) and selects for coalescing ones of the blocks with a stored read counter value (optionally multiplied by M to restore a full-range) trailing the respective read counter value by more than the excessive read limit.

Similar techniques to the read counter technique described above are used, in various embodiments, with write counters and/or with operation counters.

In some embodiments, a block of the less-fine-grained memory which has an ECC error when it is read is selected for coalescing. In some usage scenarios, blocks with ECC errors are more likely to have read wear and/or write wear (as the ECC error may have been caused by read wear and/or write wear). In various embodiments and/or usage scenarios, an ECC error in a particular block is detected by a thread other than a coalescing-selection thread, and the ECC-error-detecting thread is enabled to provide the particular block to a coalescing-selection thread and/or to a coalescing-processing thread.

In some embodiments, wear (such as a number of erase cycles) is maintained for each of at least some of the blocks of the less-fine-grained memory. For example, overhead information in each of the at least some of the blocks (or, in further embodiments, in each page of each of the at least some of the blocks) includes a count of a number of times the block has been erased. In further embodiments, ones of the at least some of the blocks with low wear (a small number of erase cycles compared to others of the at least some of the blocks) are selected, such as by a coalescing-selection thread, for coalescing in order to maintain more even wear among all of the at least some of the blocks. In one example, an average wear (such as an average number of erase cycles) is maintained for all blocks in a coalescing region, and ones of the blocks which are less worn than the average by a specified factor, such as a factor of two, are selected for coalescing.

In some embodiments, a block of the less-fine-grained memory which has a low utilization (such as a utilization less than a utilization threshold) is selected, such as by a coalescing-selection thread, for coalescing. According to various embodiments, the utilization of the block is determined from one or more of: data structures, such as a block information table and/or a local map; information stored in the block; and information stored in a related block (such as another block in a same shard). In some embodiments, the utilization threshold is set dynamically based, at least in part, on an amount of available space (such as blocks on a free list) in a shard containing the block.

In some embodiments, paragraphs stored in the less-fine-grained memory include and/or are associated with a respective coalescing age. In further embodiments, the coalescing age is stored as part of the overhead information in each page (and/or in each block), or in a header of each paragraph. In various embodiments, the coalescing age is and/or includes an n-bit saturating counter, such as a two-bit saturating counter. (A saturating counter increments up to a maximum value, and further increments have no effect—the saturating counter remains at the maximum value until the saturating counter is decremented or reset.) Every time a particular paragraph is reallocated for coalescing, the respective coalescing age (in the respective saturating counter) of the particular paragraph is incremented. When the particular paragraph is re-written other than for coalescing, the respective coalescing age is reset to zero. The coalescing age thus specifies how frequently the particular paragraph is re-written solely for coalescing. In some embodiments and/or usage scenarios, paragraphs having a similar coalescing age have a similar likelihood of being (or of not being) re-written other than for coalescing. By grouping paragraphs of a similar coalescing age together, fragmentation of blocks is reduced, hi various embodiments, the coalescing age is treated as having only three values: zero (not previously coalesced), non-zero but not saturated (previously coalesced), and saturated (at the maximum value).

In some embodiments, the coalescing-processing threads perform coalescing using one or more write buffers, such as write buffer 374 as illustrated in FIG. 3C. In further embodiments, the coalescing-processing threads use a same one or more write buffers as used for writing new data (such as re-writing elements of one or more containers). For example, there is one respective write buffer per shard of a particular container that is used for both writing new data and for coalescing. Continuing the example, there are multiple shards of the particular container on the particular node, and there is one coalescing-processing thread for the particular container. The coalescing-processing thread is enabled to use the respective write buffers (one per shard of the particular container) to perform coalescing of the respective shards.

According to various embodiments, a particular coalescing-processing thread uses one or more of: a same one or more write buffers as used for writing new data; a different one or more write buffers than one or more write buffers used for writing new data; and a plurality of write buffers, zero or more of the plurality of write buffers the same as one or more write buffers used for writing new data.

In some embodiments, each of the write buffers used for coalescing processing includes zero or more active (open) blocks into which paragraphs being reallocated are copied. In various embodiments, having a plurality of active blocks per write buffer provides greater flexibility as to which paragraphs are merged into a same one of the active blocks when reallocated for coalescing.

In some embodiments, a particular coalescing-processing thread performing coalescing of a particular coalescing region is enabled to use a plurality of active blocks of a write buffer to perform the coalescing. In further embodiments, a given paragraph being reallocated during the coalescing processing is able to be copied into any one of the active blocks. For each of at least some of the paragraphs being coalesced, the particular coalescing-processing thread is configured to determine a respective one or more of the active blocks into which data of the paragraph is copied. (More than one of the active blocks is optionally and/or selectively used if only a portion of the paragraph fits into a first determined one of the active blocks.) According to various embodiments, the determining is based on one or more of: a size of the paragraph; a timestamp of the paragraph; a coalescing age of the paragraph; a coalescing age associated with each of the active blocks; available space in each of the active blocks; and other similar factors. According to various embodiments, the determining is according to one or more of: first fit; best fit; an age-based and/or time-based algorithm; a greedy algorithm; a bin packing algorithm; a heuristic algorithm; another type of algorithm for relocating data and removing unused space; and any combination of the foregoing.

In some embodiments, each of a plurality of active blocks of a write buffer is associated with a coalescing age. In further embodiments, one of the active blocks is optionally used for new data and is associated with a coalescing age of zero and/or one. When a particular paragraph is reallocated due to coalescing, the respective coalescing age of the paragraph is used, at least in part, to determine the one of the active blocks into which to copy the paragraph. For example, a paragraph with a respective coalescing age of three is copied into a particular one of the active blocks associated with the coalescing age of three. Continuing the example, all of the paragraphs in the particular active block have a coalescing age of three.

Of course, in some embodiments, variations of the uses described above for the coalescing age are possible. In a first example, a particular one of the active blocks is associated with a range of coalescing ages. In a second example, paragraphs are copied into active blocks based on the respective coalescing age and other factors, and optionally each of the active blocks is configured to store paragraphs having a respective range of coalescing ages. In a third example, there are multiple ones of the active blocks associated with a same coalescing age, and, for a given paragraph, one of the multiple active blocks is determined according to other factors, such as available space.

In some embodiments and/or usage scenarios, blocks of a particular container of fixed-sized chunks of storage, where the size of the chunks is a multiple of a user-accessible size of pages of the less-fine-grained memory, are enabled to be coalesced without a use of a write buffer using page-at-a-time copying. In further embodiments, a chunk in the particular container is movable to a new physical location without copying any data into a write buffer, since all write operations are full page writes. In still further embodiments, a first page located in a first block of the particular container is moved to a second page located in a second block of the particular container using a page-to-page transfer, such as a page-to-page transfer operation of a memory device.

In various embodiments, page-at-a-time copying, as described above, is used to move whole pages from a first block of the less-fine-grained memory to a second block of the less-fine-grained memory without a use of a write buffer. In some embodiments and/or usage scenarios, page-at-a-time copying is more efficient than paragraph-at-a-time copying, such as when utilization of a page being copied is high.

According to various embodiments, coalescing uses write buffers located in one or more of: volatile memory; non-volatile memory; and temporarily non-volatile memory. In various embodiments and/or usage scenarios, coalescing is enabled to use volatile memory since data being coalesced is already stored in non-volatile memory. If the coalescing operation is aborted (such as due to a failure of the particular node), no data is lost. In further embodiments, writing of a coalesced block to non-volatile memory (such as to the less-fine-grained memory) is, at least in part, an atomic operation that, when successful, enables previous physical locations of the paragraphs in the coalesced block to be treated as unused locations.

In some embodiments, information, such as overhead information, stored in each block (and/or in each page) of at least a portion of the less-fine-grained memory (such as a shard) provides a respective reverse map of contents of the block. In a first example, the overhead information of a block containing fixed-sized chunks includes a respective node address of each of the chunks in the block. In a second example, each variable-sized object stored in a block includes a header with a size of the object and a key of the object. In various embodiments, reading the information in each of the blocks of the at least a portion of the less-fine-grained memory after a reboot enables rebuilding of a local map data structure used to map element identifiers (such as node addresses for fixed-size chunks or keys for variable-sized objects) to physical addresses in the less-fine-grained memory.

In various embodiments, overhead information stored in each page (and/or in each block) of at least a portion of the less-fine-grained memory enables a previous (and now out-of-date) copy of a particular element stored in a first paragraph and a current copy of the particular element stored in a second paragraph to be distinguished. In a first example, overhead information (of each of the blocks) and/or header information (of each of the paragraphs) includes, for each of the first paragraph and the second paragraph, a respective epoch field of the particular element, and a particular one of the first paragraph and the second paragraph with a larger respective epoch field is newer than another one of the first paragraph and the second paragraph with a smaller respective epoch field. In a second example, the overhead information includes a respective timestamp for each of the blocks, such as a timestamp from a counter incremented on each block write or from a real-time clock. The contents of a particular one of the blocks with a larger respective timestamp is more recent than another one of the blocks (with a smaller respective timestamp). Accordingly, a copy of the particular element stored in the particular block is newer than a previous copy of the particular element (in the block with the smaller respective timestamp).

In some embodiments, a shard stores one or more elements and has a respective local map. The respective local map associates respective element identifiers, or portions thereof, of the elements with physical addresses of memory devices. The shard is associated with (such as by being allocated) a subset of the blocks of the less-fine-grained memory. When a block associated with the shard is written to the less-fine-grained memory, a next portion, such as a next 1/Nth, of the respective local map is stored in the block, so that a last N written blocks of the shard store a copy of the respective local map. Of course, the respective local map is changing (due, for example, to remapping as the elements are re-written), but the last N written blocks also store the respective reverse maps which are usable to determine changes that are not in the copy of the respective local map (because a change to a particular 1/Nth of the local map occurred after the particular 1/Nth of the local map was last saved). The respective local map is restorable (such as after a reboot) by reading the last N written blocks, assembling a copy of the respective local map from the portions stored in each of the last N written blocks, and selectively applying changes to the copy of the respective local map from the respective reverse maps stored in the last N written blocks. According to various embodiments, a recovery pointer for the respective local map, saved in non-volatile or in temporarily non-volatile memory, points to one or more of: a last written block, the pointer is updated as each block is written, and the blocks are linked together in a reverse order from an order in which the blocks were written; and an Nth previous (or even earlier) written block, the pointer is updated periodically, but is always at least N blocks behind, and the blocks are linked together in the order in which the blocks were written. Using the recovery pointer and following the linked list to read the last N written blocks, the respective local map is recoverable without reading all of the blocks. Of course, in some embodiments where the recovery pointer is more than N blocks behind, there are optionally and/or selectively additional ones of the last written blocks with changes (from respective reverse maps) that must be selectively applied to recover the respective local map.

In a variation of the above technique, the next portion of the respective local map is not of a fixed size (such as 1/Nth), but is of a size that fits in each of the written blocks. In further embodiments, each of the written blocks optionally has space reserved for storing at least some of the respective local map, and in addition has a variable amount of respective otherwise unused space that is also used for storing the next portion of the respective local map. Continuing the variation of the above technique, the recovery pointer is saved as two pointers, a recovery pointer and a tentative recovery pointer. Each time a first portion of the respective local map is stored in one of the written blocks, the tentative recovery pointer is moved to the recovery pointer, and the tentative recovery pointer is set to the one of the written blocks storing the first portion of the respective local map. Except for the case when too few blocks have yet been written to save the entire respective local map, recovery of the respective local map is able to find a complete copy of the respective local map starting at the written block specified by the recovery pointer. All of the written blocks written after the written block specified by the recovery pointer store (in the respective reverse maps) changes that are optionally and/or selectively applied to the stored copy of the respective local map. (For example, some of the changes, such as a write to an element stored in a first one of the written blocks that is mapped by a portion of the respective local map stored in a later-written one of the written blocks, are not applied.)

In further embodiments, storing a portion, such as 1/Nth, of the respective local map in each of the blocks associated with the shard changes a manner in which the blocks of the shard are selected for coalescing. Because the last N written blocks (or, more generally, all of the blocks as new as or newer than the recovery pointer) are selectively used for recovery, coalescing of any of the blocks as new as or newer than the recovery pointer complicates some recovery techniques (such as by breaking the linked list of blocks). Accordingly, in some embodiments, the blocks as new as or newer than the recovery pointer are optionally and/or selectively restricted from being selected for coalescing.

In various embodiments, once blocks have been erased, the erased blocks are placed on one or more free lists (for example, lists of available blocks), such as free less-fine-grained memory list(s) 1786 as illustrated in FIG. 17. According to various embodiments, the free lists are used by one or more of: the erasing threads, to add blocks to the free lists; the coalescing-processing threads to allocate empty blocks from the free lists into which to coalesce fragmented blocks; and in conjunction with write buffers for writing new data and/or for coalescing, such as to allocate empty blocks from the free lists for writing full pages (and/or blocks) from the write buffers to the less-fine-grained memory.

In some embodiments, one or more active blocks of a write buffer used for coalescing processing (and optionally and/or selectively for new data) are flushed (written to the less-fine-grained memory) as the active blocks (or, in some embodiments, as pages of the active blocks) are filled. For example, as a particular one of the write buffers writes contents of the particular write buffer (such as a block and/or a page of the particular write buffer) to blocks of the less-fine-grained memory, blocks are removed (allocated) from a respective one of the free lists to provide the blocks of the less-fine-grained memory. According to various embodiments, one or more of: as the active blocks are filled, new active blocks are allocated from a respective one of the free lists as replacements; and when a paragraph being reallocated does not fit in a determined one of the active blocks, a new active block is allocated from a respective one of the free lists to replace the determined active block.

Each of the free lists is one or more of: a list of blocks; a list of logical blocks; a list of pages; and any combination of the foregoing. According to various embodiments, the free lists are organized according to one or more organization criteria, such as: one free list for the particular node; a respective free list for each of one or more of the coalescing regions; a respective free list for each of the coalescing regions; a respective free list for each of the erasing threads; a respective free list for each of the coalescing-processing threads; a respective free list for each group of one or more shards, such as all shards of a container on the particular node; a respective free list for each shard; and a respective free list for each group of one or more memory devices, such as single memory chips and/or packages, or memory devices in one bank, or memory devices on one printed circuit board. In a first example, such as when an assignment of memory devices to logical blocks is fixed for a particular shard, the respective free list of the particular shard is a list of logical blocks. In a second example, the free lists are lists of physical blocks (individual blocks of the memory devices of the less-fine-grained memory), even if allocation from the free lists is of logical blocks (one or more physical blocks). In some embodiments, having free lists on a shard basis enables more efficient usage of the less-fine-grained memory. In a third example, the free lists are organized per one or more of a plurality of memory devices, and any shard allocated or otherwise determined to require a block of a particular one or more of the plurality of memory devices is enabled to allocate the block from the respective free list of the particular memory devices. Continuing the third example, a particular one of the shards is determined to require a block from the particular memory devices according to one or more factors, such as: achieving specified bandwidths (for example, balanced bandwidths) among the plurality of memory devices and/or among the shards; achieving specified utilization (for example, balanced utilization) among the plurality of memory devices and/or among the shards; achieving specified wear (for example, balanced wear) among the plurality of memory devices and/or among the shards; and other similar factors. Further in the third example, the particular shard and/or specific contents of the particular shard for which a block is being allocated are determined to have a low expected write frequency, and a block having relatively more wear (compared to others of the blocks in the respective free list of the particular memory devices) is allocated. Other factors could, of course, be used to allocate a block from ones of the memory devices having, for example, more or less bandwidth and/or utilization.

In some embodiments, one or more of the free lists are organized in an inter-node basis, enabling ones of the blocks in the one or more free lists to be allocated from the respective less-fine-grained memories of one or more of the nodes. For example, a global free list of a container contains erased blocks of any of two or more shards of the container, without regard to ones of the nodes containing the shards. In some embodiments, the global free list is managed by one of the nodes. In other embodiments, the global free list is managed in a distributed fashion by two or more of the nodes. In some embodiments and/or usage scenarios, the global free list enables allocation to balance factors such as bandwidth and utilization in an inter-node fashion.

The following descriptions of the free lists describe block-based free lists (including physical blocks of the less-fine-grained memory and/or logical blocks that include one or more of the physical blocks). Similar techniques are applicable to page-based free lists. Of course, in some embodiments, the free lists are a combination of page-based and/or block-based and/or logical-block-based free lists. In a first example, a first one of the free lists is a block-based free list, and a second one of the free lists is a page-based free list. In a second example, a particular one of the free lists is maintained as a free list of blocks, and also as a free list of pages of zero or more active ones of the blocks, such as active blocks associated with active blocks of a write buffer. Each of the active blocks has an associated list of free pages (pages of the active block that are available for use).

According to various embodiments, each of the free lists is maintained (i.e., the blocks in each of the free lists are maintained) in an order that is one or more of: first-in, first-out; last-in, first-out; random; sorted; and any other order. Each of the free lists maintained in a sorted order is sorted according to one or more sorting criteria of each of the blocks, for example: wear, such as a number of erase cycles, or such as read wear and/or write wear of the block and/or of any adjacent ones of the blocks; physical location, such as by memory bank or by memory device or by memory chip; logical location, such as per shard, or per any of the free list organization criteria; utilization associated with physical locations and/or with logical locations, such as memory utilization or bandwidth utilization; and any combination of the foregoing. According to various embodiments, a particular one of the free lists maintained in a sorted order is one or more of: maintained in a roughly sorted, as opposed to an exactly sorted, order, such as by performing a limited number of iterations of a quicksort algorithm; maintained using an insertion sort, such as a tree insertion or a list insertion, when a particular one of the blocks is added to the free list; maintained in a sorted order using respective sorting criteria values of each of the blocks in the particular free list as of when the blocks were added to the particular free list; and periodically re-sorted, in whole or in part, using updated respective sorting criteria values of each of the blocks in the particular free list.

In some embodiments, a particular one of the free lists is maintained as a plurality of sub-free lists, the sub-free lists having an ordering according to a set of the sorting criteria. Optionally, blocks in each of one or more of the sub-free lists are also sorted according to the same or a different set of the sorting criteria. According to various embodiments, blocks are allocated from the sub-free lists according to one or more of: randomly; in a specified order; in order according to the set of the sorting criteria; and in any other order.

For example, a particular one of the free lists is associated with a particular subset of the less-fine-grained memory (such as a shard) and has four sub-free lists. Each of the sub-free lists corresponds to a respective range of counts of previous write and/or erase cycles of blocks of the subset of the less-fine-grained memory. The four sub-free lists correspond to ones of the blocks that have been written and/or erased: less than or equal to 1000 times (a first sub-free list); more than 1000 but less than or equal to 10000 times (a second sub-free list); more than 10000 but less than or equal to 100000 times (a third sub-free list); and more than 100000 times (a fourth sub-free list). When a particular one of the blocks is made available, such as after being erased, the particular block is added to an appropriate one of the sub-free lists, based, at least in part, upon a count of previous write and/or erase cycles of the particular block. Continuing the example, each of the sub-free lists is sorted by utilization so that ones of the blocks in more heavily utilized areas (such as on data busses having higher utilization) are further towards the back of the sub-free list (and are less likely to be allocated).

Further in the example, when allocating one of the blocks from the particular free list, ten of the blocks are allocated from the first sub-free list for every one of the blocks allocated from the second sub-free list (assuming the first sub-free list is non-empty). Similarly, ten of the blocks are allocated from the second sub-free list for every one of the blocks allocated from the third sub-free list. The fourth sub-free list is solely used if the first sub-free list, the second sub-free list, and the third sub-free list are all empty. Of course, in various embodiments, the sub-free lists are organized in manners other than in powers of 10, such as in powers of other numbers, or such as by a frequency distribution of the write and/or erase cycle counts of the blocks of the subset of the less-fine-grained memory, as determined either statically at initialization or dynamically during operation. In various embodiments, rates of removing blocks from the sub-free lists are determined in fashions other than and/or in addition to proportionality of the magnitude of the ranges of the counts of previous write and/or erase cycles, such as according to a respective size (depth) of the sub-free lists.

According to various embodiments, an expected write frequency of a particular paragraph is determined according to one or more of: information from a user, such as information provided when the particular paragraph is created, or later information provided by the user, information of a container in which the particular paragraph is contained, such as a type and/or an organization of the container; a coalescing age associated with the particular paragraph; a timestamp associated with the particular paragraph, such as a timestamp of a block where the particular paragraph was previously stored; history, such as write history, associated with the particular paragraph or with related paragraphs (such as other paragraphs in a same shard); assumptions about the expected write frequency, such as assuming any newly created paragraph is more likely to be updated, or assuming that any paragraph reallocated for coalescing is less likely to be updated; and other similar factors. In further embodiments, an expected write frequency of a particular page and/or a particular block (such as a page and/or a block in a write buffer) is determined based, at least in part, on the expected write frequencies of one or more paragraphs contained in the particular page and/or the particular block. For example, in some embodiments, paragraphs are selectively organized in active blocks of a write buffer according to a respective expected write frequency of the paragraphs.

In some embodiments, paragraphs with a lower (less frequent) expected write frequency are reallocated to more heavily written (more worn) blocks of the less-fine-grained memory. For example, the less frequently written paragraphs are assumed to be less likely to be written in the future, and this enables the more worn blocks to be used for storage without writing the more worn blocks an excessive number of times. In some embodiments, paragraphs with a higher (more frequent) expected write frequency (and/or, in further embodiments, newly-written paragraphs) are written to less heavily written (less worn) blocks of the less-fine-grained memory. For example, the more frequently written (and/or, in further embodiments, the newly-written) paragraphs are assumed to be more likely to be written in the future, and this enables the less worn blocks to be used for storage in a manner that makes wear of the blocks more even. In various embodiments, segregating data in the less-fine-grained memory by write frequency, such as by associating paragraphs with blocks of the less-fine-grained memory in a manner that puts paragraphs with a higher expected write frequency in less-worn blocks and/or that puts paragraphs with a lower expected write frequency in more-worn blocks, reduces fragmentation of the less-fine-grained memory and/or makes wear of blocks of the less-fine-grained memory more even.

In some embodiments, blocks are selectively allocated from a particular one of the free lists (and/or from a sub-free list of the particular free list) according to information of the blocks being written to the less-fine-grained memory. The information of the blocks being written includes factors such as the expected write frequency of the blocks; information of a container associated with the blocks being written, such as a type and/or an organization of the container, and other similar factors. For example, the particular free list is maintained in a sorted order with blocks having less wear (such as a smaller number of previous erase cycles) at the front of the particular free list, and blocks having more wear (such as a larger number of previous erase cycles) at the back of the particular free list. Contents of a first one of the blocks being written to the less-fine-grained memory are determined to have a low (infrequent) expected write frequency. Accordingly, a more heavily worn block is allocated from (the back of) the particular free list for the first block. Contents of a second one of the blocks being written to the less-fine-grained memory are determined to have a high (frequent) expected write frequency. Accordingly, a less heavily worn block is allocated from (the front of) the particular free list for the second block. Of course, in various embodiments, blocks are allocated from any part of one of the free lists according to various factors associated with the sorting of the free list and/or of blocks being written to the less-fine-grained memory for which the allocation is being performed.

Each of the free lists is implemented, for example, as one or more of: a bit map; a queue; a linked list; an array, such as an array with a pointer to a highest in-use element; a structure supporting sorted free lists, such as a tree structure; and any other data structure, such as a data structure compatible with the organization and/or the ordering of the free lists (and/or sub-free lists thereof).

In some embodiments and/or usage scenarios, blocks on the free lists are shuffled (such as swapped) among the free lists to aid in wear leveling. For example, a first one of the write buffers (used for coalescing and/or for new data) is associated with a first one of the free lists (such as for a first shard), and a second one of the write buffers (used for coalescing and/or for new data) is associated with a second one of the free lists (such as for a second shard). A wear leveling thread (or, in various embodiments, one of the coalescing-processing or erasing threads), determines that blocks of the first shard are less worn than blocks of the second shard (such as by using a number of erase cycles stored in each of the blocks or in a block information table, computing a respective average number of erase cycles for each of the shards, and comparing the averages). If a difference in wear between the blocks of the first shard and the blocks of the second shard is greater than a specified threshold, then a determined number of selected ones of the blocks of the free list of the first (less worn) shard are swapped with the determined number of selected ones of the blocks of the free list of the second shard. According to various embodiments, one or more of: at least some of the selected blocks of the first shard are selected to have a number of erase cycles less than the average number of erase cycles of the first shard and/or less than the average number of erase cycles of the second shard; and at least some of the selected blocks of the second shard are selected to have a number of erase cycles greater than the average number of erase cycles of the second shard and/or greater than the average number of erase cycles of the first shard.

In various embodiments and/or usage scenarios, one of the free lists uses logical blocks of a different size than the blocks (or logical blocks) of another of the free lists. The shuffling of blocks shuffles equivalent numbers of physical blocks, even in embodiments where the free lists are lists of logical blocks. In some embodiments and/or usage scenarios, the shuffling of blocks into a particular one of the free lists organized as logical blocks and with a fixed assignment of memory devices to logical blocks maintains the fixed assignment by solely shuffling in blocks selected so as to not change the fixed assignment.

Error Detection and Error Correction

Figures 11A, 11B, 11C:
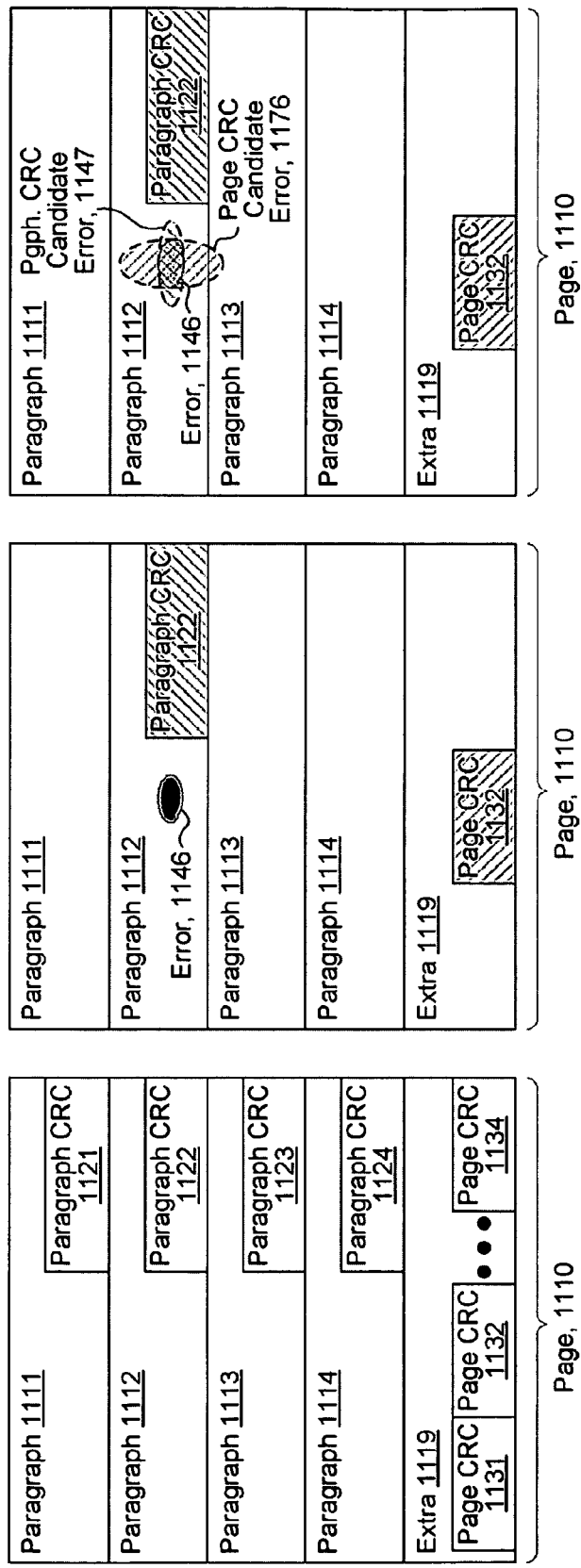
FIGS. 11A-11C illustrate an example of error detection and correction within a page.

FIGS. 11A-11C illustrate an example of error detection and correction within a page. While the example of FIGS. 11A-11C illustrates a page with four paragraphs, in other embodiments, a page includes a plurality of paragraphs. The principles described below for the example are applicable to pages with various numbers of paragraphs.

In some embodiments, pages of the less-fine-grained memory include a data portion and an extra portion. For example, in some embodiments and/or usage scenarios, a page includes 2 KB of data and 64 B of "extra" space. The extra space is used to store system information, such as mapping information, and to store information used for error detection and/or error correction. In various embodiments and/or usage scenarios, an error correcting code is used, at least in part, as an error detecting code. In a first example, an error correcting code is used first in hardware to detect errors, and then subsequently in software to correct the errors. In a second example, by not using all correction ability of an error correcting code, some of the correction ability is usable to detect errors.

As illustrated in FIG. 11A, each page, such as page 1110, includes a plurality of paragraphs (1111 through 1114), and each paragraph includes a respective portion of the data of the page, and a respective portion of the extra space of the page. In various embodiments, the respective portion of the extra space contains a paragraph-level error detection and/or error correction code, such as a CRC (paragraph CRCs 1121 through 1124). (In some embodiments, the paragraph CRCs are instances of per-paragraph EDC 979 as illustrated in FIG. 9D.) In further embodiments, the respective portions of the extra space of all of the paragraphs of the page do not use all of the extra space of the page, and a respective page-level portion of the extra space of the page is left over. In still further embodiments, the respective page-level portion of the extra space contains a page-level error detection and/or error correction code, such as one or more page CRCs (1131 through 1134). (In some embodiments, the page CRCs are instances of vertical EDC 959 as illustrated in FIG. 9B.) According to various embodiments, a number of the page CRCs is the same as and/or is different from a number of the paragraph CRCs. According to various embodiments, a size of each of the page CRCs is the same as and/or is different from a size of each of the paragraph CRCs. In some embodiments, a first one of the page CRCs is of a different size than a second one of the page CRCs.

In some embodiments, individual ones of the paragraphs are read from the less-fine-grained memory. In other embodiments, an entire page is read from the less-fine-grained memory, but a particular one of the paragraphs is read first, the particular paragraph depending, for example, on an element identifier, such as an address, provided and/or used by one of the respective processors. A paragraph-level error detection and/or correction code enables, in some usage scenarios, processing of the particular paragraph after the particular paragraph is read, and prior to reading the entire page.

In some embodiments, when reading a particular one of the paragraphs, a paragraph-level error detection and/or correction code is used solely for error detection. In further embodiments, an error detected when reading the particular paragraph is correctable by reading the entire page (or, one or more of a plurality of sub-pages of the page), and by using a combination of the paragraph-level error detection and/or correction code and a page-level error detection and/or correction code (or one or more sub-page level error detection and/or correction codes). In other embodiments, paragraphs selectively cross page boundaries within a block, and an error detected when reading the particular paragraph is correctable by reading one or more pages containing the paragraph, and by using a combination of the paragraph-level error detection and/or correction code and page-level error detection and/or correction codes of the one or more pages.

In some embodiments, a paragraph-level error detection code is a CRC code, such as an 18-bit CRC or a 20-bit CRC, protecting the respective portion of the data and the respective portion of the extra space. In some embodiments, the page-level error detection and/or correction code is a plurality of CRCs, such as four 16-bit CRCs, each of the CRCs protecting a "slice" of data across all the paragraphs of the page, and, in further embodiments, at least a part of the page-level portion of the extra space. According to various embodiments, the data protected by a particular one of the page CRCs is chosen so that one or more of: adjacent bytes in a paragraph are protected by different ones of the page CRCs (and thus errors in adjacent bytes affect multiple ones of the page CRCs); and adjacent pairs of bits in a paragraph are protected by different ones of the page CRCs (and thus errors in adjacent pairs of bits affect multiple ones of the page CRCs). According to various embodiments, the data protected by a particular one of the page CRCs is chosen based upon one or more of: error characteristics of the memory devices; transfer sizes of the memory devices; bus widths of devices participating in reading of data from the memory devices; granularities of the memory devices; internal organization of the memory devices; and organizations of memories holding data read from the memory devices.

An error in a particular one of the paragraphs is detected, when the particular paragraph is read, by processing (evaluating a CRC syndrome of) the particular paragraph (including the paragraph CRC of the particular paragraph). In an event of an error, the remainder of the page is read. Using a burst-trapping technique on the paragraph CRC of the particular paragraph, a first candidate isolated error in the form of a short burst is determined in the particular paragraph. Using a burst-trapping technique on the page CRCs of the page, a second candidate error is determined. If the paragraph CRC of the particular paragraph and the page CRCs of the page produce a same candidate error, the candidate error is verified, and the error is correctable. A failure of the paragraph CRC of the particular paragraph and the page CRCs of the page to produce a same candidate error indicates that the page has a more serious error. In some usage scenarios, more complex errors, such as multiple burst errors, are correctable than illustrated by the above example, such as by software techniques.

For example, as illustrated in FIG. 11B, an error (1146) in paragraph 1112 of page 1110 causes paragraph CRC 1122 to detect an error, and causes page CRC 1132 to also detect an error. As illustrated in FIG. 11C, burst trapping on page CRC 1132 produces page CRC candidate error 1176, and burst trapping on paragraph CRC 1122 produces paragraph CRC candidate error 1147. (For purposes of illustration, the candidate errors are shown as non-coincident; if the error is correctable by this first-order technique, the candidate errors and the error are all coincident.) Because the candidate errors indicate a same one or more error locations, error 1146 is identified and is correctable (such as by inverting each bit in the error).

In a more complex example, error 1146 affects multiple ones of the page CRCs. A similar procedure to the above, but using burst trapping on each of the multiple page CRCs and accumulating the detected bursts, is enabled to determine the error so that the error is correctable.

According to various embodiments, encoding and/or decoding of error detection and/or error correction codes is performed by one or more of hardware circuitry, state machines, microcontrollers, firmware, software, the respective processors, and control and/or diagnostic processors.

In some embodiments, the per-page information is protected analogously to protection of paragraphs using an error detecting and/or correcting code to protect the per-page information (such as per-page information EDC 957 in FIG. 9B), and using vertical CRC information, such as the page CRCs, also covering the per-page information to enable reliable correction.

Figures 11D, 11E:
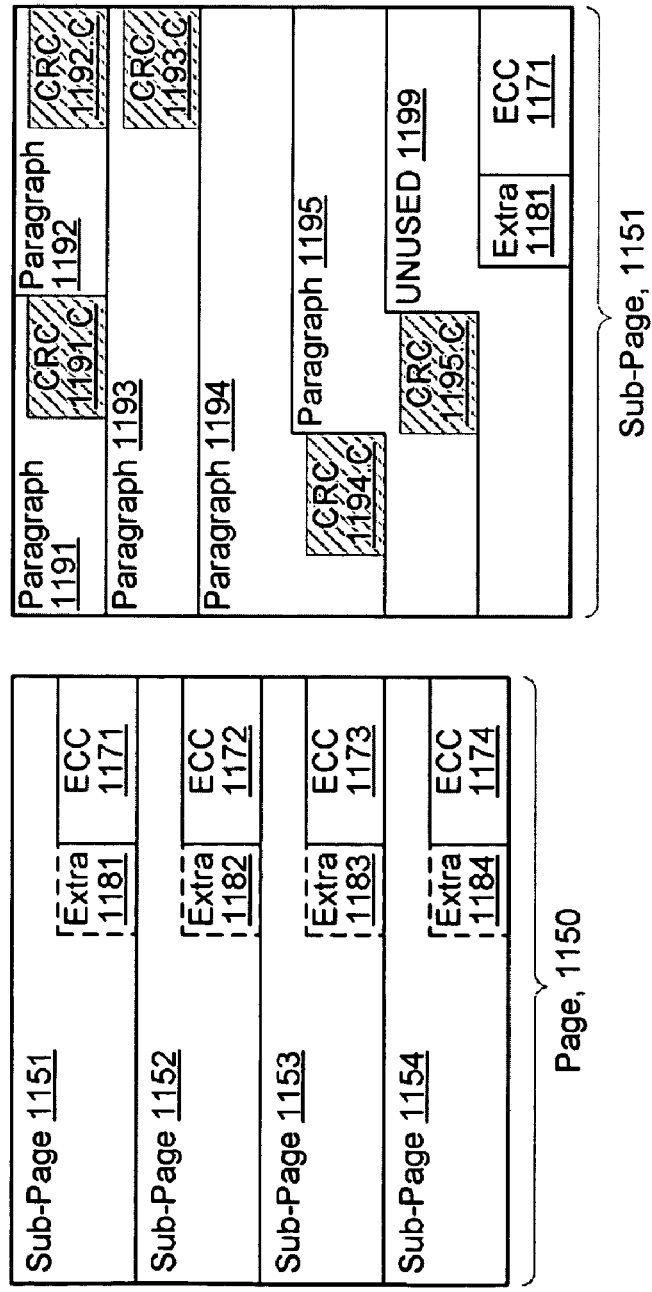
FIG. 11D illustrates an example of a page organized as one or more sub-pages, each sub-page protected by an ECC code.
FIG. 11E illustrates an example of a sub-page including one or more paragraphs, each paragraph protected by a CRC code.

FIG. 11D illustrates an example of a page organized as one or more sub-pages, each sub-page protected by an ECC code, such as a Reed-Solomon code. In some embodiments, page 1150 is divided into one or more sub-pages (for example, four sub-pages 1151, 1152, 1153, and 1154 as illustrated in FIG. 11D), each sub-page having a respective ECC code (1171, 1172, 1173, and 1174) stored at an end of the sub-page. (While FIG. 11D illustrates the respective ECC code stored at the end of each of the sub-pages, in various embodiments, the respective ECC code is stored in and/or adjacent to any part of the sub-page, or elsewhere in page 1150, or elsewhere in a block containing page 1150.) According to various embodiments, the respective ECC codes of one or more sub-pages of a page are stored in one or more of: as part of and/or adjacent to the associated sub-pages; elsewhere within the page; and elsewhere within a block containing the page. For example, in some embodiments, storing the respective ECC codes at a fixed location within the block containing the page (and not within the page, but elsewhere within the block) enables more space on the page to be used for user-accessible data. While space per block for user-accessible data is not increased, in various embodiments and/or usage scenarios, increasing an amount of user-accessible data on the page provides higher user throughput, as the respective ECC codes are rarely accessed in conjunction with reading the page.

In some embodiments, each of the sub-pages also has respective extra space (1181, 1182, 1183, and 1184) stored as part of the sub-page and optionally protected by the respective ECC code. (While FIG. 11D illustrates the respective extra space stored near the end of each of the sub-pages, in various embodiments, the respective extra space is stored in and/or adjacent to any part of the sub-page.) In various embodiments, the extra space of the page is divided into space for the respective ECC codes of the sub-pages, and optionally left-over extra space distributed among the sub-pages. In further embodiments, the respective extra spaces of some of the sub-pages differ in size. For example, in some embodiments, a first one of the sub-pages has respective extra space, and a second one of the sub-pages does not have respective extra space.

In some embodiments, dividing a page into sub-pages, each sub-page with a respective ECC code, provides a finer granularity for fixed-size chunks of a node address space to be mapped to physical sub-pages (used as fixed-sized paragraphs) of the less-fine-grained memory, where the chunks are provided with ECC coverage.

FIG. 11E illustrates an example of a sub-page including one or more paragraphs, each paragraph protected by a CRC code. In some embodiments, the paragraphs are of a fixed size. In other embodiments, the paragraphs are variable in size. In some embodiments, sub-page 1151 (as illustrated in FIG. 11D) stores one or more paragraphs (for example, five paragraphs 1191, 1192, 1193, 1194, and 1195 as illustrated in FIG. 11E), each paragraph having a respective CRC (1191.C, 1192.C, 1193.C, 1194.C, and 1195.C) stored as part of the paragraph. According to various embodiments and/or usage scenarios, a sub-page has one or more of: no unused space; unused space at the end of the sub-page (such as unused space 1199); and unused space at one or more places within the sub-page. In a first example, a sub-page has unused space because the sub-page is written to the less-fine-grained memory prior to it being entirely filled. In a second example, a sub-page has unused space because one or more paragraphs within the sub-page have been re-written (modified since the sub-page was written to the less-fine-grained memory), leaving the previous copies of the one or more paragraphs as unused. For example, in various embodiments and/or usage scenarios, if paragraph 1193 is re-written, then the space used by paragraph 1193 becomes unused.

In some embodiments and/or usage scenarios, providing each paragraph with a respective CRC enables a memory sub-system controller (such as memory sub-system controller 112 in FIG. 1D) to read any particular one of the paragraphs independent of reading the entire sub-page containing the particular paragraph, while still being able to detect errors in the particular paragraph using the respective CRC.

While FIG. 11E illustrates an example of a sub-page including one or more paragraphs, an illustration of a page including one or more paragraphs, or of a block including one or more paragraphs, is, in some embodiments, substantially similar.

According to various embodiments, encoding and/or decoding of error detection and/or error correction codes is performed by one or more of hardware circuitry, state machines, microcontrollers, firmware, software, the respective processors, control and/or diagnostic processors, and any combination of the foregoing.

Compression

Figures 12A, 12B:
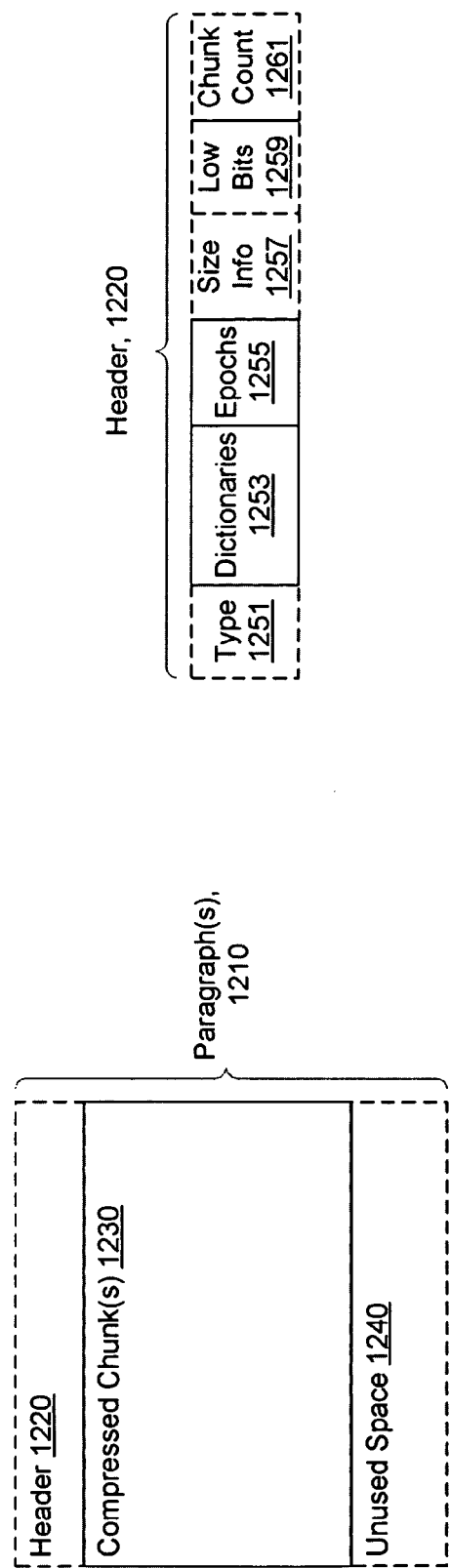
FIG. 12A illustrates an embodiment of a compressed version of one or more chunks.
FIG. 12B illustrates an embodiment of a header of a compressed version of one or more chunks.

FIG. 12A illustrates an embodiment of a compressed version of one or more chunks. Compressed chunks 1230 as illustrated in FIG. 12A represent a data portion of a compressed version of one or more chunks of data, such as compressed by compress/decompress 370 (illustrated in FIG. 3B). In some embodiments, compress/decompress 370 prepends a header, such as header 1220, to compressed chunks 1230. The header and the compressed chunks are stored in one or more paragraphs, such as paragraph(s) 1210. In some embodiments, the header and the compressed chunks do not fill the one or more paragraphs, and leave some space unused at the end of the one or more paragraphs, such as unused space 1240.

FIG. 12B illustrates an embodiment of a header of a compressed version of one or more chunks as stored in one or more paragraphs. According to various embodiments, header 1220 includes one or more fields, such as: a type (1251), such as a type of compression; a specification of one or more dictionaries (1253) used in the compression; one or more epoch fields (1255), storing epoch fields corresponding to at least some of the one or more chunks; a size field (1257) specifying a size of valid data in the paragraphs and/or in a last one of the paragraphs; a low-bits field (1259) specifying the low bits of an address, such as a node address, of the first one of the one or more chunks; a chunk count field (1261), specifying a count of the number of chunks stored, in compressed form, in the paragraphs; and other information. According to various embodiments, a value of the type field determines one or more of: a format of the fields of the header; an arrangement of the fields of the header; and which of the various fields are present in the header. In some embodiments, the header includes information such as a chunk count, and mapping information (such as mapping entry 1 1011 in FIG. 10B) does not store and/or redundantly stores the information. In some embodiments, the header includes information such as a size field and/or a low-bits field, and per-paragraph information (such as per-paragraph information 940 in FIG. 9D) does not store and/or redundantly stores the information. In some embodiments, epoch field 1255 in the header stores epoch fields associated with subsequent ones of the one or more chunks after a first one of the one or more chunks. In various embodiments, the epoch field of the first one of the one or more chunks is stored in per-paragraph information associated with the first of the paragraphs. In further embodiments, the epoch field is not included in the header if the paragraphs store a single chunk.

Mirroring

In some embodiments, some or all of contents of the respective memory sub-system of a particular one of the nodes is mirrored on one or more other nodes. In a first example, some or all of the contents of a cache of the particular node, such as a cache of the respective less-fine-grained memory of the particular node, are mirrored in caches of the one or more other nodes. In some embodiments and/or usage scenarios, mirroring of the cache provides copies in more than one of the nodes of any data whose most recent version is not yet stored in the less-fine-grained memory. In a second example, some or all of the contents of the respective less-fine-grained memory of the particular node, are mirrored in the respective less-fine-grained memories of the one or more other nodes.

According to various embodiments, the mirroring is performed by one or more of: hardware mirroring logic on the particular node and the one or more other nodes; firmware, such as firmware running on a control processor of the particular node and/or the one or more other nodes; software, such as software running on the respective processors of the particular node and/or the one or more other nodes; and any combination thereof.

In some embodiments, mirroring provides redundancy on write, in that all writes that are mirrored are performed in both the particular node and on one of the other nodes. In some embodiments, mirroring is based on physical addresses, and a mirrored copy of data of the particular node on one or more others of the nodes is a copy of physical memory, such as a copy of each of the mirrored pages of the less-fine-grained memory. In other embodiments, mirroring is based on node addresses, and a mirrored copy of data of the particular node represents a software view of the data rather than a physical view. In various embodiments, the software view mirrors software entities such as data structures or containers. In some embodiments, containers are composed of one or more shards, and each of the shards corresponds to a portion of the less-fine-grained memory on a respective one of the nodes. In further embodiments and/or usage scenarios, shards are mirrored and each of the shards has a home node (containing a master copy of the corresponding portion of the less-fine-grained memory), and one or more replica nodes (containing respective replica copies of the corresponding portion of the less-fine-grained memory).

Hot Standby

In some embodiments, one or more of the nodes are reserved as hot standby nodes. In the event of a failure of an active one of the nodes, one of the hot standby nodes is enabled to take over for the failed node. In some embodiments, there is one hot standby node for each active node. In other embodiments, there is one hot standby node shared among a number of the active nodes.

In some embodiments, a particular one of the hot standby nodes is kept in synchronization with a particular one of the active nodes. According to various embodiments, the synchronization is performed by one or more of: hardware synchronization logic on the particular active node and the particular standby node; firmware, such as firmware running on a control processor of the particular active node and/or the particular standby node; software, such as software running on the respective processors of the particular active node and/or the particular standby node; and any combination thereof.

In some embodiments, the synchronization maintains one or more memories of the particular active node and the particular standby node in synchronization, such as the respective less-fine-grained memory and/or the respective fine-grained memory. In further embodiments, the synchronization is of software-controlled units of memory, such as data structures or containers. In various embodiments, the synchronization provides synchronization of information related to software tasks executing on the particular active node so that the particular standby node is enabled to take over the software tasks in an event of a failure of the particular active node.

Software

In some embodiments, one or more of the nodes cooperatively run a distributed application, such as a database. In some embodiments, a first portion of the nodes runs a first application and/or a first set of tasks, and a second portion of the nodes runs a second application and/or a second set of tasks. In a first example, in some embodiments, the first portion of the nodes runs a database system, such as an on-line transaction processing system, and the second portion of (lie nodes runs a decision support system, such as a data mining system. In a second example, in some embodiments, the first portion of the nodes runs a front-end portion of an application, and the second portion of the nodes runs a set of tasks to perform a back-end portion of the application, under the management and/or control of the first portion.

In some embodiments, software running on the nodes is unchanged from distributed software images that run on processors of a same architecture as that of the respective processors of the nodes. For example, in some embodiments, the nodes run a Linux operating system distribution and/or a Windows™ operating system distribution and/or applications for either of the Linux and/or the Windows™ operating systems.

In some embodiments, some or all of the software run on the nodes is advantageously modified, such as by re-writing and/or by re-compiling, to use the less-fine-grained memory and/or the ACID memory properties. In a first example, a database application is modified to avoid some or all usage of locks and/or semaphores by advantageously using transactional memory and/or transaction coherency. In a second example, a software application is modified to use hardware lock primitives that support (in hardware) any necessary inter-node communication for locking, avoiding software-based inter-node communication to maintain and/or control the locking. In a third example, a distributed application is modified to use a global, shared memory (the less-fine-grained memory) rather than some or all file operations. The respective interconnect switches and/or the respective memory sub-system controllers incorporate logic, such as an ACID functional unit, to, at least in part, enable maintaining transactional consistency on data communicated among the nodes, such as via the global, shared memory. The logic provides one or more of inter-node ACID memory properties and/or or inter-node, hardware-supported locking. In a fourth example, an application is modified to use properties of the less-fine-grained memory, such as the chunk size, and to perform more efficiently than an unmodified application. In a fifth example, an application is modified to use streams of sequential writes to the less-fine-grained memory rather than file operations for some or all logging and/or history, such as transaction logging.

In some embodiments, some or all of the software run on the nodes is advantageously modified, such as by re-writing and/or by re-compiling, to use knowledge of an arrangement of the less-fine-grained memories in the node address space (such as node address space 500 in FIG. 5A). In a first example, memory allocation software advantageously allocates memory in a fashion that distributes accesses to the less-fine-grained memories across a plurality of the nodes. In a second example, memory allocation software selects a particular one of the less-fine-grained memories from which to allocate a piece of memory based on utilizations of the less-fine-grained memories. In some embodiments, the utilization accounts for respective compression effectiveness of data stored in each one of the less-fine-grained memories.

According to various embodiments, some or all of the software run on the nodes accesses the less-fine-grained memories of the nodes using one or more of: load and/or store operations; put and/or get operations; prefetch versions of any of the foregoing; and other communication techniques, such as a message-based protocol. In various embodiments, any of the techniques for accessing the less-fine-grained memories operate asynchronously.

According to various embodiments, some or all of the software run on the nodes accesses the less-fine-grained memories of the nodes using one or more of: raw (unmapped) accesses; non-cacheable accesses; and cacheable accesses. In some embodiments, some or all of the software run on the nodes accesses the less-fine-grained memories using accesses that are cache coherent with respect to at least some of the respective processors. For example, in some embodiments, load/store operations used to access the less-fine-grained memory are cache coherent.

Database

In some embodiments, a database includes one or more modules that optionally and/or selectively execute on a same and/or on separate ones of the nodes. Processes executing on the nodes as part of the database cooperate and perform requests and/or queries. According to various embodiments, one or more of: multiple of the requests and/or queries are performed in parallel by one or more of the nodes; and a single one of the requests and/or queries is performed in parallel by a plurality of the nodes. In some embodiments, the processes use scatter/gather techniques to perform one of the requests and/or one of the queries in parallel. In some embodiments, the processes share data, such as by using a message-passing protocol, to perform one of the requests and/or one of the queries in parallel. In various embodiments, the software uses prefetching into a cache of the less-fine-grained memory and/or into a cache or a directly-connected memory of the respective processors to achieve higher performance.

In some embodiments, such as for decision support applications, intermediate results are advantageously stored in the fine-grained memories and/or the less-fine-grained memories of the nodes. In further embodiments, the intermediate results are processed as the intermediate results are being generated. For example, as a first one of the nodes is writing the intermediate results to a region of the less-fine-grained memory, a second one of the nodes is reading and processing the intermediate results.

In some embodiments and/or usage scenarios, a decision support application using a first database co-exists on a same system of one or more nodes with an on-line transaction processing application using a second database.

File System

In some embodiments, at least a portion of the less-fine-grained memories of the nodes are organized as one or more memory-based file systems. In various embodiments, memory used for at least some of the file systems is distributed across a plurality of the nodes. In further embodiments, such as where software uses raw accesses to the less-fine-grained memory, a mapping between files of one of the file systems and physical locations in the less-fine-grained memory is managed by software. In still further embodiments, the mapping of a particular one of the files specifies a particular one of the nodes, and a physical location in the less-fine-grained memory of the particular node. In other embodiments, a first level of mapping between files of one of the file systems and one or more ranges of addresses in a node address space is managed in software, and a second level of mapping between chunks of the node address space and physical locations in the less-fine-grained memories of the nodes is managed, at least in part, by hardware, such as by a memory sub-system controller.

Example Hardware Embodiment Techniques

In some embodiments, various combinations of all or portions of functions performed by a node (such as node 100 of FIG. 1A), a system including a plurality of nodes (such as system 190 in FIG. 1C), an ASIC including an interconnect switch and a memory sub-system controller (such as ASIC 105 in FIG. 1A), an ASIC including an interconnect switch and one or more CPUs (such as ASIC 106 in FIG. 1B), an interconnect switch (such as switch 116 of FIG. 2A), a memory sub-system (such as memory sub-system 108 of FIG. 3A), a memory sub-system controller (such as memory sub-system controller 112 of FIG. 3B), a less-fine-grained memory DIMM including a control CPLD (such as DIMM 305.A1 of FIG. 3A), a control CPLD (such as CPLD 328.A1 of FIG. 3A), and portions of a processor or a microprocessor providing all or portions of the aforementioned functions, are specified by descriptions compatible with processing by a computer system (e.g. Verilog, VHDL, or any similar hardware description language). In various embodiments the processing includes any combination of interpretation, compilation, simulation, and synthesis to produce, to verify, or to specify logic and/or circuitry suitable for inclusion on an integrated circuit. The integrated circuit, according to various embodiments, is designed and/or manufactured according to a variety of techniques. The techniques include a programmable technique (such as a field or mask programmable gate array integrated circuit), a semi-custom technique (such as a wholly or partially cell-based integrated circuit), and a full-custom technique (such as an integrated circuit that is substantially specialized), any combination thereof, or any other technique compatible with design and/or manufacturing of integrated circuits.

CONCLUSION

Certain choices have been made in the description merely for convenience in preparing the text and drawings and unless there is an indication to the contrary the choices should not be construed per se as conveying additional information regarding structure or operation of the embodiments described. Examples of the choices include: the particular organization or assignment of the designations used for the figure numbering and the particular organization or assignment of the element identifiers (i.e., the callouts or numerical designators) used to identify and reference the features and elements of the embodiments.

The words "includes" or "including" are specifically intended to be construed as abstractions describing logical sets of open-ended scope and are not meant to convey physical containment unless explicitly followed by the word "within."

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description and are within the scope of the claims of the issued patent. For example, interconnect and function-unit bit-widths, clock speeds, and the type of technology used are variable according to various embodiments in each component block. The names given to interconnect and logic are merely exemplary, and should not be construed as limiting the concepts described. The order and arrangement of flowchart and flow diagram process, action, and function elements are variable according to various embodiments. Also, unless specifically stated to the contrary, value ranges specified, maximum and minimum values used, or other particular specifications (such as a capacity, width, bandwidth, or number of memory chips; a physical packaging, arrangement or organization of memory chips; a physical packaging, arrangement or organization of components of a node; a nature, type, capacity, or performance of processors; a bandwidth, type, or protocol of any communications link, connection, or coupling; a number of cores in a processor; a number of processors in a node; a number of nodes in a system; and the number of entries or stages in registers and buffers), are merely those of the described embodiments, are expected to track improvements and changes in implementation technology, and should not be construed as limitations.

Functionally equivalent techniques known in the art are employable instead of those described to implement various components, sub-systems, functions, operations, routines, and sub-routines. It is also understood that many functional aspects of embodiments are realizable selectively in either hardware (i.e., generally dedicated circuitry) or software (i.e., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards, network protocols, or communications links; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or features without altering the basic cooperation among tire remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design include insubstantial changes over the teachings conveyed by the described embodiments. It is also understood that the embodiments described herein have broad applicability to other computing and networking applications, and are not limited to the particular application or industry of the described embodiments. The invention is thus to be construed as including all possible modifications and variations encompassed within the scope of the claims of the issued patent.

What is claimed is:

1. A system comprising: a plurality of nodes, each of the nodes comprising a respective processor, a respective interconnect switch, a respective fine-grained memory comprising a plurality of independently-writable words, and a respective less-fine-grained memory comprising a plurality of independently-writable pages, where units of the respective less-fine-grained memory smaller than one of the pages are not independently writable, where each of the pages is at least twice a size of one of the words of the fine-grained memory, and where the respective less-fine-grained memory is a solid-state, non-volatile memory; an interconnection network coupling the nodes via the respective interconnect switches; wherein the less-fine-grained memories as an aggregate are configured to store a plurality of elements, each of the elements having a respective element identifier; wherein the respective fine-grained-memory of each of at least a first subset of the nodes is enabled to store a respective global map, the respective global map configured to specify for each of the elements, based at least in part on a portion of the respective element identifier, a respective home one of the nodes of the element; wherein, at each of the nodes, the respective less-fine-grained memory is enabled to store a respective subset of the elements, and the respective fine-grained-memory is enabled to store a respective local map, the respective local map having a plurality of entries, each one of the respective subset of the elements associated with a corresponding and distinct one of the entries, each of the entries comprising fields which when populated store a respective physical location of the element associated with the entry, the respective physical location comprising an address of a respective one of the pages of the respective less-fine-grained memory and a respective offset within the respective page; wherein, at a particular one of the first subset of the nodes, the respective processor is configured to determine, via the respective global map, the respective home node of a particular one of the elements, and forward an access of the particular element to the respective processor of the respective home node of the particular element; wherein, at the respective home node of the particular element, the respective processor is configured to access, via the respective local map, the respective physical location of the particular element in the respective less-fine-grained memory, and return a response to the access of the particular element to the respective processor of the particular node; and wherein the particular element and at least one other of the respective subset of the elements of the respective home node of the particular element are enabled to be stored at a same time in the respective page of the respective physical location of the particular element.

2. The system of claim 1, wherein the elements are not all of a same size.

3. The system of claim 2, wherein the particular element and the at least one other of the elements are different in size.

4. The system of claim 2, wherein at least some of the elements are less than 128 bytes in size.

5. The system of claim 2, wherein at least some of the elements are enabled to have a size in a range from a minimum size to a maximum size.

6. The system of claim 1, wherein the access is a write access; wherein the particular element is associated with a particular one of the entries of the respective local map of the respective home node of the particular element, the particular entry enabled, prior to the write access, to store a first one of the physical locations; wherein the respective processor of the respective home node of the particular element is further configured, in conjunction with the write access, to update the particular entry to store a second one of the physical locations; and wherein the respective page of the first physical location is different from the respective page of the second physical location.

7. The system of claim 6, wherein the respective offset of the first physical location is different from the respective offset of the second physical location.

8. The system of claim 7, wherein the respective offset of the first physical location is an index within the respective page of the first physical location, the index having a granularity of no more than 64 bytes.

9. The system of claim 6, wherein the particular node is a first one of the nodes; wherein, at a second one of the nodes, the respective processor is configured, subsequent to completion of the write access, to access the at least one other of the elements by, at least in part, forwarding the access of the at least one other of the elements to the respective processor of the respective home node of the particular element; and wherein, at the respective home node of the particular element, the respective processor is configured to access, via the respective local map, the respective physical location of the at least one other of the elements in the respective less-fine-grained memory, and where the respective page of the respective physical location of the at least one other of the elements is the respective page of the first physical location.

10. The system of claim 9, wherein the second node is different from the first node.

11. The system of claim 9, wherein the particular element and the at least one other of the elements are different in size.

12. The system of claim 9, wherein the respective processor of the respective home node of the particular element is further configured, in conjunction with the write access, to store data of the write access in a particular one of a plurality of pages of a write buffer in the respective fine-grained memory of the respective home node of the particular element, and copy, subsequent to the storing of the data of the write access, the particular page of the write buffer to the respective page of the second physical location in the respective less-fine-grained memory of the respective home node of the particular element.

13. The system of claim 12, wherein the respective home node of the particular element further comprises a back-up power source coupled to the write buffer.

14. The system of claim 13, wherein at least a portion of the respective fine-grained memory of the respective home node of the particular element is not coupled to the back-up power source, the at least a portion of the respective fine-grained memory of the respective home node of the particular element comprising the respective local map of the respective home node of the particular element.

15. The system of claim 13, wherein the respective home node of the particular element further comprises a primary power source coupled to the respective fine-grained memory of the respective home node of the particular element; and wherein the respective processor of the respective home node of the particular element is further configured, in event of a power disruption of the primary power source, to copy the particular page of the write buffer to a determined one of the pages of the respective less-fine-grained memory of the respective home node of the particular element.

16. The system of claim 15, wherein the determined page of the respective less-fine-grained memory of the respective home node of the particular element is the respective page of the second physical location.

17. The system of claim 6, wherein the respective processor of the respective home node of the particular element comprises a memory controller, the memory controller coupled to the respective less-fine-grained memory of the respective home node of the particular element.

18. The system of claim 17, wherein, in conjunction with the write access, the memory controller is configured to compress the particular element.

19. The system of claim 18, wherein, subsequent to the write access, a size of a read access to the respective physical location of the particular element in the respective less-fine-grained memory of the respective home node of the particular element varies according to a compression ratio achieved by the memory controller.

20. The system of claim 1, wherein the particular node is the respective home node of the particular element.

21. The system of claim 1, wherein the respective offset of the respective physical location of the particular element is an index of an independently read-accessible storage location.

22. The system of claim 1, wherein each of the elements is enabled to be stored within one of the respective less-fine-grained memories.

23. The system of claim 1, wherein each of at least some of the elements is enabled to be stored within a first one of the respective less-fine-grained memories, and is further enabled to have a respective replica stored within a second one of the respective less-fine-grained memories, the second less-fine-grained memory different from the first less-fine-grained memory.

24. The system of claim 1, wherein each of the elements smaller in size than one half of a size of one of tire pages of a particular one of the less-fine-grained memories is enabled to be stored along with a respective error detecting code in the particular less-fine-grained memory.

25. The system of claim 24, wherein the respective error detecting code is a Cyclic Redundancy Check (CRC).

26. The system of claim 24, wherein the respective error detecting code is an error correcting code.

27. The system of claim 24, wherein a type of the respective error detecting code is according to a size of the element.

28. The system of claim 24, wherein each of the pages of the particular less-fine-grained memory enabled to store more than one of the elements is further enabled to store an error correcting code protecting the more than one of the elements, the error correcting code different from the respective error detecting codes of the more than one of the elements.

29. The system of claim 28, wherein the error correcting code comprises an independent error correcting code for each of a plurality of sub-pages of the page.

30. The system of claim 28, wherein the error correcting code comprises the respective error detecting codes of at least one of the more than one of the elements.

31. The system of claim 1, wherein the first subset of the nodes is two or more of the nodes.

32. The system of claim 1, wherein the first subset of the nodes is all of the nodes.

33. The system of claim 1, wherein the respective interconnect switch comprises a Network Interface Controller (NIC).

34. The system of claim 33, wherein the interconnection network comprises a network switch.

35. The system of claim 1, wherein the respective less-fine-grained memory of the particular node comprises at least one flash memory chip.

36. The system of claim 1, wherein each one of the respective subset of the elements is associated with the corresponding entry of the respective local map via at least a portion of the respective element identifier.

37. The system of claim 1, wherein the respective element identifier of the particular element comprises an address of the particular element.

38. The system of claim 37, wherein the address is an address in a node address space.

39. The system of claim 1, wherein the respective element identifier of the particular element comprises a text string.

40. The system of claim 39, wherein, for each of at least some of the elements including the particular element, the less-fine-grained memories as an aggregate are further configured to store the respective element identifier along with the element.

41. The system of claim 40, wherein the respective element identifiers of the at least some of the elements are not all of a same size.

42. The system of claim 1, wherein the respective offset is an index within the respective page, the index having a granularity of no more than 32 bytes.

43. A method comprising: mapping, via a map comprising a plurality of entries, each of a plurality of elements associated via a respective element identifier with a corresponding and distinct one of the entries, the respective element identifier of a particular one of the elements to determine a respective physical location of the particular element in a non-volatile memory, where the non-volatile memory comprises a plurality of pages, where units of the non-volatile memory smaller than one of the pages are not independently writable, and where the respective physical location of the particular element comprises an address of a particular one of the pages and an offset within the particular page; reading the particular element by retrieving a first portion less than all of the particular page according to the offset, and where at least one of the elements other than the particular element is stored in a second portion of the particular page, the second portion exclusive of the first portion; and determining if the first portion has an error using a respective portion-specific error-detecting code of the first portion, the respective portion-specific error-detecting code of the first portion stored in the first portion.

44. The method of claim 43, wherein the non-volatile memory is a solid-state memory.

45. The method of claim 43, wherein a size of the particular element is different than a size of one of the at least one of the elements.

46. The method of claim 43, wherein the first portion is a contiguous portion.

47. The method of claim 43, further comprising providing as at least part of an access to the particular element in the non-volatile memory, the respective element identifier of the particular element.

48. The method of claim 47, wherein the providing is by software executing on a processor.

49. The method of claim 48, wherein the software is an application.

50. The method of claim 47, wherein the retrieving the first portion of the particular page is in response to the providing; and further comprising retrieving at least a portion of an other one of the pages of the non-volatile memory, the other page different from the particular page, subsequent to the retrieving the first portion of the particular page and prior to retrieving any of the second portion of the particular page.

51. The method of claim 43, wherein the particular element is a first element, the offset is a first offset, and the at least one of the elements is a second element; and further comprising: retrieving the second portion of the particular page according to a second offset within the particular page, the second offset different from the first offset, and determining if the second portion has an error using a respective portion-specific error-detecting code of the second portion, the respective portion-specific error-detecting code of the second portion stored in the second portion.

52. The method of claim 51, wherein a size of the first element is different than a size of the second element.

53. The method of claim 51, further comprising mapping the respective element identifier of the second element to determine a respective physical location of the second element in the non-volatile memory, where the respective physical location of the second element comprises the address of the particular page and the second offset.

54. The method of claim 43, wherein the respective portion-specific error-detecting code of the first portion is a Cyclic Redundancy Check (CRC).

55. The method of claim 43, further comprising, in response to determining that the first portion has the error, using an error correcting code stored in the particular page to correct the error.

56. The method of claim 55, further comprising storing the error correcting code in a portion of the particular page exclusive of the first portion and exclusive of the second portion.

57. The method of claim 55, wherein the error correcting code protects the first portion of the particular page and the second portion of the particular page.

58. The method of claim 55, further comprising using the respective portion-specific error-detecting code of the first portion solely to determine if the first portion has the error.

59. The method of claim 55, wherein the error correcting code comprises the respective portion-specific error-detecting code of the first portion and at least one other error-detecting code stored in the particular page.

60. The method of claim 43, wherein the corresponding entry of the particular element stores the respective physical location of the particular element.

61. The method of claim 60, further comprising, prior to the reading, writing the particular element; and wherein the writing comprises storing the address of the particular page and the offset within the particular page in the corresponding entry of the particular element.

62. The method of claim 60, further comprising, subsequent to the reading, writing the particular element; and wherein the writing comprises updating the corresponding entry of the particular element so that the respective physical location of the particular element is an updated physical location.

63. The method of claim 62, wherein the particular page is a first page, and the offset within the particular page is a first offset; and wherein the updated physical location comprises an address of a second one of the pages and a second offset within the second page, the second page different from the first page, and the second offset different from the first offset.

64. The method of claim 63, wherein the writing further comprises: writing solely a first part less than all of the particular element to the second page; and writing a remaining part of the particular element to a third one of the pages, the third page different from the first page, and the third page different from the second page.

65. The method of claim 64, wherein the third page is in a same one of a plurality of blocks of the non-volatile memory as the second page, and the third page is adjacent, with respect to addresses of the non-volatile memory, to the second page.

66. The method of claim 64, wherein the third page is in a different one of a plurality of blocks of the non-volatile memory than the second page, and the updated physical location further comprises an address of the third page.

67. The method of claim 43, further comprising, prior to the reading, writing the particular element; and wherein the writing comprises computing the respective portion-specific error-detecting code of the first portion.

68. The method of claim 67, wherein the writing further comprises computing a respective page-specific error-correcting code of the particular page.

69. The method of claim 68, wherein the writing further comprises storing the page-specific error-correcting code in a portion of the particular page exclusive of the first portion and exclusive of the second portion.

70. The method of claim 69, wherein the writing further comprises writing the particular element and the respective portion-specific error-detecting code of the first portion to a region of a write buffer in a volatile memory, and copying the region of the write buffer to the particular page.

71. The method of claim 70, further comprising, in event of a power disruption of a primary power source coupled to the volatile memory, powering the volatile memory with a back-up power source.

72. The method of claim 43, wherein the offset specifies an index within the particular page, the index having a granularity of no more than 64 bytes.

73. The method of claim 72, wherein the offset specifies an index within the particular page, the index having a granularity of no more than eight bytes.

74. The method of claim 43, wherein the elements are not all of a same size.

75. The method of claim 43, wherein the element identifiers specify sections of an address space.

76. The method of claim 75, wherein the element identifiers are addresses of the sections of the address space.

77. The method of claim 43, wherein the element identifiers are keys.

78. The method of claim 77, wherein the keys are text strings.

79. The method of claim 77, wherein the keys are not all of a same size.

* * * * *